US011192082B2

(12) United States Patent
Laine

(10) Patent No.: US 11,192,082 B2
(45) Date of Patent: Dec. 7, 2021

(54) METHODS, DEVICES AND SYSTEMS FOR PROCESSING OF CARBONACEOUS COMPOSITIONS

(71) Applicant: NANOTECH ENERGY, INC., Los Angeles, CA (US)

(72) Inventor: Scott Laine, Chico, CA (US)

(73) Assignee: NANOTECH ENERGY, INC., Los Angeles, CA (US)

( * ) Notice: Subject to any disclaimer, the term of this patent is extended or adjusted under 35 U.S.C. 154(b) by 0 days.

(21) Appl. No.: 16/564,909

(22) Filed: Sep. 9, 2019

(65) Prior Publication Data

US 2020/0086288 A1 Mar. 19, 2020

Related U.S. Application Data

(63) Continuation of application No. 16/130,751, filed on Sep. 13, 2018, now Pat. No. 10,449,505, which is a
(Continued)

(51) Int. Cl.
*B01J 8/10* (2006.01)
*B01J 8/08* (2006.01)
(Continued)

(52) U.S. Cl.
CPC .............. *B01J 8/10* (2013.01); *B01J 8/082* (2013.01); *B01J 8/087* (2013.01); *C01B 32/196* (2017.08);
(Continued)

(58) Field of Classification Search
CPC ..... B01J 8/10; B01J 8/082; B01J 8/087; B01J 2208/00858; B01J 2208/0088;
(Continued)

(56) References Cited

U.S. PATENT DOCUMENTS

RE23,788 E    2/1954  Detjen
3,028,227 A   4/1962  Mario et al.
(Continued)

FOREIGN PATENT DOCUMENTS

CN    102275897 A    12/2011
JP    2006057057 A    3/2006
(Continued)

OTHER PUBLICATIONS

Australian Application No. AU2017222654 First Examination Report dated Aug. 14, 2020.
(Continued)

*Primary Examiner* — Lessanework Seifu
(74) *Attorney, Agent, or Firm* — Wilson Sonsini Goodrich & Rosati

(57) ABSTRACT

Provided herein are methods, devices and systems for processing of carbonaceous compositions. The processing may include the manufacture (or synthesis) of oxidized forms of carbonaceous compositions and/or the manufacture (or synthesis) of reduced forms of oxidized carbonaceous compositions. Some embodiments provide methods, devices and systems for the manufacture (or synthesis) of graphite oxide from graphite and/or for the manufacture (or synthesis) of reduced graphite oxide from graphite oxide.

13 Claims, 123 Drawing Sheets

Related U.S. Application Data continuation of application No. 15/693,222, filed on Aug. 31, 2017, now Pat. No. 10,112,167, which is a continuation of application No. 15/442,336, filed on Feb. 24, 2017, now Pat. No. 9,782,739.

(60) Provisional application No. 62/300,550, filed on Feb. 26, 2016, provisional application No. 62/301,511, filed on Feb. 29, 2016, provisional application No. 62/302,689, filed on Mar. 2, 2016, provisional application No. 62/324,796, filed on Apr. 19, 2016.

(51) Int. Cl.
*C01B 32/198* (2017.01)
*C01B 32/196* (2017.01)
*B01D 33/073* (2006.01)

(52) U.S. Cl.
CPC .......... *C01B 32/198* (2017.08); *B01D 33/073* (2013.01); *B01J 2208/00088* (2013.01); *B01J 2208/00141* (2013.01); *B01J 2208/00752* (2013.01); *B01J 2208/00761* (2013.01); *B01J 2208/00858* (2013.01); *B01J 2208/00867* (2013.01)

(58) Field of Classification Search
CPC ... B01J 2208/00141; B01J 2208/00761; C01B 32/198; C01B 32/182; C01B 32/19; C01B 32/192
See application file for complete search history.

(56) References Cited

U.S. PATENT DOCUMENTS

| | | | |
|---|---|---|---|
| 3,765,051 A | 10/1973 | Wanat | |
| 3,919,088 A | 11/1975 | Doncer et al. | |
| 4,236,999 A | 12/1980 | Burgess et al. | |
| 4,443,421 A | 4/1984 | Hollifield et al. | |
| 4,707,260 A | 11/1987 | Nagayama et al. | |
| 4,909,181 A | 3/1990 | Smith | |
| 5,000,850 A | 3/1991 | Berry | |
| 5,577,675 A | 11/1996 | Ishikawa | |
| 6,419,094 B1 | 7/2002 | Zittel et al. | |
| 9,266,737 B2 | 2/2016 | Ji et al. | |
| 9,782,739 B2 | 10/2017 | Laine | |
| 10,112,167 B2 | 10/2018 | Laine | |
| 10,449,505 B2 | 10/2019 | Laine | |
| 2001/0054581 A1 | 12/2001 | Bertolotti et al. | |
| 2003/0170150 A1 | 9/2003 | Lau et al. | |
| 2003/0170156 A1 | 9/2003 | Kemp et al. | |
| 2003/0224168 A1 | 12/2003 | Mack et al. | |
| 2004/0112806 A1 | 6/2004 | Anderson | |
| 2004/0171321 A1 | 9/2004 | Plant | |
| 2004/0238439 A1 | 12/2004 | Oglesby | |
| 2006/0237694 A1 | 10/2006 | Kaner et al. | |
| 2007/0045200 A1 | 3/2007 | Moon et al. | |
| 2009/0071123 A1 | 3/2009 | Tomazic et al. | |
| 2009/0200248 A1 | 8/2009 | Van Rooyen | |
| 2011/0237762 A1* | 9/2011 | Goto | B01J 19/18 526/75 |
| 2012/0055887 A1 | 3/2012 | Love | |
| 2012/0251613 A1 | 10/2012 | Jain et al. | |
| 2013/0315815 A1 | 11/2013 | Lee et al. | |
| 2014/0272172 A1 | 9/2014 | Zhamu et al. | |
| 2015/0008194 A1 | 1/2015 | Davis et al. | |
| 2015/0098167 A1 | 4/2015 | El-Kady et al. | |
| 2015/0108400 A1* | 4/2015 | Ji | B01J 19/10 252/182.32 |
| 2015/0166348 A1* | 6/2015 | Ikenuma | H01G 11/34 429/231.95 |
| 2015/0298095 A1* | 10/2015 | Ashe | B01F 5/0619 423/659 |
| 2016/0077074 A1 | 3/2016 | Strong et al. | |
| 2016/0101981 A1* | 4/2016 | Hong | B01J 19/1862 423/579 |
| 2016/0148759 A1 | 5/2016 | El-Kady et al. | |
| 2017/0246606 A1 | 8/2017 | Laine | |
| 2017/0361294 A1 | 12/2017 | Laine | |
| 2019/0060798 A1 | 2/2019 | Laine et al. | |

FOREIGN PATENT DOCUMENTS

| | | |
|---|---|---|
| JP | 2007054817 A | 3/2007 |
| KR | 20150020004 A | 2/2015 |
| TW | 200304851 A | 10/2003 |
| WO | WO-2006135430 A2 | 12/2006 |
| WO | WO-2013127712 A1 | 9/2013 |
| WO | WO-2013134207 A1 | 9/2013 |
| WO | WO-2013162649 A2 | 10/2013 |
| WO | WO-2014168362 A1 | 10/2014 |
| WO | WO-2015156396 A1 | 10/2015 |
| WO | WO-2015195700 A1 | 12/2015 |
| WO | WO-2016081638 A1 | 5/2016 |
| WO | WO-2016191564 A1 | 12/2016 |
| WO | WO-2017147468 A1 | 8/2017 |

OTHER PUBLICATIONS

El-Kady et al., Laser scribing of high-performance and flexible graphene-based electrochemical capacitors, Science, 335(6074):1326, 2012.
Indian Application No. IN201817036106 First Examination Report dated May 26, 2020.
PCT/US2017/019423 International Preliminary Report on Patentability dated Sep. 7, 2018.
PCT/US2017/019423 International Search Report and Written Opinion dated May 26, 2017.
PCT/US2018/048602 International Preliminary Report on Patentability dated Mar. 12, 2020.
PCT/US2018/048602 International Search Report and Written Opinion dated Jan. 28, 2019.
Taiwan Application No. 106106573 Search Report dated Sep. 29, 2020.
Tiliakos et al.: Graphite Oxide Post-Synthesis Processing Protocols. Proceedings of the 2nd CommScie International Conference. pp. 33-37 (2015).
U.S. Appl. No. 15/442,336 Office Action dated Apr. 14, 2017.
U.S. Appl. No. 16/130,751 Office Action dated Mar. 18, 2019.
European Patent Application No. 18849599.8 European Search Report dated Apr. 29, 2021.
Japanese Patent Application No. 2018-544273 Office Action dated Feb. 3, 2021.
U.S. Appl. No. 16/116,776 Office Action dated Jun. 19, 2020.
U.S. Appl. No. 16/116,776 Office Action dated Mar. 9, 2021.

* cited by examiner

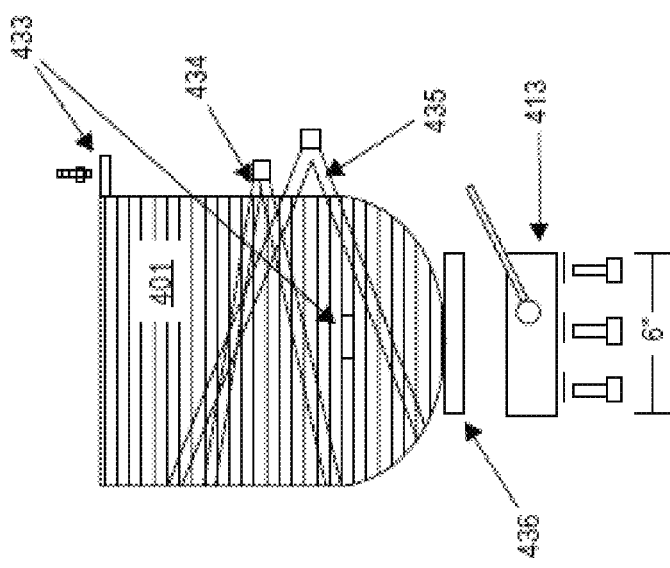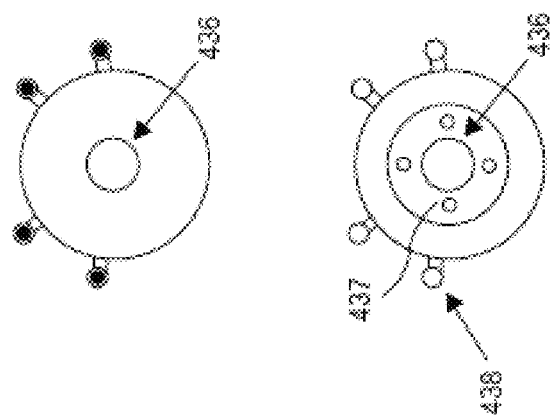
FIG. 4

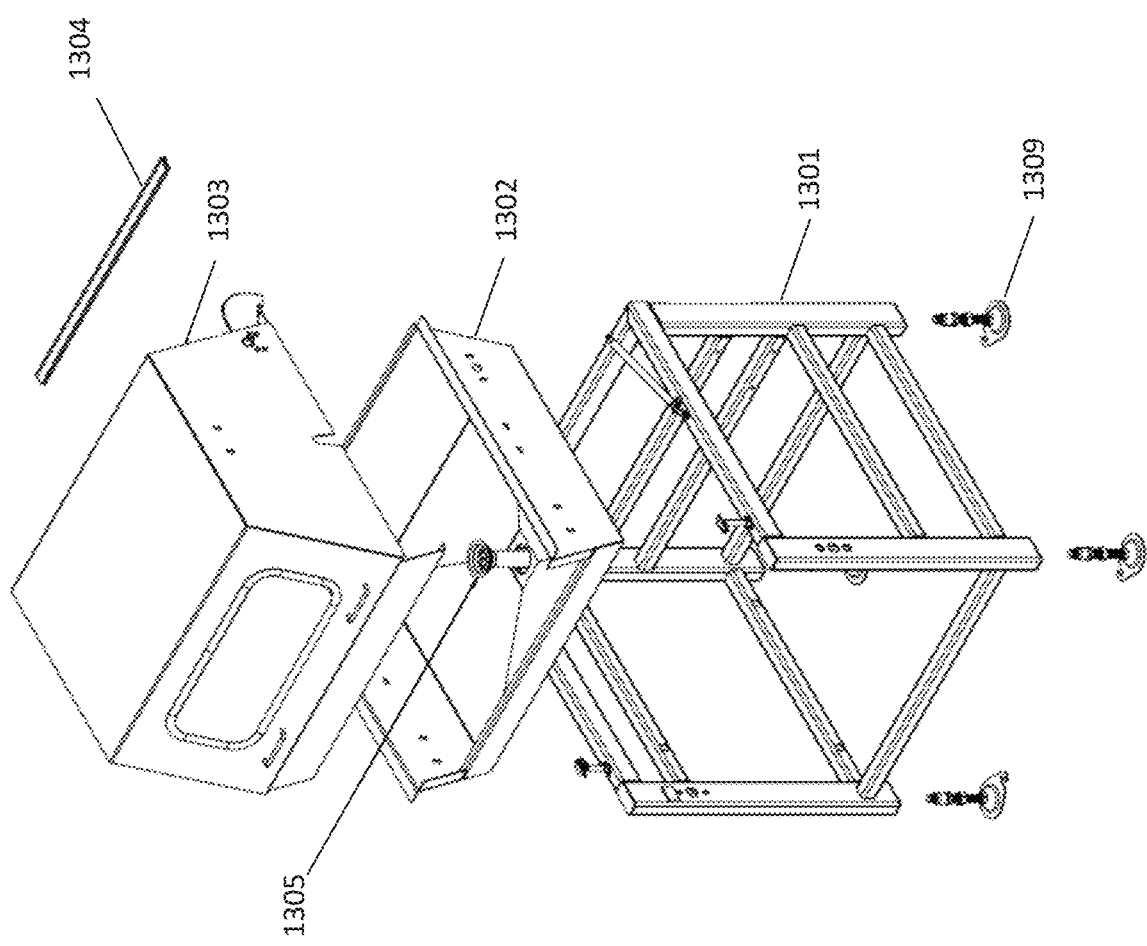

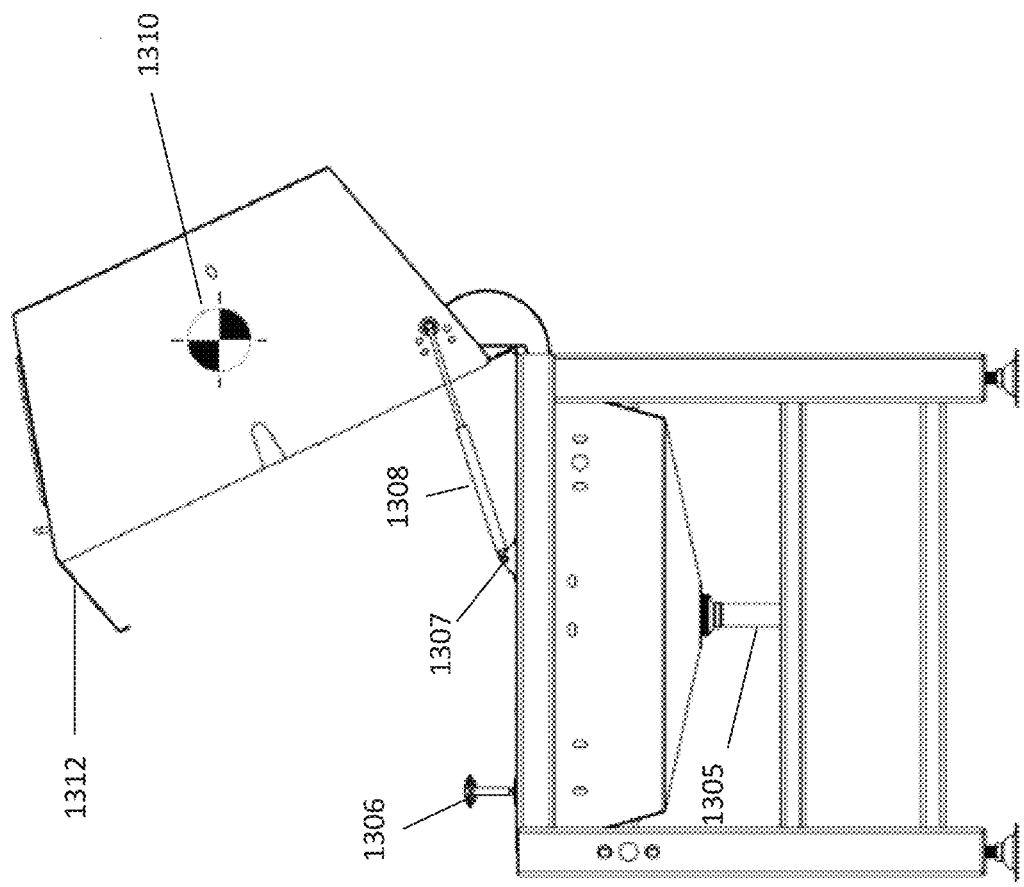
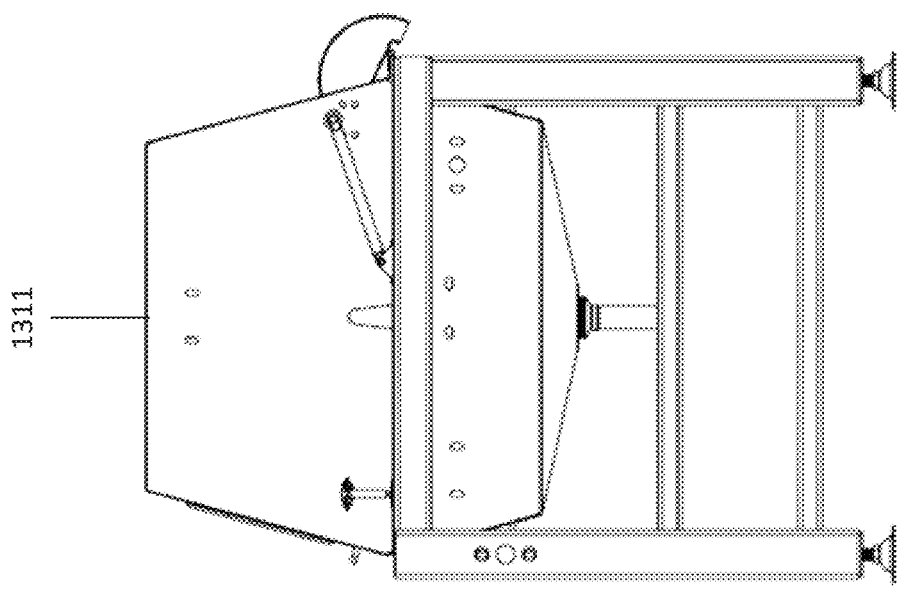
FIG. 13B

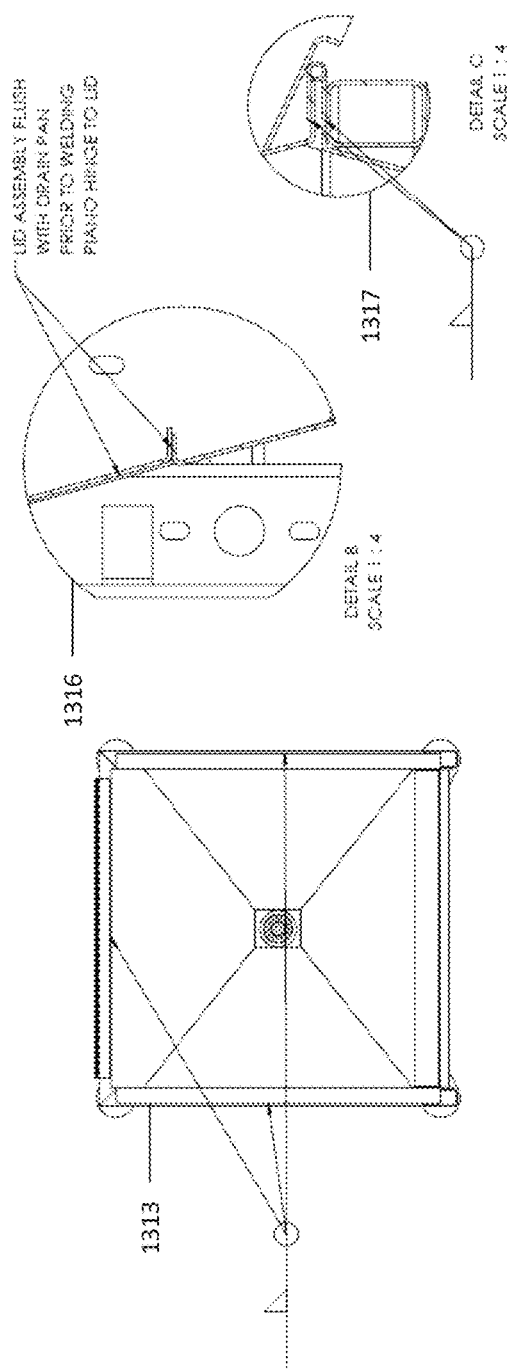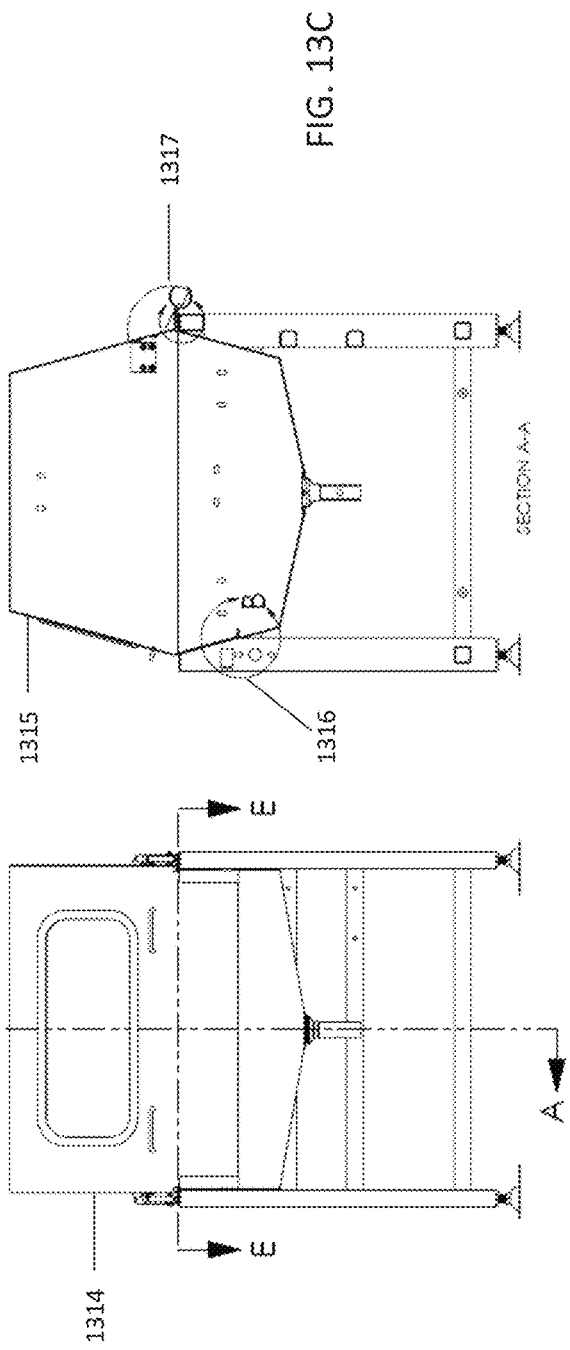
FIG. 13C

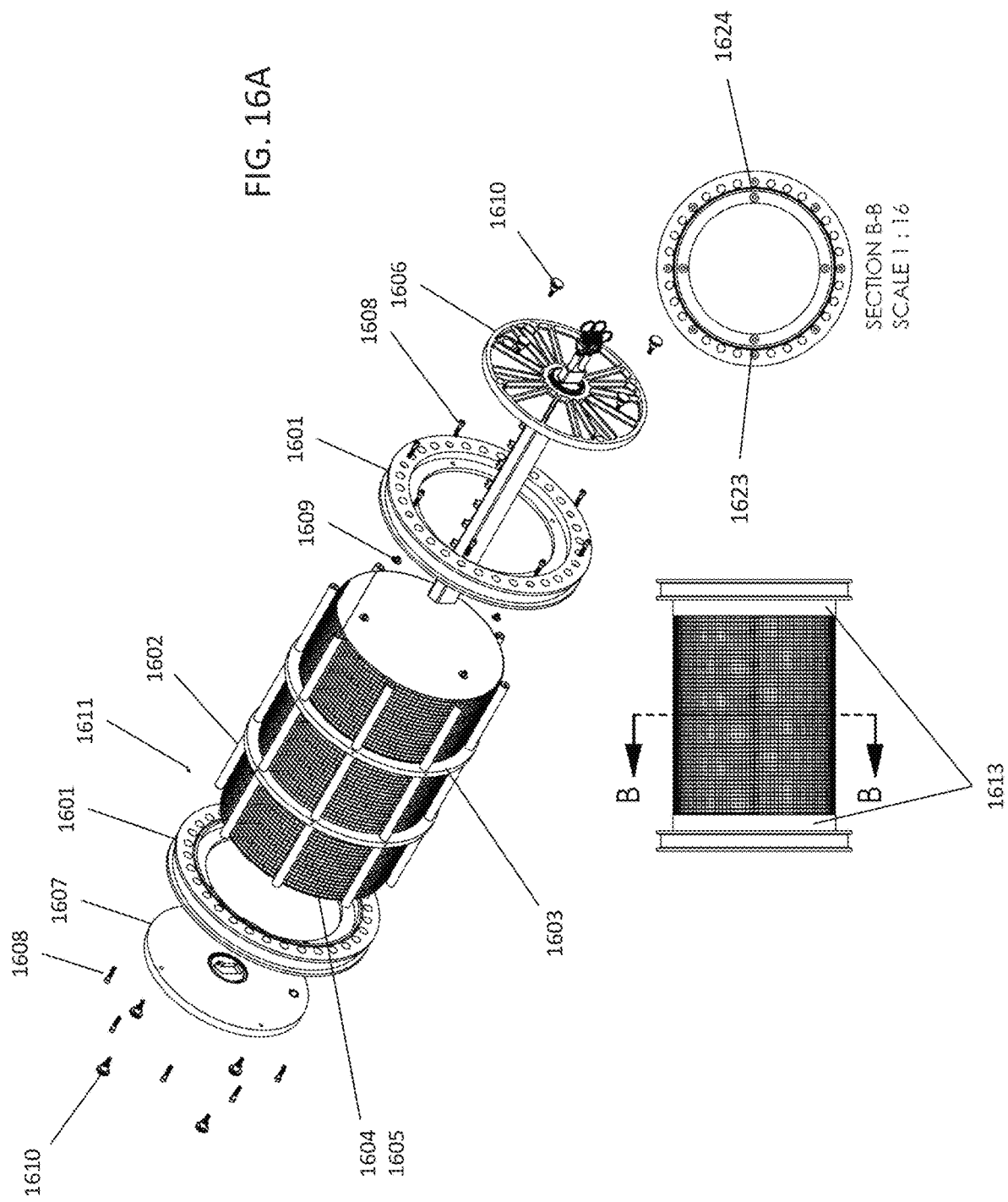

FIG. 22B
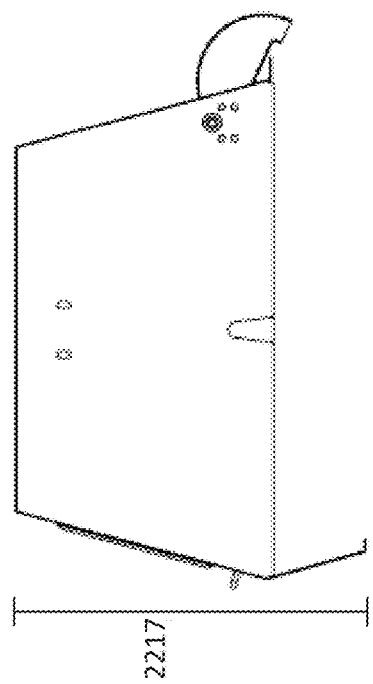
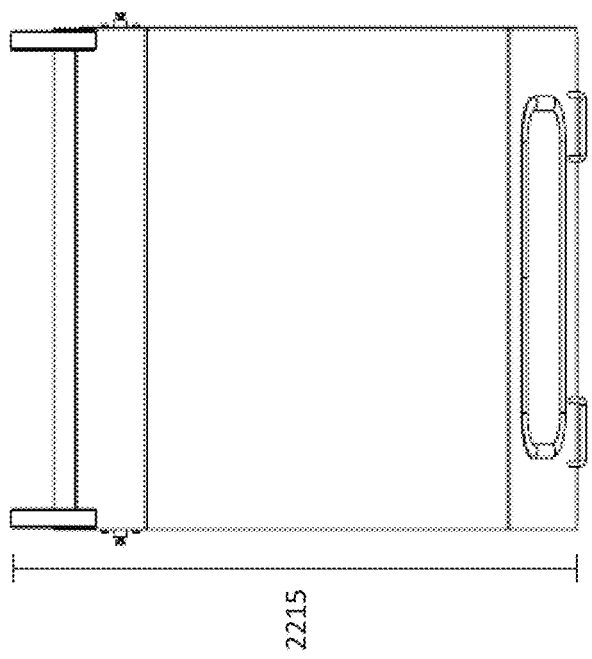
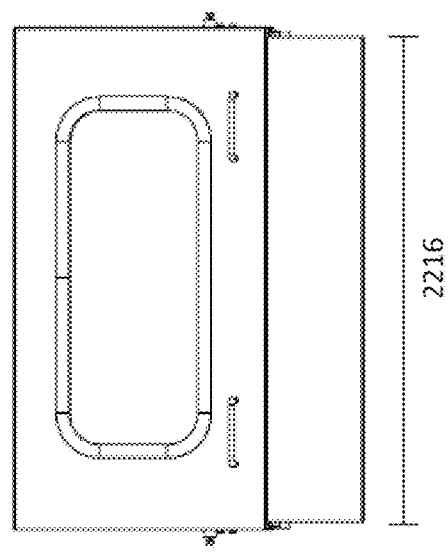

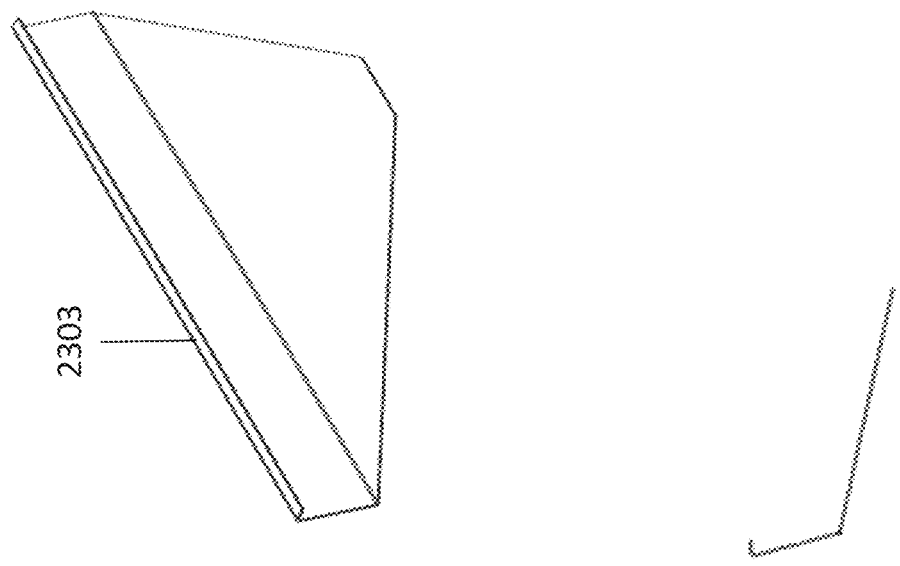
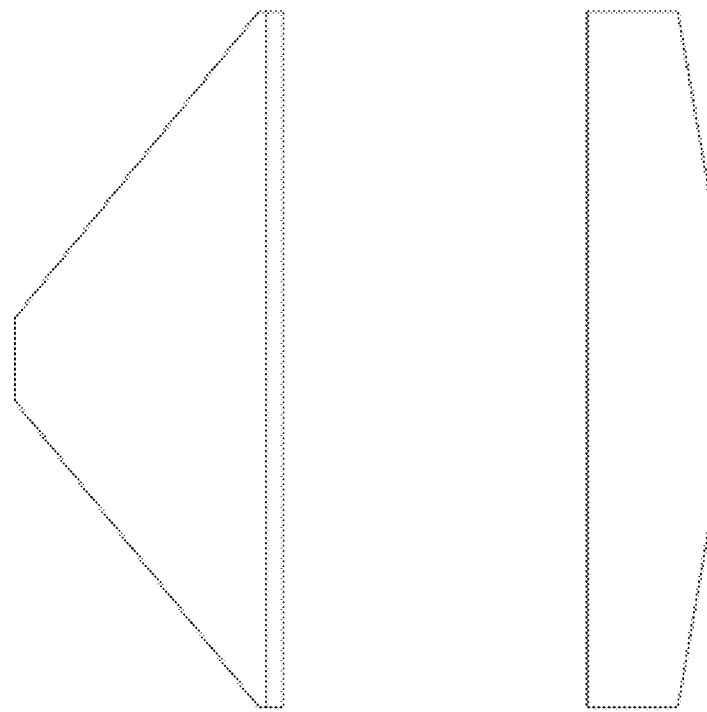
FIG.23C

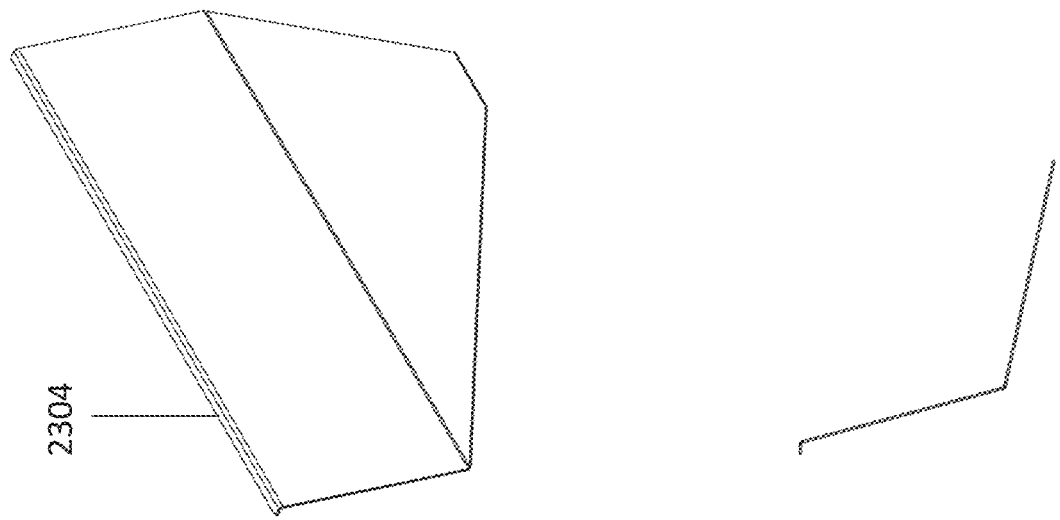
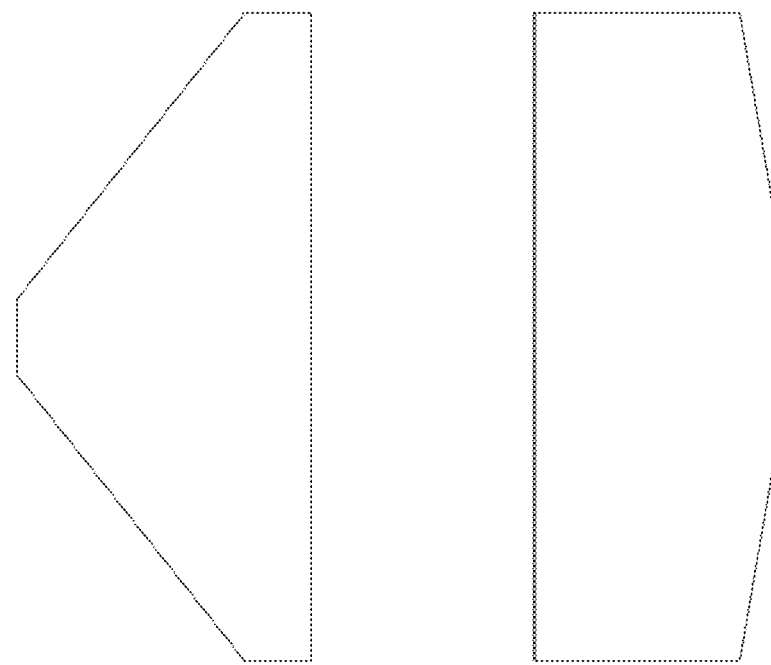
FIG. 23D

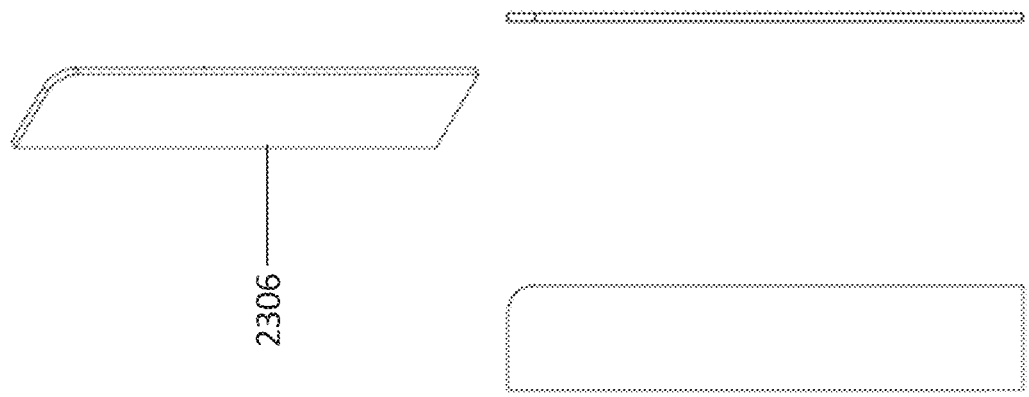
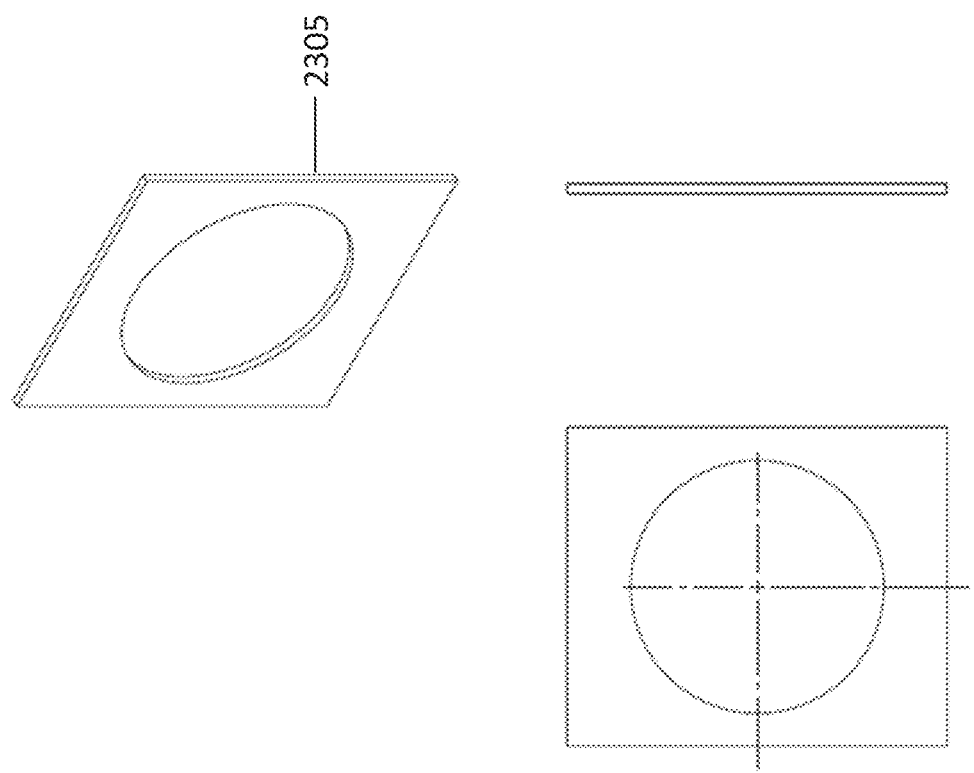
FIG. 23E

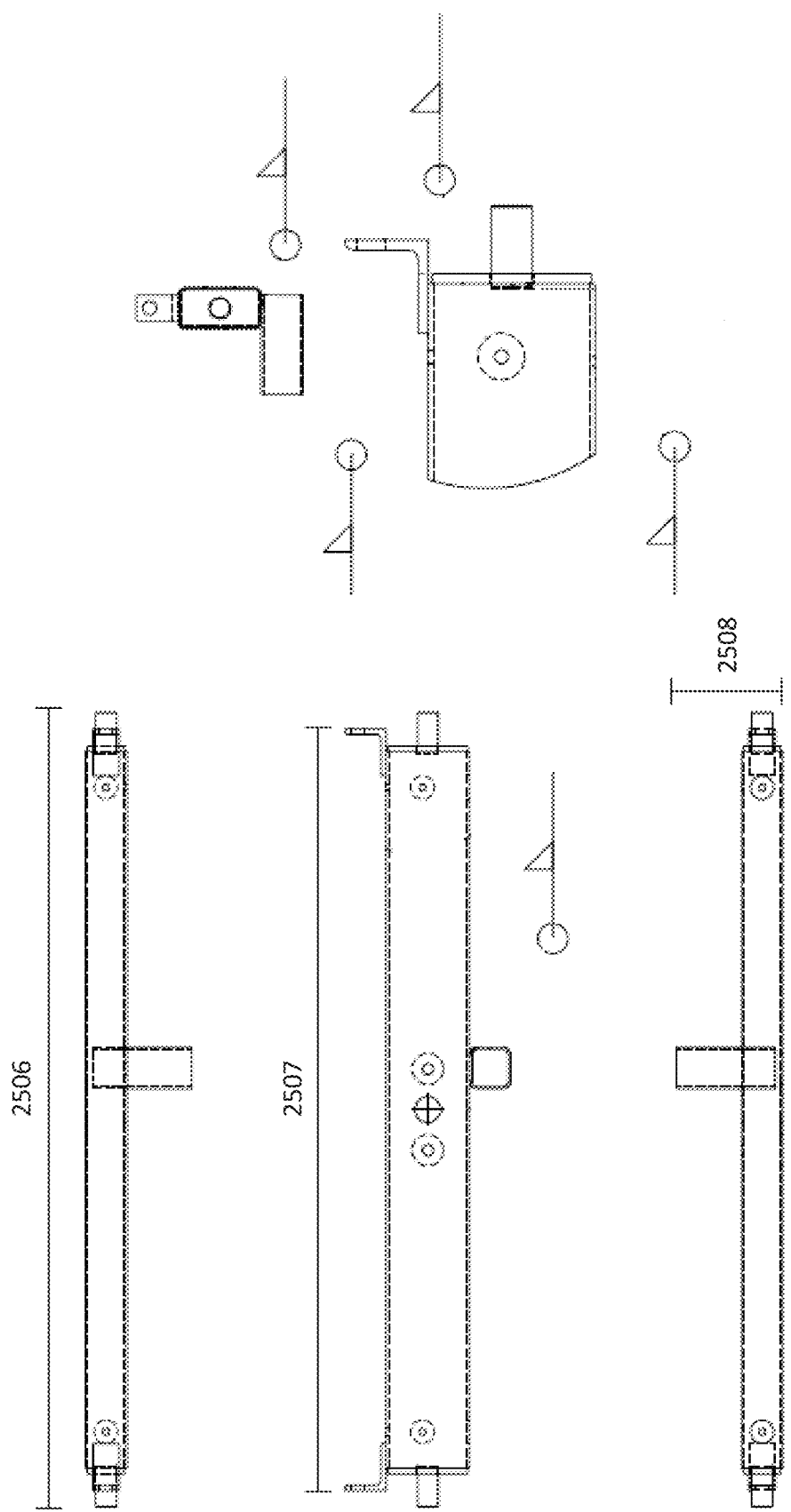

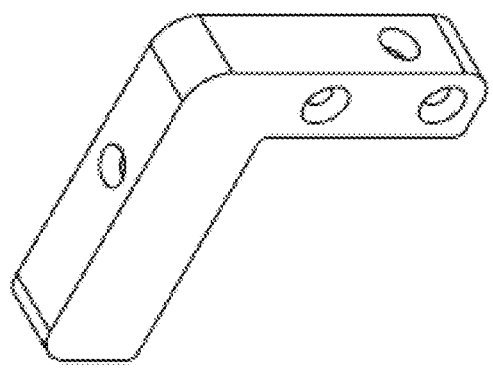
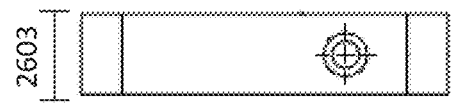
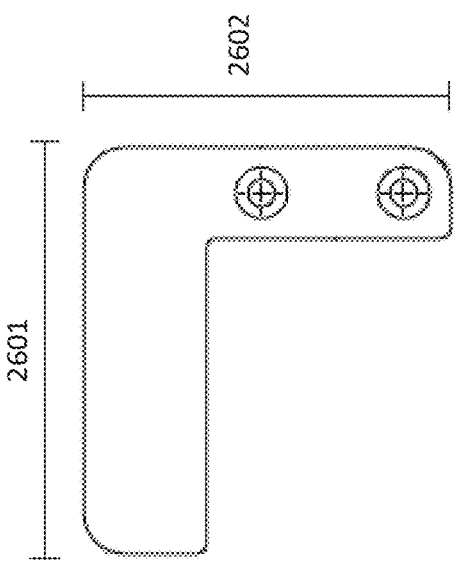
FIG.26A

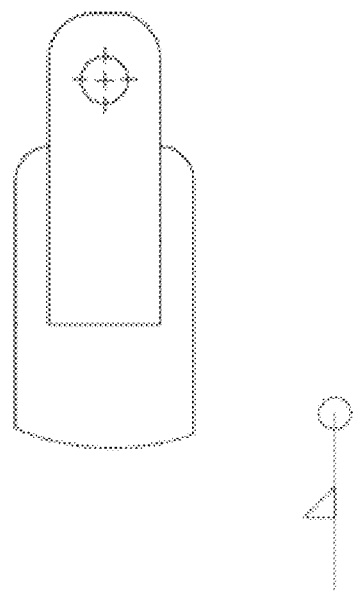
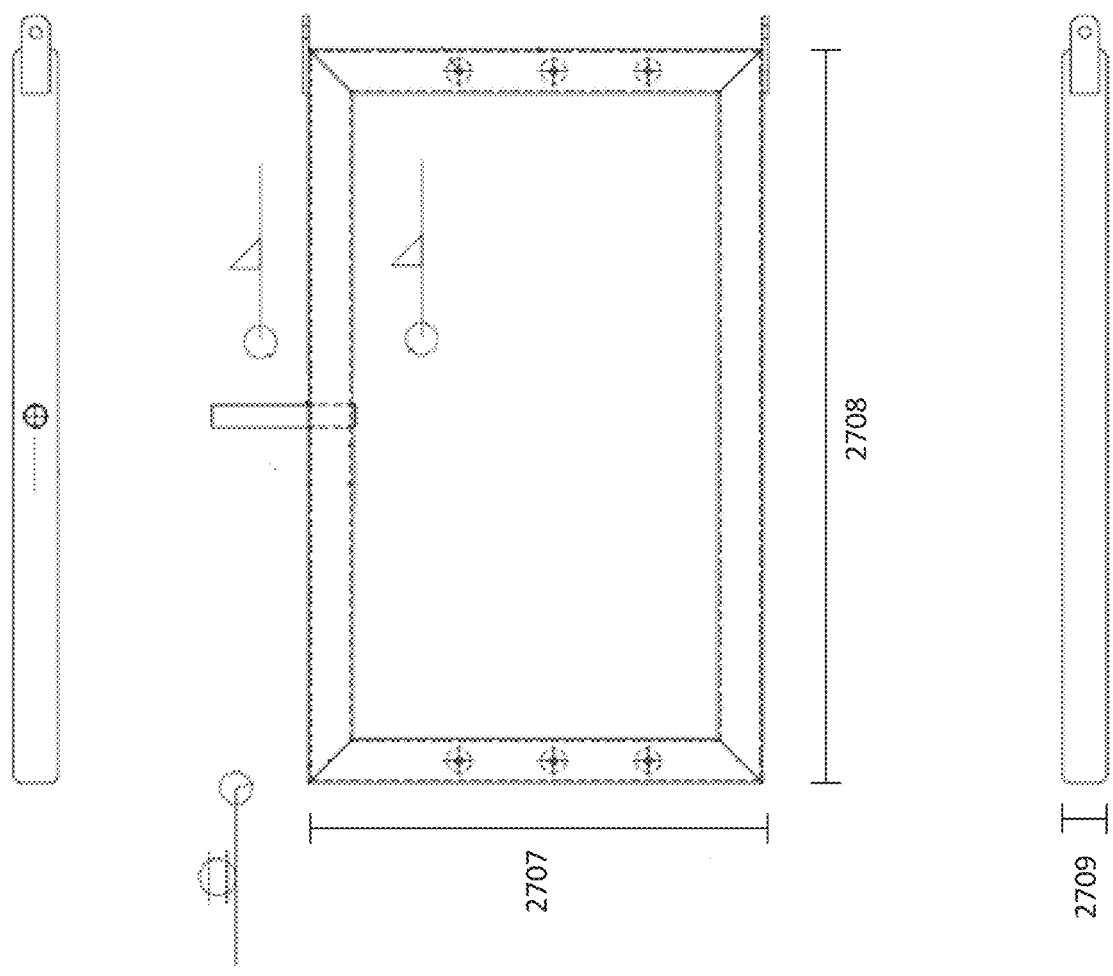
FIG. 27B

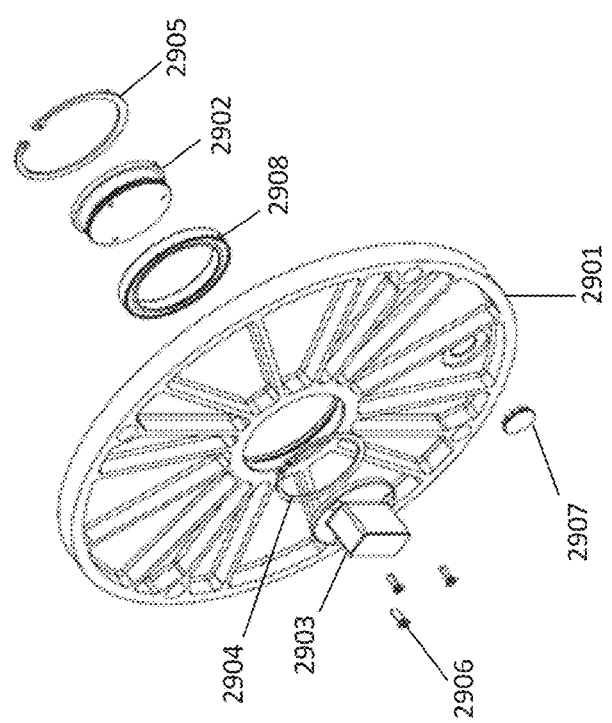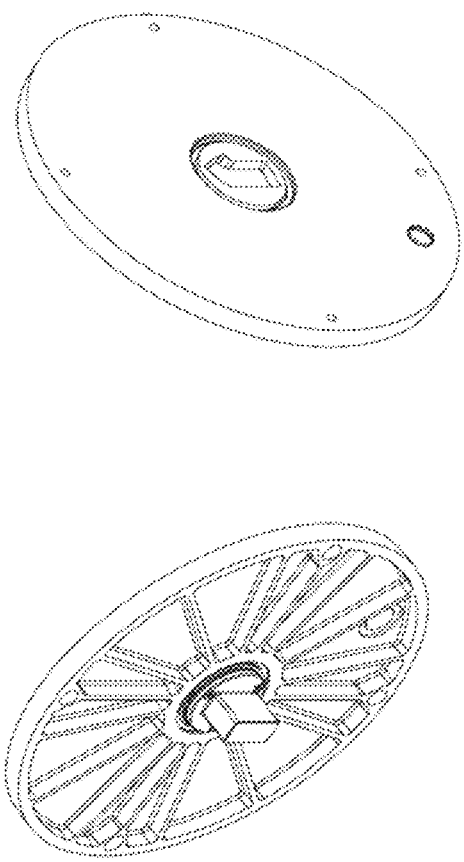
FIG. 29A

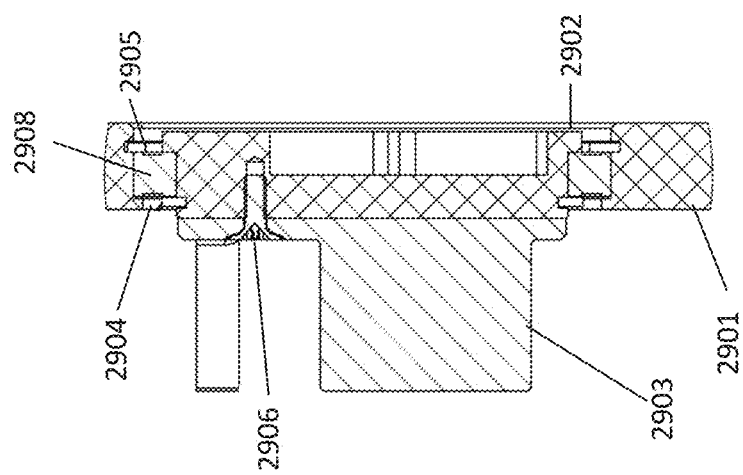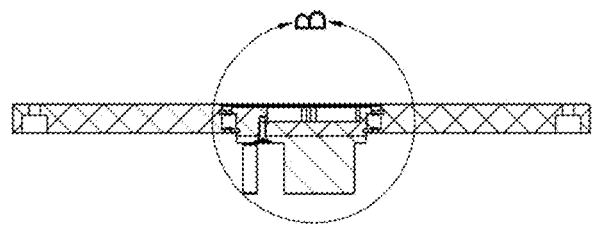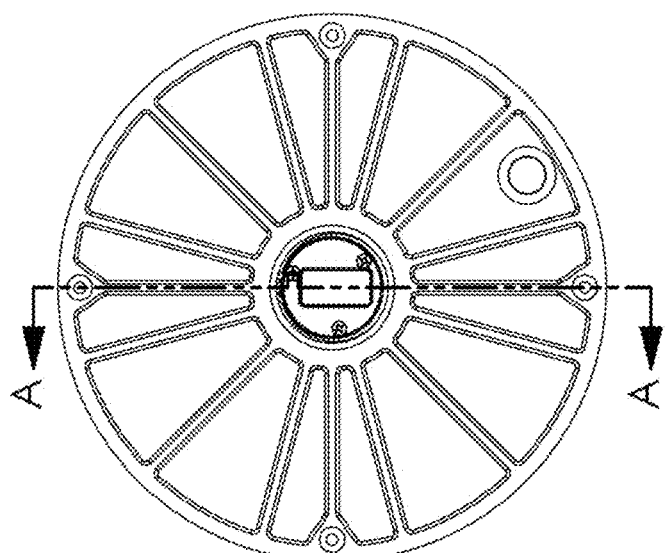
FIG. 29B

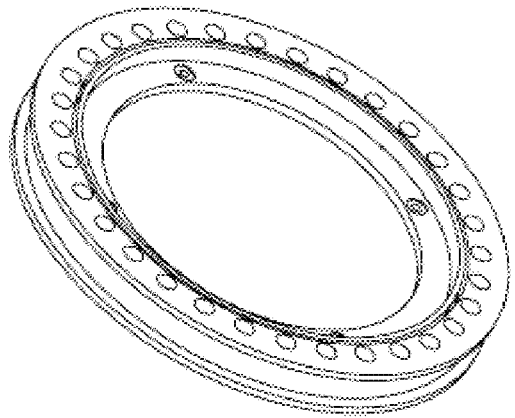
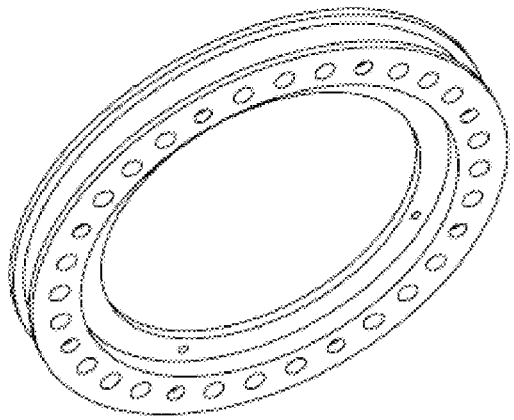
FIG. 30A

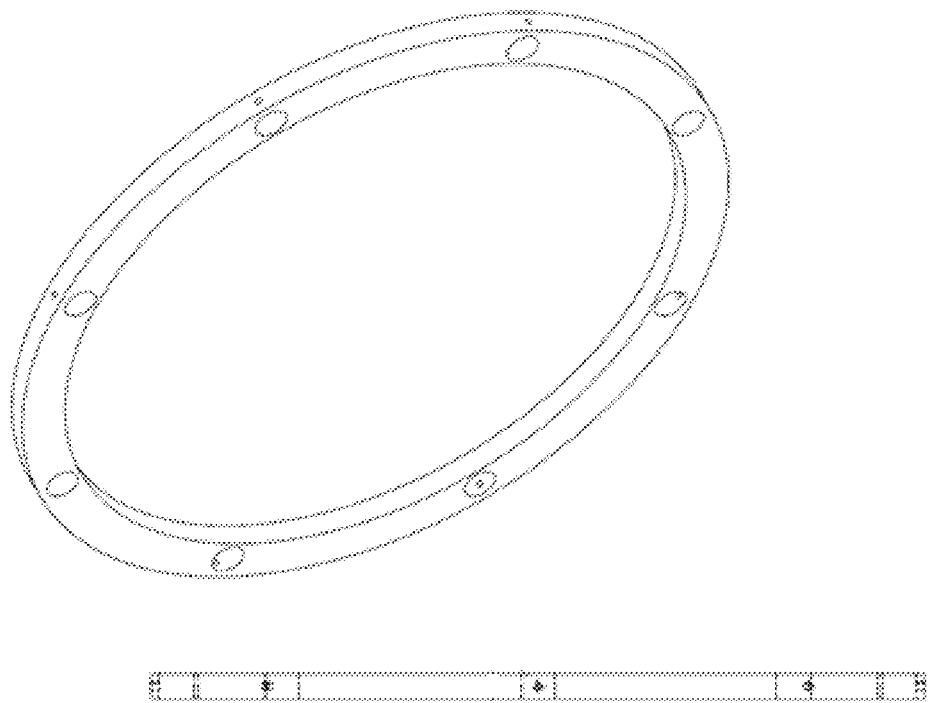
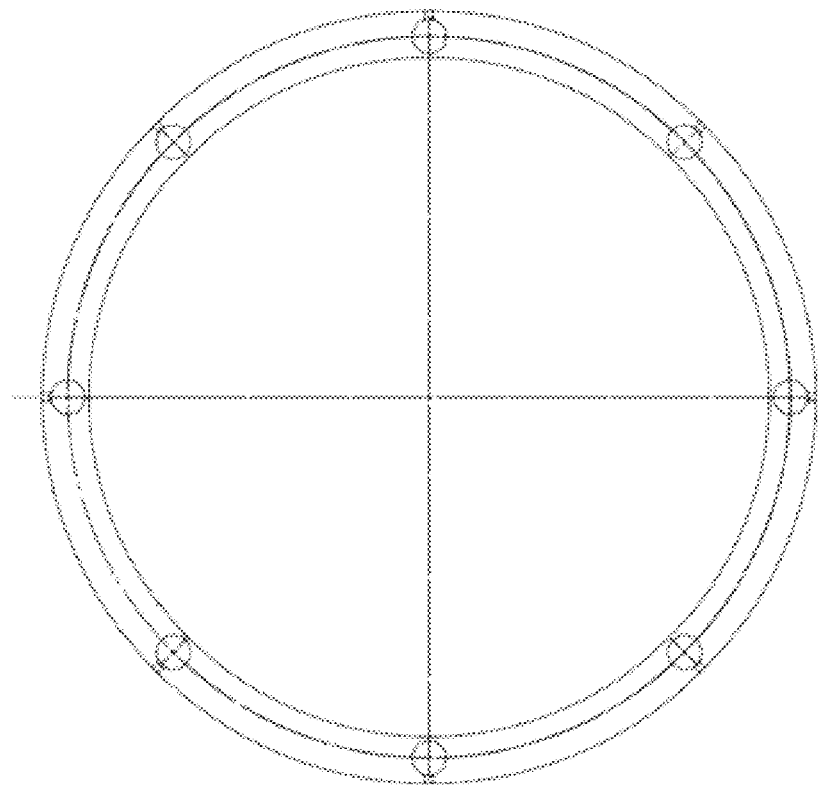
FIG. 32

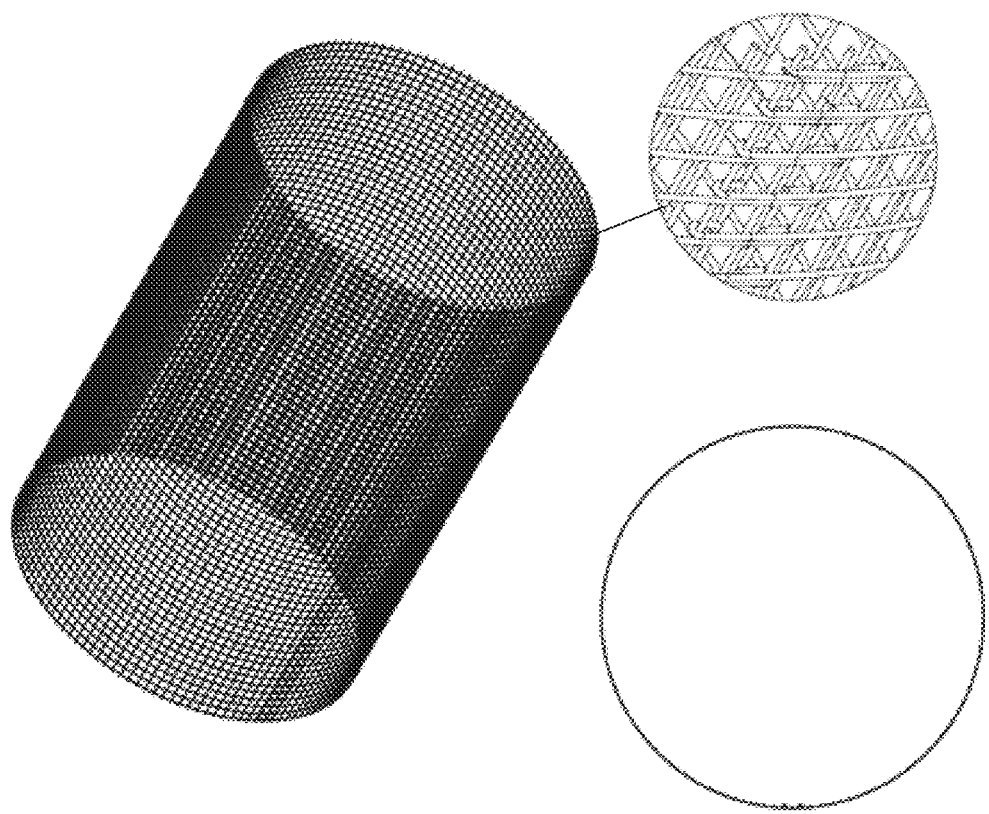
FIG. 33
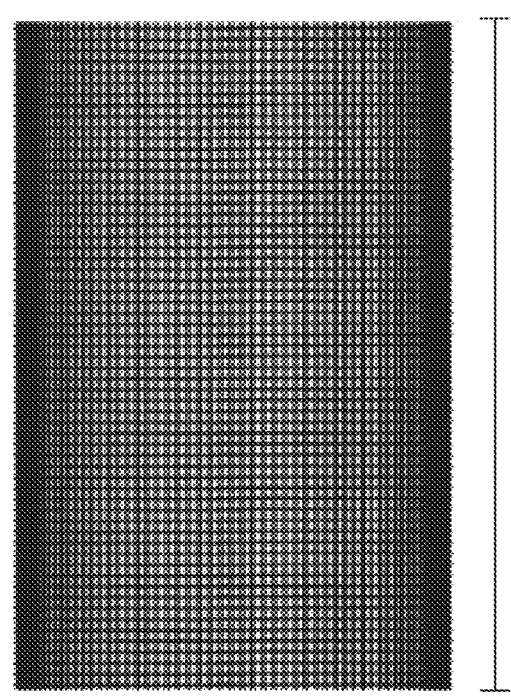
3301

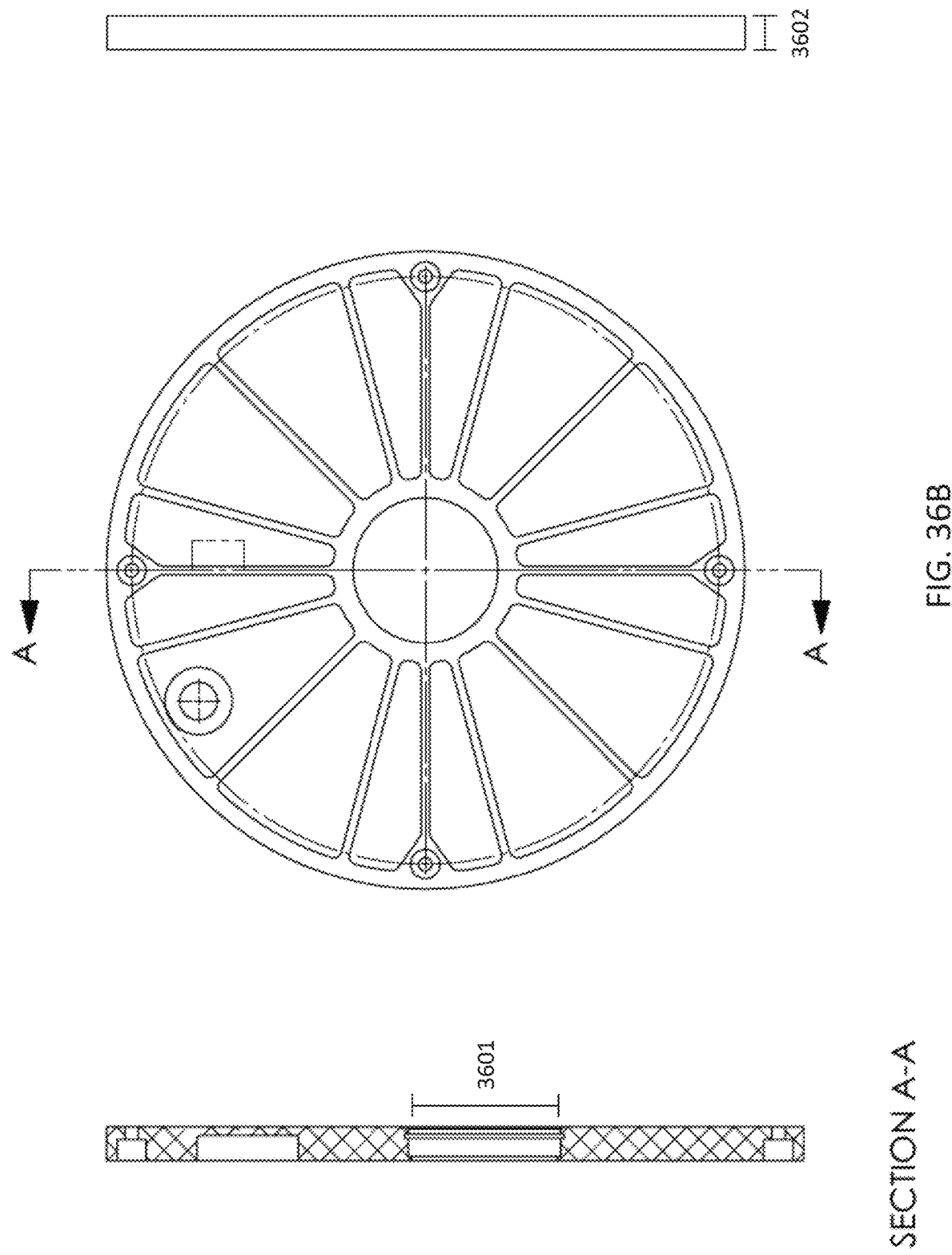

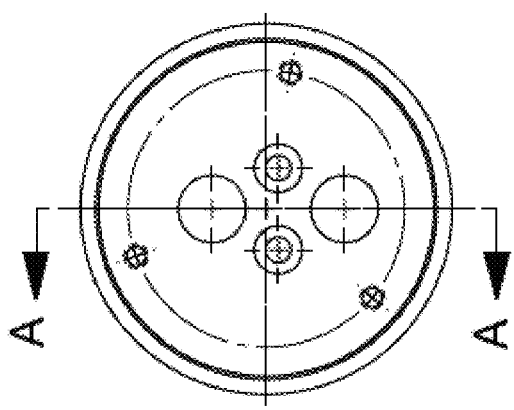
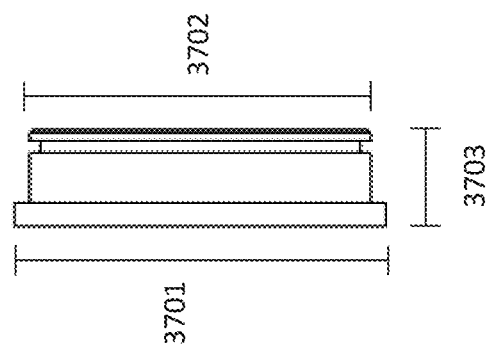
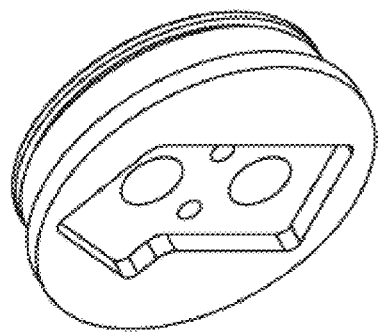
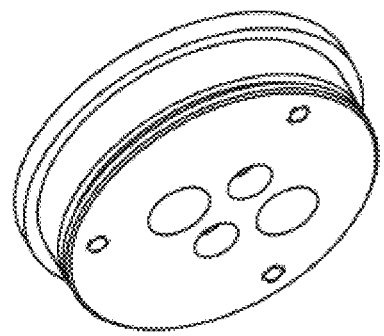
FIG. 37A

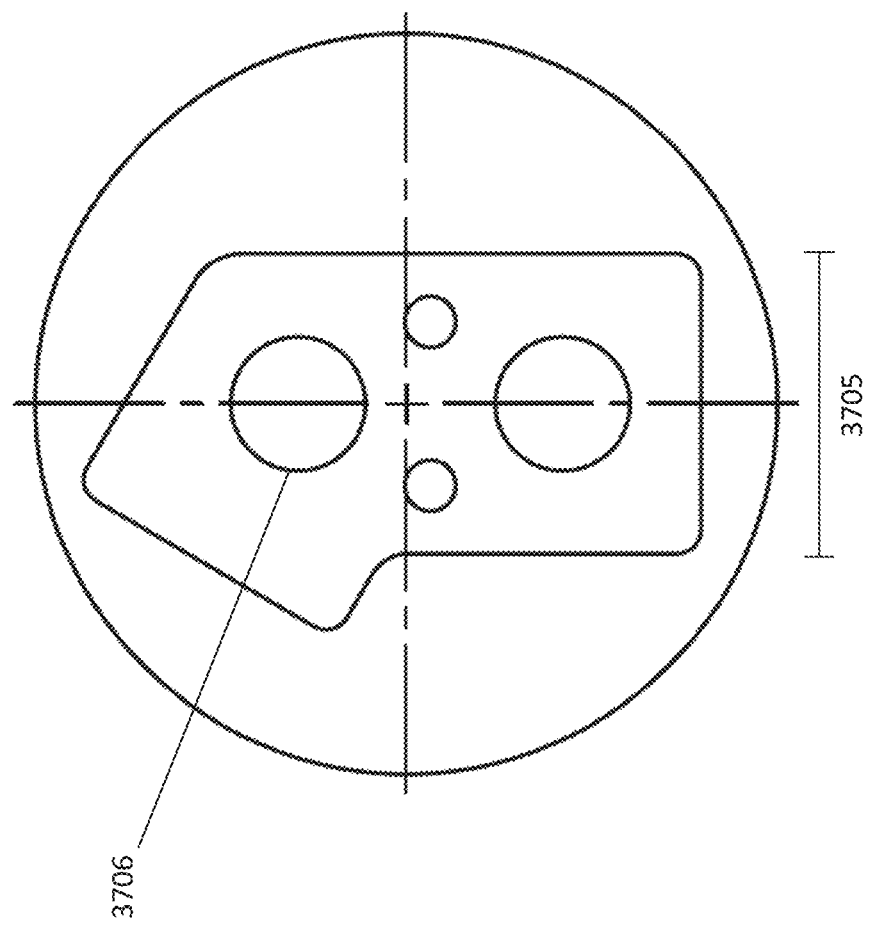
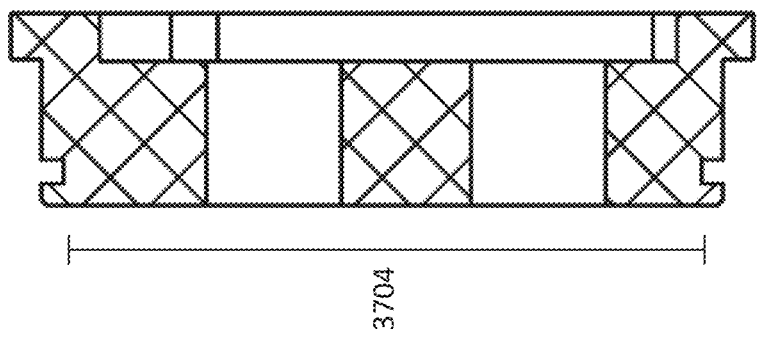
FIG. 37B

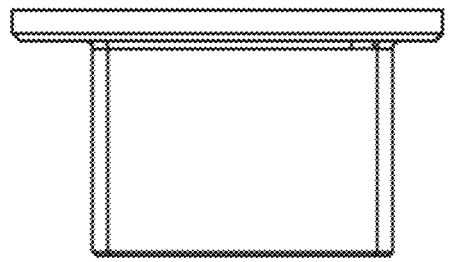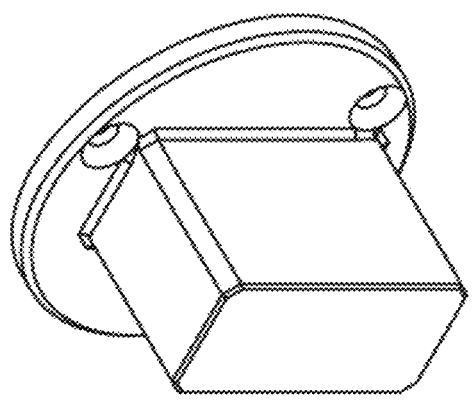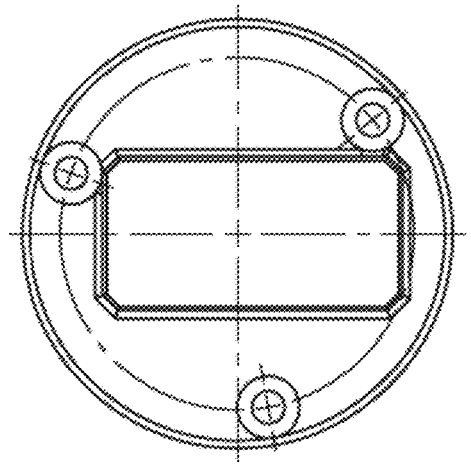
FIG.40

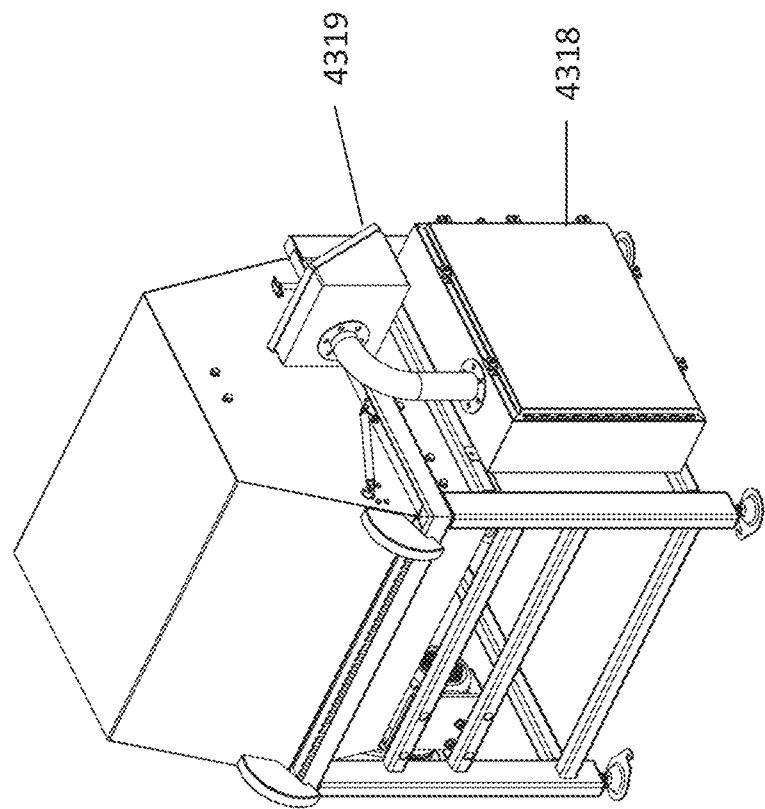
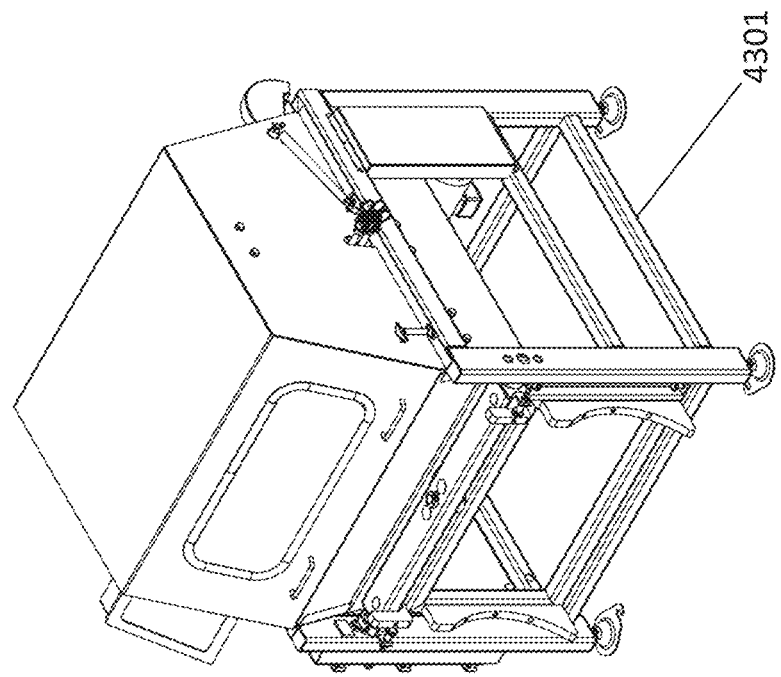
FIG. 43A

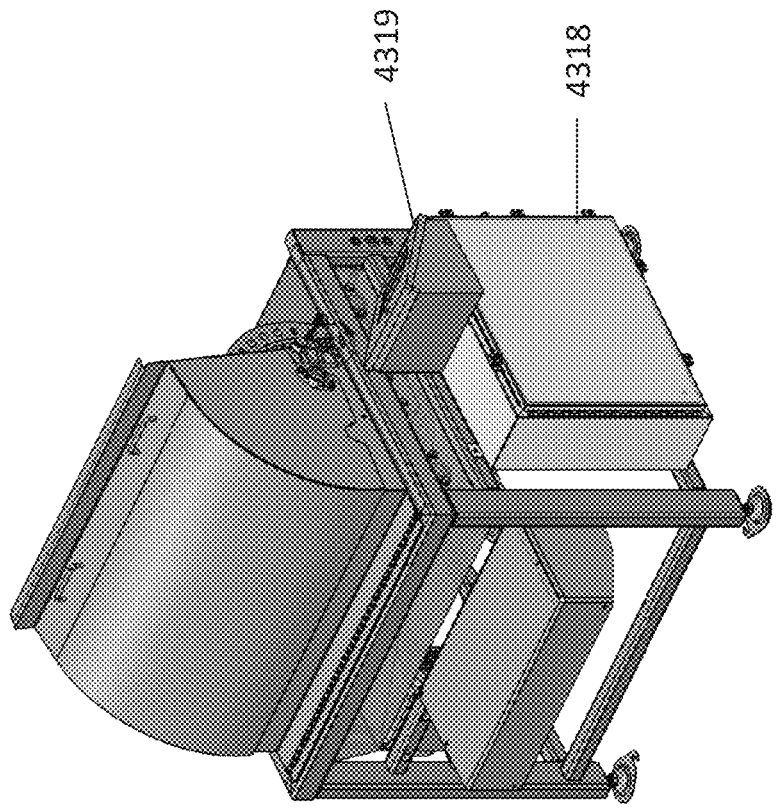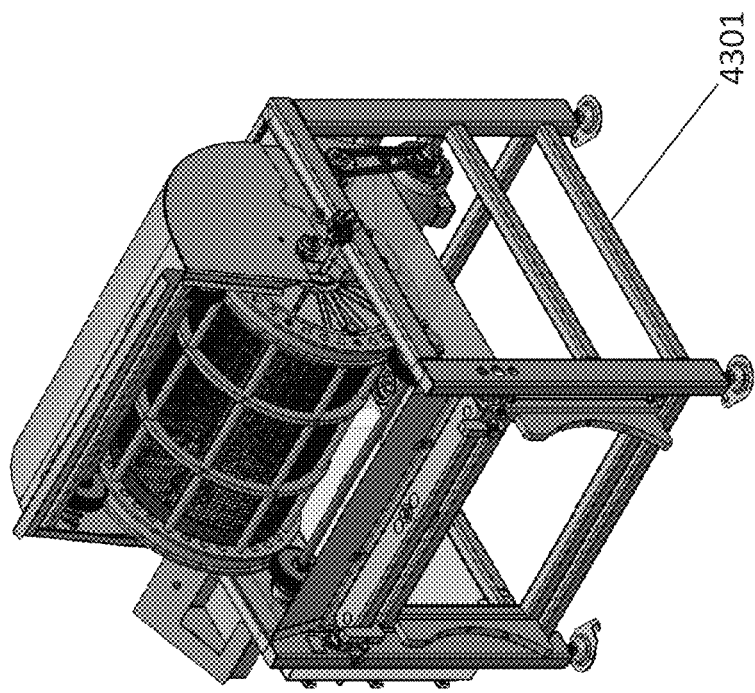
FIG. 43D

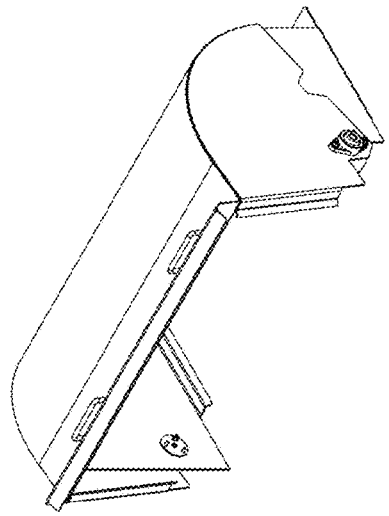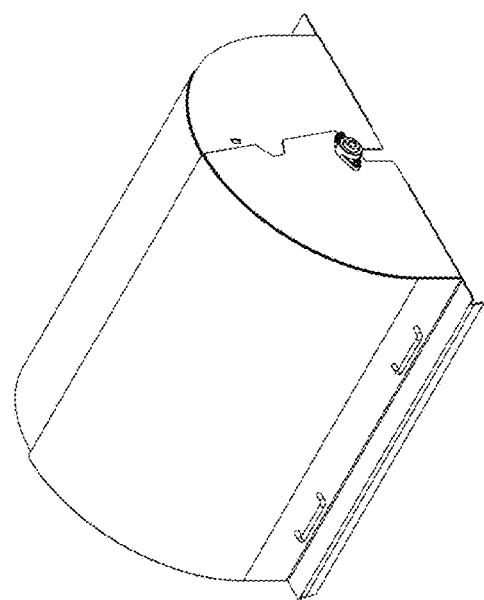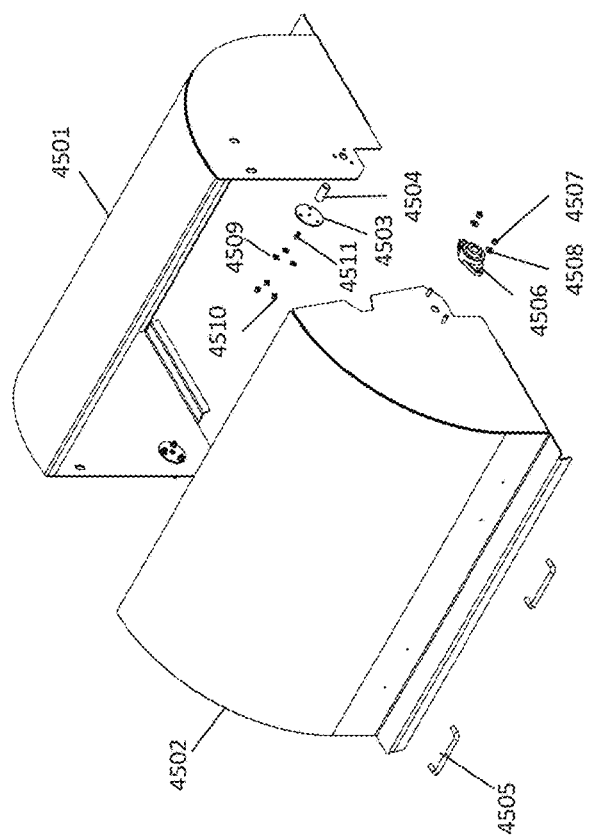
FIG. 45A

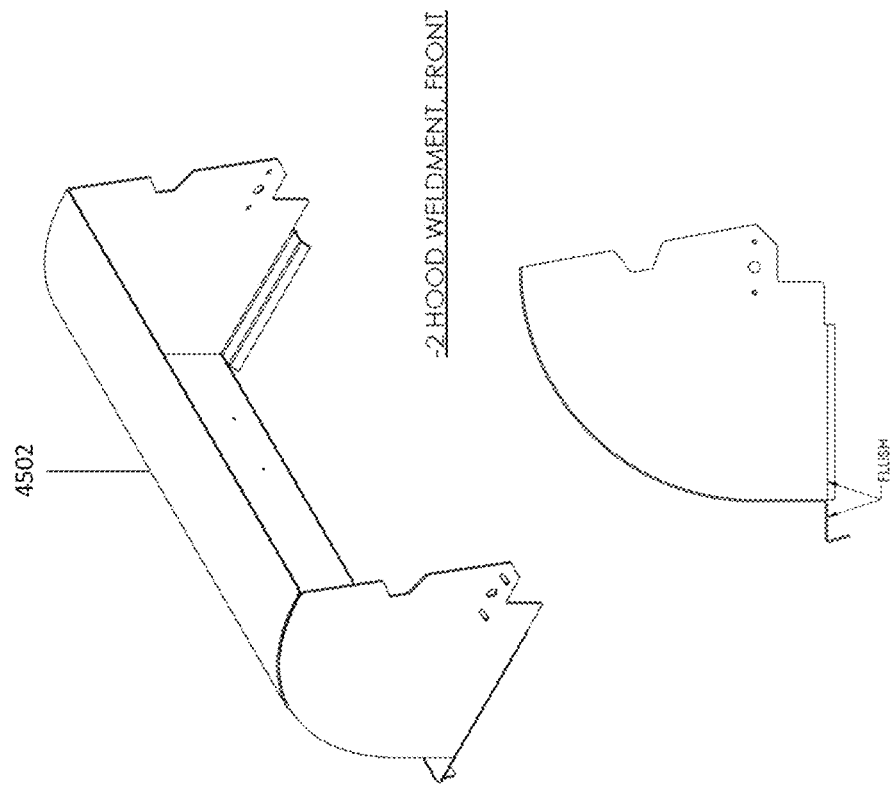
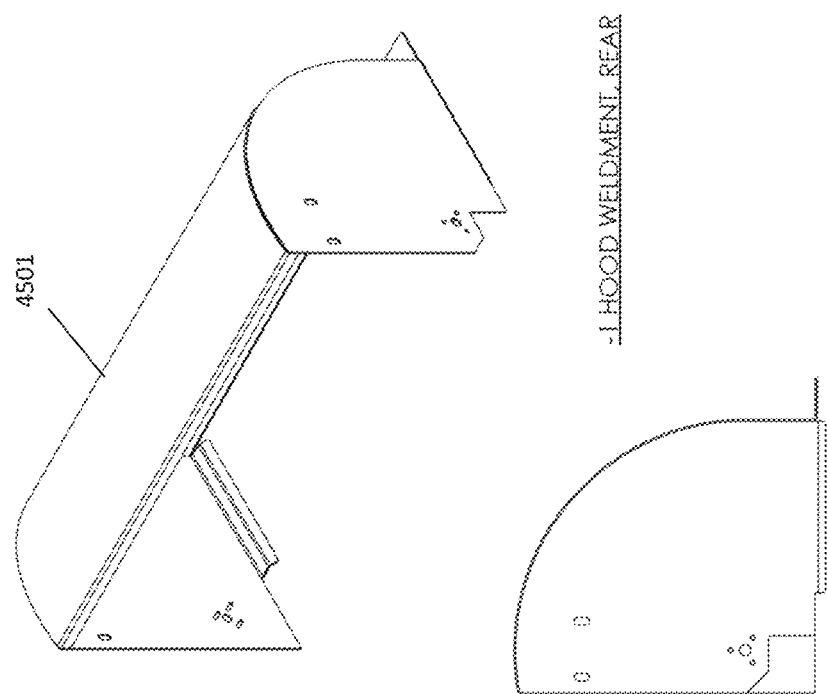
FIG. 45B

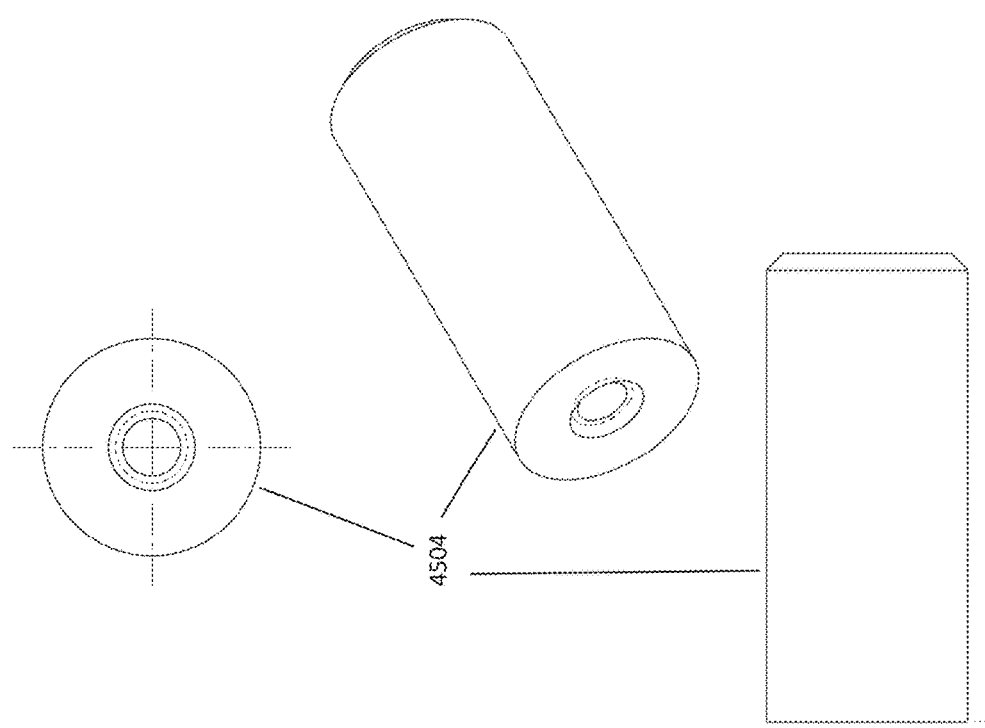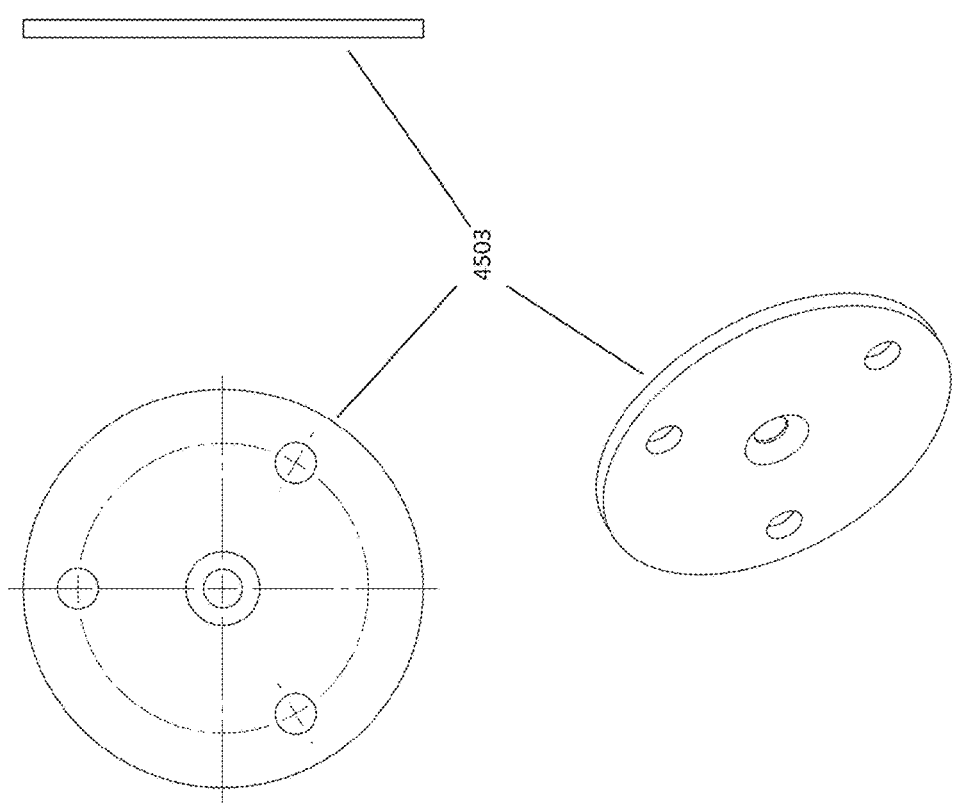
FIG. 45E

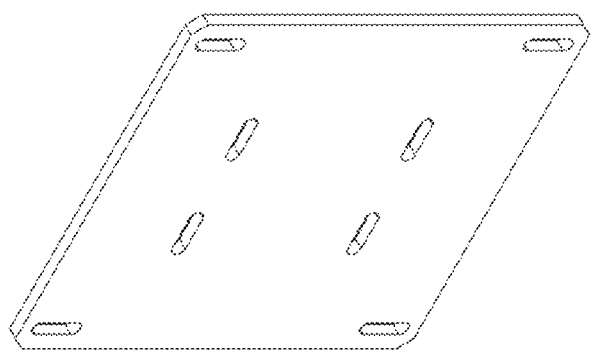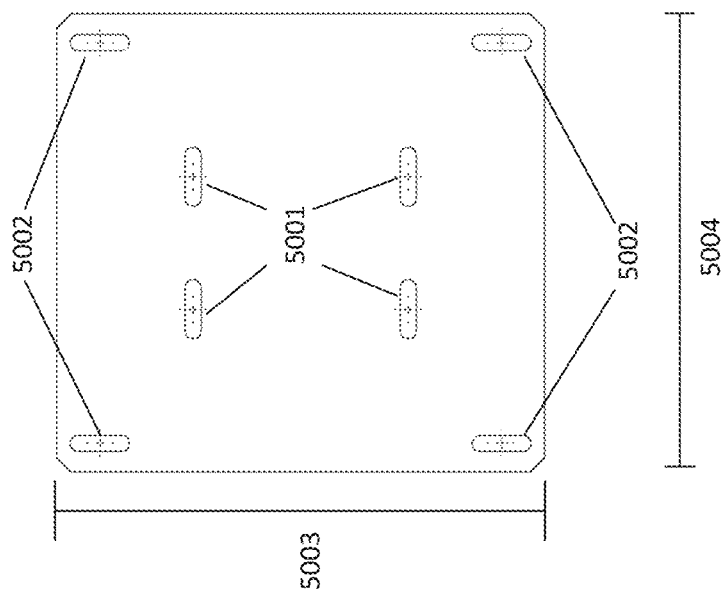
FIG. 50

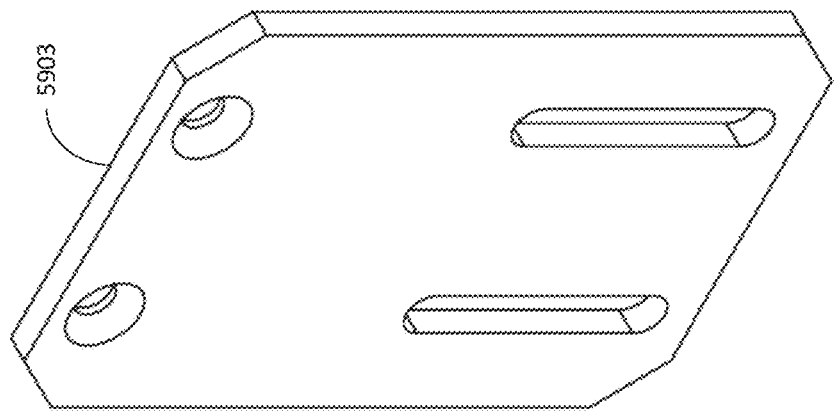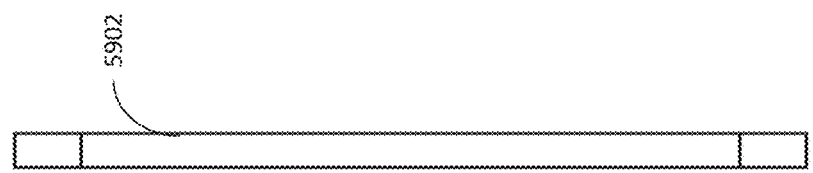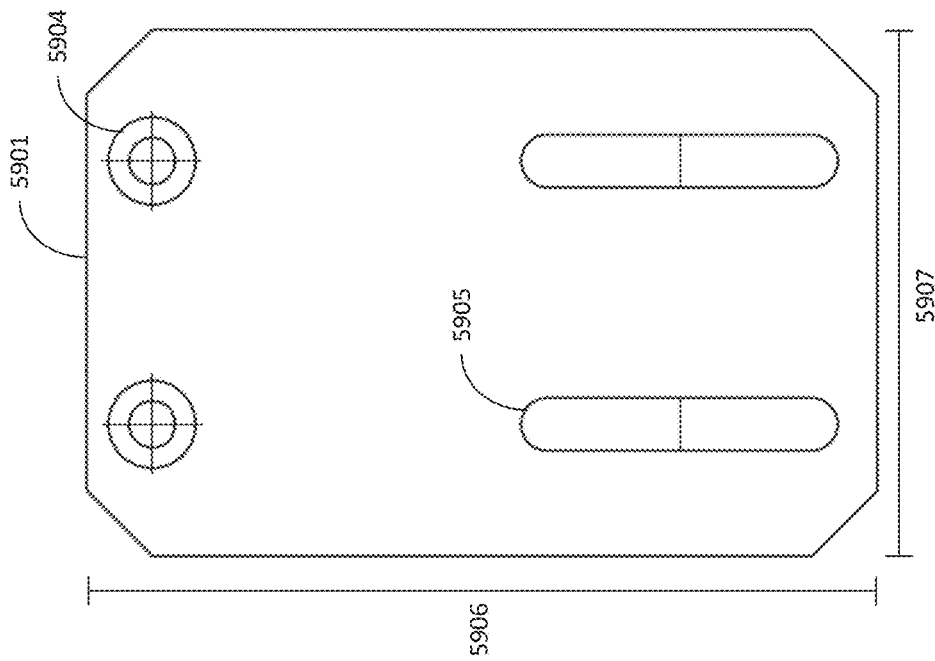
FIG. 59

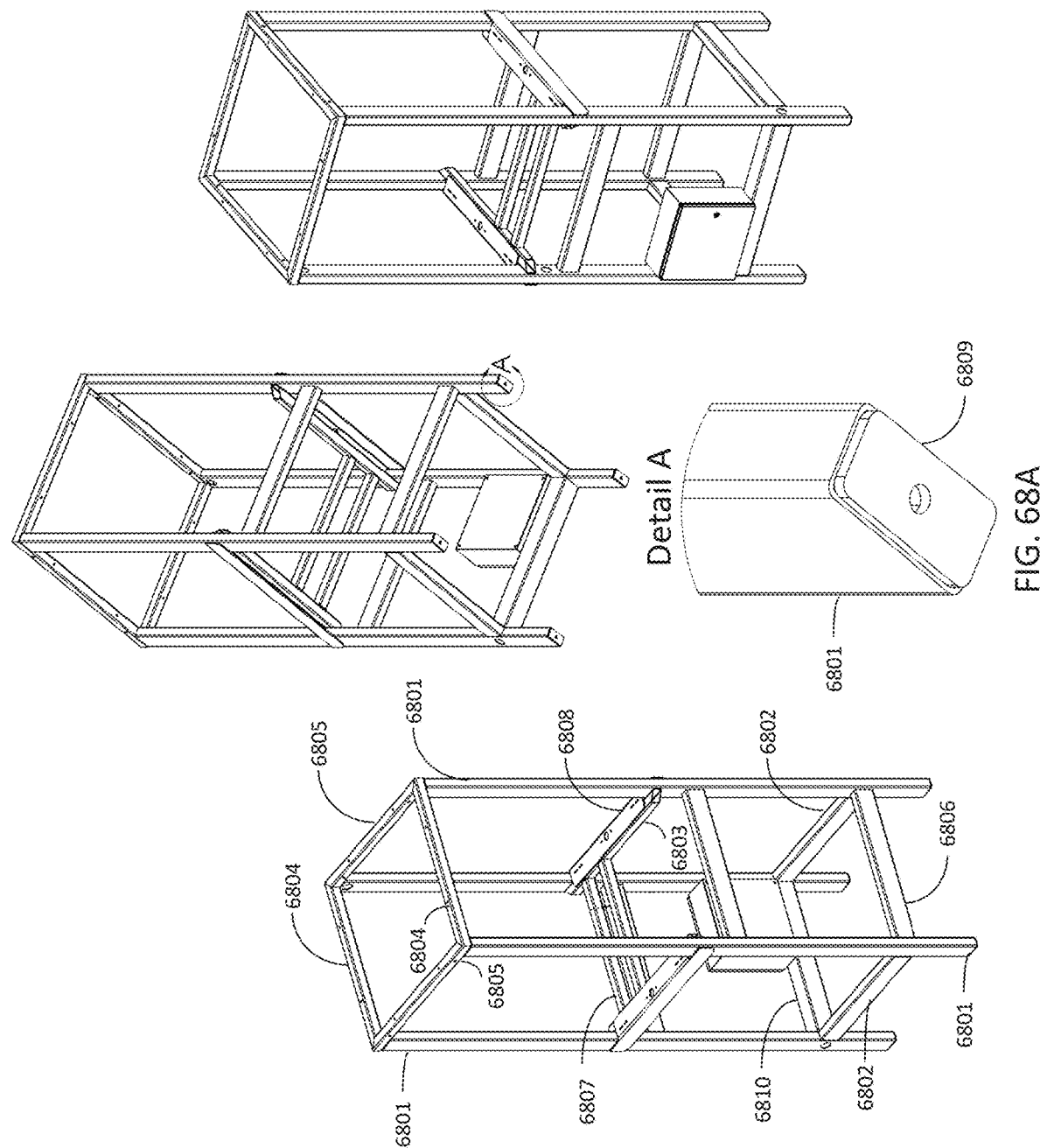

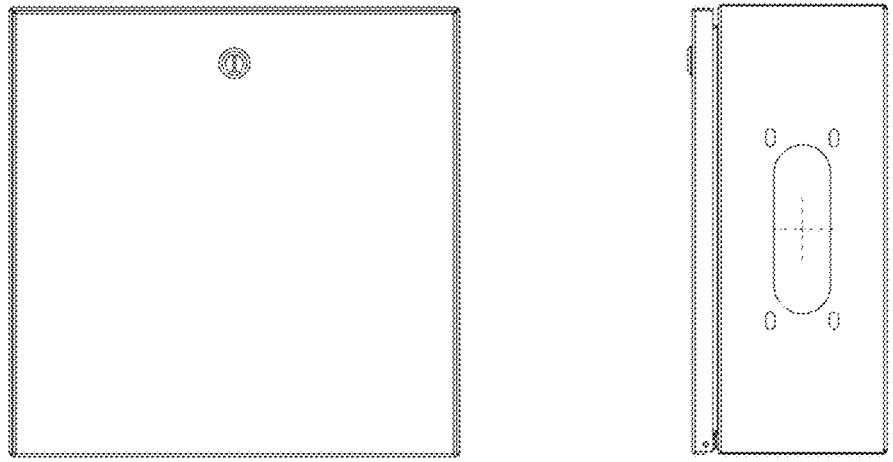
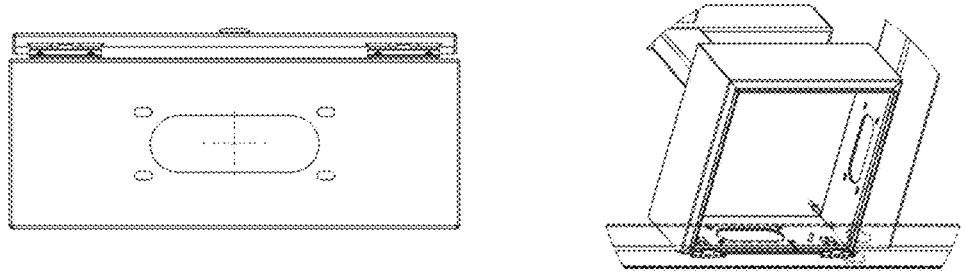
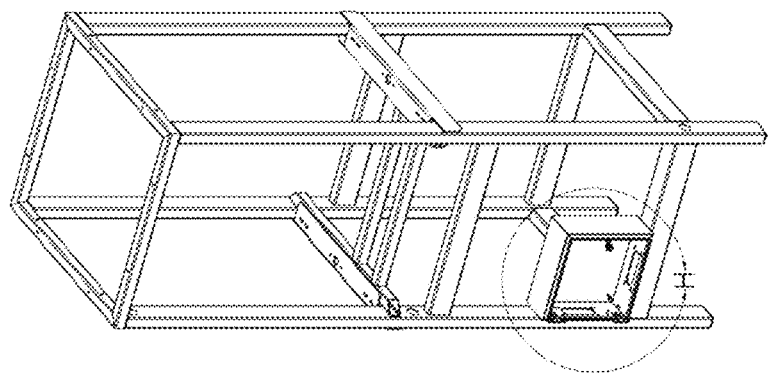
FIG. 68B

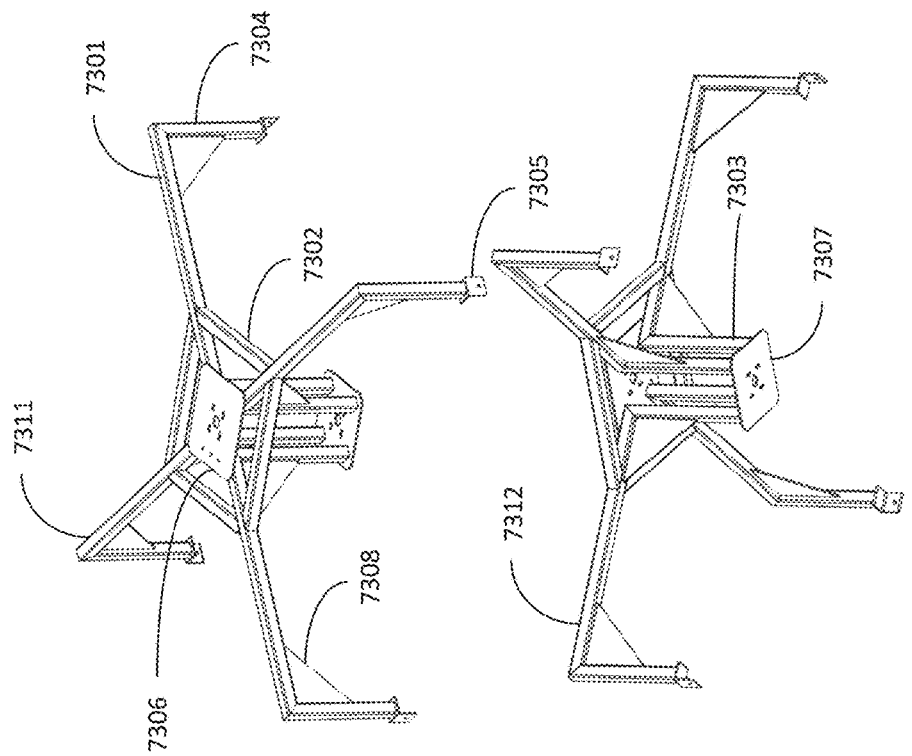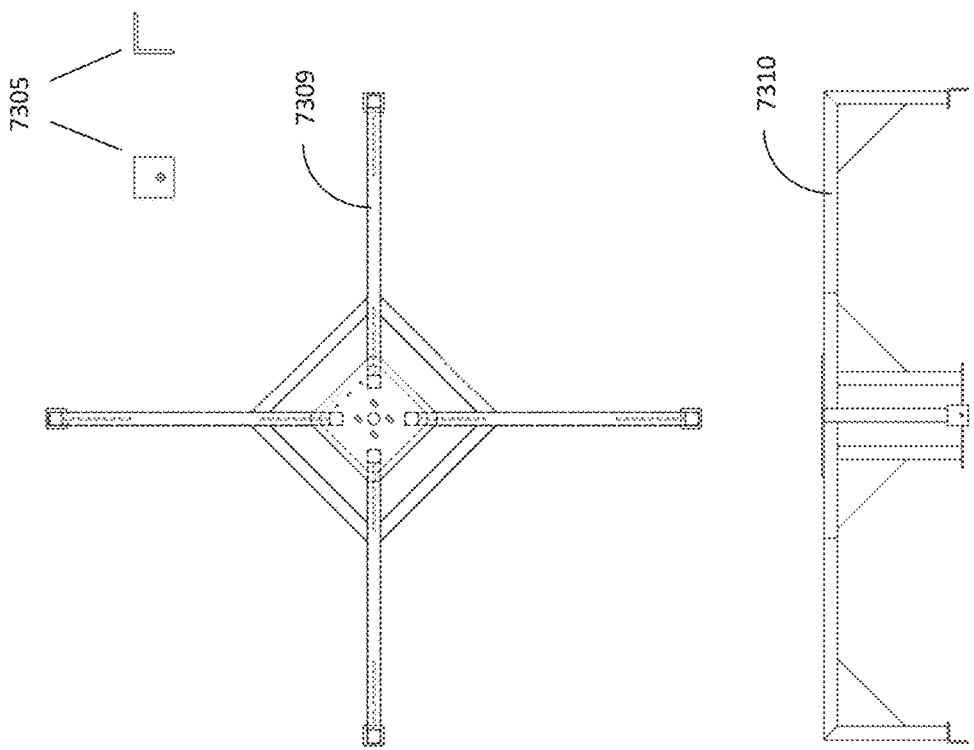
FIG. 73

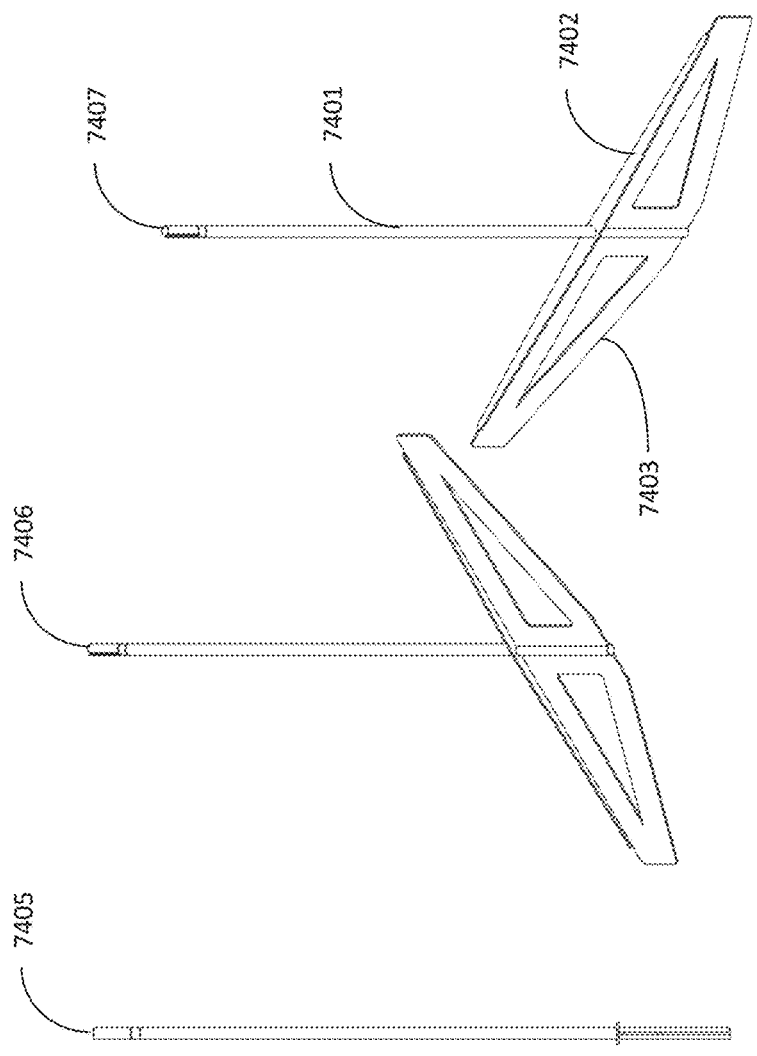
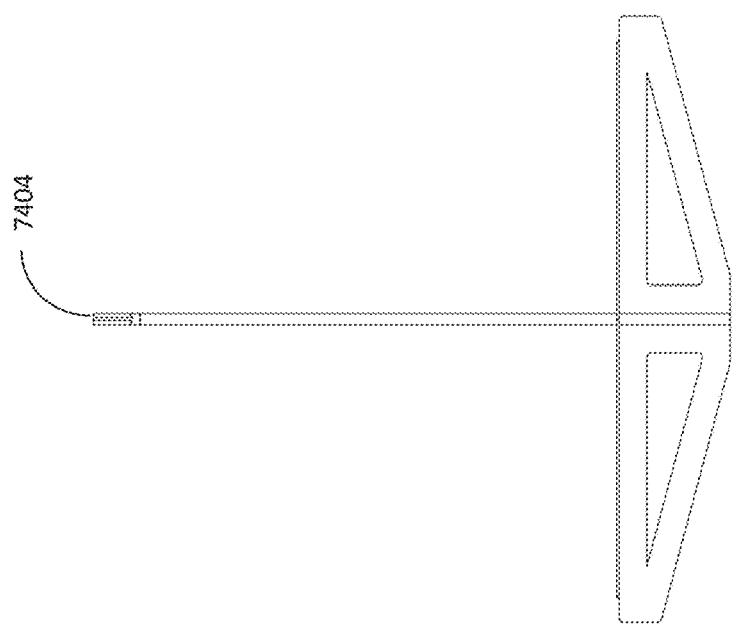
FIG. 74

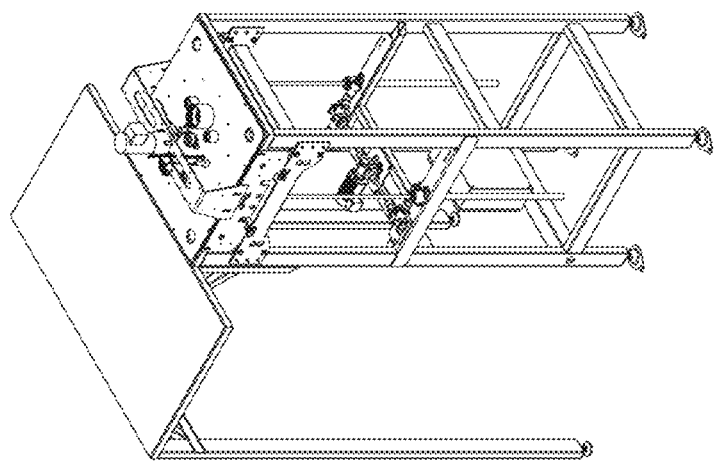
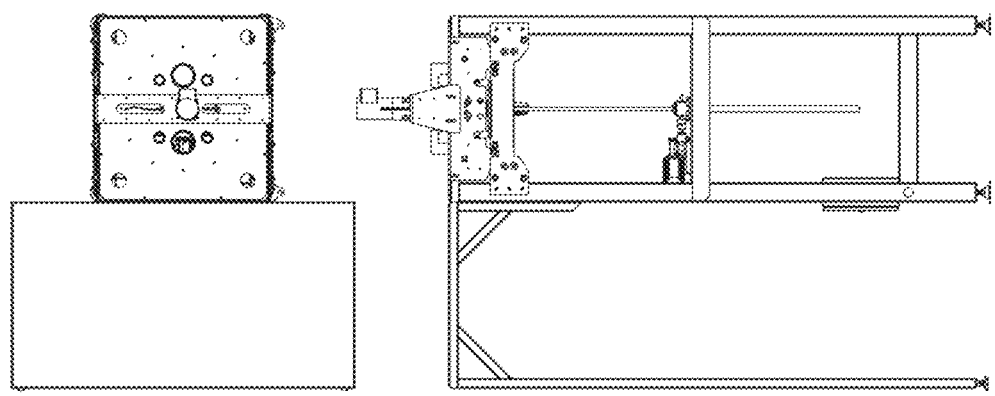
FIG. 76B

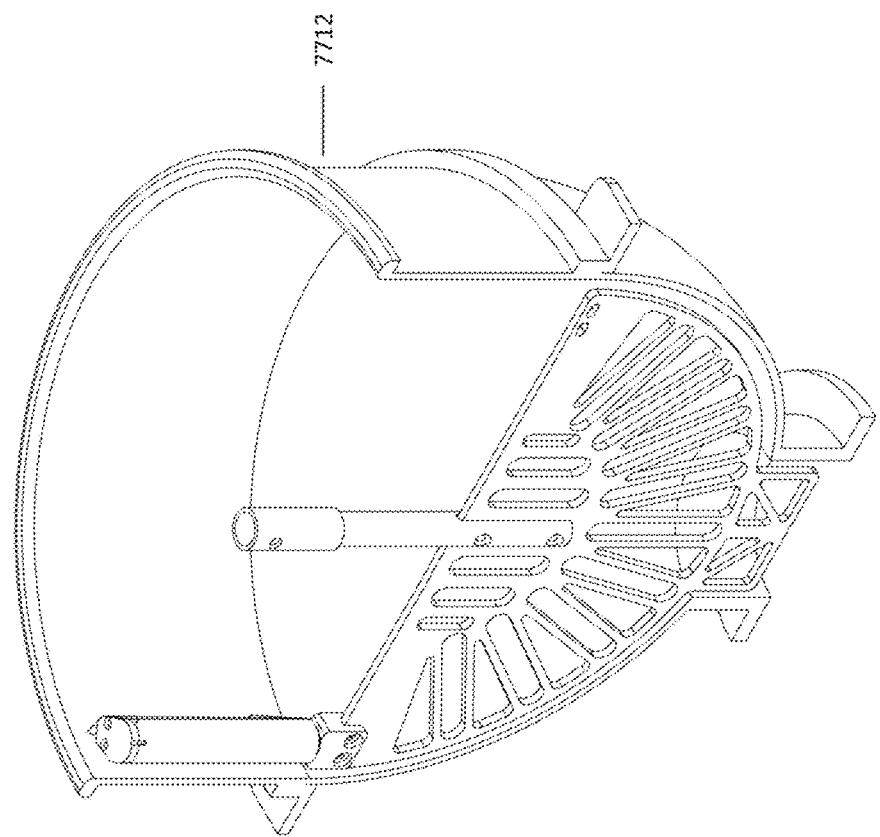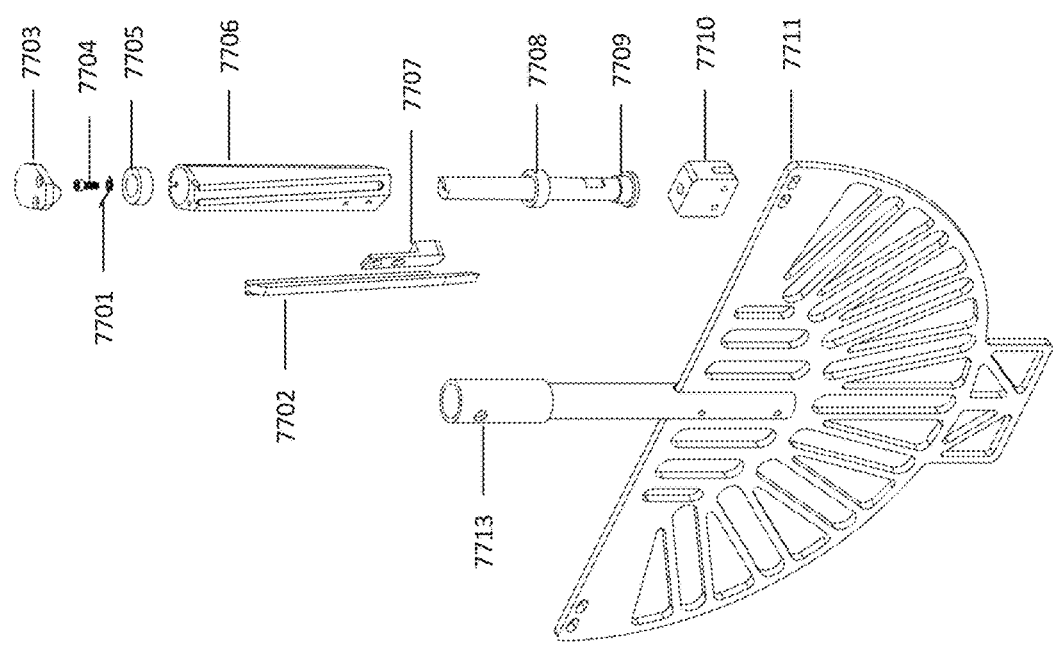
FIG. 77A

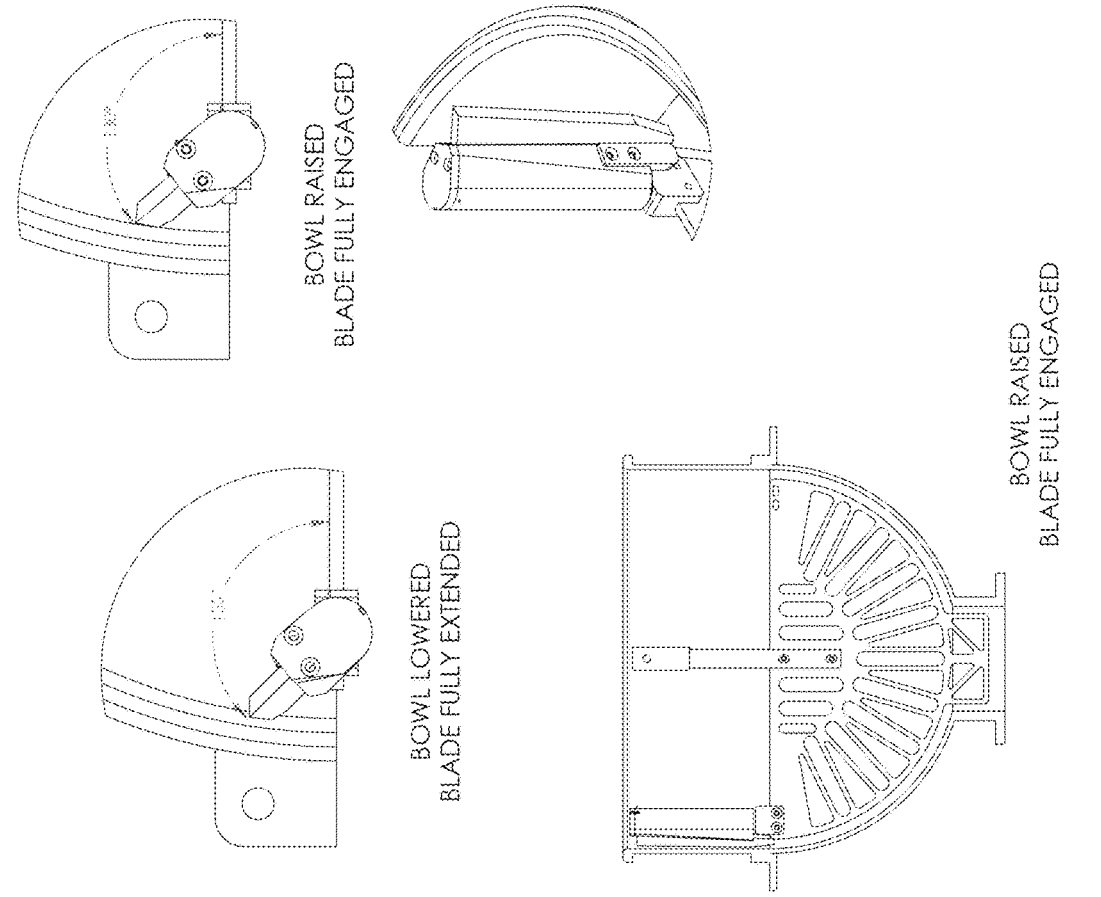
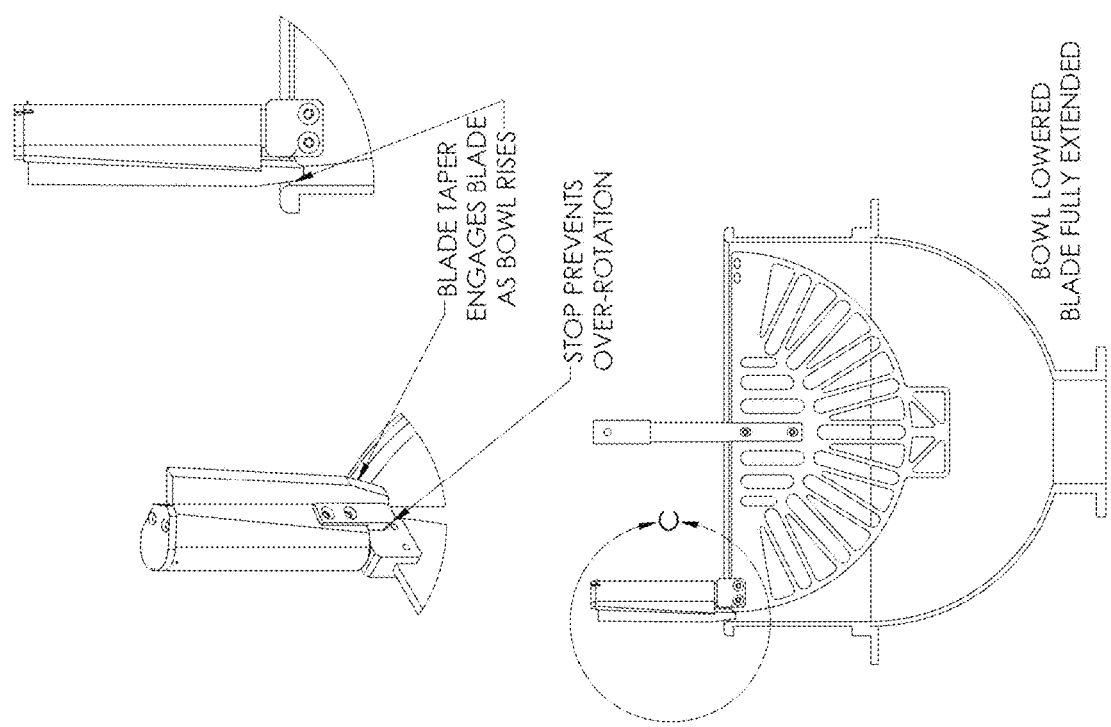
FIG. 77B

METHODS, DEVICES AND SYSTEMS FOR PROCESSING OF CARBONACEOUS COMPOSITIONS

CROSS-REFERENCE

This application is a continuation of U.S. patent application Ser. No. 16/130,751 filed Sep. 13, 2018, which is a continuation of U.S. patent application Ser. No. 15/693,222 filed Aug. 31, 2017, now issued as U.S. Pat. No. 10,112,167 on Oct. 30, 2018, which is a continuation of U.S. patent application Ser. No. 15/442,336, filed Feb. 24, 2017, now allowed as U.S. Pat. No. 9,782,739 on Oct. 10, 2017, which claims the benefit of U.S. Provisional Application No. 62/300,550, filed Feb. 26, 2016, U.S. Provisional Application No. 62/301,511, filed Feb. 29, 2016, U.S. Provisional Application No. 62/302,689, filed Mar. 2, 2016, and U.S. Provisional Application No. 62/324,796, filed Apr. 19, 2016, which applications are incorporated herein in their entirety by reference.

SUMMARY OF INVENTION

Provided herein are methods, devices, and systems for processing of carbonaceous compositions. In certain embodiments, the processing includes the manufacture (or synthesis) of oxidized forms of carbonaceous compositions and/or the manufacture (or synthesis) of reduced forms of oxidized carbonaceous compositions. Some embodiments provide methods, devices and systems for the manufacture (or synthesis) of graphite oxide from graphite and/or for the manufacture (or synthesis) of reduced graphite oxide from graphite oxide.

In one aspect, disclosed herein is an apparatus, the apparatus comprising: a tank, the tank comprising a carbonaceous composition; a mixer mounted to the tank, the mixer in fluid communication with the tank; and a tank agitator mechanically coupled to the mixer. The tank agitator is configured to agitate the carbonaceous composition in the tank, thereby forming an oxidized form of the carbonaceous composition at a rate of greater than about 1 tonne per year (tpy).

Other goals and advantages of the methods, devices, and systems disclosed herein will be further appreciated and understood when considered in conjunction with the following description and accompanying drawings. While the following description contains specific details describing particular embodiments, this should not be construed as limitations but rather as an exemplification of preferable embodiments. For each aspect of the invention, many variations are possible as suggested herein that are known to those of ordinary skill in the art. In some embodiments, the methods, devices, and systems disclosed herein are capable of a variety of changes and modifications not explicitly recited.

In one aspect, described herein is a reaction system comprising: (a) a reaction vessel comprising a carbonaceous composition, the vessel comprising (i) a reaction mixer mounted to the vessel, the reaction mixer in fluid communication with the vessel; and (ii) a reaction agitator mechanically coupled to the reaction mixer, wherein the reaction agitator is configured to agitate the carbonaceous composition in the vessel; (b) a tank comprising (i) a tank mixer mounted to the tank, the tank mixer in fluid communication with the tank; and (ii) a tank agitator mechanically coupled to the tank mixer, wherein the agitator is configured to agitate the carbonaceous composition in the tank after the composition has been transferred to the tank; wherein the reaction system is configured to transfer the carbonaceous composition from the reaction vessel to the tank. In some embodiments, the system comprises a sensor disposed within the reaction vessel. In further embodiments, the sensor measures temperature, pH, or salt concentration. In some embodiments, the system comprises a sensor disposed within the tank. In further embodiments, the sensor measures temperature, pH, or salt concentration. In some embodiments, the system modulates a rate of addition of one or more reactants into the reaction vessel to maintain a reaction temperature no greater than 15° C. In some embodiments, the system allows a temperature inside the reaction vessel (e.g. reaction temperature) to rise to an ambient temperature after the reaction is over. In some embodiments, the system adjusts a temperature inside the reaction vessel (e.g. raise or lower the temperature). In some embodiments, the system comprises one or more cooling coils configured to reduce a reaction temperature inside the reaction vessel. In some embodiments, the system comprises a control unit for regulating a reaction carried out by the system. In further embodiments, the control unit regulates a reaction temperature. In further embodiments, the control unit regulates a temperature of the carbonaceous composition inside the reaction vessel. In further embodiments, the control unit regulates a temperature of the carbonaceous composition after it has been transferred to the tank. In further embodiments, the control unit regulates temperature by controlling a rate of addition of one or more materials into the reaction vessel. In yet further embodiments, the one or more materials are selected from the list consisting of: carbonaceous composition, potassium permanganate, sulfuric acid, water, hydrogen peroxide, and ice. In some embodiments, the reaction vessel comprises an intake for receiving the carbonaceous composition. In some embodiments, the reaction vessel comprises an intake for receiving potassium permanganate. In some embodiments, the reaction vessel comprises an intake for receiving sulfuric acid. In some embodiments, the reaction vessel comprises a port for receiving ventilation into the vessel. In some embodiments, the reaction vessel comprises a port for releasing ventilation from the vessel. In some embodiments, the system configured to move the reaction mixer and reaction vessel towards and away from each other. In some embodiments, the system is configured to lower the reaction mixer into the reaction vessel. In some embodiments, the system is configured to raise the reaction mixer away from the reaction vessel. In some embodiments, the system is configured to lower the reaction vessel away from the reaction mixer. In some embodiments, the system is configured to raise the reaction vessel towards the reaction mixer. In some embodiments, the reaction mixer is configured on a slide such that it can move with respect to the reaction vessel. In some embodiments, the reaction mixer is configured to slide away from the reaction vessel for ease of cleaning of the reaction vessel. In some embodiments, the reaction mixer comprises a cover for sealing the reaction vessel when the reaction mixer is lowered into the reaction vessel. In some embodiments, the reaction mixer is a reaction mixer blade, the reaction mixer blade having an edge that is within 5 inches of a side of the reaction vessel. In some embodiments, the reaction mixer comprises a scraper engaged with an inside surface of the reaction vessel, the scraper configured to scrape off materials stuck on the inside surface. In certain embodiments, the scraper is a scraper blade. In further embodiments, the scraper is attached to the reaction mixer. In further embodiments, the scraper is engaged with the inside surface of the reaction vessel at an angle, wherein a top portion of the scraper is ahead of a bottom portion of the scraper in a direction of rotation of a reaction mixer blade of the agitator. In some embodiments, the reaction mixer comprises a scraper blade configured to dislodge material that sticks to the reaction vessel. In some embodiments, the reaction vessel has a volume of at least about 20 gallons. In some embodiments, the reaction vessel has a volume of at least about 60 gallons. In some embodiments, the tank has a volume of at least about 500 gallons. In some embodiments, the tank has a volume of at least about 1,600 gallons. In some embodiments, the reaction vessel comprises a valve, wherein the reaction vessel is in fluid communication with the tank via the valve. In further embodiments, wherein the system is configured to open the valve to allow the carbonaceous composition to transfer from the reaction vessel to the tank for quenching a reaction carried out in the reaction vessel. In further embodiments, the reaction vessel is positioned higher than the tank, wherein opening the valve allows the carbonaceous composition in the reaction vessel to drain into the tank. In some embodiments, the reaction agitator is driven at a rate of up to about 60 revolutions per minute. In some embodiments, the tank has a volume of at least about 200 gallons. In some embodiments, the tank holds or contains (i) at least about 200 gallons of a liquid, (ii) at least about 300 pounds of ice, or (iii) a liquid and at least about 300 pounds of ice. In some embodiments, the tank comprises an intake for receiving hydrogen peroxide. In some embodiments, the tank is configured to dispense hydrogen peroxide into an interior space of the tank. In some embodiments, the tank comprises an intake for receiving crushed ice. In some embodiments, the tank is configured to dispense crushed ice into an interior space of the tank. In some embodiments, the tank mixer is mounted to a top of the tank. In some embodiments, the tank mixer comprises a shaft that mechanically couples the tank agitator to the tank mixer. In some embodiments, the tank mixer is configured on a slide such that it can move with respect to the tank. In some embodiments, the tank mixer slides away from the tank for ease of cleaning of the tank. In some embodiments, the system comprises a plurality of tank agitators. In some embodiments, the tank agitator is driven at a rate of up to about 60 revolutions per minute. In some embodiments, the tank agitator comprises agitator blades. In further embodiments, the agitator blades comprise 2 rows of 4 blades with at least about ½ inch clearance from all sides and bottom of the tank. In some embodiments, the system comprises (i) a transmission between the tank mixer and the tank agitator, the transmission configured to actuate the tank agitator, or (ii) a motor configured to actuate the tank agitator, wherein the motor is separate from the tank mixer. In some embodiments, the system forms an oxidized form of the carbonaceous composition at a rate of greater than about 10 kg per batch. In some embodiments, the system forms an oxidized form of the carbonaceous composition at a rate of greater than about 50 kg per batch. In some embodiments, the system comprises one or more additional reaction vessels. In further embodiments, the system comprises at least two reaction vessels. In further embodiments, the system comprises at least three reaction vessels. In further embodiments, the system comprises at least four reaction vessels. In yet further embodiments, the tank has a volume of at least a combined volume of the at least four reaction vessels. In yet further embodiments, the tank has a volume of at least double a combined volume of the at least four reaction vessels. In further embodiments, the system comprises at least eight reaction vessels. In yet further embodiments, the tank has a volume of at least a combined volume of the at least four reaction vessels. In yet further embodiments, the tank has a volume of at least double a combined volume of the at least eight reaction vessels. In some embodiments, the carbonaceous composition comprises graphite. In some embodiments, the carbonaceous composition comprises a graphite feedstock. In some embodiments, the system is configured to process the carbonaceous composition into graphene oxide. In some embodiments, the system is configured to process the carbonaceous composition, wherein the processed carbonaceous composition is suitable for downstream use in making a capacitor comprising electrodes having a peak capacitance of at least about 100 mF/cm$^2$ at a scan rate of about 10 mV/s. In some embodiments, the system is configured to process the carbonaceous composition, wherein the processed carbonaceous composition is suitable for downstream use in making a capacitor comprising electrodes having a peak capacitance of at least about 150 mF/cm$^2$ at a scan rate of about 10 mV/s. In some embodiments, the system is configured to process the carbonaceous composition, wherein the processed carbonaceous composition is suitable for downstream use in making a capacitor comprising electrodes having a peak capacitance of at least about 200 mF/cm$^2$ at a scan rate of about 10 mV/s. In some embodiments, the system is configured to carry out a first reaction involving the carbonaceous composition in the reaction vessel and quench the first reaction in the tank. In further embodiments, the system is configured to carry out the first reaction by adding one or more of the carbonaceous composition, sulfuric acid, and potassium permanganate. In further embodiments, the system is configured to quench the first reaction by adding one or more of hydrogen peroxide and ice. Disclosed herein are methods of processing a carbonaceous composition using the system of any of the preceding embodiments.

In one aspect, disclosed herein is a reaction system comprising: (a) a reaction vessel comprising graphite, the vessel comprising: (i) a reaction mixer mounted to the vessel, the reaction mixer in fluid communication with the vessel; and (ii) a reaction agitator mechanically coupled to the reaction mixer, wherein the reaction agitator is configured to agitate the graphite in the vessel and configured to facilitate the conversion of graphite into graphene oxide; (b) a tank comprising: (i) a tank mixer mounted to the tank, the tank mixer in fluid communication with the tank; and (ii) a tank agitator mechanically coupled to the tank mixer, wherein the agitator is configured to agitate the graphene oxide in the tank after the composition has been transferred to the tank; wherein the reaction system is configured to transfer the graphene oxide from the reaction vessel to the tank.

In one aspect, disclosed herein is a reaction filter, the reaction filter comprising: (a) a drum assembly; (b) a spray bar assembly disposed within the interior of the drum assembly, the spray bar assembly comprising: (i) a first set of one or more openings for dispensing a wash liquid; and (ii) a second set of one or more openings for dispensing a carbonaceous composition; wherein the drum assembly is configured to rotate. In some embodiments, the spray bar assembly dispenses the carbonaceous composition at low pressure. In some embodiments, the spray bar assembly is coupled to a source of the carbonaceous composition. In some embodiments, the spray bar assembly dispenses the carbonaceous composition using gravity (e.g. carbonaceous composition flows through spray bar assembly and out the one or more openings via gravity and is not actively pumped). In some embodiments, the spray bar assembly dispenses the wash liquid at high pressure. In some embodiments, the spray bar assembly is coupled to a source of the wash liquid, wherein the source comprises a pump for pressurizing the wash liquid to enable the spray bar assembly to dispense the wash liquid at high pressure. In some embodiments, the wash liquid is deionized water. In some embodiments, the reaction filter further comprises a control unit for controlling operation of the reaction filter. In further embodiments, the control unit is configured for autonomous operation of the reaction filter in carrying out one or more wash cycles. In further embodiments, the control unit is configured to carry out one or more wash cycles until a threshold condition is met. In further embodiments, the control unit is configured to carry out a cleaning protocol. In some embodiments, the drum assembly comprises a drum mesh. In further embodiments, the drum mesh is configured to provide structural support to a drum micron filter. In further embodiments, the drum mesh comprises a pore size of no more than about 2 inches. In further embodiments, the drum mesh comprises a pore size of about 0.5 inches. In some embodiments, the drum assembly comprises a drum micron filter. In further embodiments, the drum micron filter comprises a plurality of layers. In further embodiments, the drum micron filter comprises between about two layers and about 10 layers. In further embodiments, the drum micron filter comprises between about two layers and about 6 layers. In further embodiments, the drum micron filter comprises about four layers. In further embodiments, the drum micron filter comprises pores having a pore size suitable for retaining at least 95% w/w of the carbonaceous composition after filtration. In further embodiments, the drum micron filter comprises pores having a diameter of about 1 micron. In further embodiments, the drum micron filter comprises pores having a diameter of no more than about 1 micron. In further embodiments, the drum micron filter comprises pores having a diameter of no more than about 2 microns. In further embodiments, the drum micron filter comprises pores having a diameter of no more than about 3 microns. In further embodiments, the drum micron filter comprises pores having a diameter of no more than about 5 microns. In further embodiments, the drum micron filter comprises pores having a diameter of no more than about 10 microns. In some embodiments, the drum assembly comprises a drum mesh and a drum micron filter, the drum mesh and drum micron filter each having an overlapping seam, wherein the overlapping seams are positioned to avoid overlapping with each other. In some embodiments, the drum assembly comprises one or more drum stiffener rings. In some embodiments, the drum assembly comprises one or more drum stiffeners. In some embodiments, the drum assembly is configured to minimize weight, wherein the drum assembly maintains sufficient durability for providing filtration for a carbonaceous composition. In some embodiments, the drum assembly comprises one or more drum bearing plates. In further embodiments, the one or more drum bearing plates are configured to rotate without forcing the spray bar assembly to rotate. In some embodiments, the drum assembly comprises one or more drum frames. In further embodiments, the one or more drum frames are configured to receive rotational force for rotating the drum assembly. In further embodiments, the reaction filter comprises a drive shaft configured to provide rotational force to the drum assembly. In some embodiments, the spray bar assembly comprises a first intake for receiving the wash liquid from a source of the wash liquid. In further embodiments, the wash liquid is pumped from the source of the wash liquid into the first intake of the spray bar assembly. In further embodiments, the first intake is configured to couple with a conduit in fluid communication with the source of the wash liquid for receiving the wash liquid. In yet further embodiments, the first intake is configured to efficiently couple and uncouple with the conduit. In yet further embodiments, the first intake is configured to couple with a quick disconnect fitting, wherein the quick disconnect fitting seals off the first intake. In further embodiments, the spray bar assembly comprises a second intake for receiving the carbonaceous composition from a source of the carbonaceous composition. In yet further embodiments, the carbonaceous composition is pumped from the source into the second intake of the spray bar assembly. In yet further embodiments, the second intake is configured to couple with a conduit in fluid communication with the source of the carbonaceous composition for receiving the carbonaceous composition. In yet further embodiments, the second intake is configured to efficiently couple and uncouple with the conduit. In some embodiments, the spray bar assembly comprises one or more spray bars, wherein the first set and second set of one or more openings are positioned on the one or more spray bars. In further embodiments, the spray bar assembly comprises a spray bar comprising the first set of one or more openings and the second set of one or more openings. In further embodiments, the spray bar assembly comprises a first spray bar comprising the first set of one or more openings and a second spray bar comprising the second set of one or more openings. In yet further embodiments, the first set and second set of one or more openings comprise spray tips. In still yet further embodiments, each spray tip is configured to spray the wash liquid at an angle spray of at least 30 degrees. In still yet further embodiments, each spray tip is configured to spray the wash liquid at an angle spray of at least 50 degrees. In some embodiments, the spray bar assembly is configured to spray the wash liquid into an interior of the drum assembly at a pressure sufficient to purify the carbonaceous composition. In further embodiments, the spray bar assembly is configured to spray the wash liquid into the interior of the drum assembly at a pressure of at least 50 PSI. In further embodiments, the spray bar assembly is configured to spray the wash liquid into the interior of the drum assembly at a pressure of at least 100 PSI. In further embodiments, the spray bar assembly is configured to spray the wash liquid into the interior of the drum assembly at a pressure of at least 150 PSI. In further embodiments, the spray bar assembly is configured to spray the wash liquid into the interior of the drum assembly at a pressure of at least 200 PSI. In further embodiments, the spray bar assembly is configured to spray the wash liquid into the interior of the drum assembly at a pressure of at least 150 PSI. In some embodiments, the drum assembly comprises a rolling position for washing the carbonaceous composition and an unloading position for unloading the carbonaceous composition. In further embodiments, the drum assembly comprises a drum cradle weldment configured to receive the drum assembly during unloading, wherein the drum assembly is rolled onto the drum cradle weldment. In yet further embodiments, the drum cradle weldment comprises one or more attachment mechanisms for securing the drum assembly. In yet further embodiments, the drum cradle weldment comprises a shaft extending from the drum cradle weldment and coupled to the apparatus, wherein the drum cradle weldment is configured to rotate about the axis of the shaft relative to the apparatus. In yet further embodiments, the drum cradle weldment comprises a locking mechanism for preventing rotation of the drum cradle weldment, wherein the locking mechanism is releasable to allow rotation of the drum cradle weldment. In some embodiments, the drum assembly comprises drum stiffeners. In some embodiments, the drum assembly comprises drum stiffener rings. In some embodiments, the drum assembly is configured to rotate at different speeds during one or more wash cycles. In some embodiments, the drum assembly is configured to rotate at a speed of at least 300 rpms. In some embodiments, the drum assembly is configured to rotate at a speed of at least 500 rpms. In some embodiments, the reaction filter comprises a drive shaft, wherein the drive shaft is engaged with the drum assembly to transmit rotational force to the drum assembly. In further embodiments, the drive shaft is mechanically linked to a motor that actuates the drive shaft. In further embodiments, the drive shaft comprises one or more drive wheels that are in direct contact with the drum assembly, wherein the one or more drive wheels are configured to deliver rotational force to the drum assembly. In yet further embodiments, the drum assembly comprises one or more drum frames, each drum frame comprising a groove along an outside surface configured to receive a drive wheel. In some embodiments, the spray bar assembly is fluidly coupled to a tank holding a reduced form of a carbonaceous composition, wherein the carbonaceous composition is pumped through the spray bar assembly to be dispensed into the drum assembly. In some embodiments, the reaction filter comprises a drainpan positioned beneath the drum assembly for collecting waste liquid from the drum assembly. In some embodiments, the reaction filter comprises a sensor configured to measure a property of a waste liquid from the drum assembly. In further embodiments, the property is selected from pH, temperature, conductivity, and salt concentration. In some embodiments, the reaction filter is configured to filter the carbonaceous composition in the drum assembly at a rate of greater than about 100 kg per year. In some embodiments, the reaction filter is configured to filter the carbonaceous composition to obtain a purity of at least 95% w/w for a batch of at least 1 kg of the carbonaceous composition after drying. In some embodiments, the reaction filter is configured to filter the carbonaceous composition to obtain a conductivity of at least 200 mS/cm for a batch of at least 1 kg of the carbonaceous composition. In some embodiments, the spray bar assembly is configured for rapid detachment and reattachment. In some embodiments, the reaction filter is configured to carry out one or more wash cycles per batch of the carbonaceous composition. In further embodiments, the reaction filter is automated to carry out the one or more wash cycles without requiring manual input. In further embodiments, the reaction filter carries out the one or more wash cycles according to a predefined wash protocol. In further embodiments, the reaction filter carries out the one or more wash cycles until a threshold condition is met. In yet further embodiments, the threshold condition is selected from pH, temperature, conductivity, and salt concentration. In some embodiments, a wash cycle comprises dispensing a carbonaceous composition into the interior of the drum assembly, dispensing a wash liquid into an interior of the drum assembly, and rotating the drum assembly. In some embodiments, wherein the reaction filter is configured to carry out a wash cycle until one or more threshold conditions are met. In some embodiments, the carbonaceous composition comprises a reduced form of graphene oxide. In some embodiments, the carbonaceous composition comprises rGO. In some embodiments, the carbonaceous composition comprises graphene. In some embodiments, the reaction filter is configured to filter the carbonaceous composition, wherein the filtered carbonaceous composition is suitable for downstream use in making a capacitor comprising electrodes having a peak capacitance of at least about 100 mF/cm$^2$ at a scan rate of about 10 mV/s. In some embodiments, the reaction filter is configured to filter the carbonaceous composition, wherein the filtered carbonaceous composition is suitable for downstream use in making a capacitor comprising electrodes having a peak capacitance of at least about 150 mF/cm$^2$ at a scan rate of about 10 mV/s. In some embodiments, the reaction filter is configured to filter the carbonaceous composition, wherein the filtered carbonaceous composition is suitable for downstream use in making a capacitor comprising electrodes having a peak capacitance of at least about 200 mF/cm$^2$ at a scan rate of about 10 mV/s. In some embodiments, the reaction filter is substantially enclosed to prevent the wash liquid and the carbonaceous composition from escaping during one or more wash cycles. In some embodiments, the reaction filter comprises a cradle pivot assembly. In some embodiments, the reaction filter comprises a drum cradle assembly. In some embodiments, the reaction filter comprises reaction filter comprises an idler shaft. In some embodiments, the reaction filter comprises reaction filter comprises a drive shroud. In some embodiments, the reaction filter comprises reaction filter comprises a drum shaft support. In some embodiments, the reaction filter comprises reaction filter comprises a motor mount plate. In some embodiments, the reaction filter comprises reaction filter comprises a frame weldment. In some embodiments, the reaction filter comprises reaction filter comprises a lid weldment. In some embodiments, the reaction filter comprises reaction filter comprises a drainpan weldment. In some embodiments, the reaction filter comprises reaction filter comprises a cradle pivot weldment. In some embodiments, the reaction filter comprises reaction filter comprises a drum roll guide. In some embodiments, the reaction filter comprises reaction filter comprises a drum brace. In some embodiments, the reaction filter comprises reaction filter comprises a drum cradle weldment. In some embodiments, the reaction filter comprises reaction filter comprises a drum end cap assembly. In some embodiments, the reaction filter comprises reaction filter comprises a spray bar bearing hub. In some embodiments, the reaction filter comprises reaction filter comprises a drum bearing plate. In some embodiments, the reaction filter comprises reaction filter comprises a drum shaft mount. In another aspect, disclosed herein are methods of filtering a carbonaceous composition using the reaction filter of any of the preceding embodiments.

In another aspect, disclosed herein is an apparatus, the apparatus comprising: a tank, the tank comprising a carbonaceous composition; a mixer mounted to the tank, the mixer in fluid communication with the tank; and a tank agitator mechanically coupled to the mixer, wherein the tank agitator is configured to agitate the carbonaceous composition in the tank, thereby forming an oxidized form of the carbonaceous composition at a rate of greater than about 1 tonne per year (tpy). In some embodiments, the tank has a volume of at least about 100 gallons. In some embodiments, the tank holds or contains a fluid. In some embodiments, the fluid comprises the carbonaceous composition. In some embodiments, the tank holds or contains (i) at least about 100 gallons of a liquid, (ii) at least about 150 pounds of ice, or (iii) a liquid and at least about 150 pounds of ice. In some embodiments, the tank comprises (i) at least one inlet, (ii) at least one outlet, or (iii) at least one inlet and at least one outlet. In further embodiments, the tank comprises a first inlet at a top of the tank and a second inlet at a bottom left edge of a back of the tank. In further embodiments, the tank comprises a first outlet at a top and a second outlet at a bottom in a center end of the tank. In some embodiments, the mixer comprises a mixer bowl. In further embodiments, the mixer bowl comprises a butterfly valve mounted substantially flush with the mixer bowl, wherein the mixer is in fluid communication with the tank via the butterfly valve. In some embodiments, the mixer is mounted to a top of the tank. In some embodiments, the mixer comprises a shaft that mechanically couples the tank agitator to the mixer. In further embodiments, the shaft comprises a drive shaft. In some embodiments, the mixer is configured on a slide such that it can move with respect to the tank. In further embodiments, the mixer slides away from the tank for ease of cleaning of the tank. In some embodiments, the apparatus comprises a plurality of tank agitators. In some embodiments, the tank agitator is driven with a drive shaft off a front attachment of the mixer. In some embodiments, the tank agitator is driven at a power/frequency of at least about 60 revolutions per minute. In some embodiments, the tank agitator comprises agitator blades. In further embodiments, the agitator blades comprise 2 rows of 4 blades with at least about ½ inch clearance from all sides and bottom of the tank. In some embodiments, one or more top-most blades among the agitator blades are at least about 6 inches from a top of the tank and at least about ½ inch from each side of the tank. In some embodiments, the apparatus further comprises (i) a transmission between the mixer and the tank agitator, the transmission configured to actuate the tank agitator, or (ii) a motor configured to actuate the tank agitator, the motor separate from the mixer. In further embodiments, the apparatus comprises a gearbox. In some embodiments, the apparatus comprises a power source in electrical communication with the mixer. In some embodiments, the oxidized form of the carbonaceous composition is formed at a rate of greater than about 2 tpy. In some embodiments, the oxidized form of the carbonaceous composition is formed at a rate of greater than about 5 tpy. In another aspect, disclosed herein are methods of processing a carbonaceous composition using the apparatus of any of the preceding embodiments.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 4 shows schematics of a mixer bowl and related components;

FIGS. 13A-13C show an exemplary embodiment of a frame assembly (e.g., GSRF-0100);

FIGS. 16A-16B show an exemplary embodiment of a drum assembly (e.g., GSRF-0108);

FIGS. 22A-22D show an exemplary embodiment of a lid weldment (e.g., GSRF-0102);

FIGS. 23A-23E show an example embodiment of a drain-pan weldment (e.g., GSRF-0103);

FIGS. 25A-25C show an exemplary embodiment of a cradle pivot weldment (e.g., GSRF-0105);

FIGS. 26A-26B show an exemplary embodiment of a drum roll guide and a drum brace (e.g., GSRF-0010);

FIGS. 27A-27B show an exemplary embodiment of a drum cradle weldment (e.g., GSRF-0107);

FIGS. 29A-29B show an exemplary embodiment of a drum end cap assembly (e.g., GSRF-0110);

FIGS. 30A-30B show an exemplary embodiment of a drum frame (e.g., GSRF-0001);

FIG. 32 shows an exemplary embodiment of a drum stiffener ring (e.g., GSRF-0003);

FIG. 33 shows an exemplary embodiment of a drum mesh (e.g., GSRF-0004);

FIGS. 36A-36B show an exemplary embodiment of a drum bearing plate (e.g., GSRF-0006);

FIGS. 37A-37B show an exemplary embodiment of a spray bar bearing hub on a fluid side (e.g., GSRF-0007);

FIG. 40 shows an exemplary embodiment of a drum shaft mount on an idler side (e.g., GSRF-0008);

FIGS. 43A-43C and 43D-43F show exemplary embodiments of an rGO/graphene second reaction filter (e.g., GSRF-1000);

FIGS. 45A-45E shows an exemplary embodiment of a cover assembly with front and rear hood weldments (e.g. GSRF-0111, GSRF-0112)

FIG. 50 shows an exemplary embodiment of a lift motor mount plate (e.g. GFRC-0004);

FIG. 59 shows an exemplary embodiment of a carriage switch mount plate (e.g. GFRC-0014);

FIGS. 68A-68C shows an exemplary embodiment of a first reaction frame weldment (e.g. GFRC-0101);

FIG. 73 shows an exemplary embodiment of a mixer motor mount (e.g. GFRC-0108);

FIG. 74 shows an exemplary embodiment of a 1000 gallon tank mixer paddle (e.g. GFRC-0109);

FIGS. 76A-76B shows an exemplary embodiment of a first reaction frame shelf (e.g. GFRC-0111); and FIGS. 77A-77B shows an exemplary embodiment of a first reaction paddle assembly (e.g. GFRC-0112).

DETAILED DESCRIPTION OF INVENTION

Figure 1:
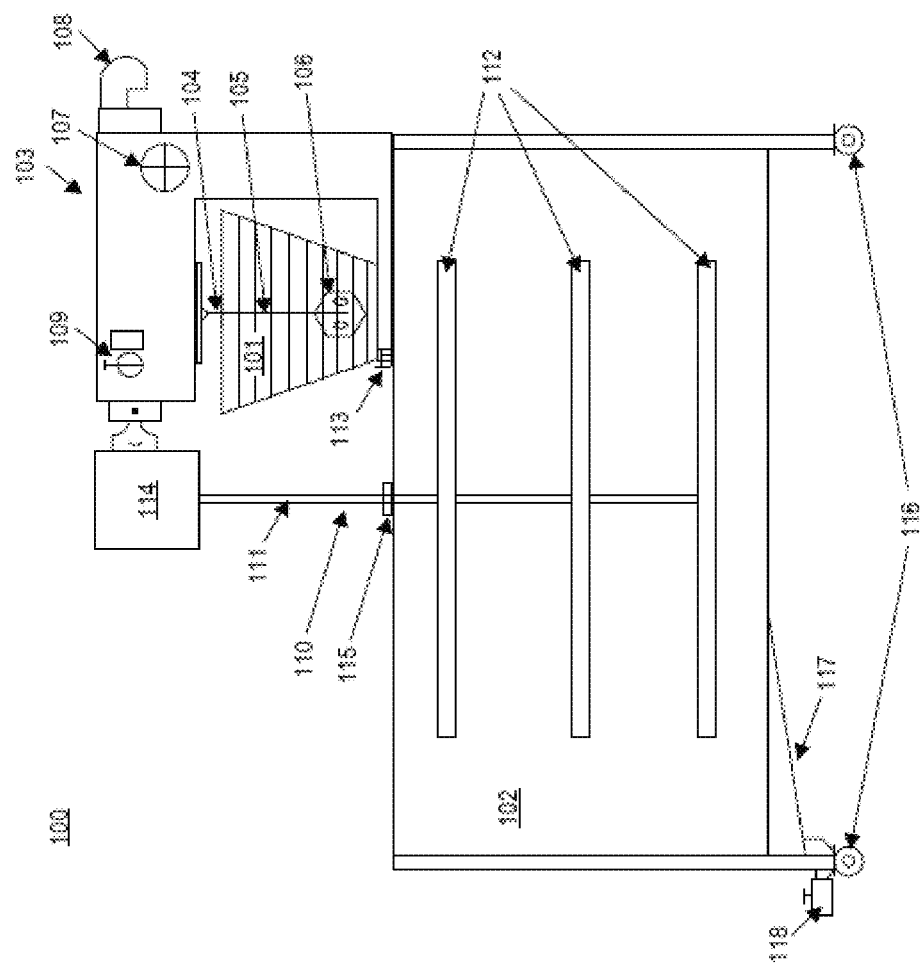
FIG. 1 is a schematic of a system comprising two vessels.

Provided herein are methods, devices and systems for processing of carbonaceous compositions. In certain embodiments, the processing includes the manufacture (or synthesis) of oxidized forms of carbonaceous compositions and/or the manufacture (or synthesis) of reduced forms of oxidized carbonaceous compositions. Some embodiments provide methods, devices and systems for the manufacture (or synthesis) of graphite oxide from graphite and/or for the manufacture (or synthesis) of reduced graphite oxide from graphite oxide. Various aspects of the disclosure described herein are applicable to any of the particular applications set forth below or in any other type of manufacturing, synthesis or processing setting. In certain embodiments, other manufacturing, synthesis or processing of materials equally benefit from features described herein. In certain embodiments, the methods, devices and systems herein are advantageously applied to manufacture (or synthesis) of various forms of non-carbonaceous compositions. In certain embodiments, the subject matter described herein are applied as a stand-alone method, device or system, or as part of an integrated manufacturing or materials (e.g., chemicals) processing system. It shall be understood that different aspects of the subject matter described herein can be appreciated individually, collectively, or in combination with each other.

An aspect of the subject matter disclosed herein relates to a system (comprising one or more devices) for the manufacture (or synthesis) or processing of materials. In certain embodiments, the system is used to manufacture oxidized forms of carbonaceous compositions.

Another aspect of the subject matter disclosed herein relates to a reaction system comprising: (a) a reaction vessel comprising a carbonaceous composition, the vessel comprising (i) a reaction mixer mounted to the vessel, the reaction mixer in fluid communication with the vessel; and (ii) a reaction agitator mechanically coupled to the reaction mixer, wherein the reaction agitator is configured to agitate the carbonaceous composition in the vessel; (b) a tank comprising (i) a tank mixer mounted to the tank, the tank mixer in fluid communication with the vessel; and (ii) a tank agitator mechanically coupled to the tank mixer, wherein the agitator is configured to agitate the carbonaceous composition in the tank after the composition has been transferred to the tank; wherein the reaction system is configured to transfer the carbonaceous composition from the reaction vessel to the tank.

Another aspect of the subject matter disclosed herein relates to a reaction filter, the reaction filter comprising: (a) a drum assembly; (b) a spray bar assembly disposed within the interior of the drum assembly, the spray bar assembly comprising: (i) a first set of one or more openings for dispensing a wash liquid; and (ii) a second set of one or more openings for dispensing a carbonaceous composition; wherein the drum assembly is configured to rotate.

Another aspect of the subject matter disclosed herein relates to a reaction filter, the reaction filter comprising: (a) a drum assembly; (b) a spray bar assembly disposed within the interior of the drum assembly, the spray bar assembly configured to dispense a wash liquid and a carbonaceous composition; wherein the drum assembly is configured to rotate.

Another aspect of the subject matter disclosed herein relates to an apparatus, the apparatus comprising: a tank, the tank comprising a carbonaceous composition; a mixer mounted to the tank, the mixer in fluid communication with the tank; and a tank agitator mechanically coupled to the mixer, wherein the tank agitator is configured to agitate the carbonaceous composition in the tank, thereby forming an oxidized form of the carbonaceous composition at a rate of greater than about 1 tonne per year (tpy).

Reference will now be made to the figures. It will be appreciated that the figures and features therein are not necessarily drawn to scale.

FIG. 1 is a schematic of a system 100 comprising two vessels. In certain embodiments, the system 100 is used to carry out a first reaction (e.g., oxidizing a carbonaceous composition). In certain embodiments, the system is used to carry out a second reaction (e.g. reducing a carbonaceous composition). In certain embodiments, the system includes a first vessel (e.g., a reaction chamber or reaction vessel where a reaction takes place) 101 and a second vessel (e.g. a tank or mixer tank where a reaction is quenched) 102. In certain embodiments, the first vessel 101 is open or closed (e.g., sealed). In certain embodiments, the first vessel comprises a reaction chamber (e.g. reaction vessel or reaction bowl). In certain embodiments, the first vessel comprises a mixer bowl. In certain embodiments, the first vessel contains a substance or composition that is mixing and/or reacting. Any description herein of the first vessel (e.g. first reaction vessel, reaction bowl, etc) is applicable to a mixer bowl (or a mixer), and vice versa. In certain embodiments, a mixer or mixer system 103 stirs or mixes the contents of the first vessel (e.g., the contents of the mixer bowl). In an example, the mixer is a 20 quart mixer. In certain embodiments, the mixer 103 comprises one or more mixer agitators 104 that stirs or mixes the contents of the first vessel (e.g., the contents of the mixer bowl). In certain embodiments, the mixer 103 comprises a motor (not shown). In certain embodiments, the motor drives the mixer agitator 104. In certain embodiments, the mixer agitator comprises a shaft 105 and a paddle, blade or other stirrer 106. In certain embodiments, the motor is further coupled to other components of the system 100 as described elsewhere herein. In certain embodiments, the mixer 103 comprises a fan 107, an optional fresh air intake 108 and/or one or more controls 109. In certain embodiments, a power source (shown) is in electrical communication with the mixer 103. In certain embodiments, the mixer 103 comprises the first vessel (e.g., mixer bowl) 101 (i.e., the mixer bowl is part of the mixer system). In certain embodiments, the optional fresh air intake 108 takes in air, for example, to protect the motor from corrosive gases (e.g., corrosive gases within the mixer 103 or any other elements of the system 100). In certain embodiments, the fresh air intake 108 is not provided in certain embodiments (e.g., fresh air may in some cases not be used when the motor is a hydraulic motor). In certain embodiments, the motor is any suitable motor that can properly drive the mixer agitator 104 and/or other components of the system 100. In certain embodiments, the motor is a hydraulic motor, an electrical motor, or other motor.

In certain embodiments, the mixer comprises (e.g., hold or contain) a fluid (e.g., solid, liquid or gas). In certain embodiments, the mixer comprises a liquid (e.g., sulfuric acid), a solid (e.g., graphite) or a mixture thereof. In certain embodiments, the contents of the mixer is maintained at a suitable temperature, such as, for example, less than or equal to about 0° C., 1° C., 2° C., 3° C., 4° C., 6° C., 8° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C. In an example, the contents of the mixer are maintained at about 0° C. In another example, the contents of the mixer are maintained at less than about 15° C. In certain embodiments, the reaction temperature and/or reaction time of the mixture in the mixer are controlled. In certain embodiments, the reaction time and/or reaction temperature are maintained below a suitable value (e.g., such that contents of the mixer are maintained at a temperature of about 0° C. or at a temperature of less than about 15° C.). In certain embodiments, the reaction temperature is decreased, for example, by cooling tubes or coils around the mixer bowl, by immersing the mixer bowl in a temperature-controlled bath (e.g., a thermostat-controlled bath or an ice bath), by other cooling methods, or any combination thereof. In certain embodiments, the cooling coils/tubes circulate chilled water. In certain embodiments, the flow rate of the chilled water is increased in order to decrease the temperature. In certain embodiments, the temperature of the chilled water is decreased in order to decrease the temperature. In certain embodiments, the reaction temperature and/or reaction time is varied by changing a rate of addition of one or more reactants to the contents of the mixer bowl (e.g., the temperature is decreased by decreasing a rate at which a reactant that leads to an exothermic reaction is added). In certain embodiments, the contents of the mixer bowl are at a pH of less than or equal to about 7, 6, 5, 4 or 3.5. In certain embodiments, the contents of the mixer bowl are at a pH of less than or equal to about 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or about 0.1. In certain embodiments, the contents of the mixer bowl have a pH from about 3 to about 7. In certain embodiments, the contents of the mixer bowl have a pH of at least about 3. In certain embodiments, the contents of the mixer bowl have a pH of no more than about 7. In certain embodiments, the contents of the mixer bowl have a pH from about 3 to about 3.5, about 3 to about 4, about 3 to about 4.5, about 3 to about 5, about 3 to about 5.5, about 3 to about 6, about 3 to about 6.5, about 3 to about 7, about 3.5 to about 4, about 3.5 to about 4.5, about 3.5 to about 5, about 3.5 to about 5.5, about 3.5 to about 6, about 3.5 to about 6.5, about 3.5 to about 7, about 4 to about 4.5, about 4 to about 5, about 4 to about 5.5, about 4 to about 6, about 4 to about 6.5, about 4 to about 7, about 4.5 to about 5, about 4.5 to about 5.5, about 4.5 to about 6, about 4.5 to about 6.5, about 4.5 to about 7, about 5 to about 5.5, about 5 to about 6, about 5 to about 6.5, about 5 to about 7, about 5.5 to about 6, about 5.5 to about 6.5, about 5.5 to about 7, about 6 to about 6.5, about 6 to about 7, or about 6.5 to about 7. In certain embodiments, the mixer bowl has a volume of at least about 0.1 gallon, 0.2 gallon, 0.5 gallon, 1 gallon, 2 gallons, 3 gallons, 4 gallons, 5 gallons, 6 gallons, 7 gallons, 8 gallons, 9 gallons, 10 gallons, 15 gallons, 25 gallons, 50 gallons, 75 gallons, 80 gallons, 85 gallons, 90 gallons, 100 gallons, 250 gallons, 500 gallons, 750 gallons, 1,000 gallons, 5,000 gallons, 10,000 gallons, 15,000 gallons, 25,000 gallons, 50,000 gallons, 100,000 gallons, 150,000 gallons, 200,000 gallons, 1,000 cubic meters, 5,000 cubic meters, 10,000 cubic meters, 50,000 cubic meters, 100,000 cubic meters or 500,000 cubic meters.

In certain embodiments, the mixer agitator is driven at a power/frequency of greater than or equal to about 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245 or 250 revolutions per minute (rpm). In certain embodiments, the mixer agitator is driven at a power/frequency of up to about 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245 or 250 revolutions per minute (rpm). In certain embodiments, the mixer agitator is driven at a power/frequency from about 20 rpm to about 300 rpm. In certain embodiments, the mixer agitator is driven at a power/frequency from at least about 20 rpm. In certain embodiments, the mixer agitator is driven at a power/frequency from at most about 300 rpm. In certain embodiments, the mixer agitator is driven at a power/frequency from about 20 rpm to about 60 rpm, about 20 rpm to about 100 rpm, about 20 rpm to about 150 rpm, about 20 rpm to about 200 rpm, about 20 rpm to about 250 rpm, about 20 rpm to about 300 rpm, about 60 rpm to about 100 rpm, about 60 rpm to about 150 rpm, about 60 rpm to about 200 rpm, about 60 rpm to about 250 rpm, about 60 rpm to about 300 rpm, about 100 rpm to about 150 rpm, about 100 rpm to about 200 rpm, about 100 rpm to about 250 rpm, about 100 rpm to about 300 rpm, about 150 rpm to about 200 rpm, about 150 rpm to about 250 rpm, about 150 rpm to about 300 rpm, about 200 rpm to about 250 rpm, about 200 rpm to about 300 rpm, or about 250 rpm to about 300 rpm. In an example, the mixer agitator is driven at a power/frequency of at least about 60, 100 or 200 revolutions per minute.

In certain embodiments, a mixer system comprises one or more types of mixers selected a ribbon blender, V blender, continuous processor, cone screw blender, screw blender, double cone blender, high viscosity mixer, counter-rotating mixer, double or triple shaft mixer, vacuum mixer, dispersion mixer, paddle mixer, jet mixer, drum blender, auger mixers, vertical mixers, rotary mixers, turbine mixer, close-clearance mixer, and high shear mixer.

In certain embodiments, the second vessel 102 is open or closed (e.g., sealed). In certain embodiments, the second vessel comprises a tank. In certain embodiments, the description herein of the second vessel is applicable to a tank, and vice versa. In certain embodiments, the tank comprises a substance or composition that is agitated by a tank agitator 110. For example, in certain embodiments, the tank comprises a carbonaceous composition that is agitated by the tank agitator. In an example, the tank comprises a 100 gallon ice bath and is agitated by an ice bath agitator. In certain embodiments, the tank agitator comprises a shaft 111 and one or more agitator blades 112. In certain embodiments, the shaft is driven such that the agitator keeps the contents of the tank in motion and/or to enhance (e.g., maximize) cooling. For example, in certain embodiments, the shaft is driven to keep graphite oxide flowing through the ice in the tank. In certain embodiments, the shaft 111 is coupled to the second vessel via a bearing 115. In certain embodiments, the system comprises a plurality of tank agitators. In certain embodiments, the system comprises at least one, two, three, four, five, six, seven, eight, nine, or ten tank agitators.

In certain embodiments, the tank comprises (e.g., hold or contain) a fluid (e.g., solid, liquid or gas). In certain embodiments, the mixer comprises a liquid (e.g., water, a liquid reaction mixture, etc.), a solid (e.g., ice) or a mixture thereof.

In certain embodiments, the contents of the tank are maintained at a suitable temperature, such as, for example, less than or equal to about 0° C., 1° C., 2° C., 3° C., 4° C., 6° C., 8° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C. In an example, the contents of the tank are maintained at about 0° C. In certain embodiments, the contents of the tank are at a pH of greater than or equal to about 3, 4, 5, 6, 7, 8, 9, or 10. In certain embodiments, the contents of the tank are at a pH of greater than or equal to about 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0. In certain embodiments, the contents of the mixer bowl have a pH from about 3 to about 7. In certain embodiments, the contents of the mixer bowl have a pH of at least about 3. In certain embodiments, the contents of the mixer bowl have a pH of no more than about 7. In certain embodiments, the contents of the mixer bowl have a pH from about 3 to about 3.5, about 3 to about 4, about 3 to about 4.5, about 3 to about 5, about 3 to about 5.5, about 3 to about 6, about 3 to about 6.5, about 3 to about 7, about 3.5 to about 4, about 3.5 to about 4.5, about 3.5 to about 5, about 3.5 to about 5.5, about 3.5 to about 6, about 3.5 to about 6.5, about 3.5 to about 7, about 4 to about 4.5, about 4 to about 5, about 4 to about 5.5, about 4 to about 6, about 4 to about 6.5, about 4 to about 7, about 4.5 to about 5, about 4.5 to about 5.5, about 4.5 to about 6, about 4.5 to about 6.5, about 4.5 to about 7, about 5 to about 5.5, about 5 to about 6, about 5 to about 6.5, about 5 to about 7, about 5.5 to about 6, about 5.5 to about 6.5, about 5.5 to about 7, about 6 to about 6.5, about 6 to about 7, or about 6.5 to about 7. In certain embodiments, the tank has a volume of at least about 1 gallon, 2 gallons, 5 gallons, 10 gallons, 25 gallons, 50 gallons, 75 gallons, 100 gallons, 250 gallons, 500 gallons, 750 gallons, 1,000 gallons, 2,000 gallons, 3,000 gallons, 4,000 gallons, 5,000 gallons, 5,500 gallons, 6,000 gallons, 7,000 gallons, 8,000 gallons, 9,000 gallons, 10,000 gallons, 15,000 gallons, 25,000 gallons, 50,000 gallons, 100,000 gallons, 150,000 gallons, 200,000 gallons, 1,000 cubic meters, 5,000 cubic meters, 10,000 cubic meters, 50,000 cubic meters, 100,000 cubic meters, 500,000 cubic meters, 1 million cubic meters, 1.5 million cubic meters, 2 million cubic meters, 2.5 million cubic meters or 3 million cubic meters. In certain embodiments, the tank has a volume of at least about 1 gallon to about 200,000 gallons. In certain embodiments, the tank has a volume of at least at least about 1 gallon. In certain embodiments, the tank has a volume of at least at most about 200,000 gallons. In certain embodiments, the tank has a volume of at least about 1 gallon to about 5 gallons, about 1 gallon to about 10 gallons, about 1 gallon to about 25 gallons, about 1 gallon to about 50 gallons, about 1 gallon to about 100 gallons, about 1 gallon to about 250 gallons, about 1 gallon to about 500 gallons, about 1 gallon to about 1,000 gallons, about 1 gallon to about 10,000 gallons, about 1 gallon to about 100,000 gallons, about 1 gallon to about 200,000 gallons, about 5 gallons to about 10 gallons, about 5 gallons to about 25 gallons, about 5 gallons to about 50 gallons, about 5 gallons to about 100 gallons, about 5 gallons to about 250 gallons, about 5 gallons to about 500 gallons, about 5 gallons to about 1,000 gallons, about 5 gallons to about 10,000 gallons, about 5 gallons to about 100,000 gallons, about 5 gallons to about 200,000 gallons, about 10 gallons to about 25 gallons, about 10 gallons to about 50 gallons, about 10 gallons to about 100 gallons, about 10 gallons to about 250 gallons, about 10 gallons to about 500 gallons, about 10 gallons to about 1,000 gallons, about 10 gallons to about 10,000 gallons, about 10 gallons to about 100,000 gallons, about 10 gallons to about 200,000 gallons, about 25 gallons to about 50 gallons, about 25 gallons to about 100 gallons, about 25 gallons to about 250 gallons, about 25 gallons to about 500 gallons, about 25 gallons to about 1,000 gallons, about 25 gallons to about 10,000 gallons, about 25 gallons to about 100,000 gallons, about 25 gallons to about 200,000 gallons, about 50 gallons to about 100 gallons, about 50 gallons to about 250 gallons, about 50 gallons to about 500 gallons, about 50 gallons to about 1,000 gallons, about 50 gallons to about 10,000 gallons, about 50 gallons to about 100,000 gallons, about 50 gallons to about 200,000 gallons, about 100 gallons to about 250 gallons, about 100 gallons to about 500 gallons, about 100 gallons to about 1,000 gallons, about 100 gallons to about 10,000 gallons, about 100 gallons to about 100,000 gallons, about 100 gallons to about 200,000 gallons, about 250 gallons to about 500 gallons, about 250 gallons to about 1,000 gallons, about 250 gallons to about 10,000 gallons, about 250 gallons to about 100,000 gallons, about 250 gallons to about 200,000 gallons, about 500 gallons to about 1,000 gallons, about 500 gallons to about 10,000 gallons, about 500 gallons to about 100,000 gallons, about 500 gallons to about 200,000 gallons, about 1,000 gallons to about 10,000 gallons, about 1,000 gallons to about 100,000 gallons, about 1,000 gallons to about 200,000 gallons, about 10,000 gallons to about 100,000 gallons, about 10,000 gallons to about 200,000 gallons, or about 100,000 gallons to about 200,000 gallons. In certain embodiments, the tank holds or contains a liquid, a solid (e.g., ice), or a combination thereof. In certain embodiments, the tank contains at least about 1 pound (lb), 25 lb, 50 lb, 75 lb, 100 lb, 150 lb, 200 lb, 100 kilograms (kg), 250 kg, 500 kg, 750 kg, 1 tonne (t), 5 t, 10 t, 25 t, 50 t, 100 t, 250 t, 500 t, 750 t, 1 kilo-tonne (kt), 2 kt, 5 kt, 10 kt, 20 kt, 50 kt, 100 kt, 200 kt, 500 kt, 1 megatonne (Mt), 1.5 Mt, 2 Mt, 2.5 Mt or 3 Mt of solid (e.g., ice) or of a solid-liquid mixture. In an example, the tank has a volume of at least about 100 gallons. In certain embodiments, a 100 gallon tank is less than about 22 inches wide (including a frame) and about 2 feet deep. In certain embodiments, the tank comprises a fluid. In certain embodiments, the fluid comprises a carbonaceous composition. In certain embodiments, the tank holds or contains at least about 100 gallons of a liquid, at least about 150 pounds of ice, or a liquid and/with at least about 150 pounds of ice. In certain embodiments, the liquid comprises water. In certain embodiments, the tank comprises at least one inlet and/or at least one outlet. In certain embodiments, the inlet(s) and outlet(s) comprise male iron pipe size (IPS) threads.

In certain embodiments, the first vessel 101 is in fluid communication with the second vessel 102. In certain embodiments, the first vessel comprises a valve (e.g., a butterfly valve) 113 that can be opened, closed or adjustably regulated to allow fluid to pass from the first vessel to the second vessel. For example, in certain embodiments, the mixer bowl comprises a butterfly valve mounted substantially flush with the mixer bowl, wherein the mixer (e.g., mixer bowl) is in fluid communication with the tank via the butterfly valve. In certain embodiments, the butterfly valve (or another type of valve with similar functionality) has a protective coating (e.g., a polytetrafluoroethylene (PTFE)-based coating, or a copolymer of ethylene and chlorotrifluoroethylene such as, for example, an ECTFE coating capable of withstanding temperatures up to about 800° F.).

In certain embodiments, the second vessel comprises one or more valves (e.g., inlet valve(s) and/or outlet valve(s)). For example, in certain embodiments, the second vessel comprises an outlet used for draining product (e.g., graphite oxide) into another tank for further refinement. In the example in FIG. 1, the second vessel comprises a drain system (or drain area) 117. The drain system comprises a drain valve 118.

In certain embodiments, the mixer 103 is mounted to the top of the tank. In certain embodiments, the system (e.g., the mixer) comprises a shaft that mechanically couples the tank agitator 110 to the mixer 103. In certain embodiments, the shaft comprises a drive shaft. In certain embodiments, the tank agitator is driven with the drive shaft off a front attachment of the mixer. In certain embodiments, the mixer is powered by a power source (e.g., 110 VAC). In certain embodiments, the power source coupled to the mixer my powers all components of the system. In certain embodiments, the system comprises a transmission between the mixer and the tank agitator. In certain embodiments, the transmission is configured to stop, start and/or regulate the tank agitator. In certain embodiments, the mixer and the tank agitator are coupled via one or more gears (e.g., a right angle gear) 114. In certain embodiments, the mixer and the tank agitator are coupled by a gearbox. Alternatively, in certain embodiments, the system comprises a separate motor configured to stop, start and/or regulate the tank agitator. In certain embodiments, the separate motor is powered from the same power source as the mixer. In certain embodiments, the separate motor is not powered from the same power source as the mixer (e.g., additional power sources are provided).

In certain embodiments, the tank agitator is driven at a power/frequency of greater than or equal to about 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245 or 250 revolutions per minute (rpm). In certain embodiments, the tank agitator is driven at a power/frequency from about 20 rpm to about 300 rpm. In certain embodiments, the tank agitator is driven at a power/frequency from at least about 20 rpm. In certain embodiments, the tank agitator is driven at a power/frequency from at most about 300 rpm. In certain embodiments, the tank agitator is driven at a power/frequency from about 20 rpm to about 60 rpm, about 20 rpm to about 100 rpm, about 20 rpm to about 150 rpm, about 20 rpm to about 200 rpm, about 20 rpm to about 250 rpm, about 20 rpm to about 300 rpm, about 60 rpm to about 100 rpm, about 60 rpm to about 150 rpm, about 60 rpm to about 200 rpm, about 60 rpm to about 250 rpm, about 60 rpm to about 300 rpm, about 100 rpm to about 150 rpm, about 100 rpm to about 200 rpm, about 100 rpm to about 250 rpm, about 100 rpm to about 300 rpm, about 150 rpm to about 200 rpm, about 150 rpm to about 250 rpm, about 150 rpm to about 300 rpm, about 200 rpm to about 250 rpm, about 200 rpm to about 300 rpm, or about 250 rpm to about 300 rpm. In an example, the tank agitator is driven at a power/frequency of at least about 60, 100 or 200 revolutions per minute.

In certain embodiments, mixing (e.g., in the mixer and/or in the tank) is achieved through non-mechanical means (e.g., with gas injection, rotary drums, magnetic stirring rods, or other means). In some embodiments, the system 100 comprises a filter (not shown). For example, in certain embodiments, the tank is coupled (e.g., via a diaphragm pump in fluid communication with the drain valve 118) to a filter configured to separate or purify one or more components of the tank mixture. In certain embodiments, the filter allows, for example, end product (e.g., an oxidized form of the carbonaceous composition), sediment(s) and/or other components (e.g., water runoff) to be separated. For example, in certain embodiments, leftovers are neutralized in a separate vessel, wherein the filter is configured to hold or contain sediments and/or water runoff. In certain embodiments, the filter removes one or more acids and/or salts to bring the tank mixture (e.g., a tank mixture comprising an oxidized form of a carbonaceous composition such as, for example, an oxidized form of graphite such as GO) to a neutral state and/or reduce the tank mixture. In certain embodiments, the filter includes one or more types of filters (e.g., for removal of acids, removal of salts, reduction, and/or other filtration or treatment purposes). For example, in certain embodiments, the filter (e.g., a filter for the first reaction described in greater detail elsewhere herein) takes out acid(s) and salt(s) to bring the tank mixture to a neutral state and/or reduce the tank mixture using a single filter, or 2 or more different types of filters (e.g., filtering/removal is performed by a first filter, and reduction is performed by a second filter, or both filters perform filtering/removal and reduction to same or different extents).

In certain embodiments, at least a portion of the system 100 is mobile. In certain embodiments, the mixer 103 is coupled to the tank 102, wherein the tank 102 is configured with casters 116. In certain embodiments, the mixer is configured on a slide such that it can move with respect to the tank. For example, in certain embodiments, the mixer slides and/or otherwise moves back for ease of cleaning of the tank. In certain embodiments, the mixer bowl is configured to be movable (e.g., slide) together or separately from the rest of the mixer.

In certain embodiments, the mixer bowl, the tank, or both contains a composition of interest (e.g., a carbonaceous composition to be converted to an oxidized form). In certain embodiments, the composition is contained in the mixer bowl, the tank, or both. In some embodiments, the composition is first contained in the mixer bowl and later transferred to the tank. In certain embodiments, the tank contains a reactant, a dilutant and/or a temperature-regulated bath (e.g., a mixture undergoing phase change at a fixed temperature). In some embodiments, the contents of the mixer bowl and the tank interacts (e.g., through heat transfer) but are not combined or mixed. In certain embodiments, the contents of the mixer bowl and the tank, when combined or mixed, react with each other. In certain embodiments, the contents of the mixer bowl and the tank, when combined or mixed, do not react with each other (e.g., the contents mix but do not react). In certain embodiments, the reaction includes, but is not limited to, redox reactions. In certain embodiments, other fluids are introduced in the mixer bowl and/or the tank (e.g., a gaseous reactant is added to the mixer bowl and/or to the tank). In certain embodiments, the system 100 is configured to enable gas-solid, gas-liquid, solid-liquid, gas-gas, liquid-liquid and/or solid-solid mixing and/or reaction. In certain embodiments, such mixing and/or reaction takes place in the mixer bowl, the tank, the mixer bowl and the tank, and/or by combining the contents of the mixer bowl and the contents of the tank.

In an example, the carbonaceous composition comprises graphite and the oxidized form of the carbonaceous composition comprises graphite oxide or graphene oxide. The contents of the tank are maintained at a temperature of about 0° C. and the contents of the mixer bowl are maintained at a temperature of less than about 15° C. In certain embodiments, the contents of the mixer bowl mix and/or react (e.g., as described elsewhere herein). In certain embodiments, the contents of the tank mix and/or react (e.g., as described elsewhere herein). In certain embodiments, the contents of the mixer bowl and tank mix and/or react with each other (e.g., as described elsewhere herein).

Figure 2:
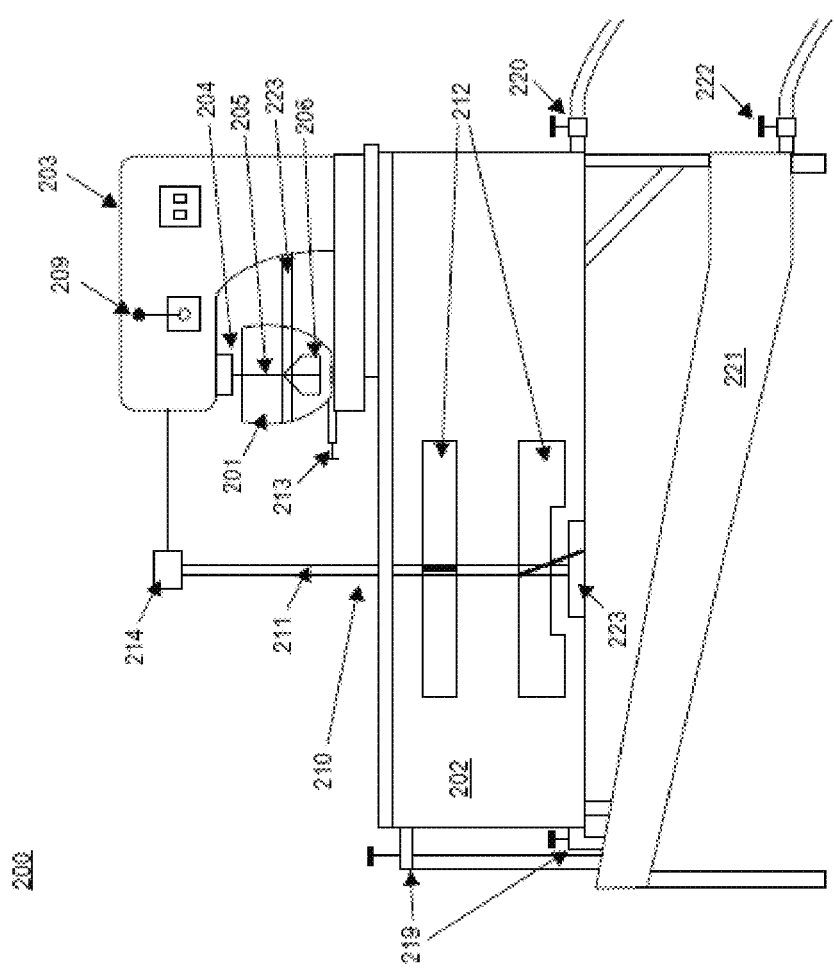
FIG. 2 is a schematic of another system comprising two vessels.

FIG. 2 is a schematic of another system 200 comprising two vessels. In certain embodiments, the system 200 is used to carry out a first reaction (e.g. oxidizing a carbonaceous composition). In certain embodiments, the system is used to carry out a second reaction (e.g. reducing a carbonaceous composition). In certain embodiments, the system includes a first vessel (e.g., a reaction chamber and/or a mixer bowl) 201 and a second vessel (e.g., a tank) 202. In certain embodiments, a mixer 203, operated using controls 209 and comprising a mixer agitator 204 with a shaft 205 and a paddle, blade or other stirrer 206, agitates or mixes the contents of the first vessel 201. In certain embodiments, the mixer is mounted to the tank (e.g., to the top of the tank). In certain embodiments, the mixer bowl 201 is in fluid communication with the tank 202 via a butterfly valve 213 (e.g., in a system with a 100 gallon tank, the mixer bowl includes a 3 inch butterfly valve mounted flush with the bowl). In certain embodiments, the mixer bowl is held in place by a holder, brace or bracket 223. In certain embodiments, the mixer comprises a shaft that is coupled to one or more tank agitators (e.g., to 100 gallon tank agitators). In certain embodiments, the mixer is mechanically coupled to a tank agitator 210 via a transmission (e.g., gear or gearbox) 214. In certain embodiments, the transmission is in line to stop, start and/or regulate the tank agitator. In certain embodiments, the tank agitator comprises a shaft 211 and one or more agitator blades 212. In some embodiments, the mixer comprises at least a portion of the shaft 211. In certain embodiments, the tank agitator is driven off the mixer. In certain embodiments, the tank agitator is driven off the mixer (e.g., off a front attachment of the mixer) with the drive shaft. In certain embodiments, the tank agitator (e.g., a tank agitator of a 100 gallon tank) comprises, for example, 2 rows of 4 blades with at least about ½ inch clearance from all sides and bottom of the tank 202. In certain embodiments, the top blades of the tank agitator are at least about 6 inches from the top of the tank and at least about ½ inch from the sides of the tank. In certain embodiments, a stabilizer bracket 223 installed in the bottom of the tank is configured to mechanically support or stabilize the tank agitator.

In certain embodiments, the tank 202 comprises one or more outlets (e.g., water outlets) 219. In certain embodiments, an outlet (e.g., drain) 219 (e.g., a single outlet in some embodiments) drains the tank (e.g., drain the tank mixture and/or water from the tank). In certain embodiments, the outlet 219 drains into a filter or filter system 221. In some embodiments, the tank comprises two outlets (e.g., a 100 gallon tank may comprise two 1.5 inch outlets): a first outlet at the top and a second outlet at the bottom in a center end of the tank. In certain embodiments, the first (top) outlet is within about 1 inch of the top of the tank, wherein the second (bottom) outlet is substantially flush with the bottom of the tank. In certain embodiments, the tank 202 comprises one or more inlets (e.g., water inlets) 220. In certain embodiments, an inlet 220 fills or adds contents to the tank. In some embodiments, the tank comprises two inlets (e.g., a 100 gallon tank comprising two 1 inch inlets): a first inlet at the top of the tank (not shown) and a second inlet at the bottom left edge of the back of the tank. In certain embodiments, such inlet(s) and/or outlet(s) comprise valve(s). For example, in certain embodiments, an outlet 219 comprises a drain valve. In some embodiments, one or more inlets and/or outlets are not used or included (e.g., see FIG. 1). For example, in certain embodiments, a top drain hole is not needed, and only a bottom drain hole is provided, and/or an inlet is not provided.

In certain embodiments, the tank comprises (or is coupled to) a filter or filter system 221. In certain embodiments, the filter system (e.g., a filter system of/coupled to a 100 gallon tank) is (or comprise a filter body having dimensions of) about 16 inches wide by about 8 inches tall on the short side and about 14 inches tall on the tall side. In certain embodiments, the filter system comprises a filter tank. In certain embodiments, the filter system comprises an outlet. In certain embodiments, the outlet of the filter comprises a valve 222. In certain embodiments, the outlet (e.g., in a filter system of/coupled to a 100 gallon tank, a 2 inch outlet) is at least partially or substantially flush (e.g., as flush as possible) with the bottom of the filter tank. In certain embodiments, the filter system is configured to hold or contain a given amount of sediments and/or runoff (e.g., at least about 13 gallons, 20 gallons, 30 gallons, 35 gallons, 50 gallons, 100 gallons, 150 gallons, 200 gallons, 250 gallons, 300 gallons, 350 gallons, 400 gallons, 450 gallons, 500 gallons, 550 gallons, 600 gallons, 700 gallons, 800 gallons, 900 gallons, 1,000 gallons, 2,000 gallons, 3,000 gallons, 4,000 gallons, 5,000 gallons, 10,000 gallons, 50,000 gallons, 100,000 gallons, 250,000 gallons, 500,000 gallons, 750,000 gallons, 1 million gallons or 1.5 million gallons of sediments and/or runoff depending on system size). For example, in certain embodiments, a filter system of/coupled to a 100 gallon tank is configured to hold or contain at least about 13 gallons of sediments, at least about 13 gallons of sediments and water runoff, at least about 20 gallons of sediments and water runoff, at least about 20 gallons total, at least about 25 gallons of sediments and water runoff, at least about 25 gallons total, at least about 30 gallons of sediments and water runoff, at least about 30 gallons total, at least about 35 gallons of sediments and water runoff, at least about 35 gallons total, between about 25 gallons and 30 gallons of sediments and water runoff (e.g., for single-layer GO), between about 25 gallons and 30 gallons total (e.g., for single-layer GO), from about 30 gallons to 35 gallons of sediments and water runoff (e.g., for multi-layer GO), from about 30 gallons to 35 gallons total (e.g., for multi-layer GO), from about 20 gallons to 35 gallons of sediments and water runoff, and/or from about 20 gallons to 35 gallons total. In some embodiments, the filter comprises baffles (not shown) distributed below the top of the sides of the filter tank (e.g., in a filter system of/coupled to a 100 gallon tank, by about 1 inch). In certain embodiments, the baffles are distributed in, across and/or along the filter tank or filter system (e.g., in a filter system of/coupled to a 100 gallon tank, baffles may be provided at least every 10 inches). In certain embodiments, the baffles comprises at least 1, 2, 3, 4, 6, 8, 10 or more (e.g., at least 3) channels to slide filters into. In certain embodiments, the baffles (e.g., 1 micron screen baffles) comprises vanes or panels configured to direct and/or obstruct flow of fluid (e.g., a solid-liquid mixture) in the filter. In certain embodiments, the baffles have a given orientation with respect to the filter (e.g., the baffles having a perpendicular or other orientation with respect to one or more sides or surfaces of the filter body). In certain embodiments, the filter system is configured to accept individual filter(s) having a rectangle frame with filter material media wrapped around the rectangle frame. In certain embodiments, an individual filter is inserted in a frame channel wide enough to fit the frame and the filter (e.g., frame channels are wide enough to fit frames and filters). In certain embodiments, the individual filter(s) and/or the filter system (e.g., dimensions of filter body) are configured to increase or maximize surface area. In some embodiments, the filter does not contain any baffles (e.g., see FIG. 1).

Figure 3A:
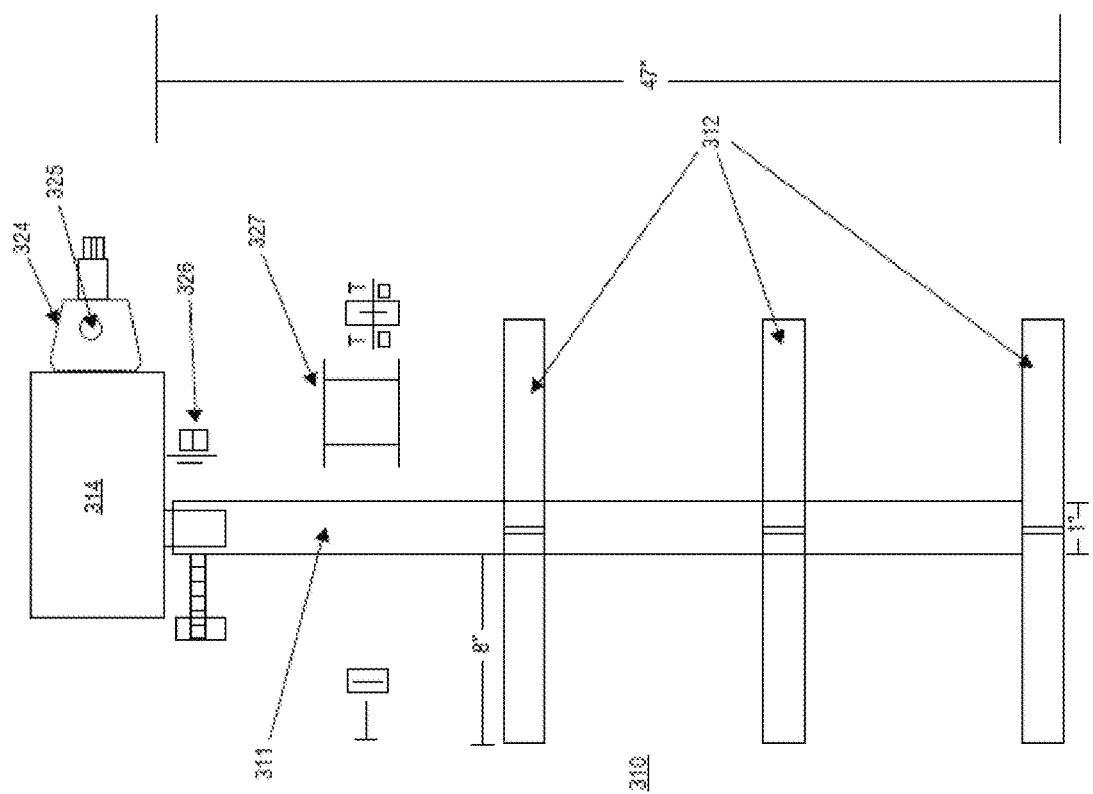
FIGS. 3A-3B show schematics of a tank agitator and related components.
Figure 3B:
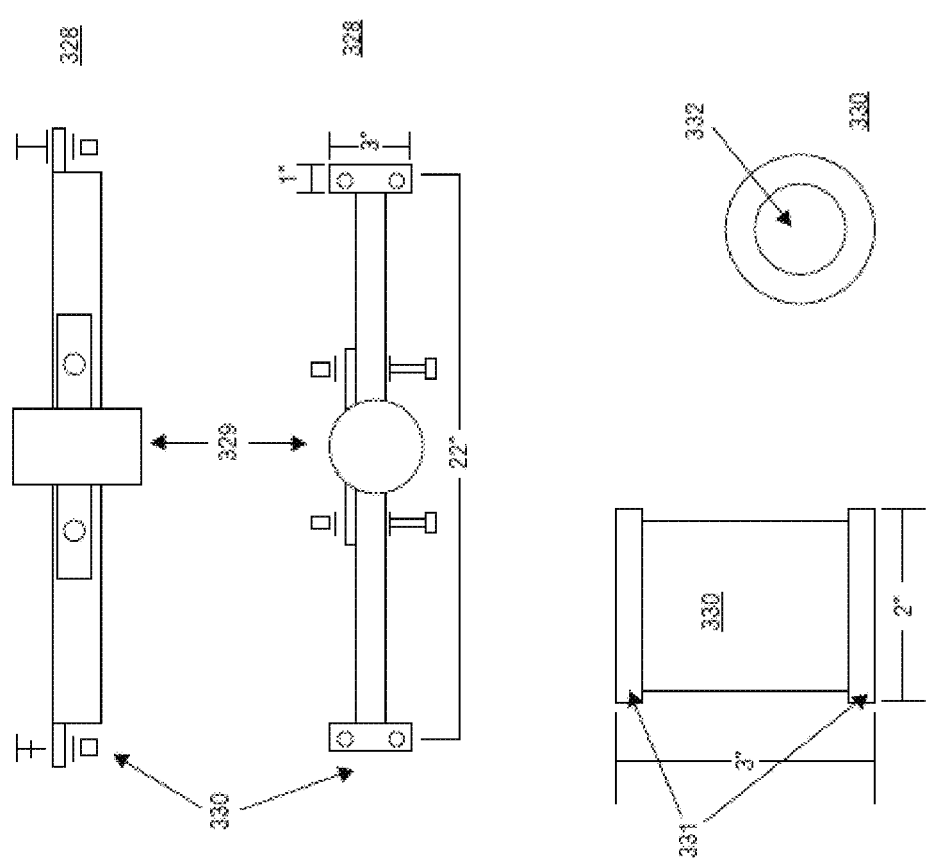

FIGS. 3A-3B show schematics of a tank agitator 310 (e.g., the tank agitator 112 in FIG. 1) and related components. In certain embodiments, the tank agitator 310 in FIG. 3A comprises a right angle gear box 314. In certain embodiments, the gear box is epoxy-coated (or comprises another type of protective coating). In certain embodiments, the gear box 314 further comprises (or is coupled to) an angle cone 324 with an alignment hole 325. A connecting bolt (e.g., a stainless steel (SS) connecting bolt) 326 couples the gear box to a shaft 311 of the tank agitator. In certain embodiments, the agitator 310 comprises agitator blades 312. In certain embodiments, the shaft 311, blades 312 and/or other portions of the tank agitator 310 have a protective coating). In an example, in certain embodiments, in a tank that comprises a 100 gallon ice bath (comprising, for example, at least about 150 pounds of ice), the tank agitator extends about 47 inches from the gear box 314 and have a shaft diameter of about 1 inch. In certain embodiments, the agitator blades 312 are coupled (e.g., welded) to the shaft. In certain embodiments, one or more bushings (e.g., nylon bushings) 327 hold the shaft to at least a portion of the tank (e.g., to the lower tank). In certain embodiments, the shaft from the mixer is held stable inside the tank with the aid of the one or more bushings (e.g., the bushings support the shaft to a side of the tank).

In certain embodiments, the tank agitator 310 is coupled to the tank (e.g., the tank 102 in FIG. 1) using one or more fastening members 328. In certain embodiments, a fastening member 328 comprises a bushing bracket 329 and one or more tank mounts 330. A side view of the fastening member 328 (*top*) and a top view of the fastening member 328 (middle) are shown in FIG. 3B. In certain embodiments, a bushing 330 is coupled to the bushing bracket 329. In certain embodiments, the bushing comprises top and bottom flanges 331. A side view of the bushing 330 (bottom left) and a top view of the bushing 330 (bottom right) are shown in FIG. 3B. In an example, in certain embodiments, in a tank that comprises a 100 gallon ice bath (comprising, for example, at least about 150 pounds of ice), the fastening member has a length of about 22 inches and the tank mounts are 3 inches wide. In certain embodiments, the bushing 330 is about 3 inches tall and has a diameter of about 2 inches. In certain embodiments, the bushing comprises a shaft hole 332 with a diameter of about 2.5 inches. In certain embodiments, the bushing bracket 329 and/or other components of the fastening member 328 comprise a protective coating (e.g. ECTFE, a copolymer of ethylene and cholotrifluoroethylene).

FIG. 4 shows schematics of a mixer bowl 401 (e.g., the mixer bowl 101 in FIG. 1) and related components. The mixer bowl comprises a reaction chamber. In certain embodiments, one or more components (e.g., all parts) in FIG. 4 comprise a protective coating). In certain embodiments, the coating protects the components from sulfuric acid fumes present in and around the mixing bowl. An exploded side view of the mixer bowl 401 and a valve (e.g., a butterfly valve) 413 coupled to the mixer bowl are shown on the right in FIG. 4. In certain embodiments, the mixer bowl is coupled to a flange 436. In certain embodiments, the flange 436 is coupled to the butterfly valve 413. In certain embodiments, the mixer bowl is mounted to a mixer or another fixture using mixer bowl mounting brackets 333. In certain embodiments, the mixer bowl is temperature-regulated. For example, in certain embodiments, the mixer bowl is cooled or otherwise regulated by one or more cooling tubes or coils, such as, for example, a first cooling tube 434 and a second cooling tube 435. In certain embodiments, the cooling tubes or coils are copper cooling tubes or coils, or are made of another material suitable for transferring heat. In certain embodiments, a heat transfer or cooling fluid is circulated in the cooling tubes. In some embodiments, different parts of the mixer bowl are cooled by different cooling tubes. For example, in certain embodiments, the top and bottom of the mixer bowl are cooled independently. In certain embodiments, the cooling tubes are provided, for example, on the outside of the mixer bowl. In certain embodiments, other forms of temperature regulation, including, for example, convection heating or cooling are implemented in addition to or instead of cooling tubes.

With continued reference to FIG. 4, top and bottom views of the flange 436 are shown on the top left and bottom left, respectively. In certain embodiments, chamber mounts 438 are used to fasten the mixer bowl to the flange (and/or to a fixture such as the mixer). In certain embodiments, bolt holes 437 are used to fasten the flange to the mixer and/or to another fixture.

In an example, the mixer bowl 401 comprises a 20 quart (5 gallon) reaction chamber. The mixer bowl is in fluid communication with a 2½ inch butterfly valve 413 having a diameter (or width) of about 6 inches. At least about 95 feet of ⅜ inch copper cooling tube is wound around the mixing bowl (e.g., split into two or more sections 434, 435). The flange 436 is affixed by bolts through ½ inch bolt holes 437. In certain embodiments, such a mixer bowl and reaction chamber is used in a system comprising a tank that comprises a 100 gallon ice bath (comprising, for example, at least about 150 pounds of ice).

Figure 5A:
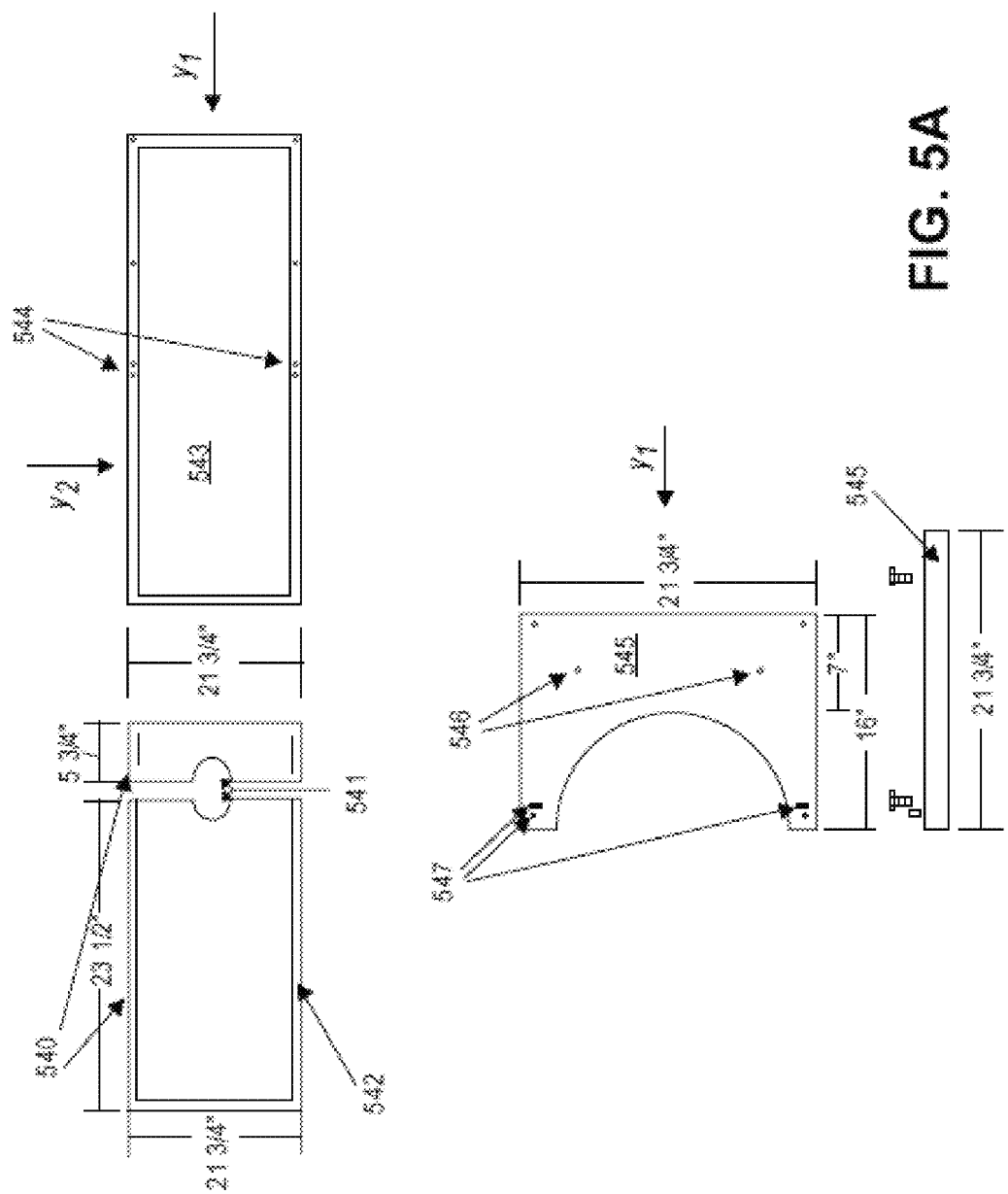
FIGS. 5A-5B shows schematics a tank and related components.
Figure 5B:
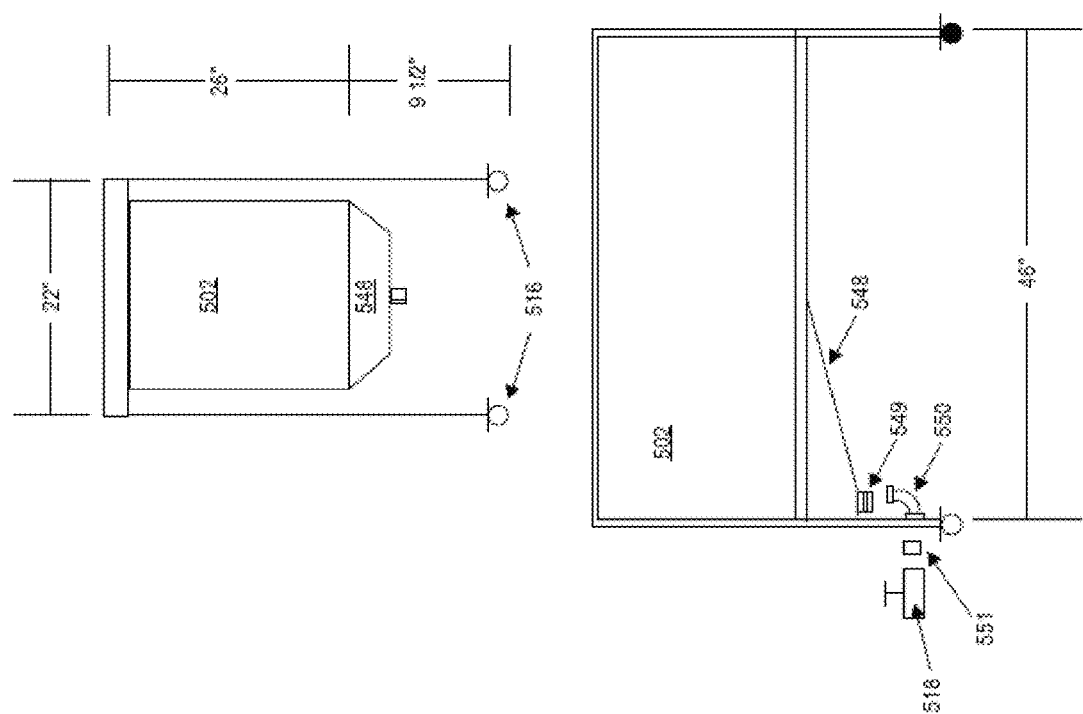

FIGS. 5A-5B show schematics of a tank 502 (e.g., the tank 102 in FIG. 1) and related components. In certain embodiments, the tank comprises a top (e.g., a plexiglass top) 540 (top left in FIG. 5A). In certain embodiments, the plexiglass top comprises one or more parts. In certain embodiments, ice auger shaft holes 541 are provided (e.g., between two separate parts). In certain embodiments, magnetic strips 542 are coupled to the plexiglass top (e.g., for easy closure of the tank). In certain embodiments, the tank further comprises a bottom 543 (top right in FIG. 5A). In certain embodiments, the bottom is formed, for example, of metal or another suitable material. In certain embodiments, the bottom comprises ice auger bracket mounts 544. In certain embodiments, the tank further comprises a mixer mounting plate 545 (top and side views shown at bottom in FIG. 5A). In certain embodiments, the mixer mounting plate is placed at the top of the tank. In certain embodiments, the mixer mounting plate comprises mixer bolt holes 546 to which a mixer is affixed. In certain embodiments, mixer cleats 547 are used to keep the mixer from moving along with the bolts.

FIG. 5B shows side views of the tank 502 along direction $y_1$ (top) and $y_2$ (bottom). In certain embodiments, the tank is positioned on casters 516. In certain embodiments, the tank comprises a drain area 548. In certain embodiments, the tank drains via a fitting 549 connected to a 90° fip 550. In certain embodiments, the 90° fip 550 connects to a drain valve (e.g., an acid-proof ball valve) 518 via a nipple 551.

In an example, a 100 gallon tank 502 (e.g., a 100 gallon ice tank containing a 100 gallon ice bath comprising, for example, at least about 150 pounds of ice) comprises a plexiglass top 540. In certain embodiments, the plexiglass top 540 comprises a first portion with a width of about 21¾ inches and a length of about 23½ inches, and a second portion with a width of about 21¾ inches and a length of about 5¾ inches (top left in FIG. 5A). In certain embodiments, the tank further comprises a bottom 543 having a width of about 21¾ inches and a length of about 46 inches (top right in FIG. 5A). In certain embodiments, the mixer mounting plate 545 has a width of about 21¾ inches and a length of about 16 inches with a cutout extending about 9 inches into the plate (bottom in FIG. 5A). In certain embodiments, the tank is about 22 inches wide (top in FIG. 5B) and about 46 inches long (bottom in FIG. 5B). In certain embodiments, the tank is about 26 inches deep. In certain embodiments, the bottom of the tank is about 9½ inches above ground. In certain embodiments, the tank is drained via a 1½ inch mip fitting 549 connected to a 1½ inch 90° fip 550, a 1½x close nipple 551 and a drain valve 518.

Figure 44:
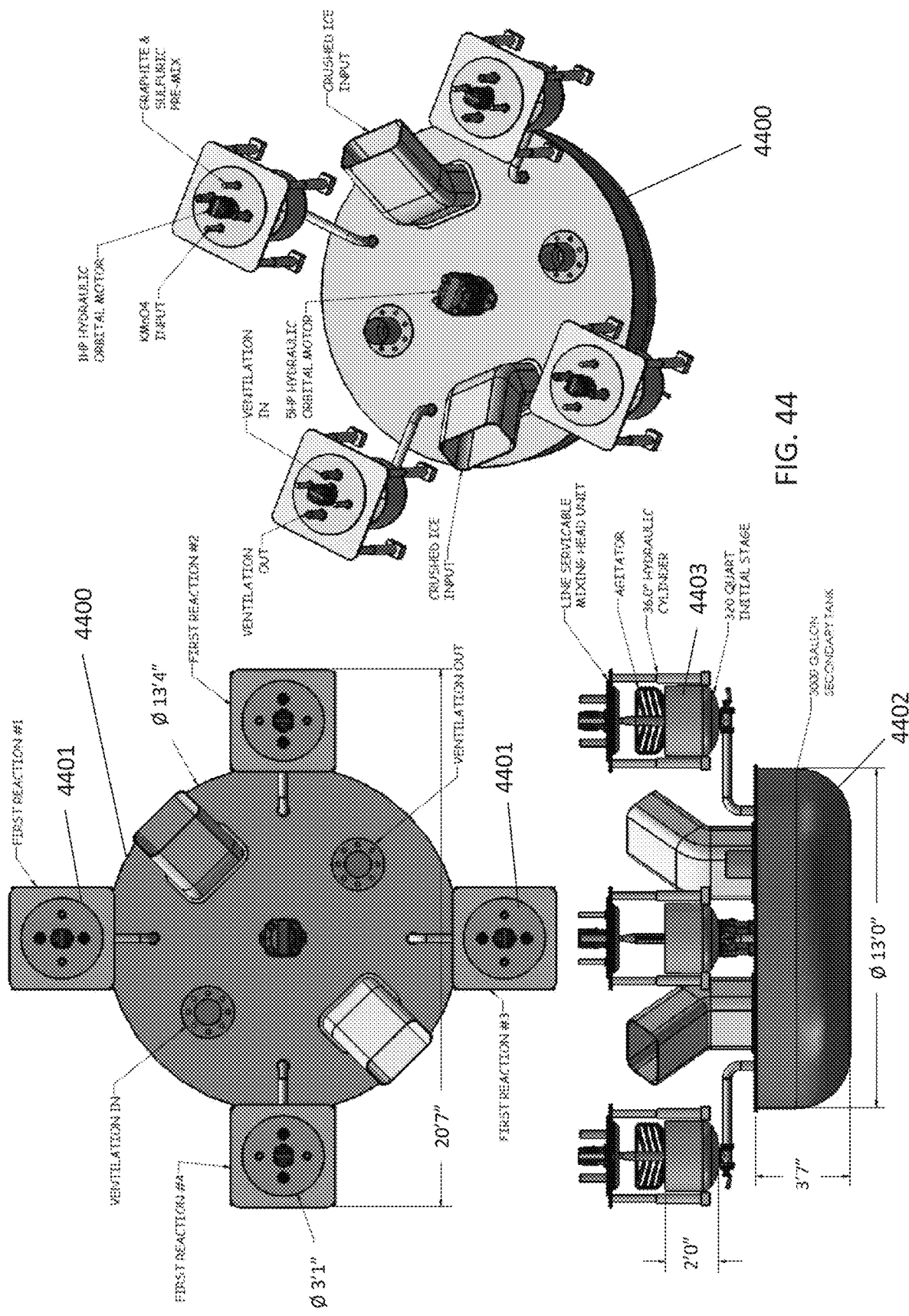
FIG. 44 shows an exemplary embodiment of a scalable reactor and an exemplary embodiment of procedures using the scalable reactor.

In certain embodiments, a system for carrying out a reaction (e.g., a first reaction system or apparatus) comprises one or more subsystems or portions. In some embodiments, a first reaction system (e.g., a system for oxidizing a carbonaceous composition such as, for example, a graphite feedstock) comprises a scalable reactor as shown in FIG. 44. In certain embodiments, each such subsystem or portion comprises one or more components such as mixers, agitators, vessels, cooling systems, or other components (e.g., as described in FIGS. 1-3). In certain embodiments, a first reaction system comprises any component(s) of such subsystems or portions. In certain embodiments, such component(s) are organized in the aforementioned subsystems or portions. In certain embodiments, such component(s) are not organized in the aforementioned subsystems or portions. Further, in certain embodiments, any components of a given subsystem or portion are provided as part of a different subsystem or portion (e.g., the components of the aforementioned subsystems or portions are reorganized in different subsystems or portions), substituted or omitted. Examples of subsystems/portions, components, and quantities of components are provided in TABLE 1. In certain embodiments, such component(s) are organized in the aforementioned subsystems or portions. Aspects of the disclosure described in relation to a first reaction system equally apply to a second reaction system or other system(s) herein at least in some configurations. In view of the present disclosure, a person of skill in the art will appreciate that certain materials useful for construction and fabrication for the devices and systems described herein can be obtained from commercial sources.

TABLE 1

| EXAMPLE QTY | PART NUMBER | DESCRIPTION |
|---|---|---|
| FIRST REACTION SYSTEM OR APPARATUS (e.g., see FIG. 44) | | |
| 8 | GFRC-0001 | Lift carriage skid plate (see, e.g., FIG. 48) |
| 1 | GFRC-0002 | Bowl lift lock spacer (see, e.g., FIG. 49) |
| 1 | GFRC-0004 | Lift motor mount plate (see, e.g., FIG. 50) |
| 1 | GFRC-0005 | Lift elbow spacer plate (see, e.g., FIG. 51) |
| 1 | GFRC-0006 | Mixer sensor bracket (see, e.g., FIG. 52) |
| 1 | GFRC-0008 | Tank motor mount (see, e.g., FIG. 53) |
| 1 | GFRC-0009 | Mixer torque bracket (see, e.g., FIG. 54) |

TABLE 1-continued

| EXAMPLE QTY | PART NUMBER | DESCRIPTION |
|---|---|---|
| 1 | GFRC-0010 | Mixer spray bar (see, e.g., FIG. 55) |
| 1 | GFRC-0011 | Tank mixer shaft (see, e.g., FIG. 56) |
| 1 | GFRC-0012 | Tank mixer blade (see, e.g., FIG. 57) |
| 1 | GFRC-0013 | Bowl mount plate (see, e.g., FIG. 58) |
| 1 | GFRC-0014 | Carriage switch mount plate (see, e.g., FIG. 59) |
| 1 | GFRC-0016 | First reaction mixer blade (see, e.g., FIG. 60) |
| 1 | GFRC-0017 | First reaction scraper blade mount (see, e.g., FIG. 61) |
| 1 | GFRC-0018 | First reaction scraper blade shaft (see, e.g., FIG. 62) |
| 1 | GFRC-0019 | First reaction scraper blade holder (see, e.g., FIG. 63) |
| 1 | GFRC-0020 | First reaction paddle shaft (see, e.g., FIG. 64) |
| 1 | GFRC-0021 | First reaction paddle cap (see, e.g., FIG. 65) |
| 1 | GFRC-0022 | First reaction mixer drive shaft (see, e.g., FIG. 66) |
| 1 | GFRC-0024 | First reaction paddle stop (see, e.g., FIG. 67) |
| 1 | GFRC-0101 | First reaction frame weldment (see, e.g., FIGS. 68A-68C) |
| 2 | GFRC-0102 | Lift carriage weldment (see, e.g., FIGS. 69A-69B) |
| 2 | GFRC-0103 | Lift carriage brace (see, e.g., FIG. 70) |
| 1 | GFRC-0104 | Lift carriage (see, e.g., FIGS. 71A-71B) |
| 1 | GFRC-0105 | First reaction top plate (see, e.g., FIG. 72) |
| 1 | GFRC-0108 | Mixer motor mount (see, e.g., FIG. 73) |
| 1 | GFRC-0109 | 1000 gallon tank mixer paddle (see, e.g., FIG. 74) |
| 1 | GFRC-0110 | 150 gallon tank mixer paddle (see, e.g., FIG. 75) |
| 1 | GFRC-0111 | First reaction frame shelf (see, e.g., FIGS. 76A-76B) |
| 1 | GFRC-0112 | First reaction paddle assembly (see, e.g., FIGS. 77A-77B) |
| GFRC-0101 First reaction frame weldment | | |
| 1 | N412161606SSC | Enclosure, stainless steel 6811 |
| 1 | 32.00 inches | 304 stainless steel tube 4.00 × 4.00 × 0.13 6810 |
| 4 |  | 304 stainless steel sheet 6809 |
| 2 |  | 304 stainless steel sheet 6808 |
| 2 | 28.00 inches | 304 stainless steel tube 2.00 × 2.00 × 0.13 6807 |
| 3 | 32.00 inches | 304 stainless steel tube 4.00 × 2.00 × 0.13 6806 |
| 2 | 39.00 inches | 304 stainless steel tube 2.00 × 2.00 × 0.13 6805 |
| 2 | 36.00 inches | 304 stainless steel tube 2.00 × 2.00 × 0.13 6804 |
| 2 | 38.00 inches | 304 stainless steel tube 2.00 × 2.00 × 0.13 6803 |
| 2 | 31.00 inches | 304 stainless steel tube 2.00 × 4.00 × 0.13 6802 |
| 4 | 108.00 inches | 304 stainless steel tube 2.00 × 4.00 × 0.13 6801 |
| GFRC-0104 Lift carriage | | |
| 8 | 93190A624 | Hex head cap screw 7114 |
| 24 | 90107A029 | Flat washer 7113 |
| 24 | 90107A033 | Flat washer ½" 7112 |
| 8 | 90107A127 | Flat washer 7111 |
| 24 | 90715A125 | Locknut 7110 |
| 12 | 90715A126 | Locknut 7109 |
| 24 | 91771A543 | Phillips machine screw 7108 |
| 12 | 92198A729 | Hex head cap screw 7107 |
| 8 | 60885K980 | Neoprene roller 7106 |
| 16 | 92320A275 | Unthreaded spacer 7605 |
| 8 | GFRC-0001 | Lift carriage skid plate 7104 |
| 4 | GFRC-0002-2 | Spacer 7103 |
| 2 | GFRC-0102 | Lift carriage weldment 7102 |
| 2 | GFRC-0103 | Lift carriage brace 7101 |
| GFRC-0105 First reaction top plate | | |
| 2 | 93190A540 | ¼"-20 thread, ¾" long, fully threaded 7207 |
| 2 | 51205K321 | ½ female × ½ male pipe size, adapter 7206 |
| 1 | 51205K311 | ¼ female × ¼ male pipe size, adapter 7205 |
| 2 | 93190A718 | ½"-13 thread, 1¾" long, fully threaded 7204 |
| 2 | 4464K363 | SS coupling, 4" NPT 7203 |
| 4 | 4464K358 | SS coupling, 1½" NPT 7202 |
| GFRC-0108 Mixer motor mount | | |
| 8 | 10.0 × 10.0 right triangle gusset | Mild steel plate 0.25 7308 |
| 1 | CNC Cut | GFRC-0008-1 7307 |
| 1 | CNC Cut | GFRC-0008-1 7306 |
| 4 | Angle (3.00 inch length) | Mild steel angle 3.00 × 3.00 × 0.25 inches 7305 |
| 4 | 45 degree cut one end (18.00 inch length) | Mild steel tube 2.00 × 2.00 × 0.13 inches 7304 |
| 4 | 45 degree cut one end (20.00 inch length) | Mild steel tube 2.00 × 2.00 × 0.13 inches 7303 |
| 4 | 45 degree cut one end (24.00 inch length) | Mild steel tube 2.00 × 2.00 × 0.13 inches 7302 |
| 4 | 45 degree cut one end (43.13 inch length) | Mild steel tube 2.00 × 2.00 × 0.13 inches 7301 |
| GFRC-0109 tank mixer paddle | | |
| 2 | GFRC-0012-2 | 1000 gallon tank mixer blade 7403 |
| 1 | GFRC-0012-1 | 1000 gallon tank mixer stiffener 7402 |
| 1 | GFRC-0011 | 1000 gallon tank mixer shaft 7401 |
| GFRC-0111 First reaction frame shelf | | |
| 2 | 3.81 × 1.81 inches | 304 SS plate, ¼" thick 7608 |
| 1 | 71.38 × 38.5 inches | 304 SS plate, ⅛" thick 7607 |
| 2 | 108.31 inches | 304 stainless steel tube 2.00 × 4.00 × 0.13 7606 |
| 6 | 16.00 inches | 304 stainless steel tube 2.00 × 2.00 × 0.13 7605 |
| 1 | 68.00 inches | 304 stainless steel tube 2.00 × 2.00 × 0.13 7604 |
| 2 | 26.00 inches | 304 stainless steel tube 2.00 × 2.00 × 0.13 7603 |
| 2 | 39.00 inches | 304 stainless steel tube 2.00 × 2.00 × 0.13 7602 |
| 2 | 72.00 inches | 304 stainless steel tube 2.00 × 2.00 × 0.13 7601 |

In certain embodiments, a reaction system (e.g., a first reaction system such as, for example, the scalable reactor shown in FIG. 44) comprises one or more elements of a lift carriage (FIGS. 71A-71B), a first reaction frame weldment (FIGS. 68A-68C), a tank mixer paddle (FIG. 74), a first reaction frame shelf (FIGS. 76A-76B), and a first reaction paddle assembly (FIGS. 77A-77B).

Figure 48:
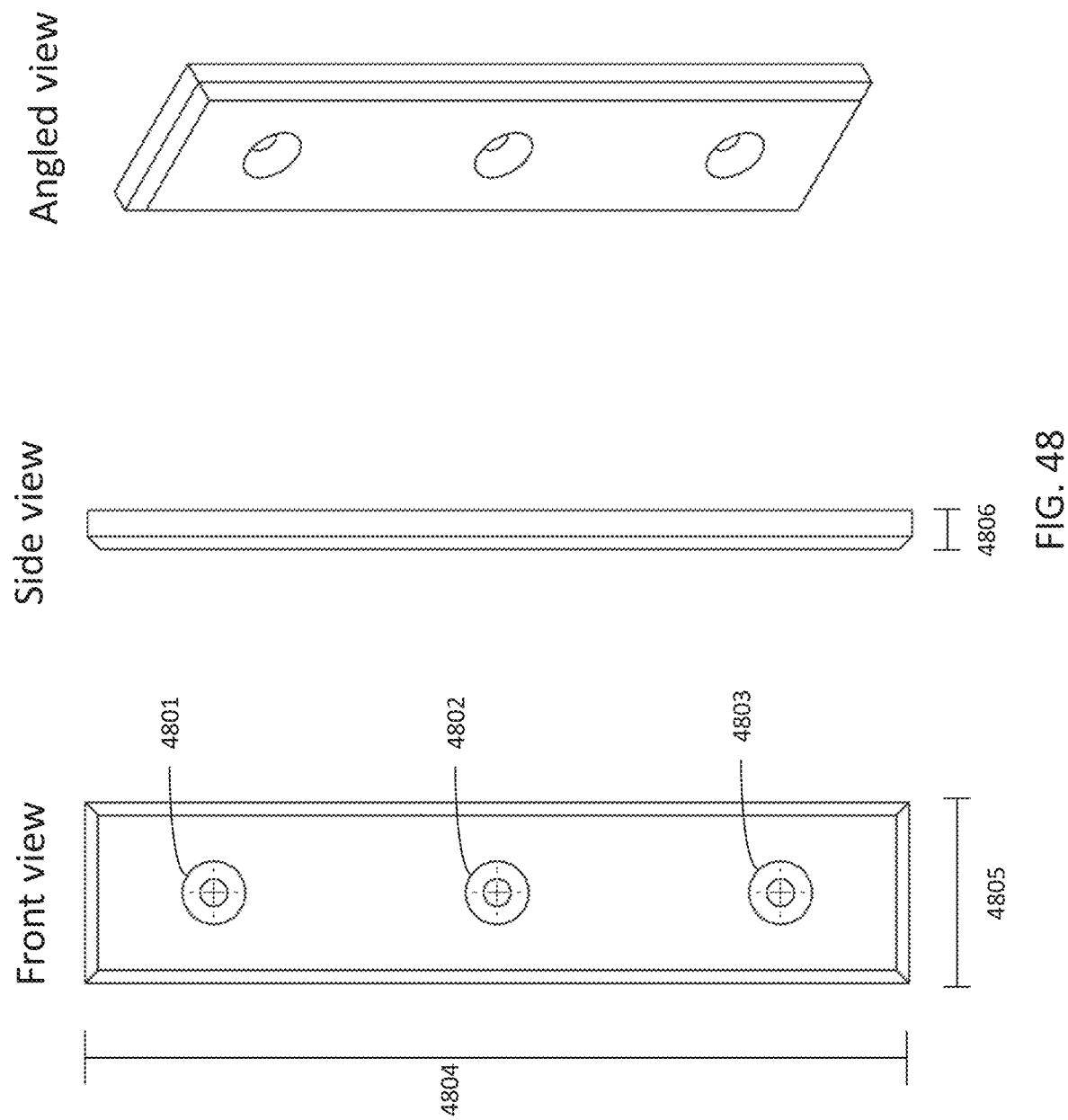
FIG. 48 shows an exemplary embodiment of a lift carriage skid plate (e.g. GFRC-0001)

In certain embodiments, a lift carriage comprises one or more of elements of a lift carriage brace 7101, a lift carriage weldment 7102, a spacer 7103, a lift carriage skid plate 7104, an unthreaded spacer 7105, a neoprene roller 7106, hex head cap screws 7107 and 7114, a Phillips machine screw 7108, locknuts 7109 and 7110, and flat washers 7111, 7112, and 7113. A lift carriage skid plate 7104 is shown in FIG. 48. In certain embodiments, the lift carriage skid plate has a height 4804, a width 4805, and a depth 4806. In one exemplary embodiment, the lift carriage skid plate has a height 4804 of about 8.00 inches, a width 4805 of about 1.75 inches, and a depth 4806 is about 0.375 inches. In certain embodiments, lift carriage skid plate comprises one or more apertures. For example, in certain embodiments, the lift carriage skid plate comprises a first aperture 4801, a second aperture 4802, and a third aperture 4803. In certain embodiments, an aperture has a circular shape. Examples of sizes, dimensions and/or installation of such elements of the lift carriage skid plate are shown in FIG. 48. In certain embodiments, other suitable elements and/or materials of different sizes and/or dimensions are used.

Figure 68C:
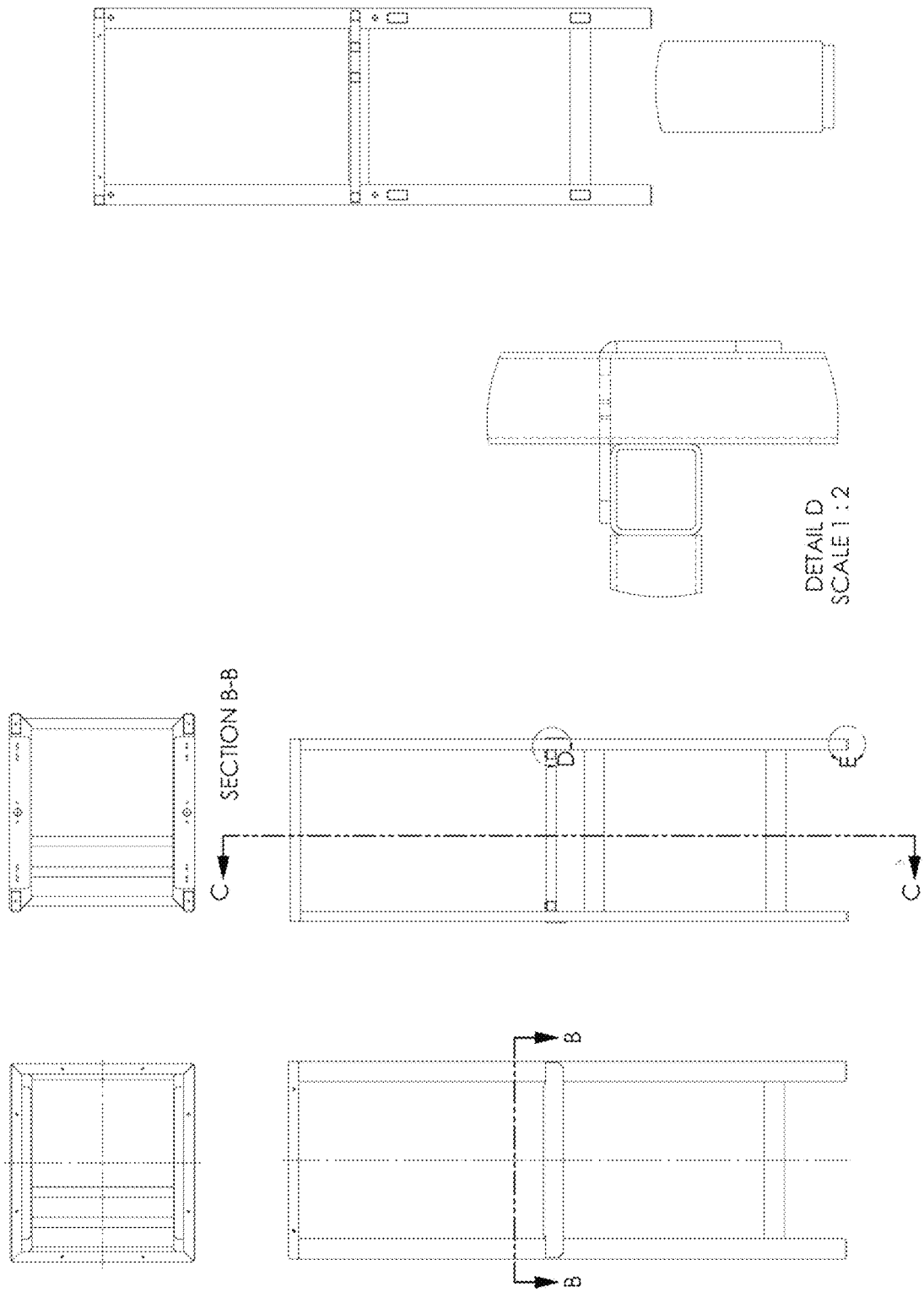

In certain embodiments, a first reaction frame weldment comprises a stainless steel enclosure 6811, stainless steel sheets 6808 and 6809, and stainless steel tubes 6801, 6802, 6803, 6804, 6805, 6806, 6807, and 6810. Examples of sizes, dimensions and/or installation of such elements of the first reaction frame weldment are shown in FIGS. 68A-68C. In certain embodiments, other suitable elements and/or materials of different sizes and/or dimensions are used.

In certain embodiments, a tank mixer paddle comprises one or more elements of a mixer shaft 7401, a tank mixer stiffener 7402, and a tank mixer blade 7403. In certain embodiments, tank mixer paddle is part of a mixer or mixer system. In certain embodiments, tank mixer paddle comprises elements made of stainless steel. Examples of sizes, dimensions and/or installation of such elements of the tank mixer paddle are shown in FIG. 74. In certain embodiments, other suitable elements and/or materials of different sizes and/or dimensions are used.

Figure 76A:
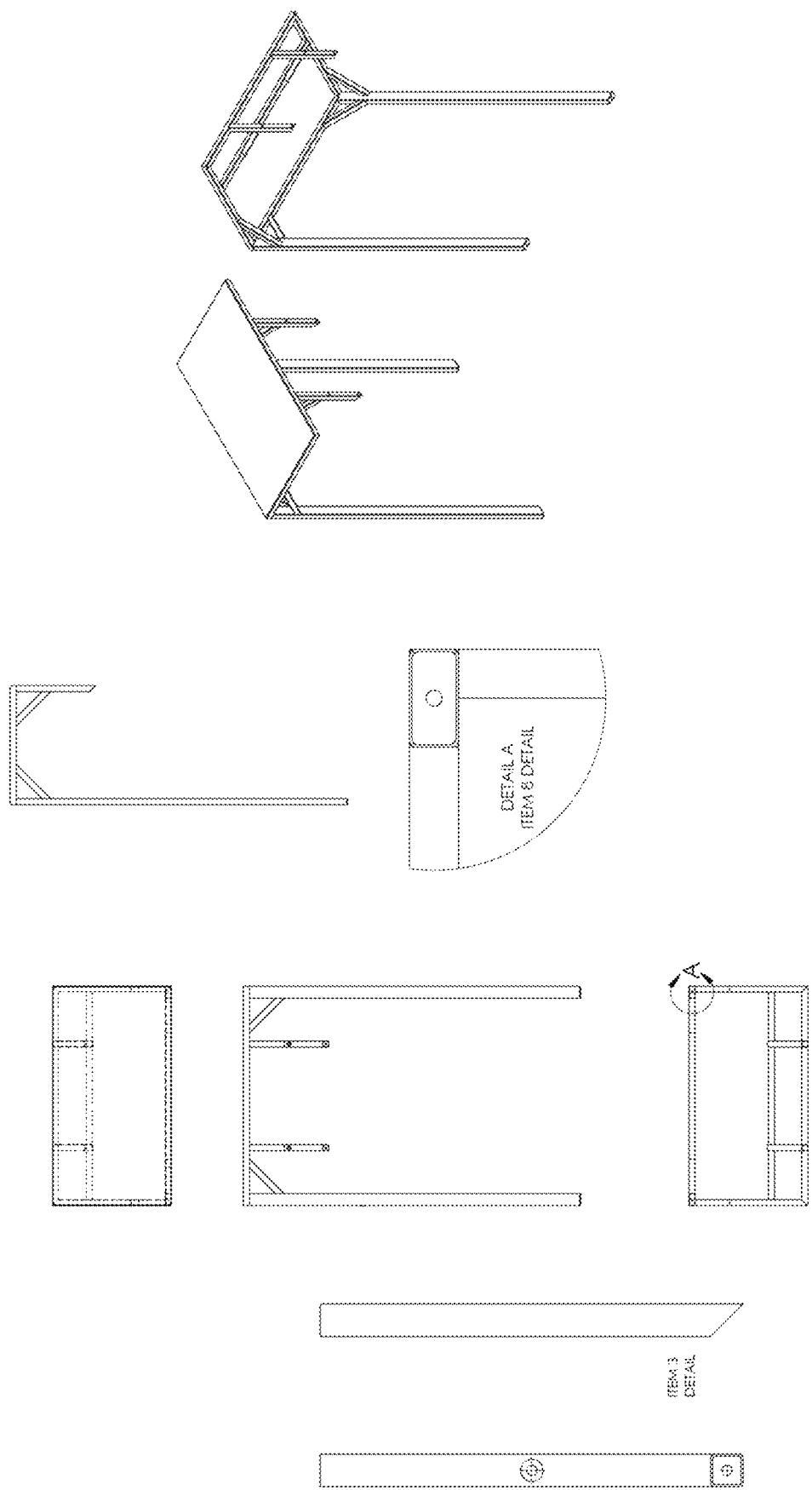

In certain embodiments, a first reaction frame shelf comprises stainless steel plates 7607 and 7608, and stainless steel tubes 7601, 7602, 7603, 7604, 7605, and 7606. In certain embodiments, first reaction frame shelf comprises elements made of stainless steel. Examples of sizes, dimensions and/or installation of such elements of the first reaction frame shelf are shown in FIGS. 76A-76B and TABLE 1. In certain embodiments, other suitable elements and/or materials of different sizes and/or dimensions are used.

Figure 66:
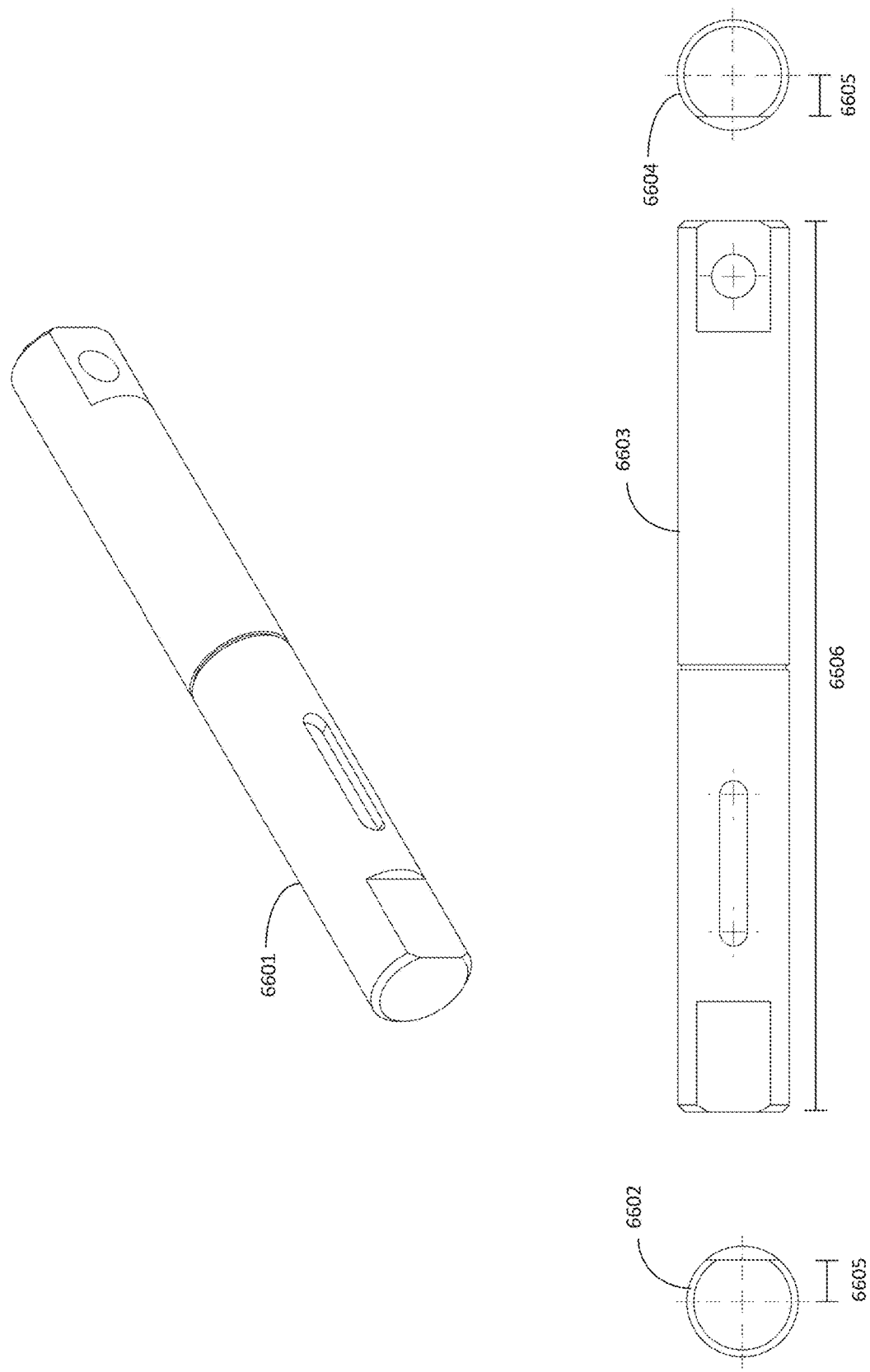
FIG. 66 shows an exemplary embodiment of a first reaction mixer drive shaft (e.g. GFRC-0022)
Figure 67:
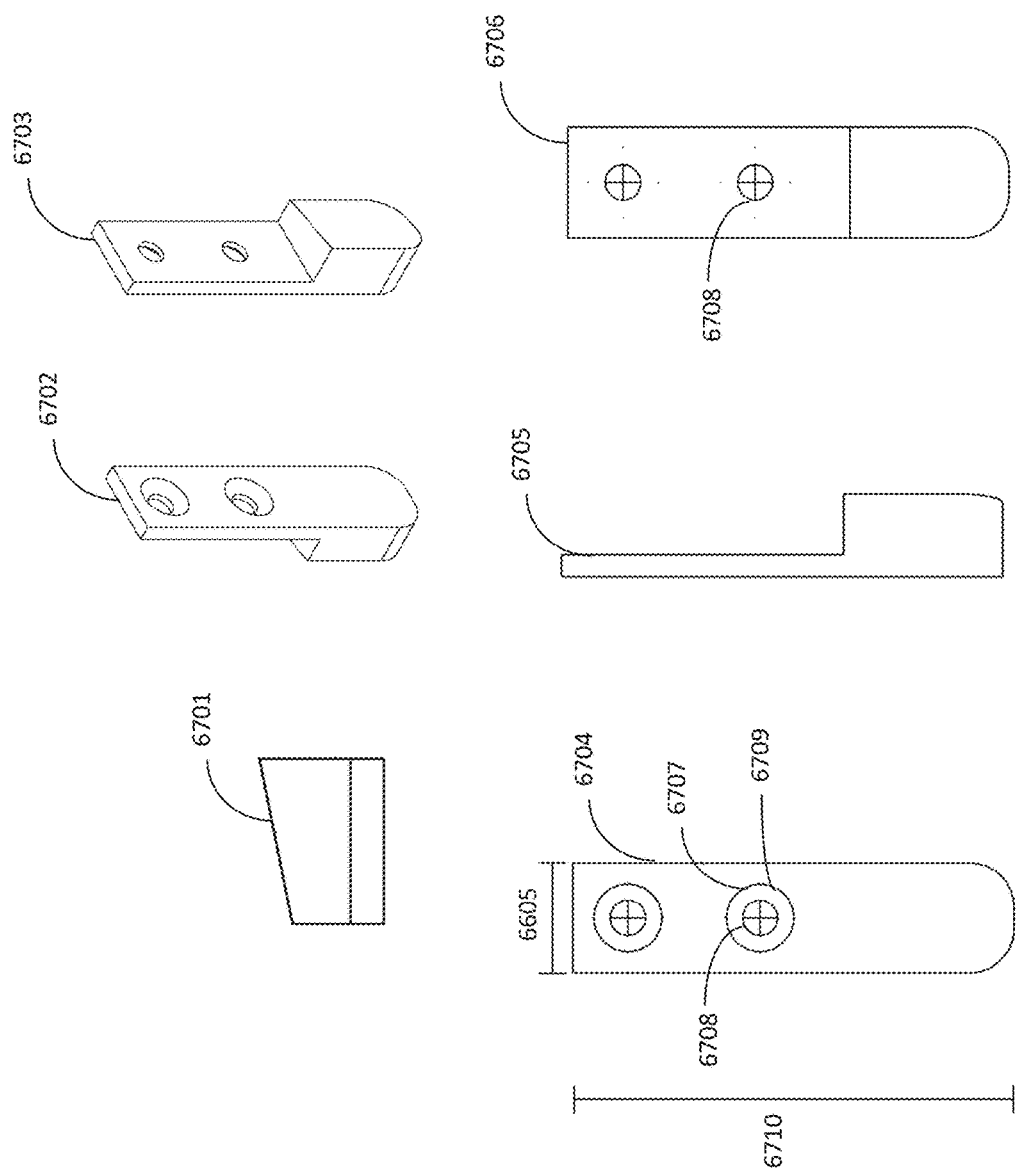
FIG. 67 shows an exemplary embodiment of a first reaction paddle stop (e.g. GFRC-0024)

In certain embodiments, a first reaction paddle assembly comprises one or more elements of a first reaction mixer blade 7711 (see, e.g., FIG. 60), a first reaction scraper blade mount 7710 (see, e.g., FIG. 61), a first reaction scraper blade shaft 7709 (see, e.g., FIG. 62), a first reaction scraper blade holder 7706 (see, e.g., FIG. 63), a first reaction paddle shaft 7713 (see, e.g., FIG. 64), a first reaction paddle cap 7703 (FIG. 65), a first reaction mixer drive shaft (see, e.g., FIG. 66), a first reaction scraper blade 7702, a reaction bowl (e.g., a reaction vessel) 7712, and a first reaction paddle stop 7707 (see, e.g., FIG. 67). In certain embodiments, additional components include a cap screw 7704, a torsion spring 7701, and HDPE bushing (7705, 7708). FIG. 77A shows an exploded view of the paddle assembly illustrating the relationship of its various components. In certain embodiments, the paddle assembly is configured to allow the reaction bowl to be raised and/or lowered. In certain embodiments, paddle assembly is configured to raise and/or lower the reaction bowl. In certain embodiments, paddle assembly is configured to allow the reaction mixer blade to be raised and/or lowered. In certain embodiments, paddle assembly is configured to raise and/or lower the reaction mixer blade. In certain embodiments, reaction mixer blade is lowered into the reaction bowl or raised out of the reaction bowl. In certain embodiments, reaction bowl is lowered away from the reaction mixer blade or raised towards the reaction mixer blade. In certain embodiments, reaction mixer blade 7711 is mechanically coupled to a scraper blade 7702. In certain embodiments, scraper blade is configured to engage with the side of the reaction bowl 7712. In certain embodiments, scraper blade is configured to engage with the reaction bowl as the bowl is raised towards the reaction mixer blade (e.g., as shown in FIG. 77B). In certain embodiments, scraper blade holder 7706 is configured to hold the scraper blade at an angle relative to the surface of the bowl with which the scraper blade is engaged. In certain embodiments, the scraper blade is held at an angle relative to the surface of the bowl such that operation of the agitator allows the scraper blade to scrape off materials stuck to the bowl while also pushing the materials down the bowl. In certain embodiments, scraper blade comprises a taper that engages with the bowl as the mixer bowl rises (see FIG. 77B). In certain embodiments, when the first reaction paddle assembly is in operation, the reaction mixer blade rotates about the drive shaft. In certain embodiments, rotating reaction mixer blade mixes a carbonaceous composition (e.g., for a first or second reaction). In certain embodiments, as the carbonaceous composition is mixed, debris and other ingredients stick to the sides of the reaction bowl. Accordingly, in certain embodiments, the paddle assembly comprises a scraper blade configured to scrape off materials that end up too high on the side of the reaction bowl. In certain embodiments, first reaction paddle assembly comprises elements made of stainless steel. Examples of sizes, dimensions and/or installation of such elements of the first reaction paddle assembly are shown in FIGS. 77A-77B. In certain embodiments, other suitable elements and/or materials of different sizes and/or dimensions are used.

In certain embodiments, a first reaction system comprises one or more elements of a lift carriage skid plate (FIG. 48), a bowl lift lock spacer (FIG. 49), a lift motor mount plate (FIG. 50), a lift elbow spacer plate (FIG. 51), a mixer sensor bracket (FIG. 52), a tank motor mount (FIG. 53), a mixer torque bracket (FIG. 54), a mixer spray bar (FIG. 55), a tank mixer shaft (FIG. 56), a tank mixer blade (FIG. 57), a bowl mount plate (FIG. 58), a carriage switch mount plate (FIG. 59), a first reaction mixer (FIG. 60), a first reaction scraper blade mount (FIG. 61), a first reaction scraper blade shaft (FIGS. 62-63), a first reaction paddle shaft (FIG. 64), a first reaction paddle cap (FIG. 65), a first reaction mixer drive shaft (FIG. 66), and a first reaction paddle stop (FIG. 67). In certain embodiments, a reaction system comprises one or more elements of a lift carriage weldment (FIGS. 69A-69B), a lift carriage brace (FIG. 70), a lift carriage (FIGS. 71A-71B), a first reaction top plate (FIG. 72), a mixer motor mount (FIG. 73), a tank mixer paddle (FIGS. 74-75), a first reaction frame shelf (FIGS. 76A-76B), and a first reaction paddle assembly (FIGS. 77A-77B).

Figure 49:
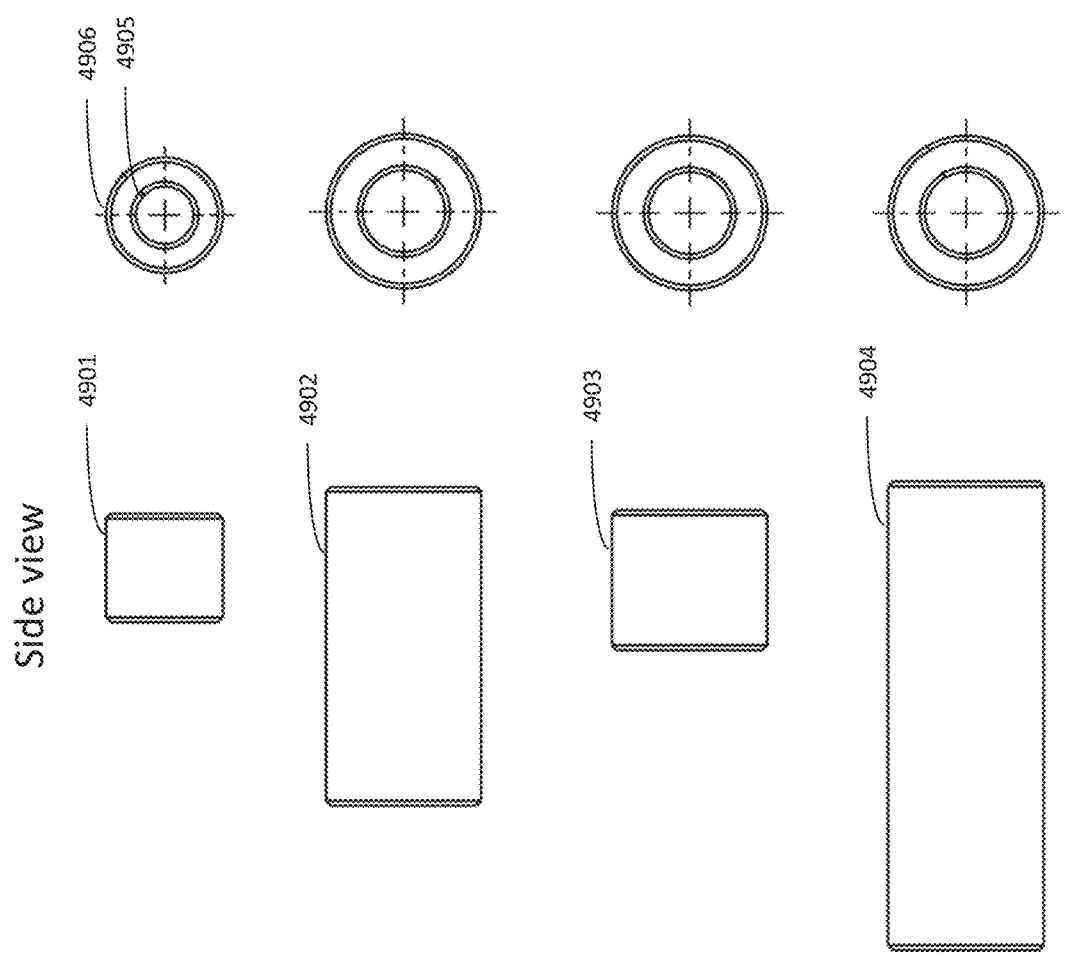
FIG. 49 shows an exemplary embodiment of a bowl lift lock spacer (e.g. GFRC-0002)

In certain embodiments, a variety of bowl lift lock spacers are shown in FIG. 49. In certain embodiments, a first spacer 4901 has a length of about 0.700 inches. In certain embodiments, a second spacer 4902 has a length of about 3.031 inches. In certain embodiments, a third spacer 4903 has a length of about 2.063 inches. In certain embodiments, a fourth spacer 4904 has a length of about 0.900 inches. In certain embodiments, each spacer has an inner diameter 4905 and an outer diameter 4906. In certain embodiments, a first spacer 4901 has an inner diameter of about 0.38 inches and an outer diameter of about 0.75 inches. In certain embodiments, a second spacer 4902 has an inner diameter of about 0.53 inches and an outer diameter of about 1.00 inches. In certain embodiments, a third spacer 4903 has an inner diameter of about 0.53 inches and an outer diameter of about 1.00 inches. In certain embodiments, a fourth spacer

4904 has an inner diameter of about 0.53 inches and an outer diameter of about 1.00 inches.

A lift motor mount plate is shown in FIG. 50. In certain embodiments, a lift motor mount plate has a height 5003, a width 5004, and a depth 5005. In certain embodiments, a lift motor mount plate has a height 5003 of about 8.50 inches, a width 5004 of about 8.00 inches, and a depth 5005 of about 0.25 inches. In certain embodiments, a lift motor mount plate comprises one or more inner apertures 5001 and one or more outer apertures 5002. In certain embodiments, a lift motor mount plate comprises four inner apertures 5001 and four outer apertures 5002. In certain embodiments, an inner aperture 5001 is positioned with its center located about 2.38 inches from the top or bottom side and about 6.13 inches from the opposite side of a lift motor mount plate having a height 5003 of about 8.50 inches. In certain embodiments, an inner aperture 5001 is positioned with its center located about 2.84 inches from the left or right side and about 5.16 inches from the opposite side of a lift motor mount plate having a width 5004 of about 8.00 inches. In certain embodiments, an outer aperture 5002 is positioned with its center located about 0.75 inches from the top or bottom side and about 7.75 inches from the opposite side of a lift motor mount plate having a height 5003 of about 8.50 inches. In certain embodiments, an outer aperture 5002 is positioned with its center located about 0.50 inches from the left or right side and about 7.50 inches from the opposite side of a lift motor mount plate having a width 5004 of about 8.00 inches. In certain embodiments, an aperture (5001 and/or 5002) has a length (longer side) of about 0.75 inches and a width (shorter side) of about 0.28 inches.

Figure 51:
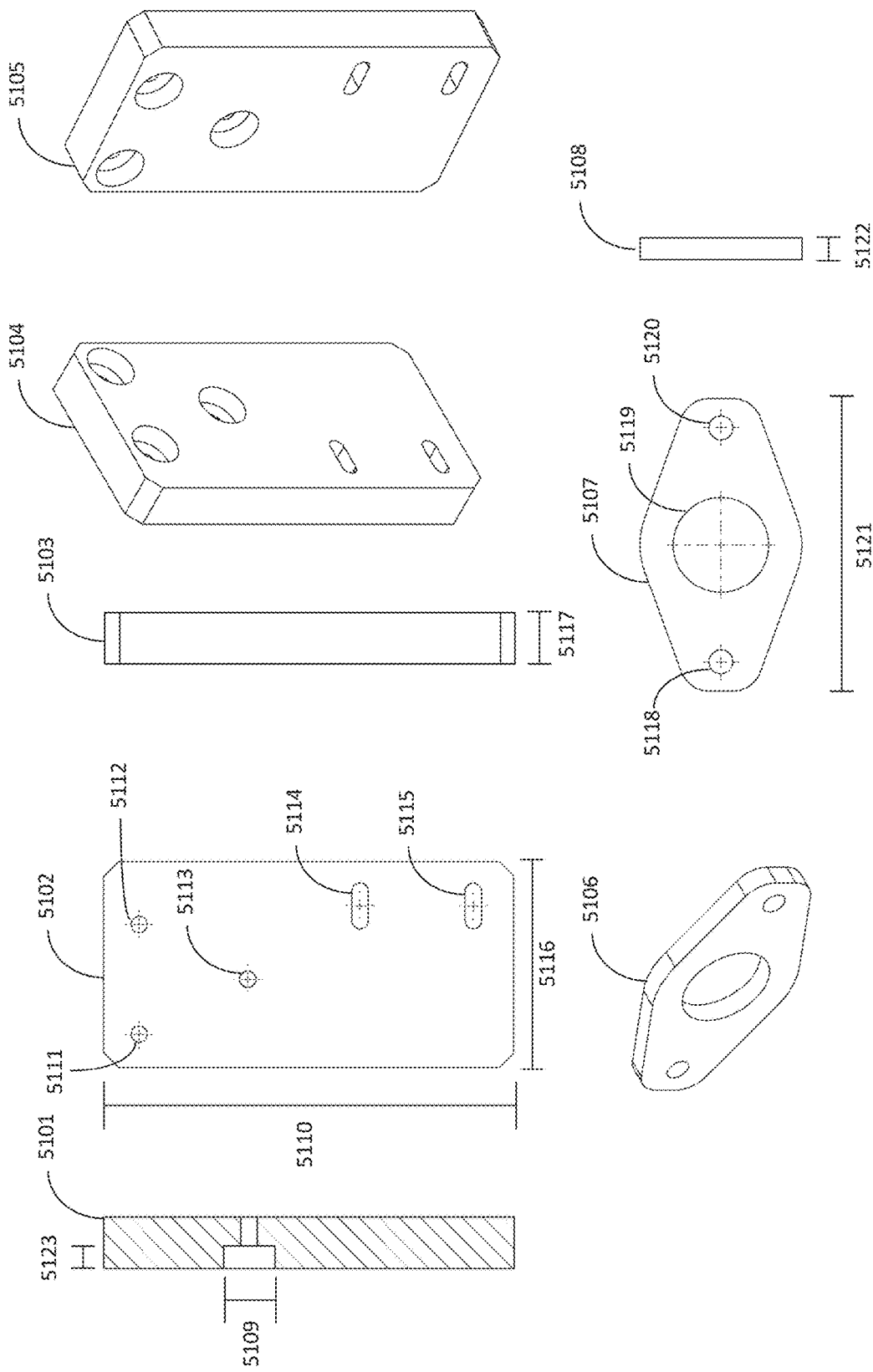
FIG. 51 shows an exemplary embodiment of a lift elbow spacer plate (e.g. GFRC-0005)

A variety of lift elbow spacer plates are shown in FIG. 51. In certain embodiments, a reaction system comprises a first lift elbow spacer plate 5104, a second lift elbow spacer plate 5105, and a third lift elbow spacer plate 5106. In certain embodiments, a first lift elbow spacer plate 5104 and a second lift elbow spacer plate 5105 are mirror images of one another. A side view 5101 of the first and/or second lift elbow spacer plates 5104 and 5105 illustrates a radius 5109 and a depth 5123 of one or more circular apertures (5111, 5112, 5113). In certain embodiments, a front view of a first or second lift elbow spacer plate 5102 shows a height 5110, a width 5116, and a depth 5117. In certain embodiments, a first or second lift elbow spacer plate 5102 has a height 5110 of 7.00 about inches, a width 5116 of about 3.50 inches, and a depth 5117 (in side view 5103) of about 0.88 inches. In certain embodiments, a first or second lift elbow spacer plate 5102 comprises a first circular aperture 5111, a second circular aperture 5112, and a third circular aperture 5113. In certain embodiments, a first or second lift elbow spacer plate comprises one or more rounded rectangular apertures. In certain embodiments, a first or second lift elbow spacer plate comprises a first rounded rectangular aperture 5114 and a second rounded rectangular aperture 5115. A third lift elbow spacer plate is shown in FIG. 51 as a perspective view 5106, a front view 5107, and a side view 5108. The third lift elbow spacer plate has a width 5121 and a depth 5122. In certain embodiments, the third lift elbow spacer plate has a width 5121 of about 5.00 inches and a depth 5122 of about 0.38 inches. In certain embodiments, third lift elbow spacer plate comprises a left aperture 5118, a middle aperture 5119, and a right aperture 5120.

Figure 52:
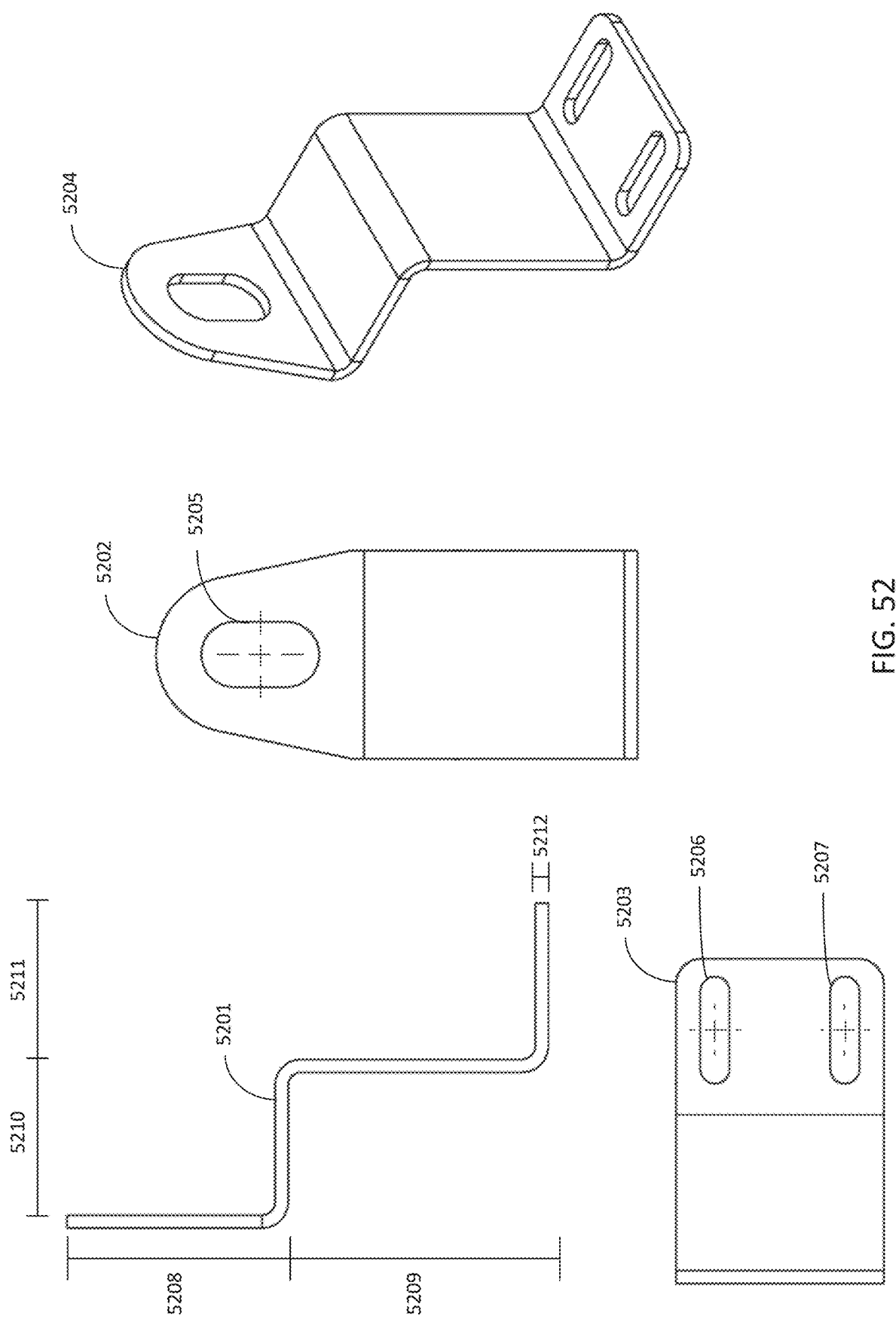
FIG. 52 shows an exemplary embodiment of a mixer sensor bracket (e.g. GFRC-0006)

A mixer sensor bracket is shown in FIG. 52 with a side view 5201, a front view 5202, a top down view 5203, and a perspective view 5204. In certain embodiments, the mixer sensor bracket has a first height 5208 and a second height 5209. In certain embodiments, the first height 5208 is 2.13 about inches. In certain embodiments, the second height 5209 is about 2.50 inches. In certain embodiments, the mixer sensor bracket has a first depth 5210 and a second depth 5211. In certain embodiments, the first depth 5210 is about 1.50 inches. In certain embodiments, the second depth 5211 is about 1.50 inches. In certain embodiments, the mixer sensor bracket has a thickness 5212. In certain embodiments, the thickness 5212 is about 0.125 inches. In certain embodiments, the mixer sensor bracket comprises one or more apertures. In certain embodiments, the mixer sensor bracket comprises a first aperture 5205, a second aperture 5206, and a third aperture 5207. In certain embodiments, the first aperture has a width (shorter side) of about 0.63 inches and a height (longer side) of about 1.13 inches. In certain embodiments, the first aperture is positioned with its center located about 3.63 inches above the bottom side of the front view mixer sensor bracket 5202.

Figure 53:
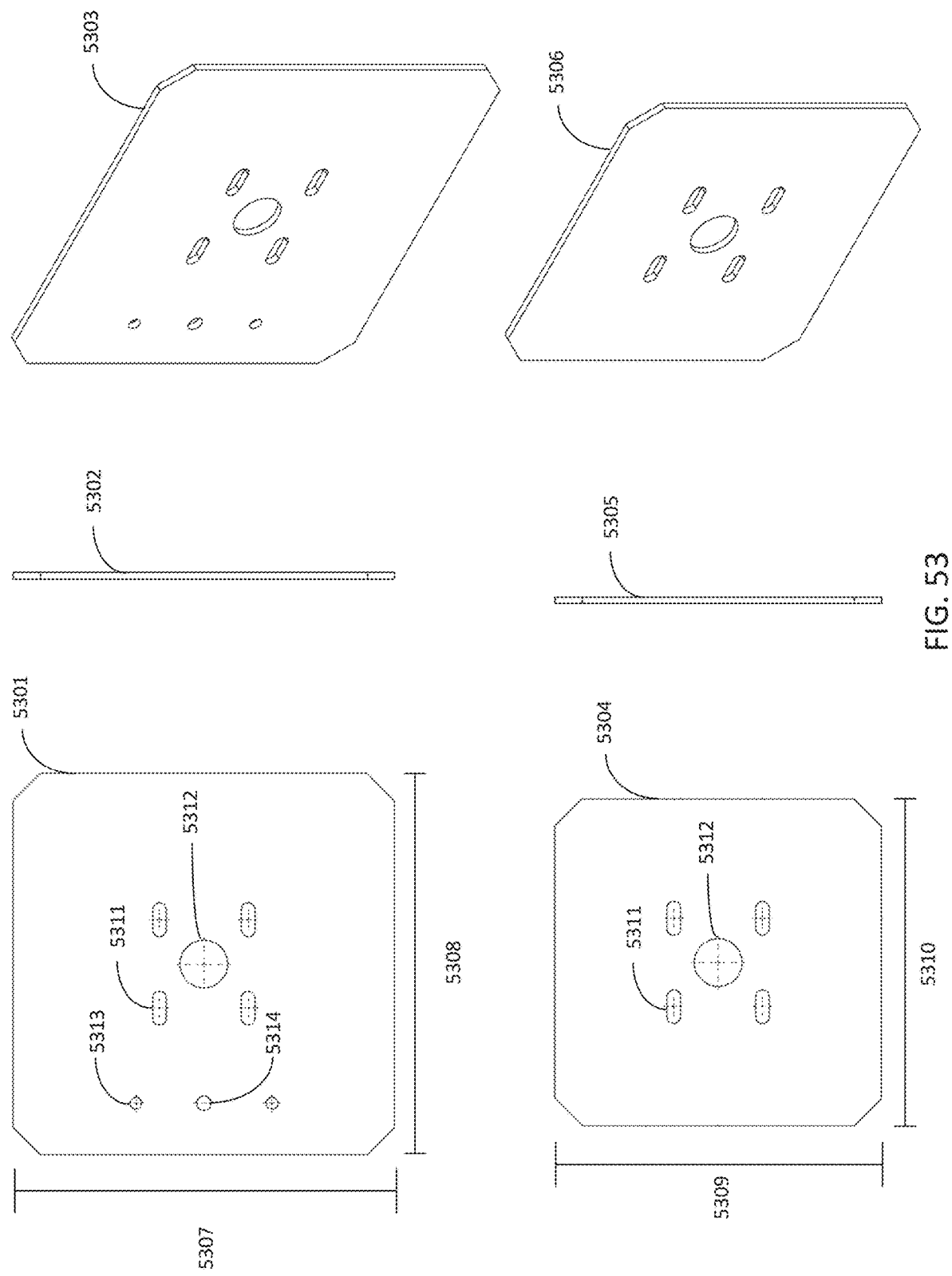
FIG. 53 shows an exemplary embodiment of a tank motor mount (e.g. GFRC-0008)

A tank motor mount is shown in FIG. 53. In certain embodiments, the tank motor mount comprises a motor mount plate and a bearing plate. FIG. 53 shows a front view 5301, a side view 5302, and a perspective view 5303 of a motor mount plate. FIG. 53 shows a front view 5304, a side view 5305, and a perspective view 5306 of a bearing plate. In certain embodiments, the motor mount plate has a height 5307 of 14.00 about inches, a width 5308 of about 14.00 inches, and a depth 5302 of about 0.25 inches. In certain embodiments, the motor mount plate comprises a central aperture 5312. In certain embodiments, the central aperture 5312 is positioned with its center located about 7.00 inches from every side of a motor mount plate having a height 5308 and width 5308 of about 14.00 inches. In certain embodiments, the motor mount plate comprises one or more rounded rectangular apertures 5311. In certain embodiments, the motor mount plate comprises four rounded rectangular apertures 5311. In certain embodiments, the motor mount comprises one or more circular apertures 5313 and 5314. FIG. 53 shows a front view 5304, a side view 5305, and a perspective view 5306 of a bearing plate. In certain embodiments, the bearing plate has a width 5310 of about 12.00 inches, a height 5309 of about 12.00 inches, and a depth 5302 of about 0.25 inches. In certain embodiments, the bearing plate comprises one or more rounded rectangular apertures 5311. In certain embodiments, the bearing plate comprises four rounded rectangular apertures 5311. In certain embodiments, the rounded rectangular aperture 5311 has a width (longer side) of about 0.75 inches and a height (shorter side) of about 0.50 inches.

Figure 54:
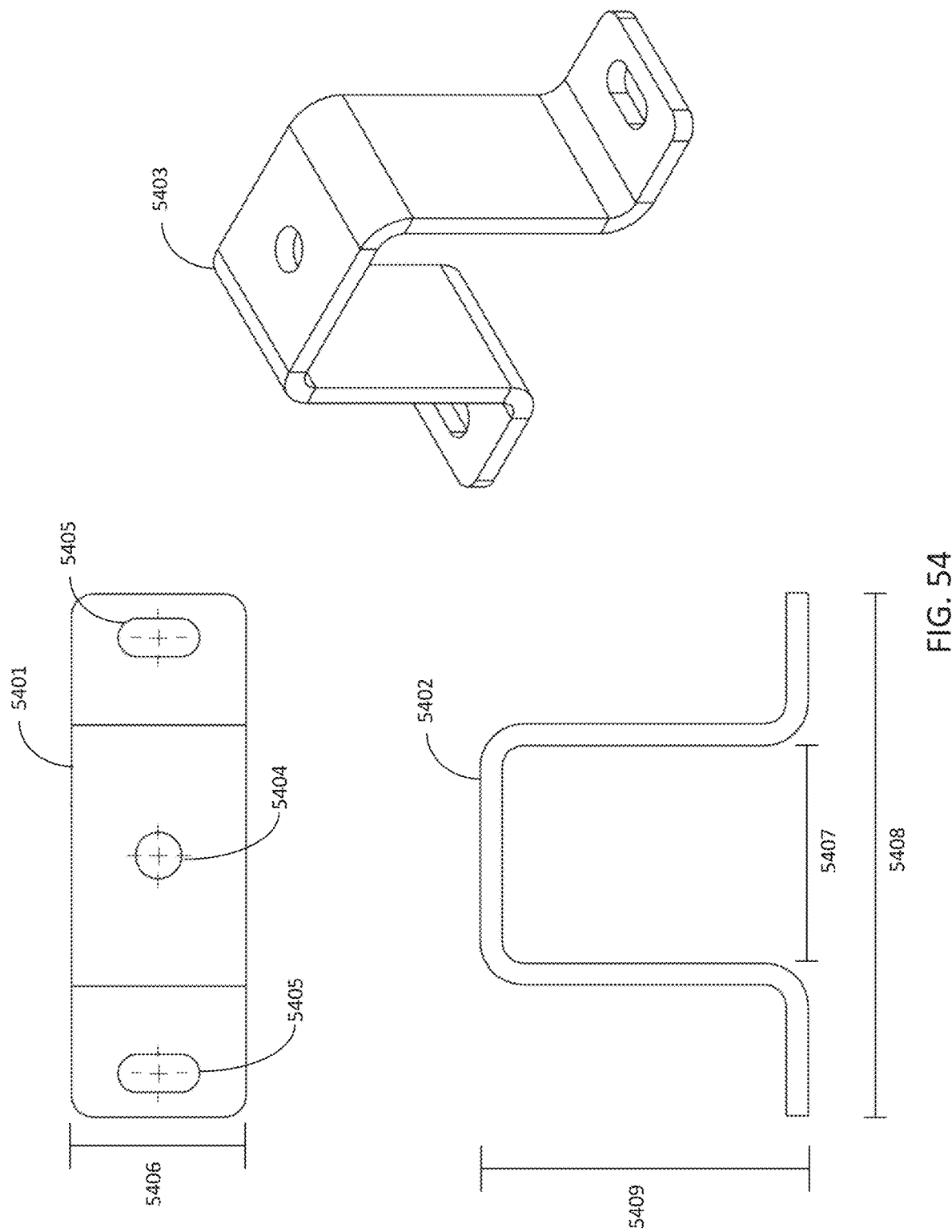
FIG. 54 shows an exemplary embodiment of a mixer torque bracket (e.g. GFRC-0009)

A mixer torque bracket is shown in FIG. 54 with a top-down view 5401, a side view 5403, and a perspective view 5402. In certain embodiments, the mixer torque bracket comprises apertures 5404, 5405, and 5406. In certain embodiments, the mixer torque bracket has a first width 5407 and a second width 5408, a depth 5406, and a height 5409. In certain embodiments, the mixer torque bracket has a first width 5407 of about 2.50 inches, a second width 5408 of about 6.00 inches, a depth 5406 of about 2.00 inches, and a height 5409 of about 3.75 inches.

Figure 55:
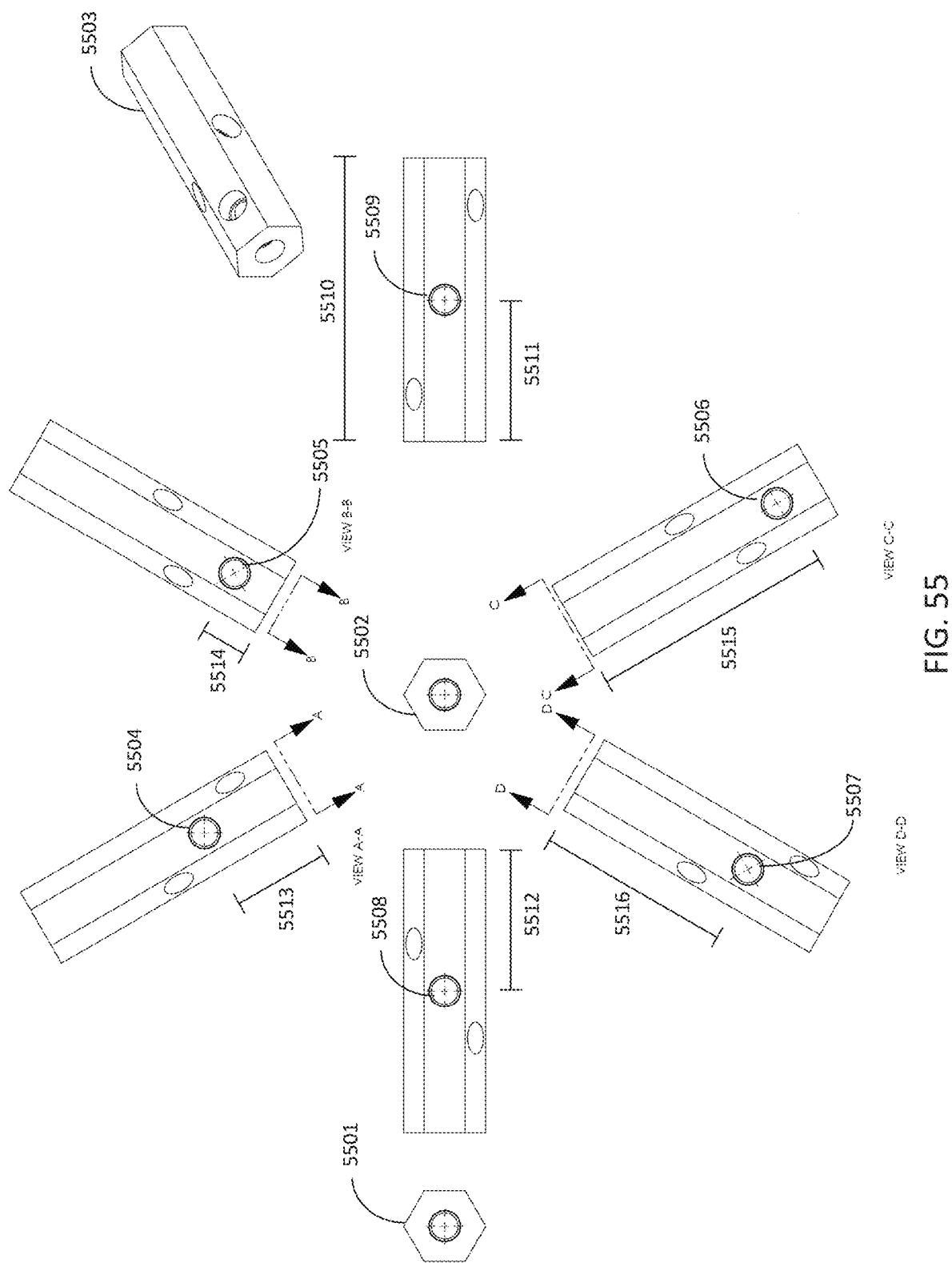
FIG. 55 shows an exemplary embodiment of a mixer spray bar (e.g. GFRC-0010)

A mixer spray bar is shown in FIG. 55. The mixer spray bar is shown with a perspective view 5503, a first end view 5502, a second end view 5501, a first side view 5504, a second side view 5505, a third side view 5506, a fourth side view 5507, a fifth side view 5508, and a sixth side view 5509. In certain embodiments, the mixer spray bar has a length 5510. In certain embodiments, the mixer spray bar has a length 5510 of about 6.00 inches. Each of the side views shows an aperture, the aperture's position along the length of one side of the mixer spray bar, and the aperture's position relative to the surrounding apertures. In certain embodiments, the mixer spray bar comprises six apertures 5504, 5505, 5506, 5507, 5508, and 5509 with each aperture positioned on one of six sides of the mixer spray bar. In certain embodiments, an aperture has a diameter of about 0.56 inches. In certain embodiments, the aperture 5504 is positioned with its center located a length 5513 of about 2.00 inches from a first end of the mixer spray bar. In certain embodiments, the aperture 5505 is positioned with its center located a length 5514 of about 1.00 inches from a first end of the mixer spray bar. In certain embodiments, the aperture 5506 is positioned with its center located a length 5515 of about 5.00 inches from a first end of the mixer spray bar. In certain embodiments, the aperture 5507 is positioned with its center located a length 5516 of about 4.00 inches from a first end of the mixer spray bar. In certain embodiments, the aperture 5508 is positioned with its center located a length 5512 of about 3.00 inches from a first end of the mixer spray bar. In certain embodiments, the aperture 5509 is positioned with its center located a length 5511 of about 3.00 inches from a first end of the mixer spray bar.

Figure 56:
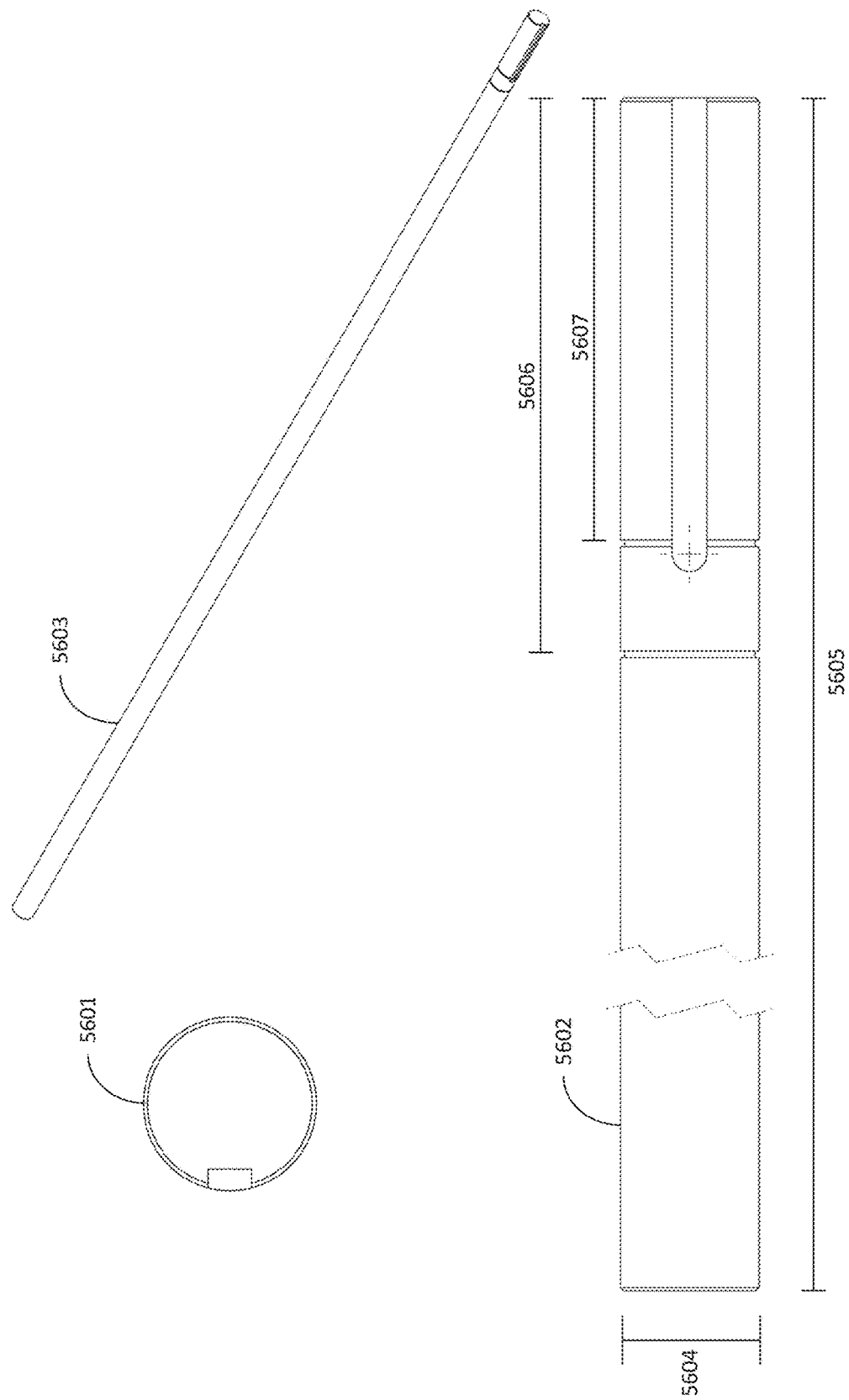
FIG. 56 shows an exemplary embodiment of a tank mixer shaft (e.g. GFRC-0011)

A tank mixer shaft is shown in FIG. 56. The tank mixer shaft is shown with an end view 5601, a side view 5602, and a perspective view 5603. In certain embodiments, the tank mixer shaft has a diameter 5604, a first length 5605, a second length 5606, and a third length 5607. In certain embodiments, the tank mixer shaft has a diameter 5604 of about 1.250 inches, a first length 5605 of about 68.50 inches, a second length 5606 of about 5.00 inches, and a third length 5607 of about 4.00 inches.

Figure 57:
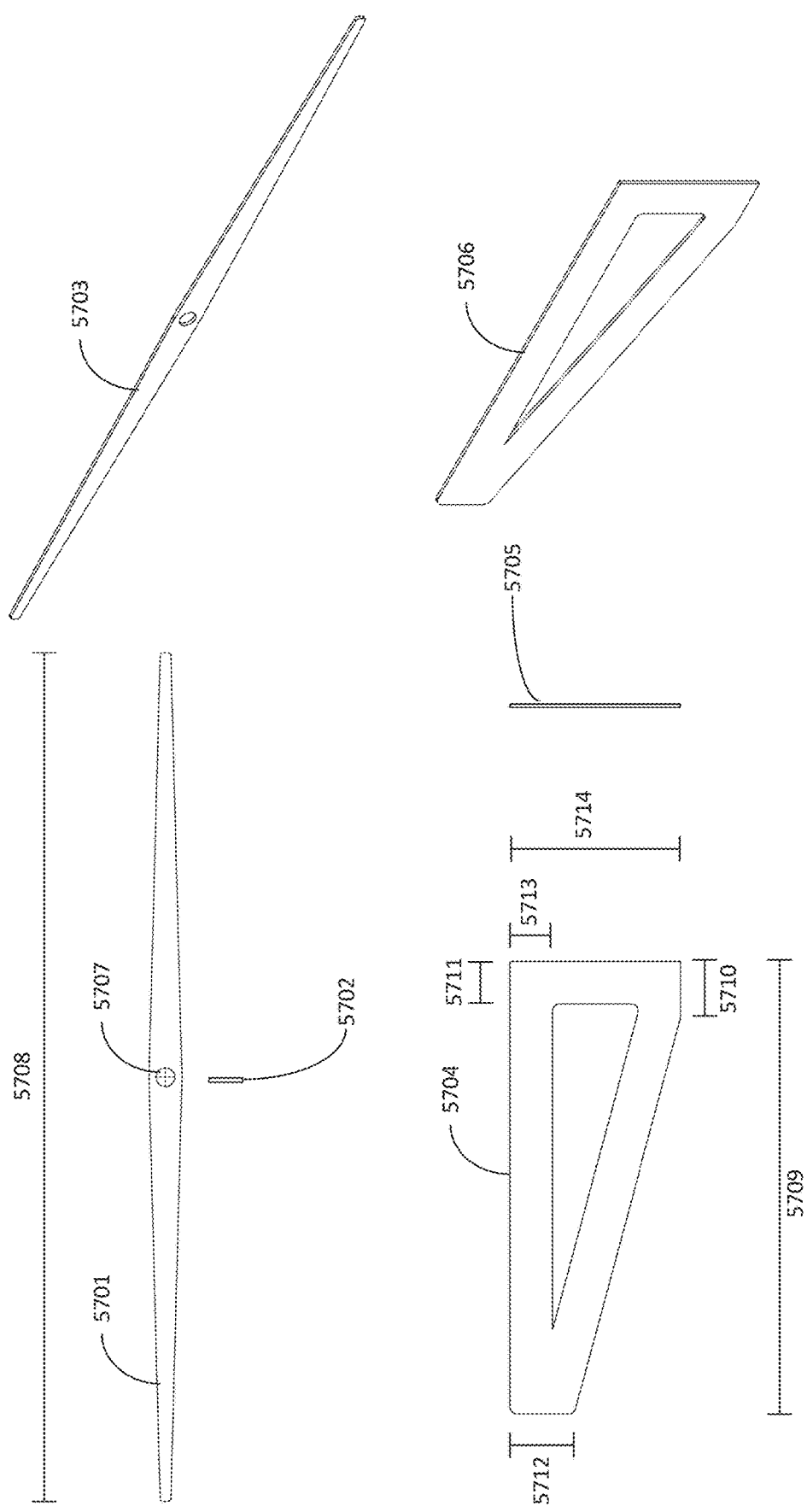
FIG. 57 shows an exemplary embodiment of a tank mixer blade (e.g. GFRC-0012)

A tank mixer stiffener is shown in FIG. 57. In certain embodiments, the tank mixer stiffener has a first component as shown by a front view 5701, a side view 5702, and a perspective view 5703. In certain embodiments, the first component has a length 5708 of about 60.00 inches. In certain embodiments, the first component comprises an aperture 5707 having a diameter of about 1.31 inches. In certain embodiments, the first component is about 0.25 inches thick. In certain embodiments, the tank mixer stiffener has a second component as shown by a front view 5704, a side view 5705, and a perspective view 5706. In certain embodiments, the second component has a width 5709 of about 32.00 inches, a width 5710 of about 4.0 inches, a width 5711 of about 3.00 inches, a height 5714 of about 12.00 inches, a height 5712 of about 4.4 inches, and a height 5713 of about 3.00 inches. In certain embodiments, the second component is about 0.25 inches thick.

Figure 58:
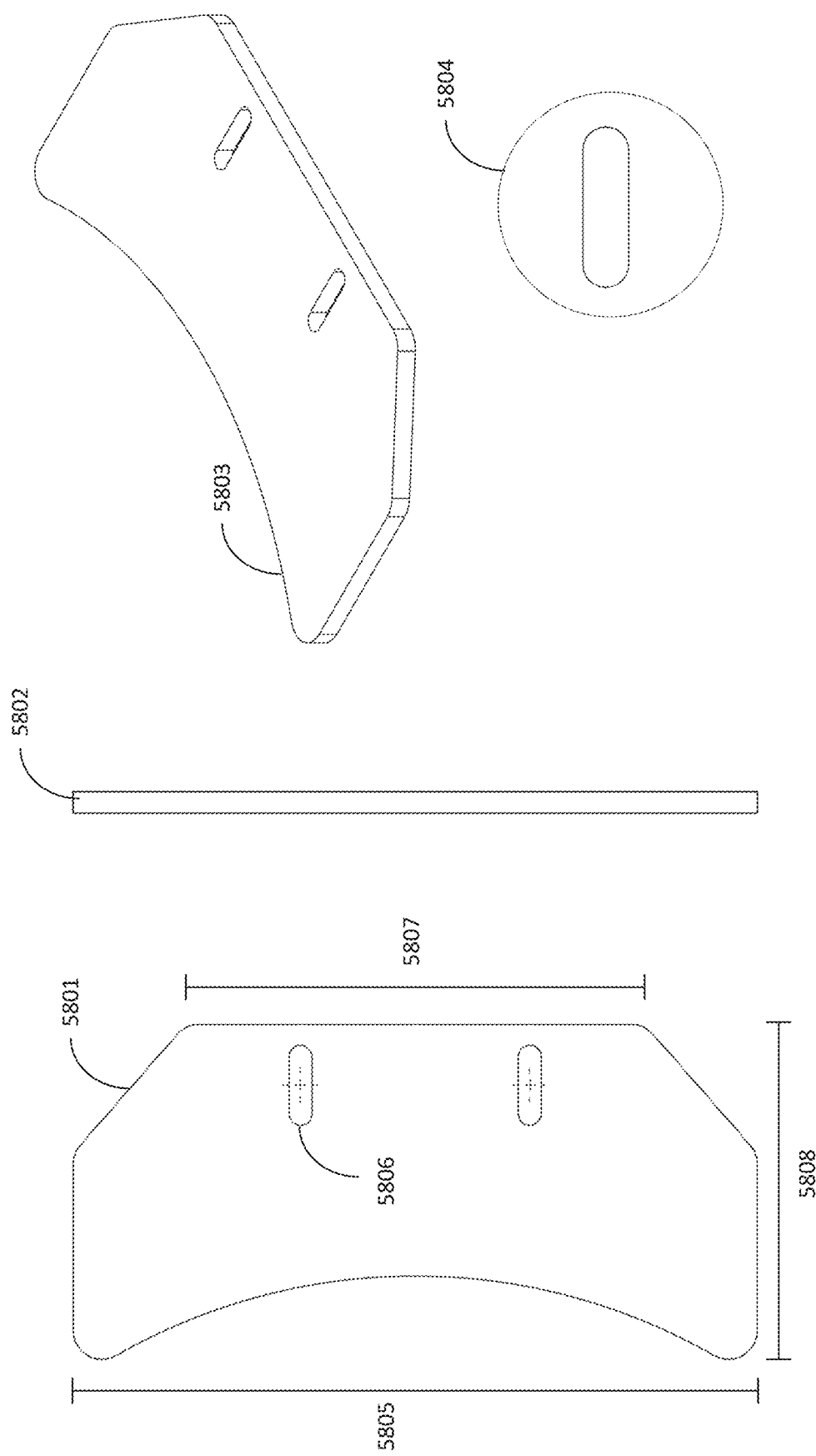
FIG. 58 shows an exemplary embodiment of a bowl mount plate (e.g. GFRC-0013)

A bowl mount plate is shown in FIG. 58 with a front view 5801, a side view 5802, and a perspective view 5803. In certain embodiments, the bowl mount plate comprises one or more apertures 5806. In certain embodiments, the bowl mount plate comprises two apertures 5806. In certain embodiments, the two apertures are about 4.00 inches apart (as measured from the center of each aperture). In certain embodiments, an aperture 5804 has a width (longer side) of about 1.40 inches and a height (shorter side) of about 0.40 inches. In certain embodiments, the bowl mount plate has a first height 5805 of about 12.0 inches, a second height 5807 of about 8.0 inches, and a width 5808 of about 5.84 inches. In certain embodiments, the bowl mount plate is about 0.38 inches thick.

A carriage switch mount plate is shown in FIG. 59 with a front view 5901, a side view 5902, and a perspective view 5903. In certain embodiments, the carriage switch mount plate comprises one or more circular apertures 5904, and one or more rounded rectangular apertures 5905. In certain embodiments, a circular aperture 5904 has a diameter of about 0.33 inches. In certain embodiments, a rounded rectangular aperture 5905 has a width (shorter side) of about 0.201 inches and a height (longer side) of about 1.20 inches. In certain embodiments, the carriage switch mount plate has a height 5906 of about 3.00 inches and a width 5907 of about 2.00 inches.

Figure 60:
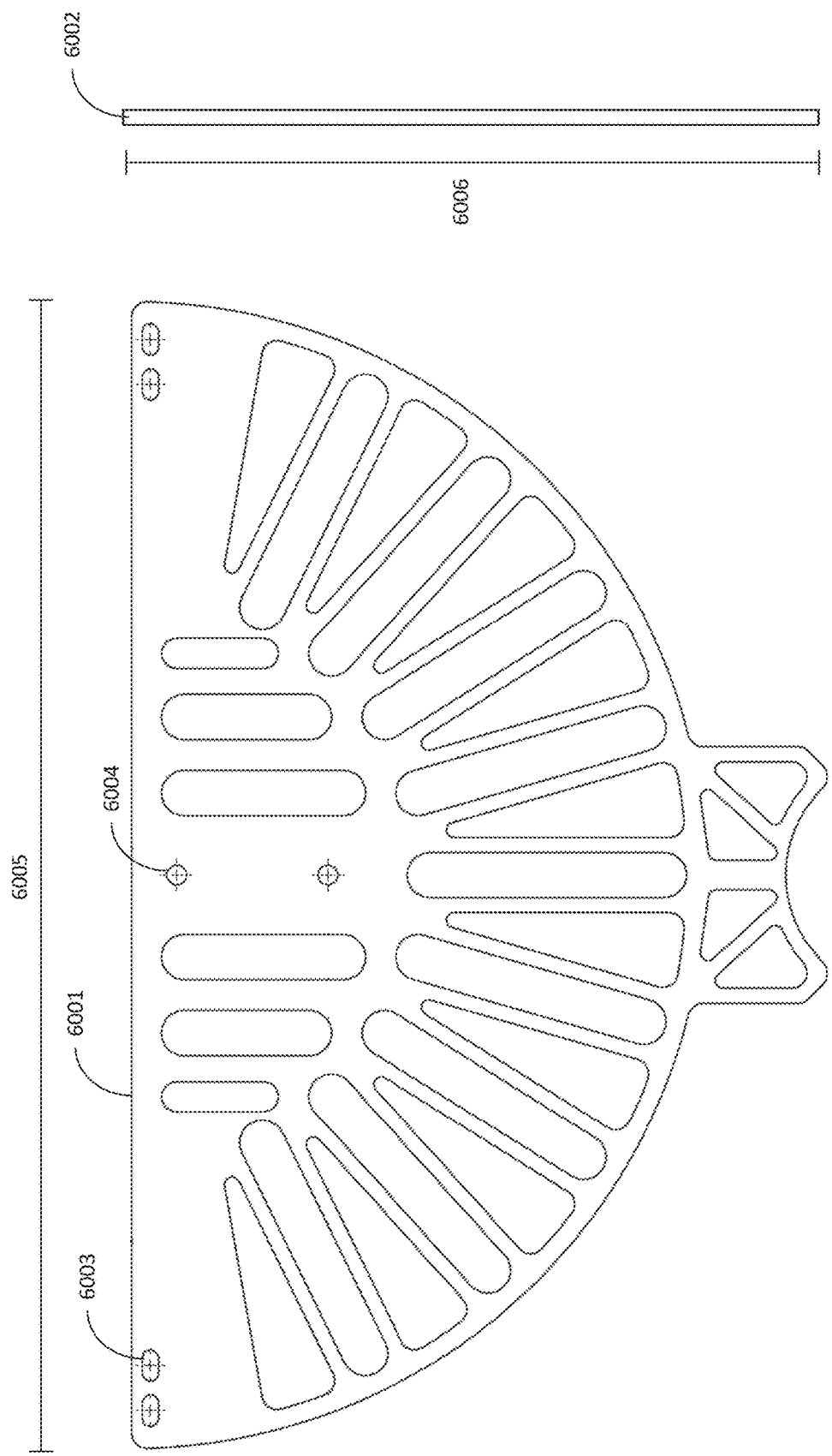
FIG. 60 shows an exemplary embodiment of a first reaction mixer blade (e.g. GFRC-0016)

A first reaction mixer blade is shown in FIG. 60 with a front view 6001 and a side view 6002. In certain embodiments, the mixer blade comprises one or more rounded rectangular apertures 6003 and one or more circular apertures 6004. In certain embodiments, a rounded rectangular aperture 6003 has a width (longer side) of about 0.53 inches and a height (shorter side) of about 0.31 inches. In certain embodiments, a circular aperture 6004 has a diameter of about 0.332 inches. In certain embodiments, the mixer blade has a height 6006 of about 11.50 inches and a width 6005 of about 19.00 inches.

Figure 61:
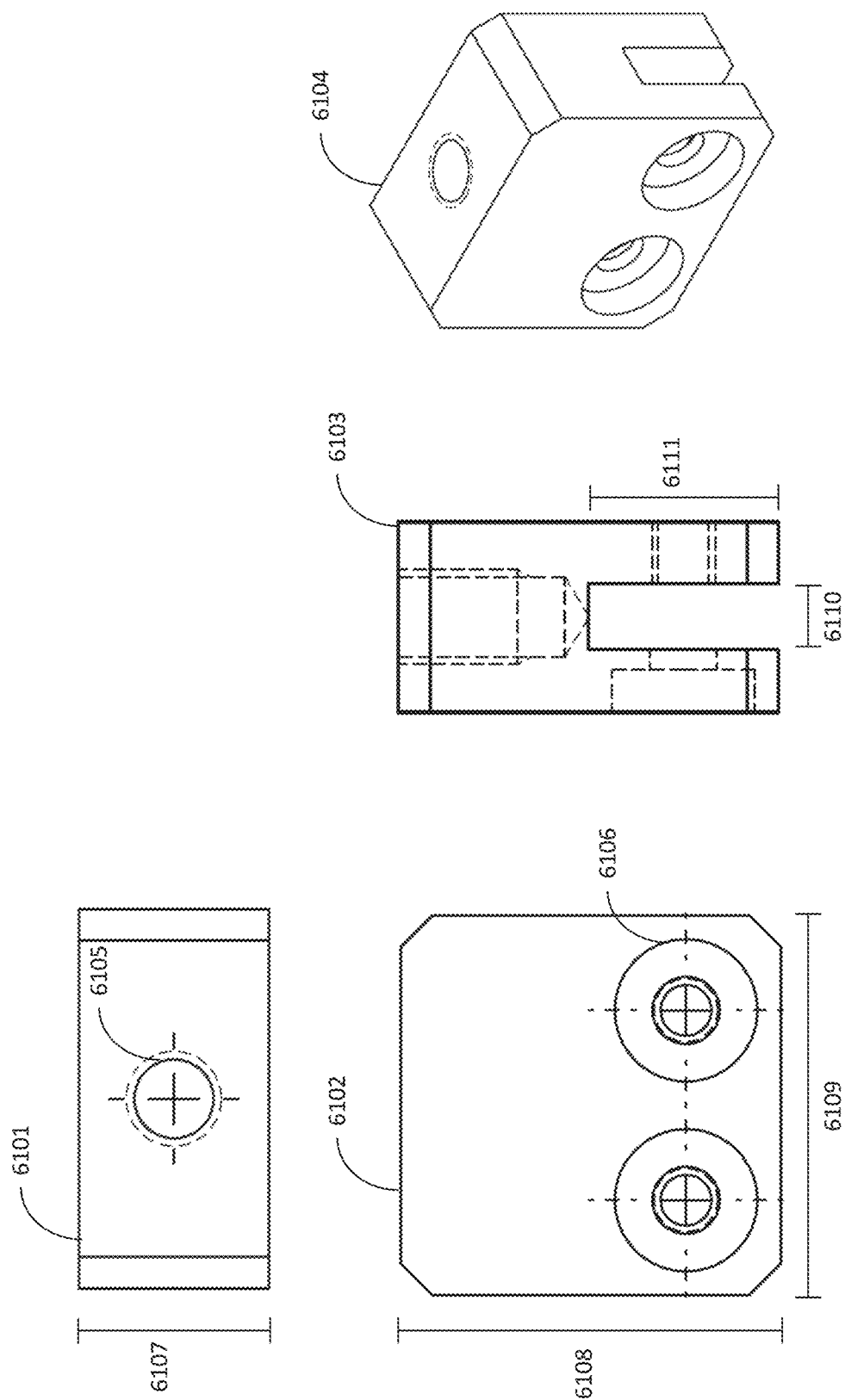
FIG. 61 shows an exemplary embodiment of a first reaction scraper blade mount (e.g. GFRC-0017)

A first reaction scraper blade mount is shown in FIG. 61 with a top-down view 6101, a front view 6102, a side view 6103, and a perspective view 6104. In certain embodiments, the scraper blade mount comprises an aperture 6105. In certain embodiments, the aperture 6105 has a diameter of about 0.313 inches. In certain embodiments, the scraper blade mount comprises one or more apertures 6106. In certain embodiments, the one or more apertures 6106 have an inner diameter of about 0.201 inches and an outer diameter of about 0.266 inches. In certain embodiments, the scraper blade mount has a height 6108 of about 1.50 inches, a width 6109 of about 1.50 inches, and a depth 6107 of about 0.75 inches. In certain embodiments, the scraper blade mount comprises an open space with a height 6111 of about 0.75 inches, a width 6109 of about 1.50 inches, and a depth 6110 of about 0.26 inches.

Figure 62:
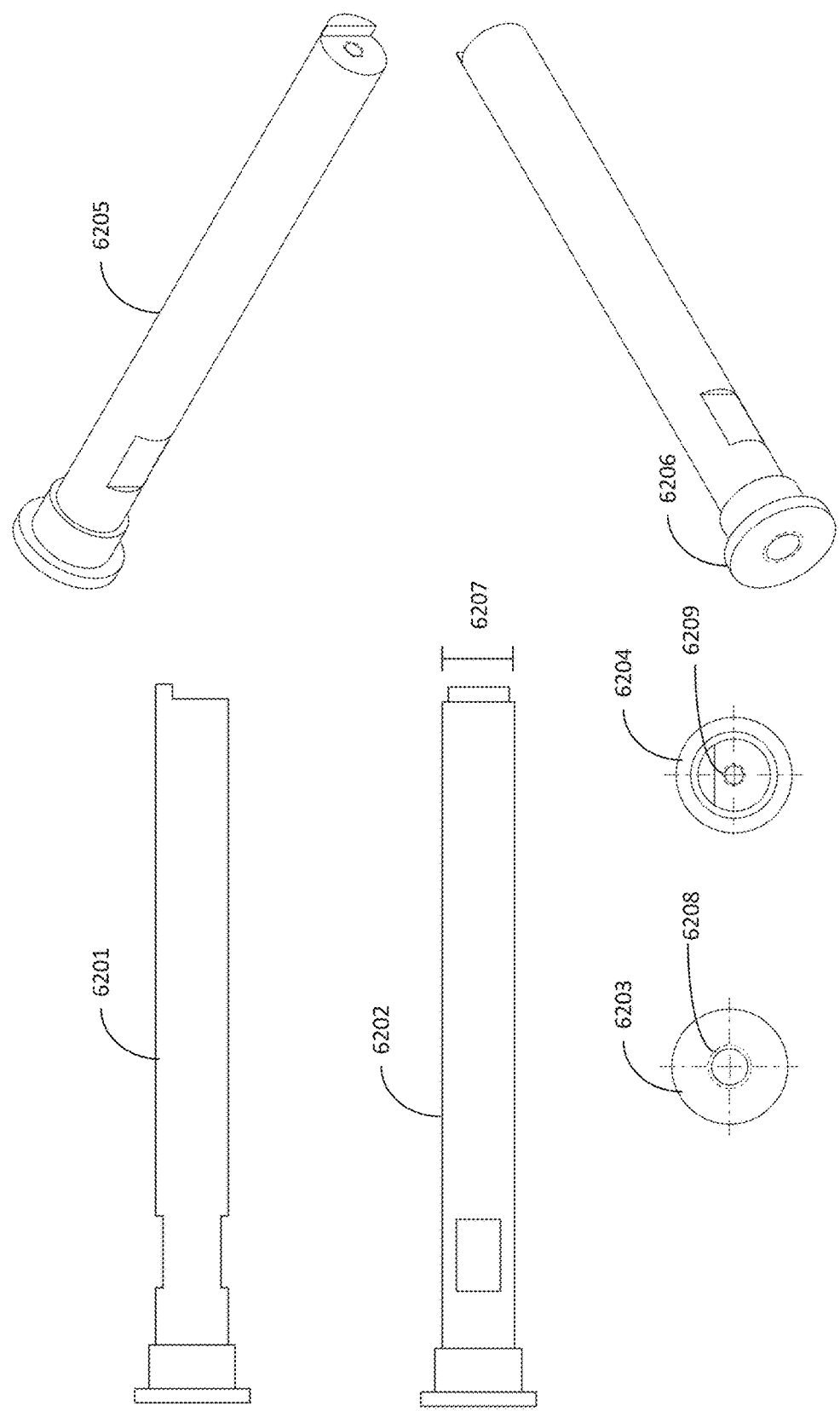
FIG. 62 shows an exemplary embodiment of a first reaction scraper blade shaft (e.g. GFRC-0018)

A first reaction scraper blade shaft is shown in FIG. 62 with a front view 6202, a back view 6201, a first perspective view 6205, a second perspective view 6206, a top view 6203, and a bottom view 6204. In certain embodiments, the scraper blade shaft comprises an opening 6208. In certain embodiments, the opening 6208 has a diameter of about 0.313 inches and a depth of about 0.97 inches. In certain embodiments, the scraper blade shaft comprises an opening 6209. In certain embodiments, the opening 6209 has a diameter of about 0.159 inches and a depth of about 0.47 inches. In certain embodiments, the scraper blade shaft has a diameter 6207 of about 0.63 inches.

Figure 63:
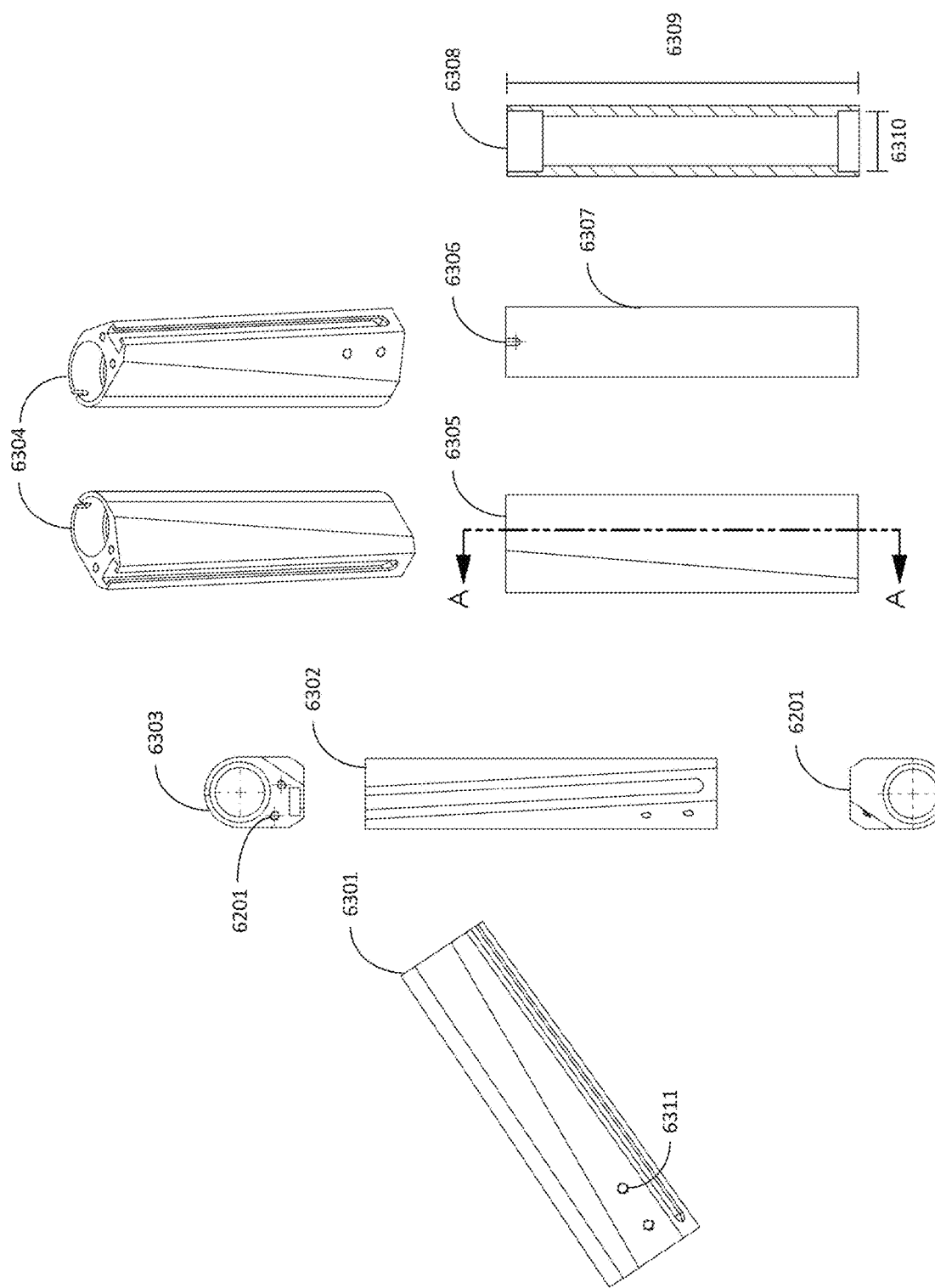
FIG. 63 shows an exemplary embodiment of a first reaction scraper blade holder (e.g. GFRC-0019)

A first reaction scraper blade holder is shown in FIG. 63 with a top-down view 6303, side views (6301, 6305), a front view 6302, perspective views 6304, a rear view 6307 showing a notch 6306 on the scraper blade holder, and a side view showing the interior space of the scraper blade holder 6308. In certain embodiments, the scraper blade holder has a height 6309 of about 6.25 inches and a diameter 6310 of about 1.075 inches. In certain embodiments, the scraper blade holder comprises one or more openings 6201 at one end of the shaft. In certain embodiments, an opening 6201 has a diameter of about 0.136 inches. In certain embodiments, the scraper blade holder comprises one or more openings 6311 along its length. In certain embodiments, an opening 6311 has a diameter of about 0.159 inches.

Figure 64:
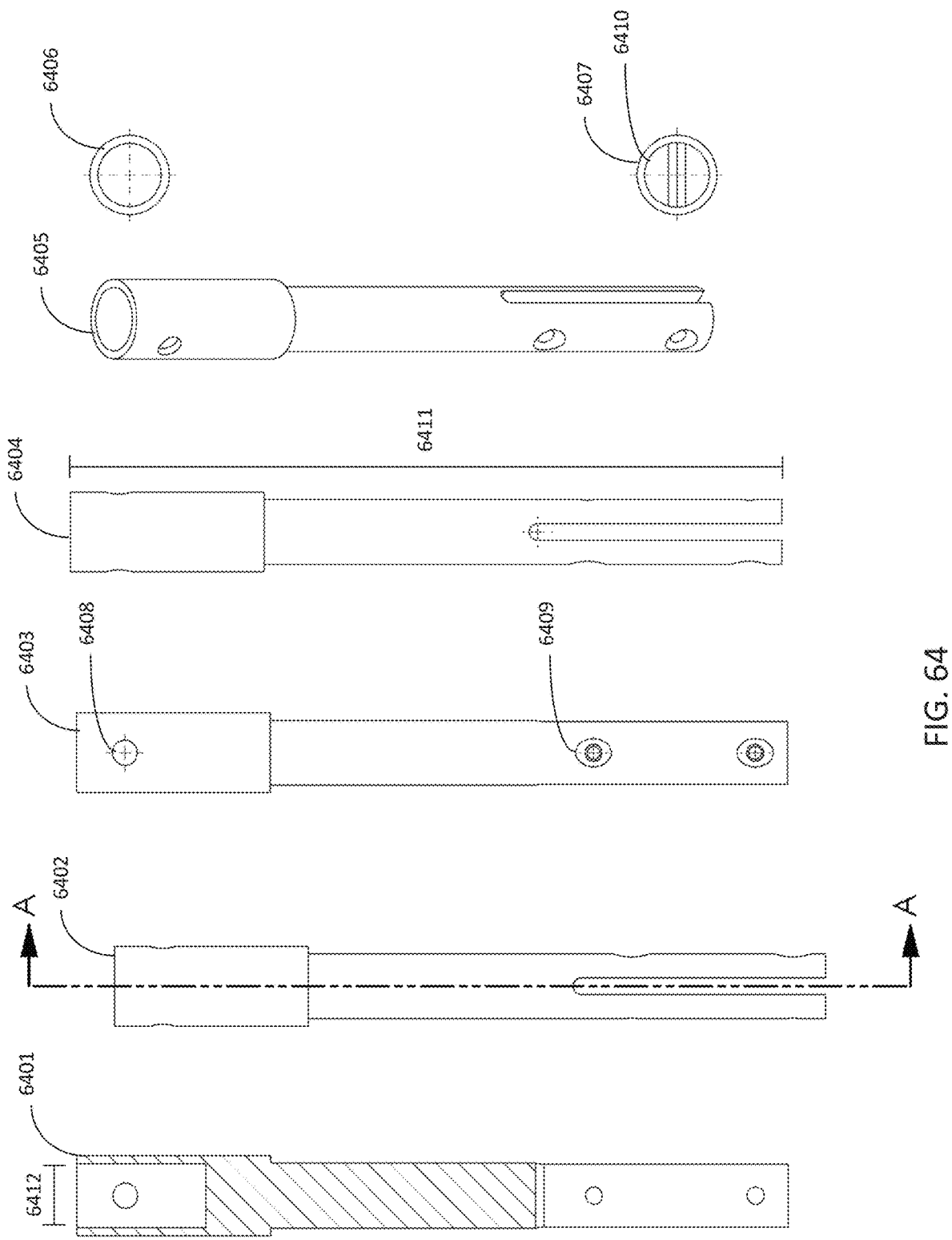
FIG. 64 shows an exemplary embodiment of a first reaction paddle shaft (e.g. GFRC-0020)

A first reaction paddle shaft is shown in FIG. 64 with a cross-section front view 6401, a front view 6403, side views (6404, 6402), a perspective view 6405, a top-down view 6406 and a bottom view 6407. In certain embodiments, the reaction paddle shaft comprises an aperture 6408 along its side having a diameter of about 0.39 inches. In certain embodiments, the reaction paddle shaft comprises one or more apertures 6409 along its side having an outer diameter of about 0.266 inches and an inner diameter of about 0.201 inches. In certain embodiments, the reaction paddle shaft has a height 6411 of about 11.00 inches and a width 6412 of about 0.980 inches. In certain embodiments, the reaction paddle shaft has a diameter at the top (see top-down view 6406) of about 1.23 inches. In certain embodiments, the reaction paddle shaft has a diameter at the bottom 6410 (see bottom view 6407) of about 1.00 inches.

Figure 65:
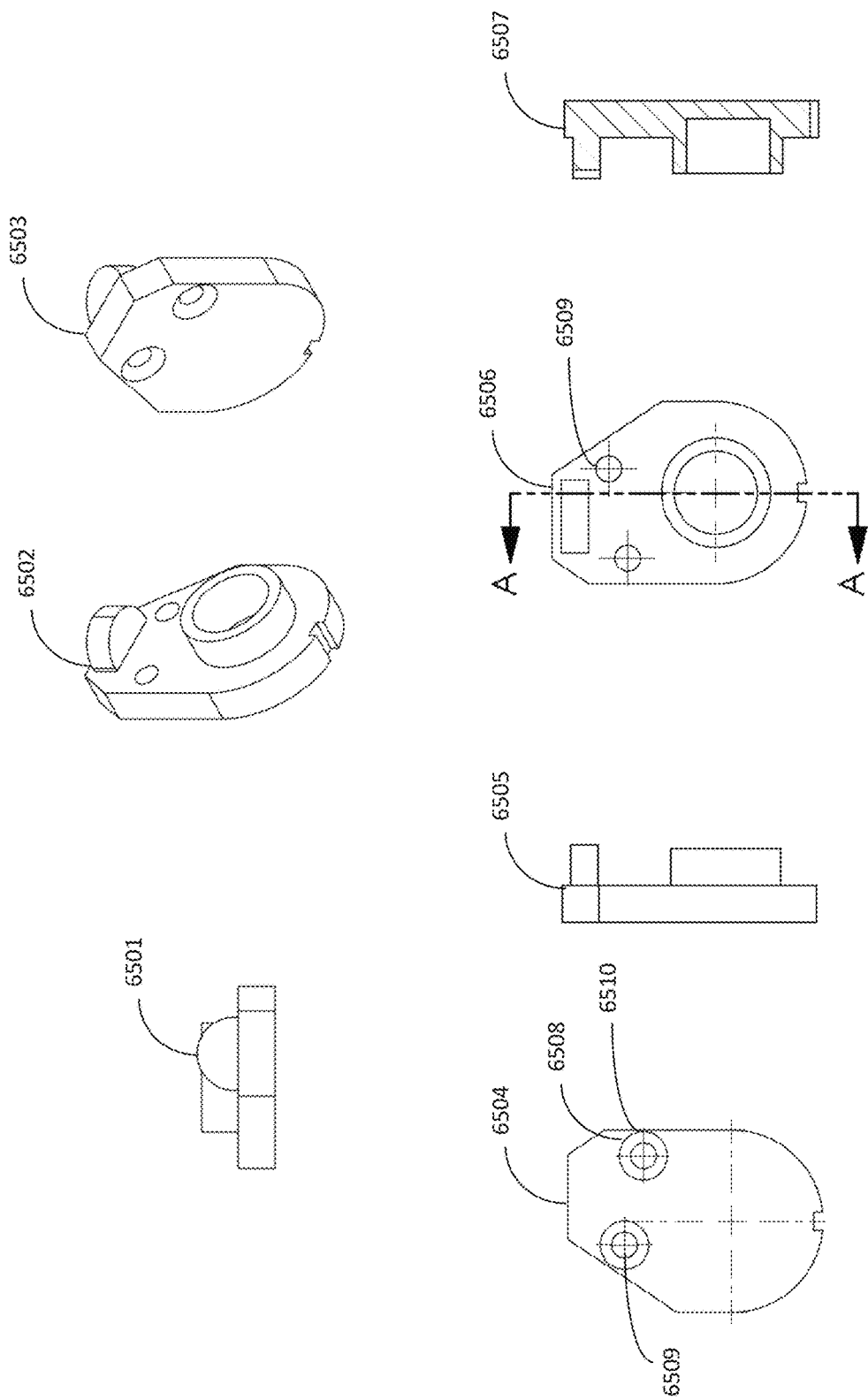
FIG. 65 shows an exemplary embodiment of a first reaction paddle cap (e.g. GFRC-0021)

A first reaction paddle cap is shown in FIG. 65 with a top-down view 6501, a front perspective view 6502, a rear perspective view 6503, a rear view 6504, a side view 6505, a front view 6506, and a cross-section side view 6507. In certain embodiments, the paddle cap comprises one or more openings 6508 having a first diameter 6509 of about 0.177 inches and a second diameter 6510 of about 0.33 inches.

A first reaction mixer drive shaft is shown in FIG. 66 with a perspective view 6601, a first end view 6602, a second end view 6604, and a front view 6603. In certain embodiments, the mixer drive shaft has a diameter of about 1.000 inches. In certain embodiments, the mixer drive shaft has a length 6606 of about 8.06 inches. In certain embodiments, the center of the mixer drive shaft has a distance 6605 of about 0.38 inches from a flat section of the shaft.

A first reaction paddle stop is shown in FIG. 67 with a top-down view 6701, a front perspective view 6702, a rear perspective view 6703, a front view 6704, a side view 6705, and a rear view 6706. In certain embodiments, the paddle stop comprises one or more apertures 6707. In certain embodiments, an aperture 6707 has an inner diameter 6708 and an outer diameter 6709. In certain embodiments, the inner diameter 6708 is about 0.201 inches, and the outer diameter 6709 is about 0.39 inches. In certain embodiments, the paddle stop has a height 6710 of about 2.50 inches and a width 6605 of about 0.63 inches.

A first reaction frame weldment is shown in FIG. 68A with multiple perspective views. In certain embodiments, the frame weldment comprises various components as detailed in FIG. 68A-68C.

Figure 69A:
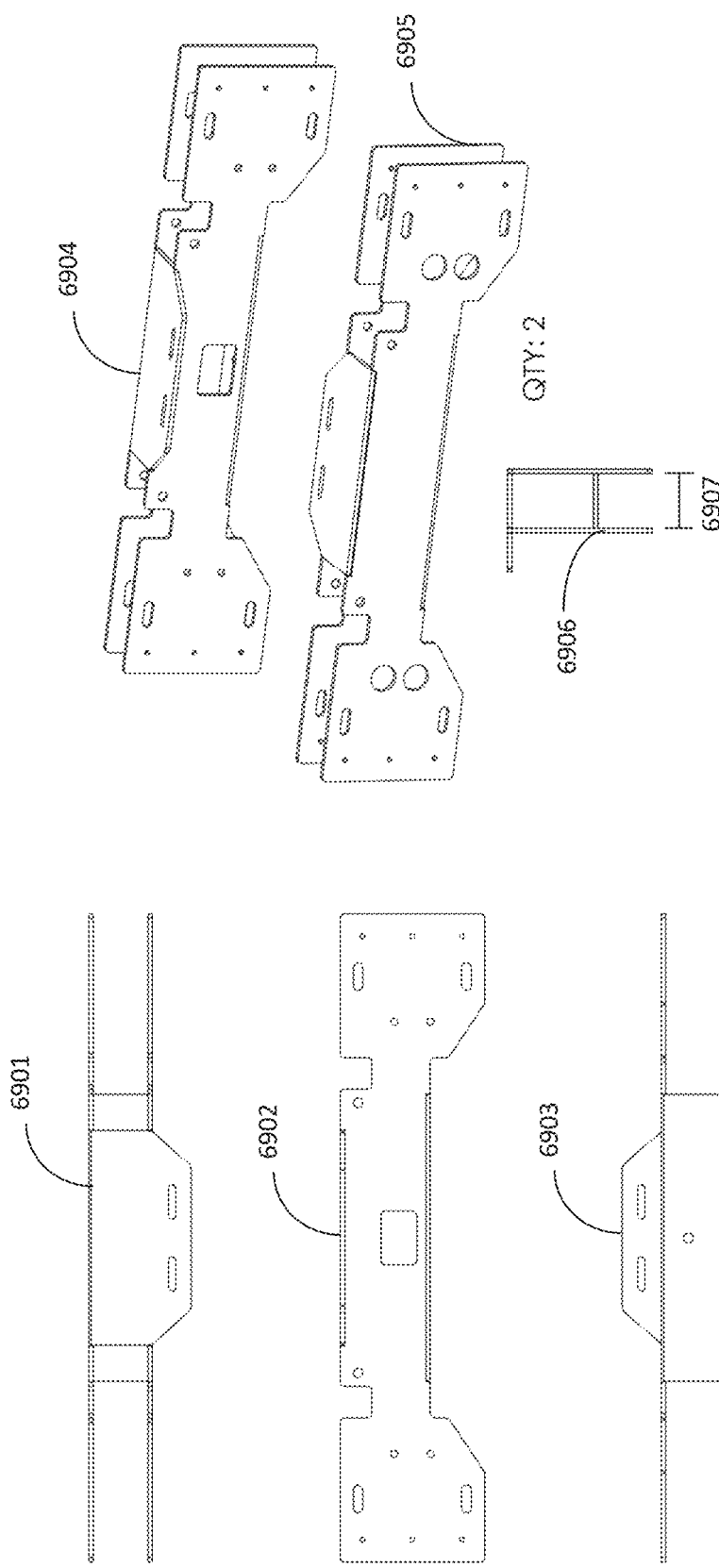
FIGS. 69A-69B shows an exemplary embodiment of a lift carriage weldment (e.g. GFRC-0102)
Figure 69B:
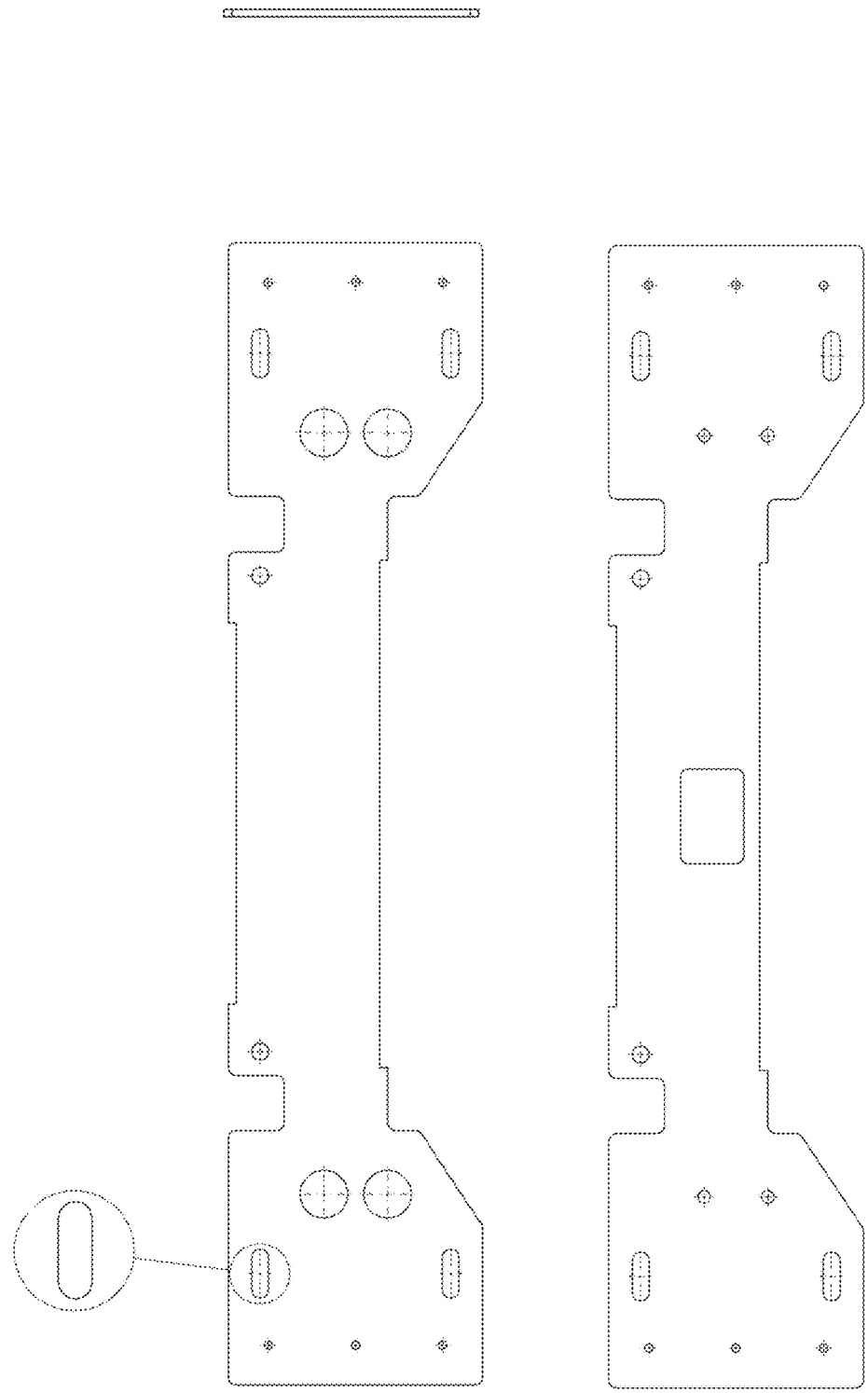

A lift carriage weldment is shown in FIGS. 69A-69B with a top-down view 6901, a front view 6902, a bottom view 6903, a side view 6906, a front perspective view 6904, and a rear perspective view 6905. In certain embodiments, the front and back plates of the lift carriage weldment are separated by a distance 6907 of about 3.03 inches.

Figure 70:
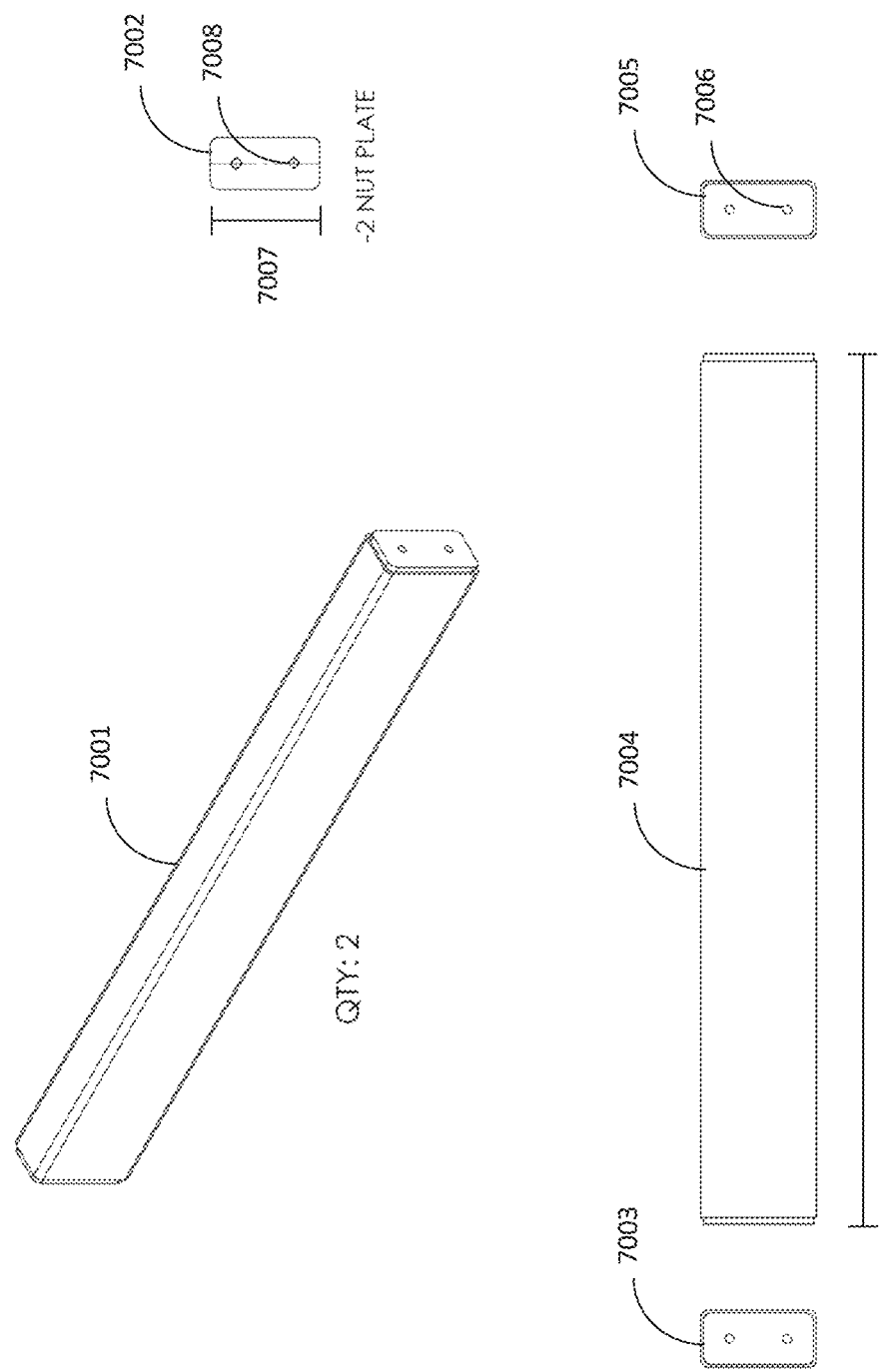
FIG. 70 shows an exemplary embodiment of a lift carriage brace (e.g. GFRC-0103)

A lift carriage brace is shown in FIG. 70 with a perspective view 7001, a front view 7004, and side views 7003 and 7005. In certain embodiments, the lift carriage brace comprises one or more openings 7006. In certain embodiments, an opening 7006 has a diameter of about 0.31 inches. In certain embodiments, the lift carriage brace has a length 7006 of about 30.47 inches and a height 7007 of about 3.81 inches. In certain embodiments, the lift carriage brace comprises a nut plate 7002 with a height 7007 of about 3.81 inches. In certain embodiments, the nut plate has one or more openings 7008. In certain embodiments, an opening 7008 has a diameter of about 0.31 inches.

Figure 71A:
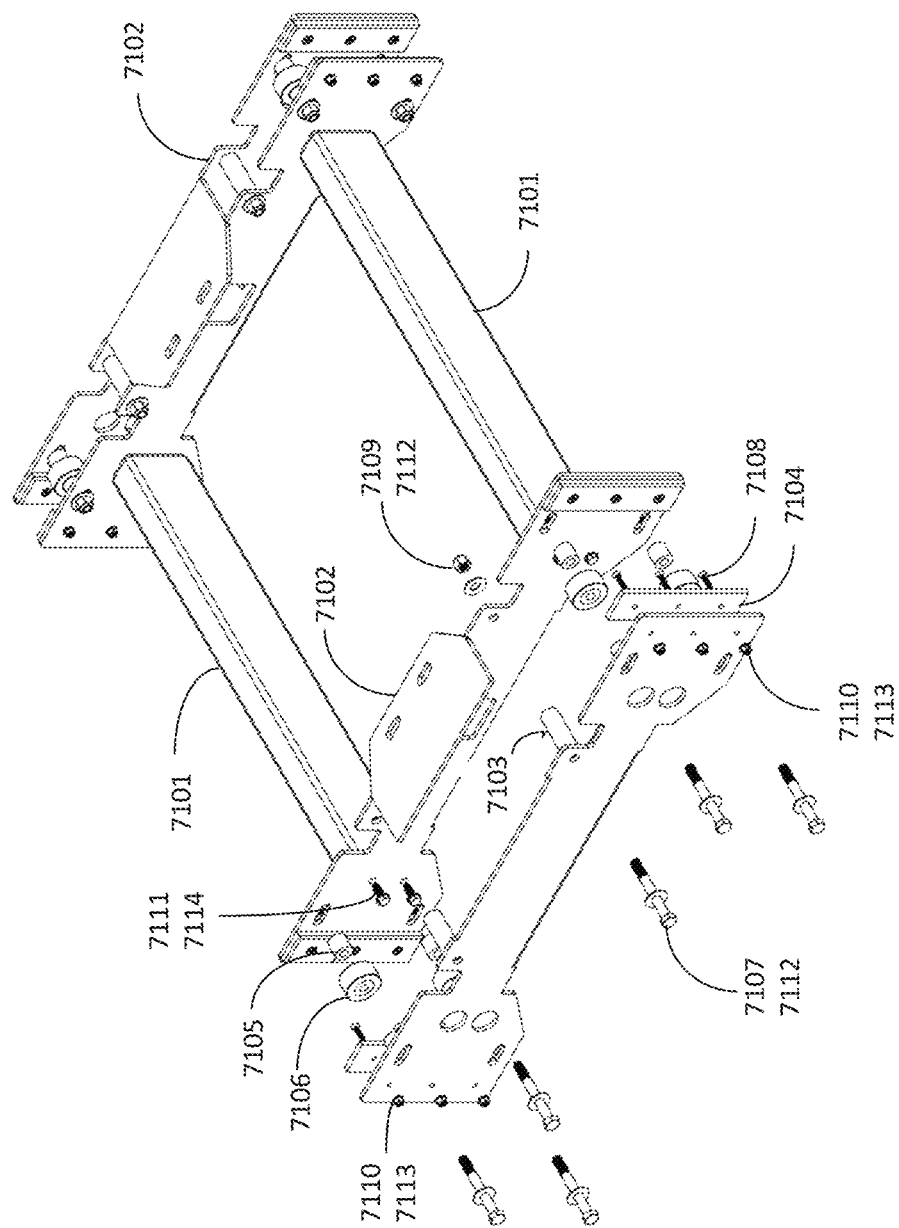
FIGS. 71A-71B shows an exemplary embodiment of a lift carriage (e.g. GFRC-0104)
Figure 71B:
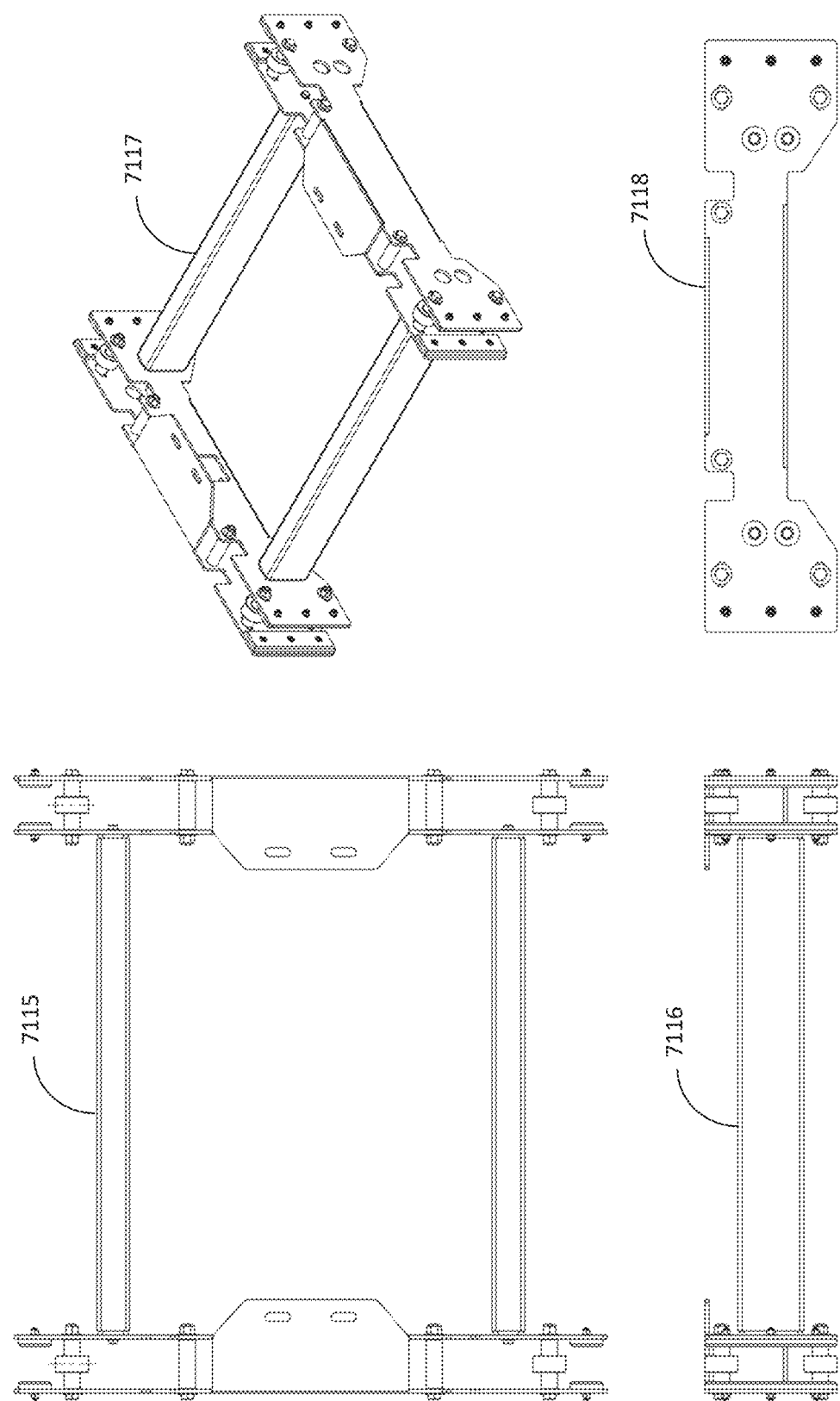

A lift carriage is shown in FIGS. 71A-71B with a perspective view in FIG. 71A. In certain embodiments, the lift carriage comprises components as shown in FIG. 71A. The lift carriage is shown with a top view 7115, a front view 7116, a perspective view 7117, and a side view 7118 in FIG. 71B.

Figure 72:
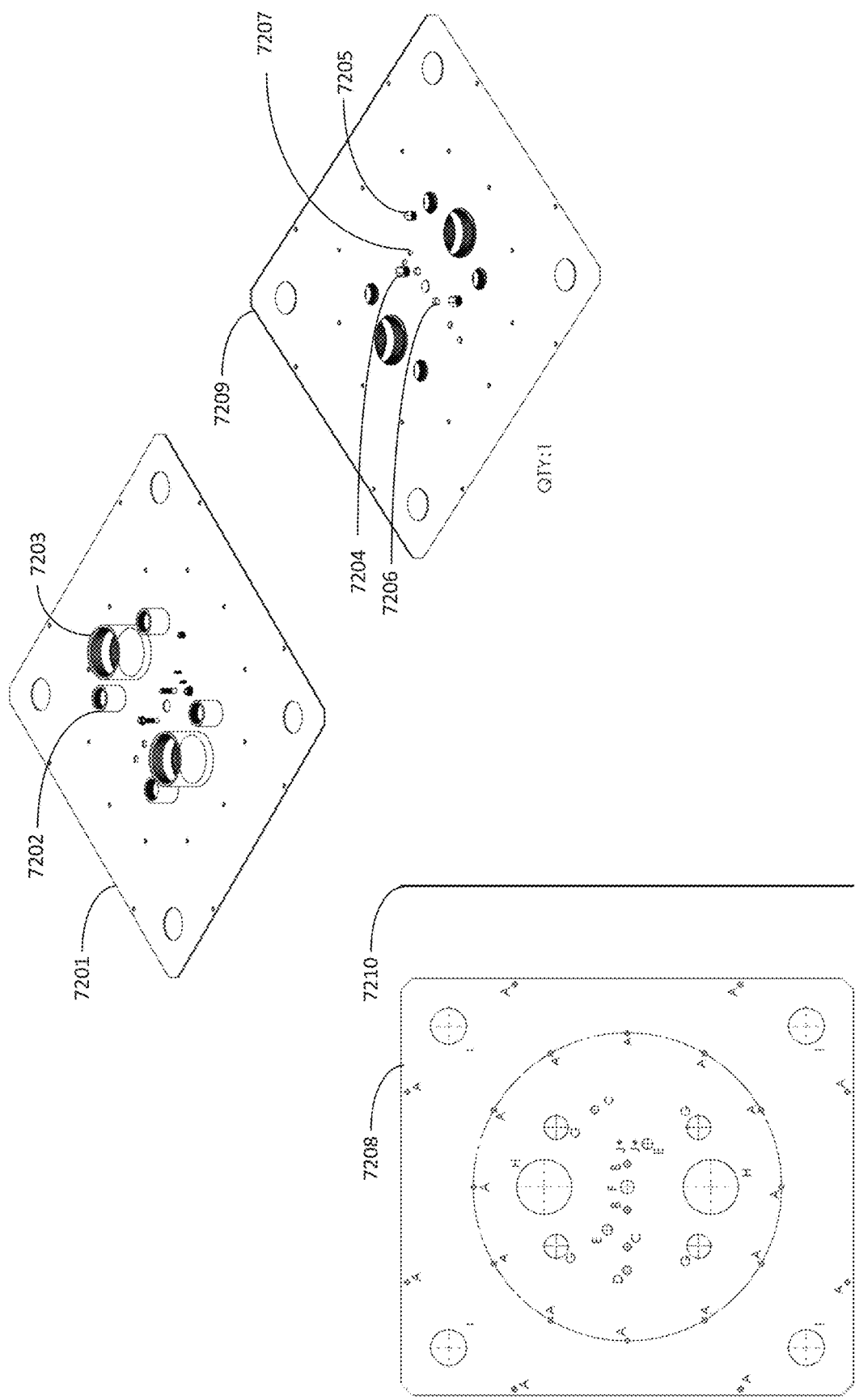
FIG. 72 shows an exemplary embodiment of a first reaction top plate (e.g. GFRC-0105)

A first reaction top plate is shown in FIG. 72 with a top-down view 7208, a side view 7210, a top perspective view 7201, and a bottom perspective view 7209. In certain embodiments, the top plate comprises components as shown in FIG. 72 and TABLE 1.

A mixer motor mount is shown in FIG. 73 with a top cross-section view 7309, a side view 7310, a top perspective view 7311, and a bottom perspective view 7312. In certain embodiments, the mixer motor mount comprises components as shown in TABLE 1. In certain embodiments, the mixer motor mount comprises one or more of the following components: mild steel tube (7301, 7302, 7304, 7305), CNC cut (7306, 7307), and mild steel plate 7308.

A tank mixer paddle is shown in FIG. 74 with a front view 7404, a side view 7405, and two perspective views 7406 and 7407. In certain embodiments, the tank mixer paddle comprises a mixer shaft 7401, a tank mixer stiffener 7402, and a tank mixer blade 7403. In certain embodiments, the tank mixer stiffener provides support, strength, and/or durability for the tank mixer blade.

Figure 75:
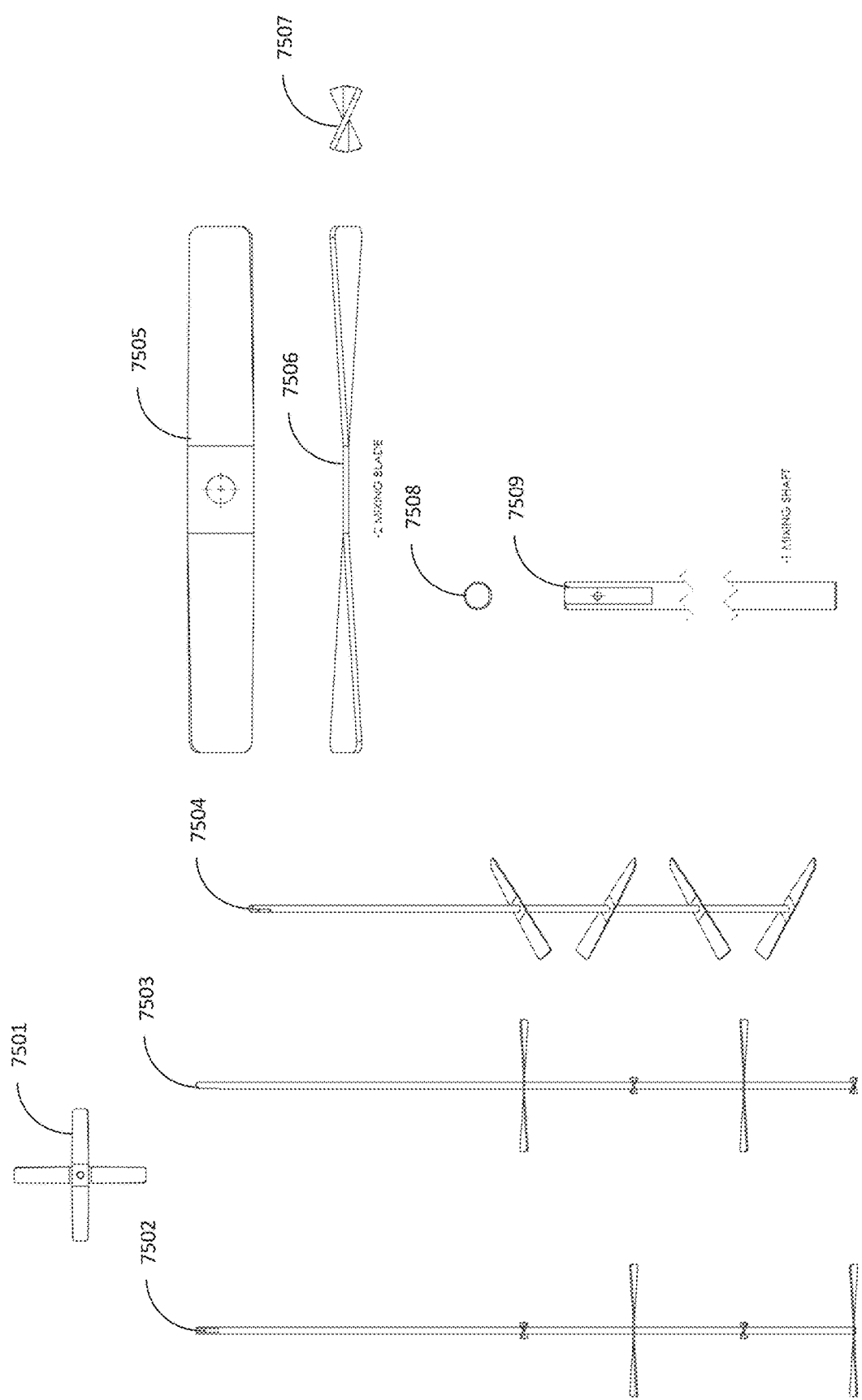
FIG. 75 shows an exemplary embodiment of a 150 gallon tank mixer paddle (e.g. GFRC-0110)

A tank mixer paddle is shown in FIG. 75 with a top-down view 7501, front views 7502 and 7503, and a front perspective view 7504. In certain embodiments, the tank mixer paddle comprises a mixing blade shown with a top-down view 7505, a front view 7506, and a side view 7507. In certain embodiments, the tank mixer paddle comprises a mixing shaft 7509 shown with a top-down view 7508.

The methods, devices and systems herein offer significant advantages with respect to existing options for manufacturing, synthesis or processing of materials. In certain embodiments, the methods, devices and systems herein enable scalable, high volume manufacturing, synthesis or processing of materials. For example, in certain embodiments, the devices and systems described herein include an apparatus comprising a tank, a mixer and a tank agitator. In certain embodiments, the tank comprises a carbonaceous composition (e.g., graphite). In certain embodiments, the mixer is mounted to the tank. In certain embodiments, the mixer is in fluid communication with the tank. In certain embodiments, the tank agitator is mechanically coupled to the mixer. In certain embodiments, the tank agitator is configured to agitate the carbonaceous composition in the tank, thereby forming an oxidized form of the carbonaceous composition (e.g., graphite oxide) at a rate of greater than about, for example, 1 tonne (metric ton) per year (tpy). In some embodiments, the apparatus form the oxidized form of the carbonaceous composition at a rate of greater than or equal to about 100 grams (g) per year, 200 g per year, 500 g per year, 750 g per year, 1 kilogram (kg) per year, 10 kg per year, 25 kg per year, 50 kg per year, 75 kg per year, 0.1 tpy, 0.2 tpy, 0.3 tpy, 0.4 tpy, 0.5 tpy, 0.6 tpy, 0.7 tpy, 0.8 tpy, 0.9 tpy, 1 tpy, 2 tpy, 3 tpy, 4 tpy, 5 tpy, 10 tpy, 25 tpy, 50 tpy, 75 tpy, 100 tpy, 200 tpy, 500 tpy, 750 tpy, 1,000 tpy (1 ktpy), 2,000 tpy, 3,000 tpy, 4,000 tpy, 5,000 tpy, 6,000 tpy, 7,000 tpy, 8,000 tpy, 9,000 tpy, 10,000 tpy or more. In certain embodiments, the apparatus (e.g., the system 100) is used for batch manufacturing, synthesis or processing (i.e., run as a batch process). In certain embodiments, as described in greater detail elsewhere herein, the methods, devices and systems herein are scalable. In some embodiments, the apparatus forms the oxidized form of the carbonaceous composition at a rate of greater than or equal to about 1 g, 2 g, 4 g, 6 g, 8 g, 10 g, 25 g, 50 g, 75 g, 100 g, 250 g, 500 g, 750 g, 1 kg, 2 kg, 4 kg, 6 kg, 8 kg, 10 kg, 15 kg, 25 kg, 50 kg, 75 kg, 100 kg, 250 kg, 500 kg, 750 kg, 1 tonne (t), 2 t, 4 t, 6 t, 8 t, 10 t, 15 t, 25 t, 50 t, 75 t, 100 t, 250 t, 500 t, 750 t or 1,000 t per batch. As used herein, a "batch" refers to an amount of material (e.g., carbonaceous composition, oxidized form of a carbonaceous composition, reduced form of a carbonaceous composition, GO, rGO, etc.) formed, produced, processed, filtered, and/or generated together as a group using the methods, apparatuses, or systems described herein. In an example, a batch of GO is produced using a process comprising a first reaction in a reaction vessel, wherein the batch comprises an amount of GO that is oxidized in the first reaction. In another example, a batch of GO is produced using a process comprising a first reaction and a first filtration, wherein the batch of GO comprises an amount of GO that is oxidized in the first reaction and subsequently filtered by the first filtration. In another example, a batch of rGO is produced using a process comprising a first reaction, a first filtration, a second reaction, and a second filtration, wherein the batch of rGO comprises an amount that is oxidized in the first reaction, filtered in the first filtration, reduced in the second reaction, and filtered in the second filtration. In an example, the apparatus forms in one day an amount of the oxidized form of the carbonaceous composition corresponding to 6 months' production using an apparatus capable of only producing 1 gram at a time.

Another aspect of the invention provides a method for the manufacture (or synthesis) or processing of materials. In certain embodiments, the method is used to manufacture oxidized forms of carbonaceous compositions. In certain embodiments, the devices and systems herein (e.g., the devices and systems of FIGS. 1-5) are used for such manufacture (e.g., manufacture of oxidized forms of carbonaceous compositions). In certain embodiments, graphite oxide is synthesized from graphite. In certain embodiments, the graphite oxide includes graphite oxide in solution. In certain embodiments, graphite oxide, as used herein, includes graphene oxide (and vice versa). Graphite oxide and graphene oxide are collectively referred to herein as GO. In certain embodiments, aspects of the disclosure described in relation to graphite oxide equally apply to graphene oxide at least in some configurations.

Figure 6:
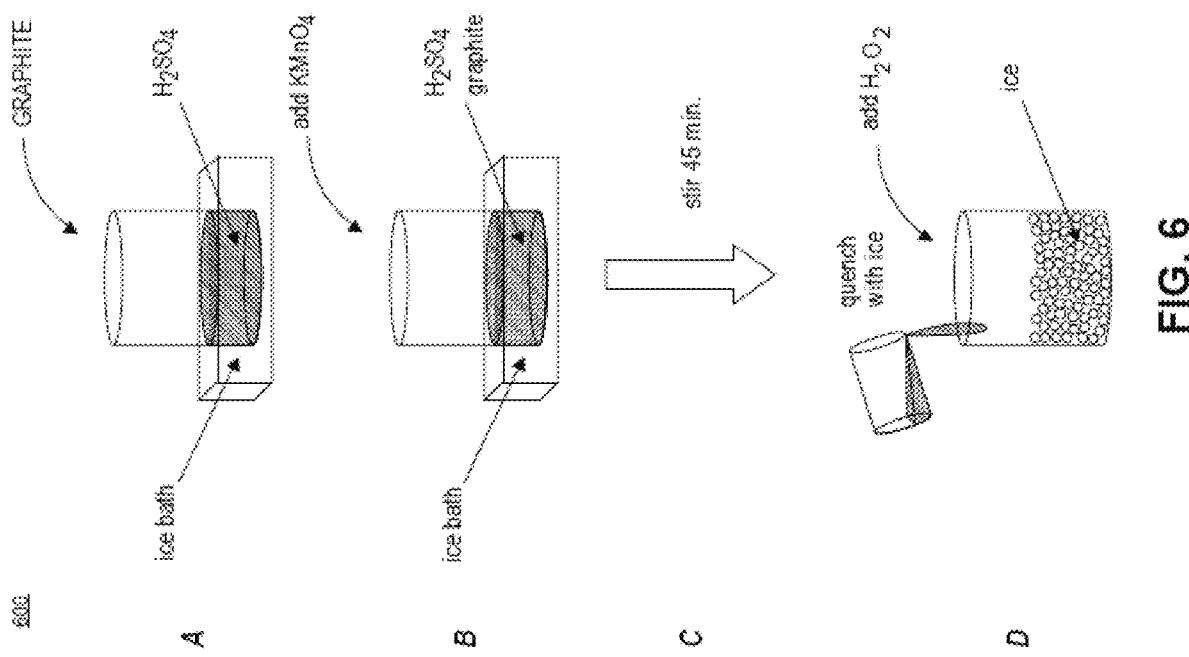
FIG. 6 schematically shows a method for manufacturing (or synthesizing) graphite oxide from graphite.

FIG. 6 schematically shows an example of a method or procedure 600 for manufacturing (or synthesizing) graphite oxide from graphite. In certain embodiments, the method in FIG. 6 is implemented using the systems and methods herein (e.g., the devices and systems of FIGS. 1-5). With reference to FIG. 6, a batch (e.g., 1*x grams (g) or y*x g, where y is a factor greater than or less than 1) of graphite oxide is produced by, in a first step A, adding about 15*x g of graphite to about 750*x milliliters (ml) of concentrated sulfuric acid ($H_2SO_4$) at a first temperature of about 0° C. The sulfuric acid is contained in a mixer (e.g., in a mixer bowl), and the graphite is added to the sulfuric acid in the mixer. The first temperature is maintained using an ice bath (e.g., the mixer bowl is immersed in the ice bath), cooling coils/tubes, or a combination thereof. In a second step B, the synthesis includes adding about 90*x g potassium permanganate ($KMnO_4$) to the mixer while maintaining a second temperature of less than about 15° C. The addition of the potassium permanganate to the mixture comprising graphite and concentrated sulfuric acid at a temperature of about 0° C. initiates an exothermic (e.g., self-heated) reaction. In certain embodiments, the second temperature is maintained, for example, by the cooling coils/tubes. For example, by adding chilled water to the cooling coils/tubes (also "chiller" herein) around the mixer bowl (e.g., reaction bowl), the temperature is decreased. In certain embodiments, the second temperature is controlled or maintained by the pace at which the potassium permanganate is added (e.g., thereby controlling the heating). For example, if more heat (increased temperature) is desired, the potassium permanganate is added at a faster pace. In certain embodiments, if a cooler temperature is desired, the chiller is set to a lower temperature and/or the flow or rate of addition of the potassium permanganate is decreased. In certain embodiments, the method further comprises, in a third step C, stirring the reaction mixture (e.g., at the second temperature) in the mixer for about 45 minutes. In certain embodiments, in a fourth step D, quenching is achieved by combining the mixture with about 2.6*x kilograms (kg) ice and then adding about 75*x ml of 30% hydrogen peroxide ($H_2O_2$). In certain embodiments, the fourth step includes transferring (e.g., via the butterfly valve 113 or 213) the contents of the mixer bowl to the tank and then adding the hydrogen peroxide. In certain embodiments, the ice bath stops the reaction and/or cools the reaction. In certain embodiments, the hydrogen peroxide is added to stop the reaction. In certain embodiments, the butterfly valve allows the GO to be transferred into the water/ice tank for cooling. In certain embodiments, a fifth step (not shown) includes purifying by 5 $H_2O$ washes, followed by about 1 week of continuous-flow dialysis. In certain embodiments, x is a scaling factor of greater than or equal to about 1, 2, 4, 6, 8, 10, 12, 14, 16, 18, 20, 22, 24, 26, 28, 30, 35, 40, 45, 50, 55, 60, 65, 70, 75, 80, 85, 90, 95, 100, 200, 300, 400, 500, 600, 700, 800, 900, 1000, or more. For example, in certain embodiments, in a system comprising a tank with at least about 150 pounds of ice, x is at least about 26.

In certain embodiments, the methods, devices and systems herein are scalable. In an example, the graphite oxide synthesis method herein is performed using a tank with a volume of at least about 100 gallons. In certain embodiments, the mixer has a volume of at least about 20 quarts (5 gallons). In certain embodiments, the tank holds or contains a liquid (e.g., water and/or the reaction mixture from the mixer bowl) and at least about 150 pounds of ice. For example, in certain embodiments, raw materials other than ice are added to the reaction chamber/mixing bowl, and ice is directly added to a 100 gallon tank. In certain embodiments, final products come out at the bottom of the 100 gallon tank. In another example, the volume of the mixer is at least about 320 quarts (80 gallons) and the volume of the tank (e.g., ice tank) is at least about 1,600 gallons (e.g., the volume of the mixer and tank are each scaled by a factor of 16). In yet another example, the volume of the tank (e.g., ice tank) is at least about 3,000 gallons, 3,500 gallons or 4,000 gallons (e.g., as high as about 4,000 gallons). In certain embodiments, the tank is used with, for example, the mixer having a volume of at least about 320 quarts (80 gallons), or with a mixer having a different volume. For example, in certain embodiments, several (e.g., at least 2, 3, 4, 5, 6, 7, 8, 9, 10, 12, 14, 16, 18, 20, 25, 50, 75 or 100) mixers are used with a single large tank (e.g., see FIG. 44). In certain embodiments, the number and size/volume of mixers scale with the size/volume of the tank. For example, a tank with a volume $V_t$ is used with one or more mixers having a volume less than or equal to $V_m$, where $V_m$ is a maximum suitable mixer volume for a given $V_t$. Further, in certain embodiments, when multiple mixers are used with a single tank, the mixers have the same size/volume. In certain embodiments, when multiple mixers are used with a single tank, the mixers do not have the same size/volume. Thus, in certain embodiments, different mixer combinations are used. For example, in certain embodiments, a mixer with a volume of at least about 5 gallons or 80 gallons is used with a tank with a volume between about 100 gallons and about 4,000 gallons (e.g., alone or in combination with one or more other mixers). In some cases, one or more portions of the mixers (e.g., a motor) are shared to increase efficiency.

In certain embodiments, the devices and systems described herein are scaled up (e.g., more ice in a bigger system). In some embodiments, the scaling is the same (e.g., the scaling factor x is the same for all components). In some embodiments, different components (e.g., tank and mixer bowl) have at least about 1%, 2%, 5%, 10%, 15%, 20%, 25%, 30%, 35%, 40%, 45%, or 50% different scaling factors. In certain embodiments, different components in the first reaction system, first reaction filter, second reactions system, and/or second reaction filter are scaled up at least 5%, 10%, 20%, 30%, 40%, 50%, 60%, 70%, 80%, 90%, or 100% of sizes and/or dimensions provided herein. In certain embodiments, different components in the first reaction system, first reaction filter, second reactions system, and/or second reaction filter are scaled up at least 1, 2, 3, 4, 5, 6, 7, 8, 9, 10, 15, 20, 25, 30, 35, 40, 45, 50, 60, 70, 80, 90, 100, 150, 200, 250, 300, 350, 400, 450, 500, 600, 700, 800, 900, or 1000 times the sizes and/or dimensions provided herein. In certain embodiments, at least a portion of the components (e.g., mixer bowl) are scaled such that given dimensions and proportions stay consistent. For example, in certain embodiments, the mixer bowl or the tank has a given shape configured to achieve efficient agitation and/or mixing. In certain embodiments, such dimensions are kept consistent when scaling up such components (e.g., location and/or clearance of tank agitator blades are such that their relative position and size with respect to the tank remain approximately the same upon scaling up, or the mixing bowl shape is increased or decreased in volume without changing relative dimensions, etc.).

In certain embodiments, graphite oxide or graphene oxide (GO) comprises one or more functional groups. For example, in certain embodiments, GO comprises one or more epoxy bridges, one or more hydroxyl groups, one or more carbonyl groups, or any combination thereof. In certain embodiments, the GO comprises a level of oxidation. For example, in certain embodiments, GO comprises a Carbon to Oxygen ratio (C:O ratio) between 2.1 and 2.9.

In certain embodiments, reduced graphite oxide or reduced graphene oxide, collectively referred to herein as rGO, comprises graphene.

In certain embodiments, a carbonaceous composition comprises a given type or quality. For example, in certain embodiments, a carbonaceous composition comprises a graphite feedstock. In certain embodiments, the graphite feedstock includes various grades or purities (e.g., carbon content measured as, for example, weight-% graphitic carbon ($C_g$)), types (e.g., amorphous graphite (e.g., 60-85% carbon), flake graphite (e.g., greater than 85% carbon) or vein graphite (e.g., greater than 90% carbon)), sizes (e.g., mesh size), shapes (e.g., large flake, medium, flake, powder or spherical graphite) and origin (e.g., synthetic or natural, such as, for example, natural flake graphite). In certain embodiments, such characteristic(s) (e.g., physical and chemical properties) affect the type or quality of the oxidized form of the carbonaceous composition. For example, in certain embodiments, the mesh size of the graphite affects the resulting GO. In certain embodiments, the graphite has a grade or carbon content of at greater than or equal to about 1%, 2%, 5%, 10%, 15%, 20%, 30%, 40%, 50%, 60%, 70%, 80%, 90%, 91%, 92%, 93%, 94%, 95%, 96%, 97%, 98%, 99% or 100% (e.g., by weight). In certain embodiments, the graphite has a grade or carbon content of at less than about 100%, 99%, 98%, 97%, 96%, 95%, 94%, 93%, 92%, 91%, 90%, 85%, 80%, 70%, 60%, 50%, 40%, 30%, 20%, 15%, 10%, 5%, 2% or 1% (e.g., by weight). In certain embodiments, the graphite has such grades or carbon contents at a mesh size of greater than or equal to about −200, −150, −100, −80, −50, −48, +48, +80, +100, +150 or +200 mesh size.

In certain embodiments, a carbonaceous composition is processed into one or more types of oxidized form(s) of the carbonaceous composition. For example, in certain embodiments, different oxidized forms or different types of the same oxidized form are generated depending on reaction conditions and/or configuration/operation of the devices and systems herein (e.g., as a result of how the machine in FIG. 1 works). In some embodiments, such factors influence the resulting synthesis product alone or in combination with the feedstock type or quality (e.g., graphite input specifications). In an example, graphite feedstock is transformed to single-layer GO or multi-layer GO. In certain embodiments, the two types of GO have different properties and/or end products/uses. In certain embodiments, the properties include, for example, physicochemical properties and/or performance characteristics (e.g., conductivity or purity). For example, in certain embodiments, single-layer GO and multi-layer GO have different conductive properties.

In certain embodiments, end products/uses for single-layer GO and multi-layer GO, or materials derived therefrom (e.g., ICCN, graphene, etc.), include, for example, energy conversion/storage (e.g., (super)capacitors, batteries, fuel cells, photovoltaics or thermoelectrics), catalysis, sensing (e.g., chemical and biological sensing), scaffolds/support, nanofillers, lightweighting and structural materials (e.g., graphene chassis/parts or turbine blades), optical electronics (e.g., touchscreens), semiconductors (e.g., graphene combined with molybdenite ($MoS_2$)), information storage, transparent materials, superconductors (e.g., graphene interspersed with magnesium diboride ($MgB_2$)), medical treatment and/or biochemical assays (e.g., DNA analysis), non-linear optical materials, filtration and/or water purification, coatings, paper (e.g., graphene oxide paper), lenses, and so on. In an example, in certain embodiments, end products/uses for single-layer GO include hybrid supercapacitors and/or lithium-ion batteries, and end products/uses for multi-layer GO includes high density supercapacitors. In certain embodiments, the GO is further transformed or processed prior to such uses. In certain embodiments, when a given GO feedstock is further processed, the resulting material(s) have certain physicochemical and/or performance characteristics. For example, in certain embodiments, GO is used as a feedstock for manufacture of graphene, interconnected corrugated carbon-based networks (ICCNs) (each comprising a plurality of expanded and interconnected carbon layers), or other materials derived from GO (e.g., graphene in conjunction with other two-dimensional crystals (e.g., boron nitride, niobium diselenide or tantalum (IV) sulphide), graphene or ICCN composite materials, etc.). In certain embodiments, the resulting material has different properties (e.g., capacitance during end use in a capacitor, characteristics during end use in a battery, etc.) that depend on the type of GO feedstock. In certain embodiments, the end products/uses herein include, for example, end products/uses of graphene oxide and/or various rGOs (e.g., graphene).

In certain embodiments, the method for synthesis (e.g., the method of FIG. 6) comprises providing a carbonaceous composition and producing a first oxidized form of the carbonaceous composition by a first transformation of the carbonaceous composition over a first time period. In certain embodiments, the first time period is equal to or less than about 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 250, 300, 350, 400, 450, or 500 minutes. In certain embodiments, a first time period is about 10 minutes to about 20 minutes, about 10 minutes to about 30 minutes, about 10 minutes to about 40 minutes, about 10 minutes to about 50 minutes, about 10 minutes to about 60 minutes, about 10 minutes to about 70 minutes, about 10 minutes to about 80 minutes, about 10 minutes to about 90 minutes, about 10 minutes to about 100 minutes, about 20 minutes to about 30 minutes, about 20 minutes to about 40 minutes, about 20 minutes to about 50 minutes, about 20 minutes to about 60 minutes, about 20 minutes to about 70 minutes, about 20 minutes to about 80 minutes, about 20 minutes to about 90 minutes, about 20 minutes to about 100 minutes, about 30 minutes to about 40 minutes, about 30 minutes to about 50 minutes, about 30 minutes to about 60 minutes, about 30 minutes to about 70 minutes, about 30 minutes to about 80 minutes, about 30 minutes to about 90 minutes, about 30 minutes to about 100 minutes, about 40 minutes to about 50 minutes, about 40 minutes to about 60 minutes, about 40 minutes to about 70 minutes, about 40 minutes to about 80 minutes, about 40 minutes to about 90 minutes, about 40 minutes to about 100 minutes, about 50 minutes to about 60 minutes, about 50 minutes to about 70 minutes, about 50 minutes to about 80 minutes, about 50 minutes to about 90 minutes, about 50 minutes to about 100 minutes, about 60 minutes to about 70 minutes, about 60 minutes to about 80 minutes, about 60 minutes to about 90 minutes, about 60 minutes to about 100 minutes, about 70 minutes to about 80 minutes, about 70 minutes to about 90 minutes, about 70 minutes to about 100 minutes, about 80 minutes to about 90 minutes, about 80 minutes to about 100 minutes, about 90 minutes to about 100 minutes, about 100 minutes to about 150 minutes, about 100 minutes to about 200 minutes, about 100 minutes to about 250 minutes, about 100 minutes to about 300 minutes, about 100 minutes to about 350 minutes, about 100 minutes to about 400 minutes, about 100 minutes to about 450 minutes, about 100 minutes to about 500 minutes, about 150 minutes to about 200 minutes, about 150 minutes to about 250 minutes, about 150 minutes to about 300 minutes, about 150 minutes to about 350 minutes, about 150 minutes to about 400 minutes, about 150 minutes to about 450 minutes, about 150 minutes to about 500 minutes, about 200 minutes to about 250 minutes, about 200 minutes to about 300 minutes, about 200 minutes to about 350 minutes, about 200 minutes to about 400 minutes, about 200 minutes to about 450 minutes, about 200 minutes to about 500 minutes, about 250 minutes to about 300 minutes, about 250 minutes to about 350 minutes, about 250 minutes to about 400 minutes, about 250 minutes to about 450 minutes, about 250 minutes to about 500 minutes, about 300 minutes to about 350 minutes, about 300 minutes to about 400 minutes, about 300 minutes to about 450 minutes, about 300 minutes to about 500 minutes, about 350 minutes to about 400 minutes, about 350 minutes to about 450 minutes, about 350 minutes to about 500 minutes, about 400 minutes to about 450 minutes, about 400 minutes to about 500 minutes, or about 450 minutes to about 500 minutes. In certain embodiments, a method for synthesis comprises providing a carbonaceous composition and producing a second oxidized form of the carbonaceous composition by a second transformation of the carbonaceous composition over a second time period. In certain embodiments, a difference between a method for producing a first oxidized form and a method for producing a second oxidized form comprises a difference in the duration of the time period (e.g. duration difference between the first and second time periods). In certain embodiments, a capacitor comprising the first oxidized form of the carbonaceous composition has at least about 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 120, 140, 160, 180 or 200 times greater capacitance than when comprising a second oxidized form of the carbonaceous composition produced by a second transformation of the carbonaceous composition over a second time period that is at least about 2, 3, 4, 5, 6, 7, 8, 9, 10, 11, 12, 13, 14, 15, 16, 17, 18, 19, 20, 25, 30, 35, 40, 45, or 50 times longer than the first time period. In certain embodiments, a capacitor comprising the first oxidized form of the carbonaceous composition has a greater capacitance than when comprising a second oxidized form of the carbonaceous composition produced by a second transformation of the carbonaceous composition over a second time period that is longer than the first time period over a range of reaction conditions. In certain embodiments, a capacitor comprising the first oxidized form of the carbonaceous composition has at least about 2 times greater capacitance than when comprising a second oxidized form of the carbonaceous composition produced by a second transformation of the carbonaceous composition over a second time period that is at least about 5 times longer than the first time period. In certain embodiments, a capacitor comprising the first oxidized form of the carbonaceous composition has at least about 10 times greater capacitance than when comprising the second oxidized form of the carbonaceous composition. In certain embodiments, a capacitor comprising the first oxidized form of the carbonaceous composition has at least about 50 times greater capacitance than when comprising the second oxidized form of the carbonaceous composition. In certain embodiments, the second time period is at least about 8 times longer than the first time period. In certain embodiments, the capacitance is at least about 10 times greater over a range of reaction conditions. In certain embodiments, the method further comprises tuning the reaction conditions to further increase the capacitance. In certain embodiments, a time period (e.g., a first or second time period) for a transformation (e.g., a reaction) ends when the reaction is quenched (e.g., when ice and hydrogen peroxide are added to an oxidation reaction comprising a carbonaceous composition, sulfuric acid, and potassium permanganate).

In certain embodiments, aspects of the disclosure described in relation to an oxidized form of the carbonaceous composition equally apply to a material derived from the oxidized form of the carbonaceous composition at least in some configurations, and vice versa. In an example, in certain embodiments, a capacitor (e.g., a double layer capacitor/supercapacitor) comprising the first oxidized form of the carbonaceous composition or a material derived therefrom (e.g., a reduced form of the first oxidized carbonaceous composition) has at least about 2, 5, 10, 15, 20, 25, 30, 35, 40, 45, 50, 55, 60, 65, 70, 75, 80, 85, 90, 95, 100, 120, 140, 160, 180 or 200 times greater capacitance than when comprising the second oxidized form of the carbonaceous composition or a material derived therefrom (e.g., a reduced form of the second oxidized carbonaceous composition). In another example, in certain embodiments, an apparatus of the disclosure forms an oxidized form of a carbonaceous composition and/or a material derived therefrom (e.g., a reduced form of the oxidized carbonaceous composition) at a rate of greater than or equal to about 100 grams (g) per year, 200 g per year, 500 g per year, 750 g per year, 1 kilogram (kg) per year, 10 kg per year, 25 kg per year, 50 kg per year, 75 kg per year, 0.1 tpy, 0.2 tpy, 0.3 tpy, 0.4 tpy, 0.5 tpy, 0.6 tpy, 0.7 tpy, 0.8 tpy, 0.9 tpy, 1 tpy, 2 tpy, 3 tpy, 4 tpy, 5 tpy, 10 tpy, 25 tpy, 50 tpy, 75 tpy, 100 tpy, 200 tpy, 500 tpy, 750 tpy, 1,000 tpy (1 ktpy), 2,000 tpy, 3,000 tpy, 4,000 tpy, 5,000 tpy, 6,000 tpy, 7,000 tpy, 8,000 tpy, 9,000 tpy, 10,000 tpy or more.

In certain embodiments, a capacitor comprising electrodes comprising a graphite oxide, graphene oxide, or a material derived therefrom synthesized according to the systems and methods described herein provides a peak capacitance of at least about 10, 20, 30, 40, 50, 60, 70, 80, 90, 100, 110, 120, 130, 140, 150, 160, 170, 180, 190, 200, 250, 300, 350, 400, 450, 500, 550, 600, 650, 700, 750, 800, 850, 900, 950, or 1000 mF/cm$^2$ at a scan rate of about 1, 2, 3, 4, 5, 6, 7, 8, 9, 10, 11, 12, 13, 14, 15, 16, 17, 18, 19, 20, 25, 30, 35, 40, 45, or 50 mV/s. In certain embodiments, a capacitor comprising electrodes comprising a reduced graphene oxide or reduced graphite oxide synthesized according to the systems and methods described herein provides a peak capacitance of at least about 10, 20, 30, 40, 50, 60, 70, 80, 90, 100, 110, 120, 130, 140, 150, 160, 170, 180, 190, 200, 250, 300, 350, 400, 450, 500, 550, 600, 650, 700, 750, 800, 850, 900, 950, or 1000 mF/cm$^2$ at a scan rate of about 1, 2, 3, 4, 5, 6, 7, 8, 9, 10, 11, 12, 13, 14, 15, 16, 17, 18, 19, 20, 25, 30, 35, 40, 45, or 50 mV/s. In certain embodiments, a capacitor comprising electrodes comprising a graphite oxide, graphene oxide, or a material derived therefrom synthesized according to the systems and methods described herein provides a peak capacitance of at least about 200 mF/cm$^2$ at a scan rate of about 10 mV/s. In certain embodiments, a capacitor comprising electrodes comprising the reduced graphite oxide or reduced graphene oxide synthesized according to the systems and methods described herein provides a peak capacitance of at least about 200 mF/cm$^2$ at a scan rate of about 10 mV/s. In certain embodiments, a device comprising an electrode comprising the graphite oxide, graphene oxide, or a material derived therefrom synthesized according to the systems and methods described herein provides at least about 56 times greater capacitance than a device comprising graphite oxide, graphene oxide, or a material derived therefrom synthesized using a different system or method. In certain embodiments, a device comprising an electrode comprising the reduced graphite oxide or reduced graphene oxide synthesized according to the systems and methods described herein provides at least about 56 times greater capacitance than a device comprising reduced graphite oxide or reduced graphene oxide synthesized using a different system or method. In certain embodiments, the device is a capacitor (e.g., a supercapacitor).

In certain embodiments, the carbonaceous composition comprises graphite. In certain embodiments, the first oxidized form of the carbonaceous composition comprises graphite oxide or graphene oxide. In certain embodiments, the second oxidized form of the carbonaceous composition comprises graphite oxide or graphene oxide. In certain embodiments, the method further comprises reducing the first oxidized form of the carbonaceous composition back to the carbonaceous composition or to another de-oxidized carbonaceous composition substantially similar to or different from the carbonaceous composition (e.g., rGO).

Figure 7:
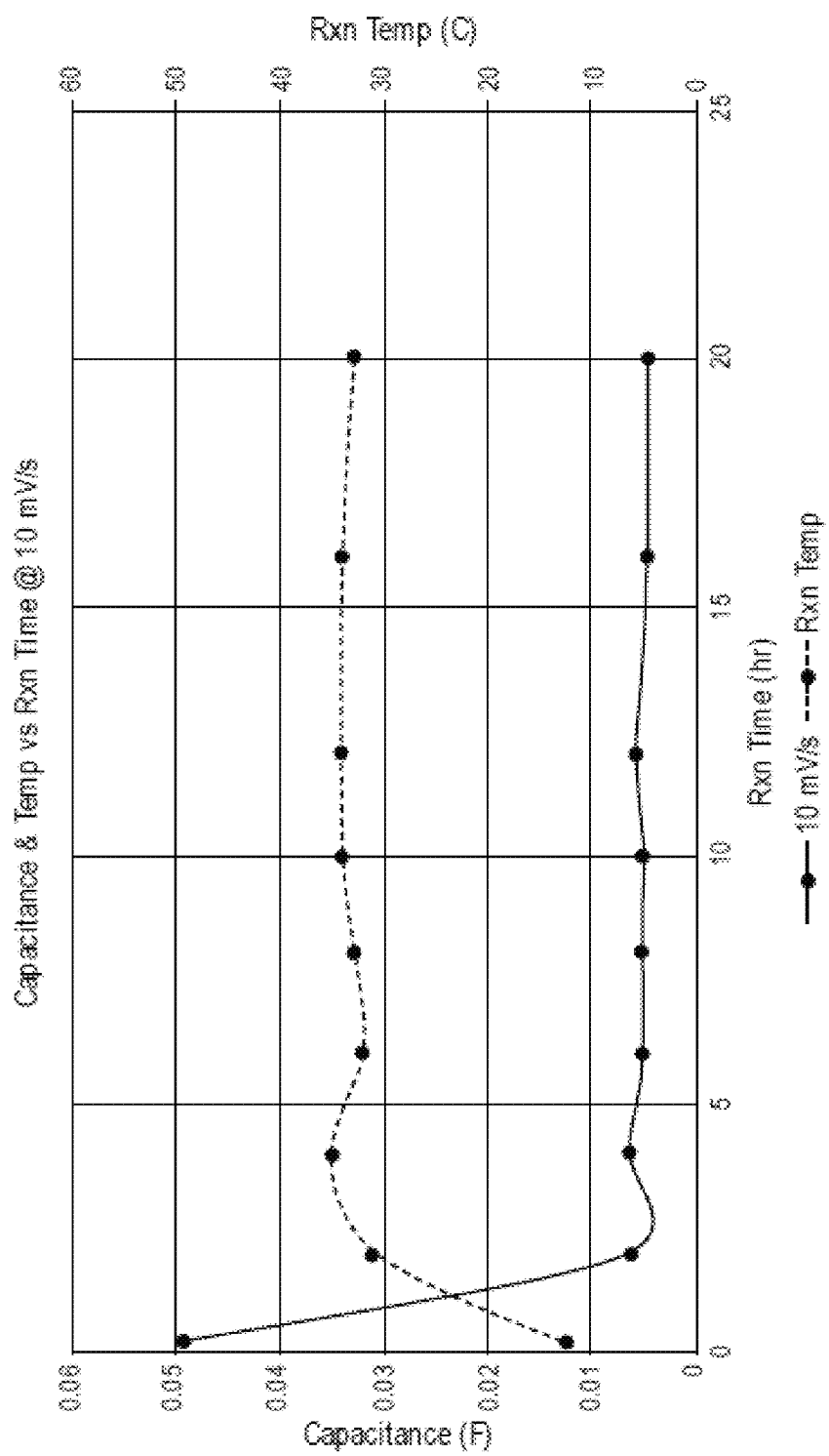
FIG. 7 shows an example of a measurement of capacitance versus reaction time.

FIG. 7 shows an example of a measurement of capacitance versus reaction time. Reaction conditions included: 6× mass ratio Ox:Gr, self-heated (exothermic), 0-20 hours. Peak capacitance at 10 mV/s was 49 mF/cm$^2$ at 20 minutes. In this example, allowing the reaction to self-heat and proceed for an extended period of time produces devices with lower capacitances over that time. In some embodiments, during the first transformation, increasing a time during which a self-heated reaction is allowed to proceed decreases maximum capacitance over that time.

In some embodiments, the self-heated reaction is initiated by adding potassium permanganate (KMnO$_4$) to a mixture comprising graphite and concentrated sulfuric acid at a temperature of about 0° C.

Figure 8:
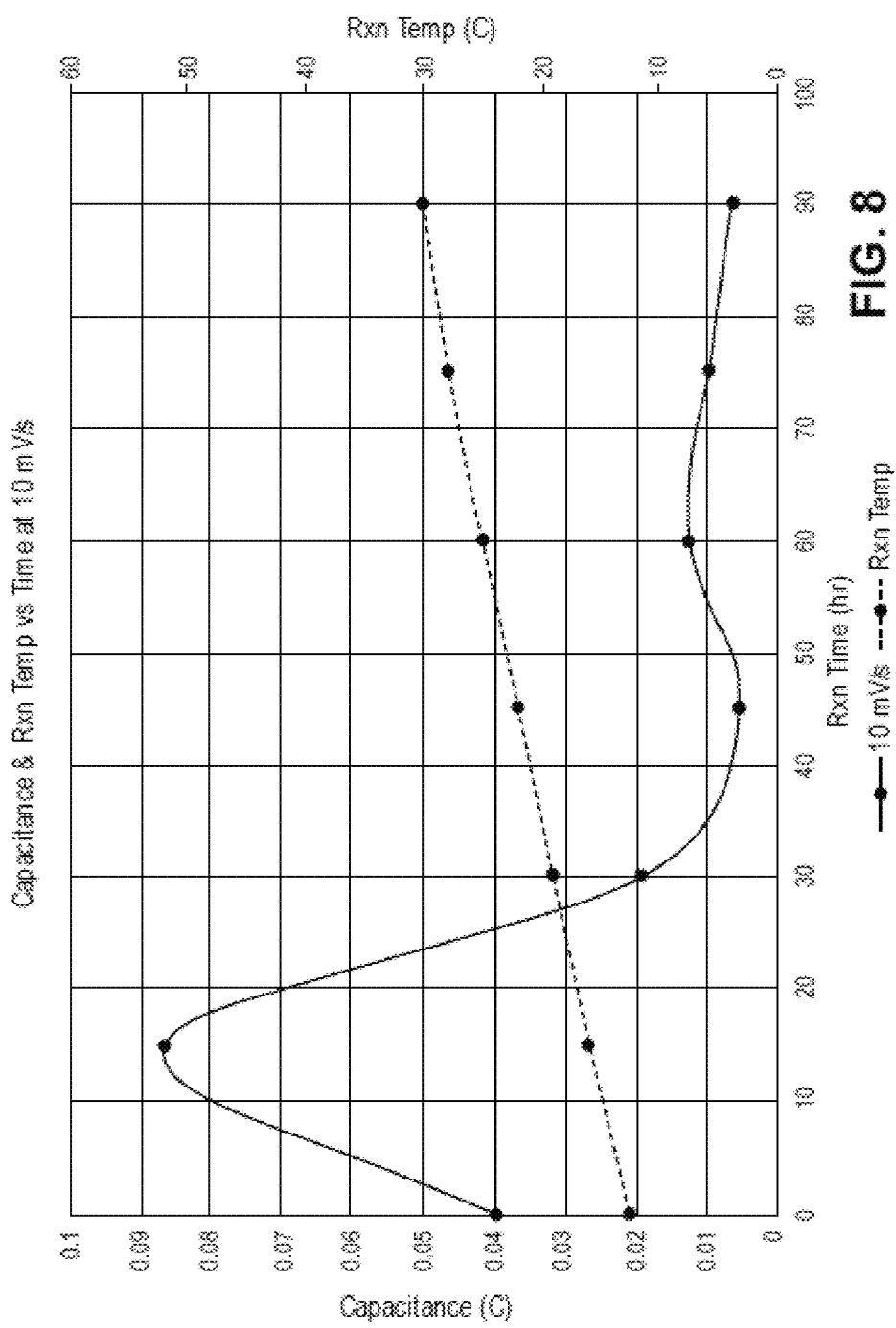
FIG. 8 shows another example of a measurement of capacitance versus reaction time.

FIG. 8 shows another example of a measurement of capacitance versus reaction time. Reaction conditions included: 6× mass ratio Ox:Gr, self-heated (exothermic), 0-2 hours. Peak capacitance at 10 mV/s was 87 mF/cm$^2$ at 15 minutes. In this example, shorter reaction times lead to higher capacitances by retaining a more pristine sp2 structure of graphene with less oxidative damage. In some embodiments, during the first transformation, decreasing a reaction time of an at least partially self-heated reaction increases maximum capacitance by retaining a more suitable structure of the carbonaceous composition with less oxidative damage.

Figure 9:
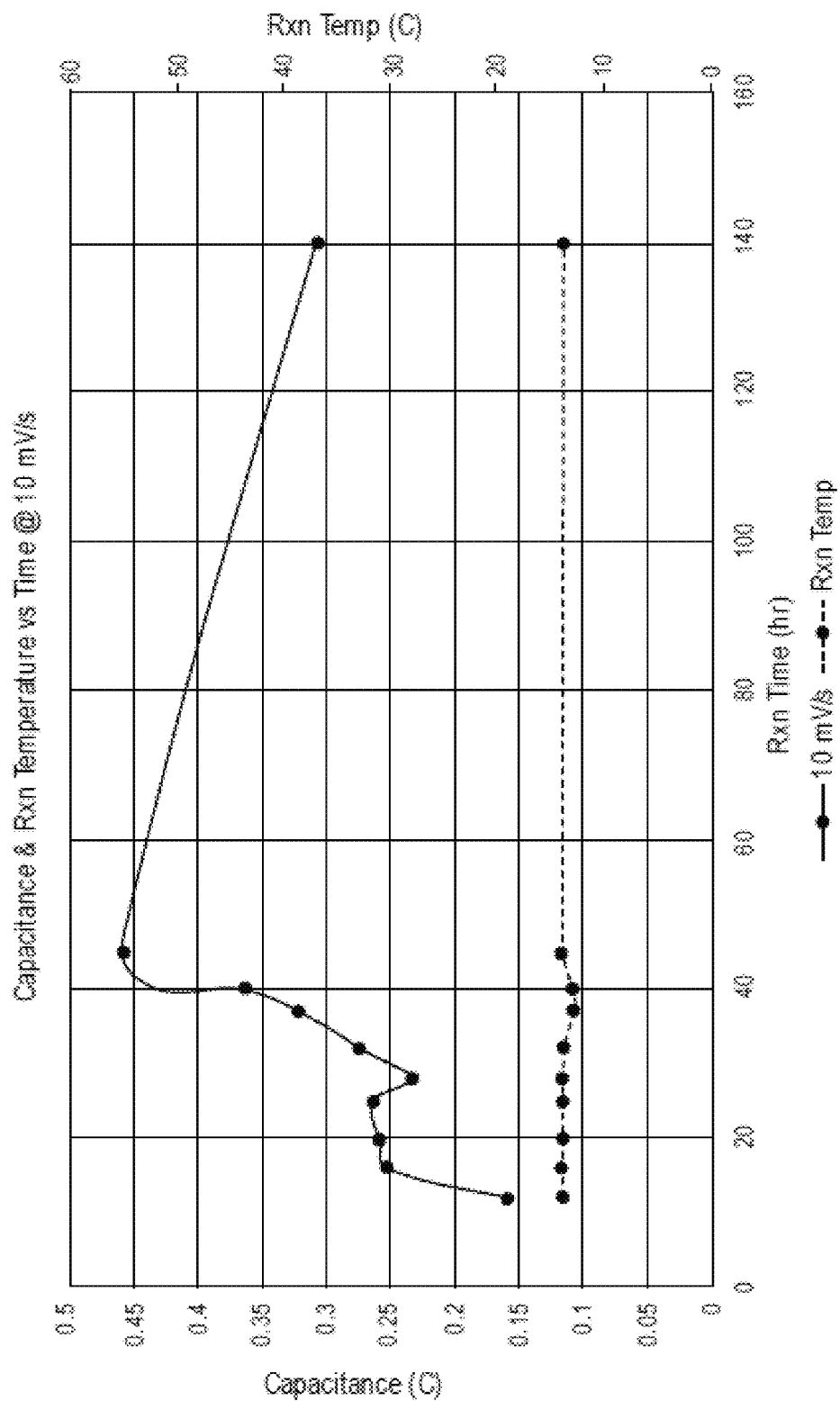
FIG. 9 shows yet another example of a measurement of capacitance versus reaction time.

FIG. 9 shows yet another example of a measurement of capacitance versus reaction time. Reaction conditions included: 6× mass ratio Ox:Gr, cooled by ice bath, 0-2 hours. Peak capacitance at 10 mV/s was 459 mF/cm$^2$ at 45 minutes. In this example, colder reaction temperatures leads to a greater window of opportunity to quench the reaction at the right time. In some embodiments, during the first transformation, decreasing a reaction temperature leads to a greater window of opportunity to quench the reaction at a suitable time. In certain embodiments, the method further comprises decreasing the reaction temperature through cooling by an ice bath. In certain embodiments, a reaction run below ambient reaction temperature (i) shows improved capacitance over a short period of time, (ii) leads to a safer, more controlled reaction, or (iii) a combination thereof. In certain embodiments, the ambient reaction temperature is the reaction temperature at ambient conditions.

Figure 10:
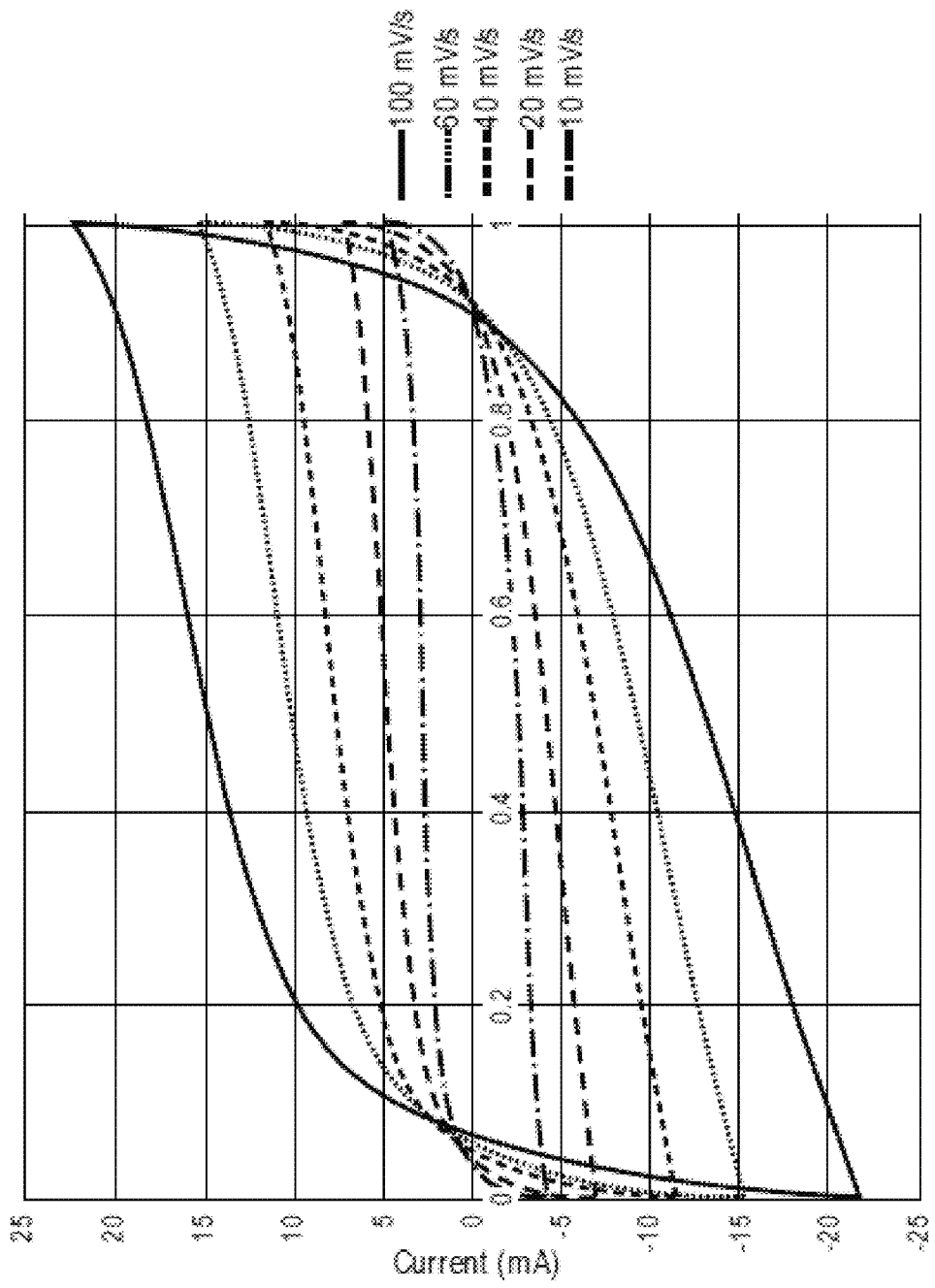
FIG. 10 shows cyclic voltammetry (CV) scans of a double layer device constructed from the sample in FIG. 9.

FIG. 10 shows cyclic voltammetry (CV) scans of a double layer device (double layer capacitor) constructed from the sample in FIG. 9. Exemplary measurement values at various scan rates are listed in TABLE 2.

TABLE 2

| Scan Rate (mV/s) | Capacitance (mF) | Specific Capacitance (F/g) |
|---|---|---|
| 10 | 229 | 265 |
| 20 | 192 | 223 |
| 40 | 159 | 185 |
| 60 | 140 | 164 |
| 100 | 118 | 137 |

Figure 11A:
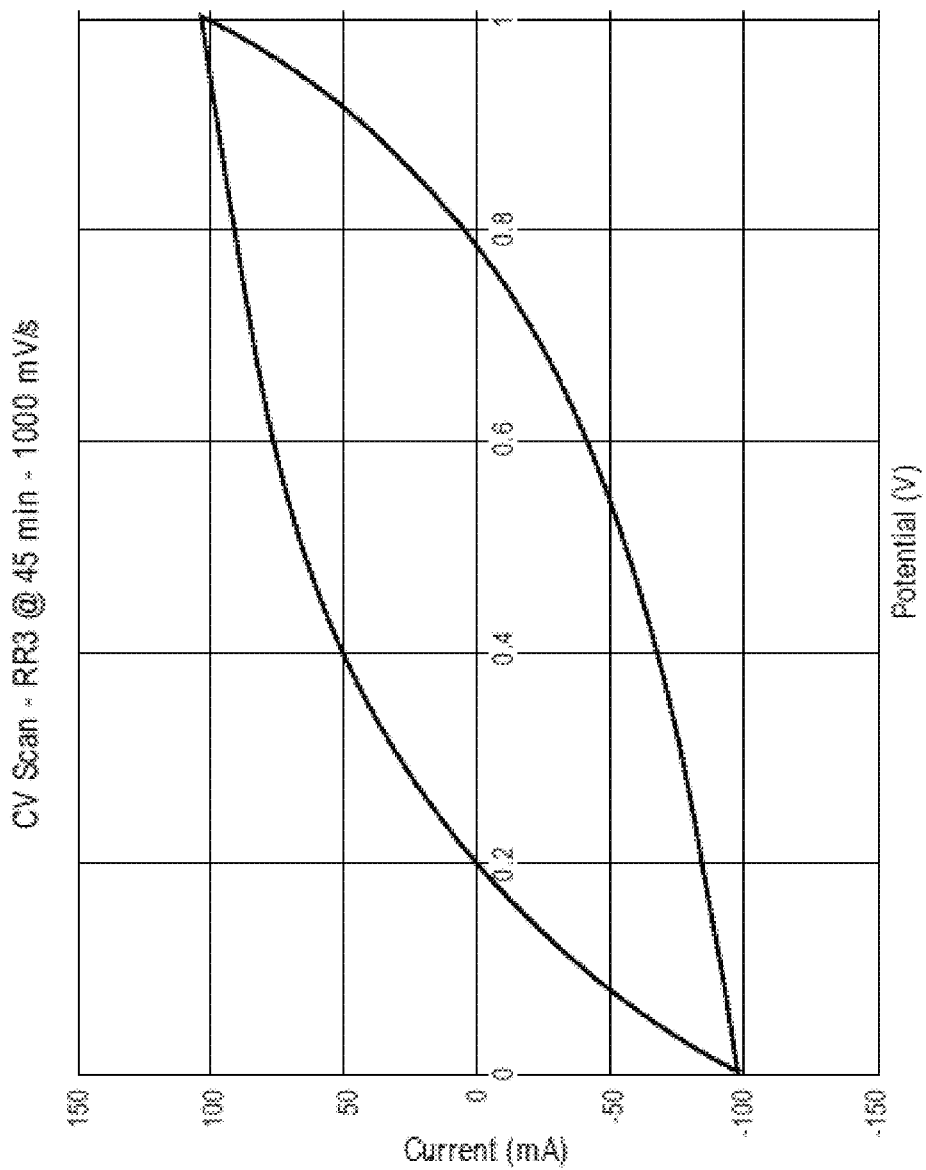
FIGS. 11A-11B provide a comparison of cyclic voltammetry (CV) scans.
Figure 11B:
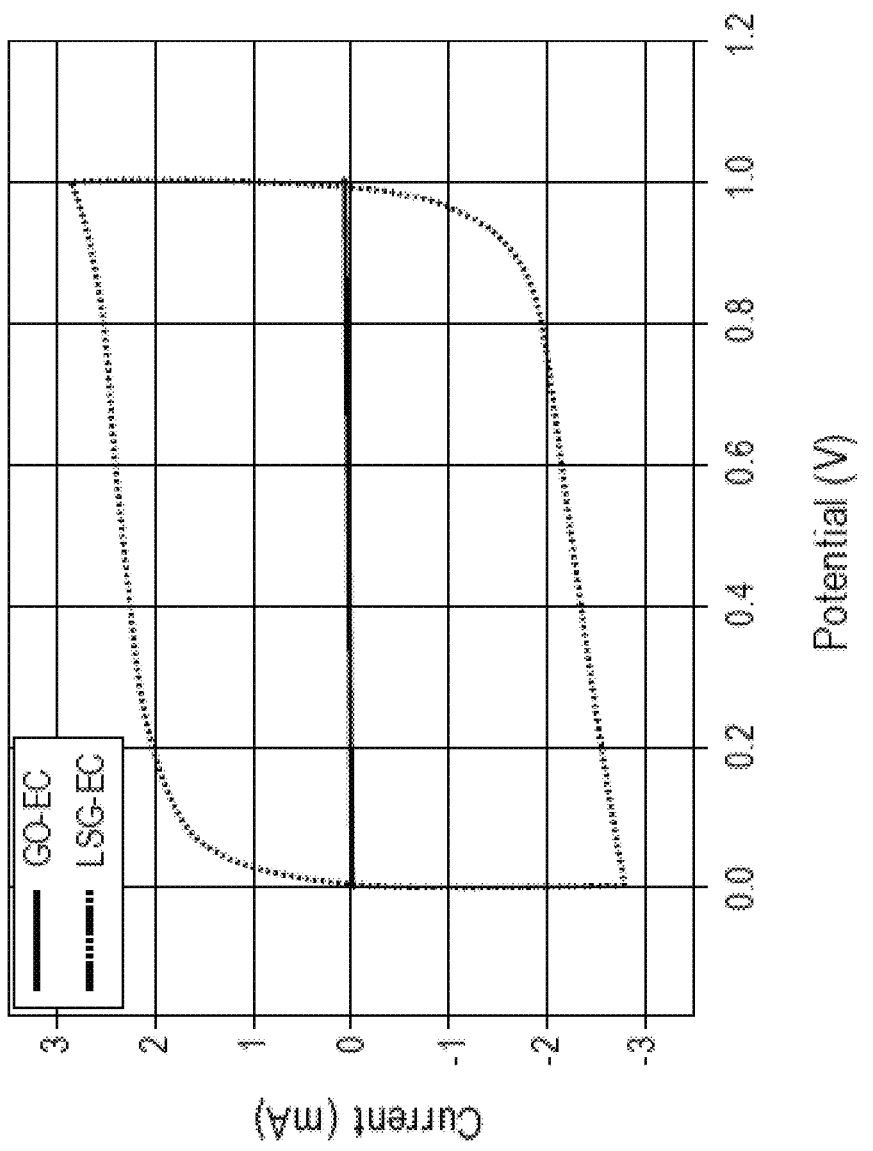

FIGS. 11A-11B provide a comparison of a cyclic voltammetry (CV) scan of a double layer device (double layer capacitor) constructed from the sample in FIG. 9 at a scan rate of 1000 mV/s (FIG. 11A) with results of El-Kady M. F., et al., "Laser scribing of high-performance and flexible graphene-based electrochemical capacitors," Science, 335 (6074), 1326 (2012), incorporated by reference herein with respect to the relevant portions therein (FIG. 11B). The device in FIG. 11A comprises one or more electrodes comprising a material derived from GO manufactured as described herein (e.g., in accordance with the method in FIG. 6). In certain embodiments, the device in FIG. 11A has a capacitance (e.g., peak capacitance at 1000 mV/s) that is at least about 35 times greater than a capacitance (e.g., peak capacitance at 1000 mV/s) of the device in FIG. 11B. Other examples of enhanced capacitances using materials manufactured in accordance with the present disclosure are provided elsewhere herein.

Figure 12:
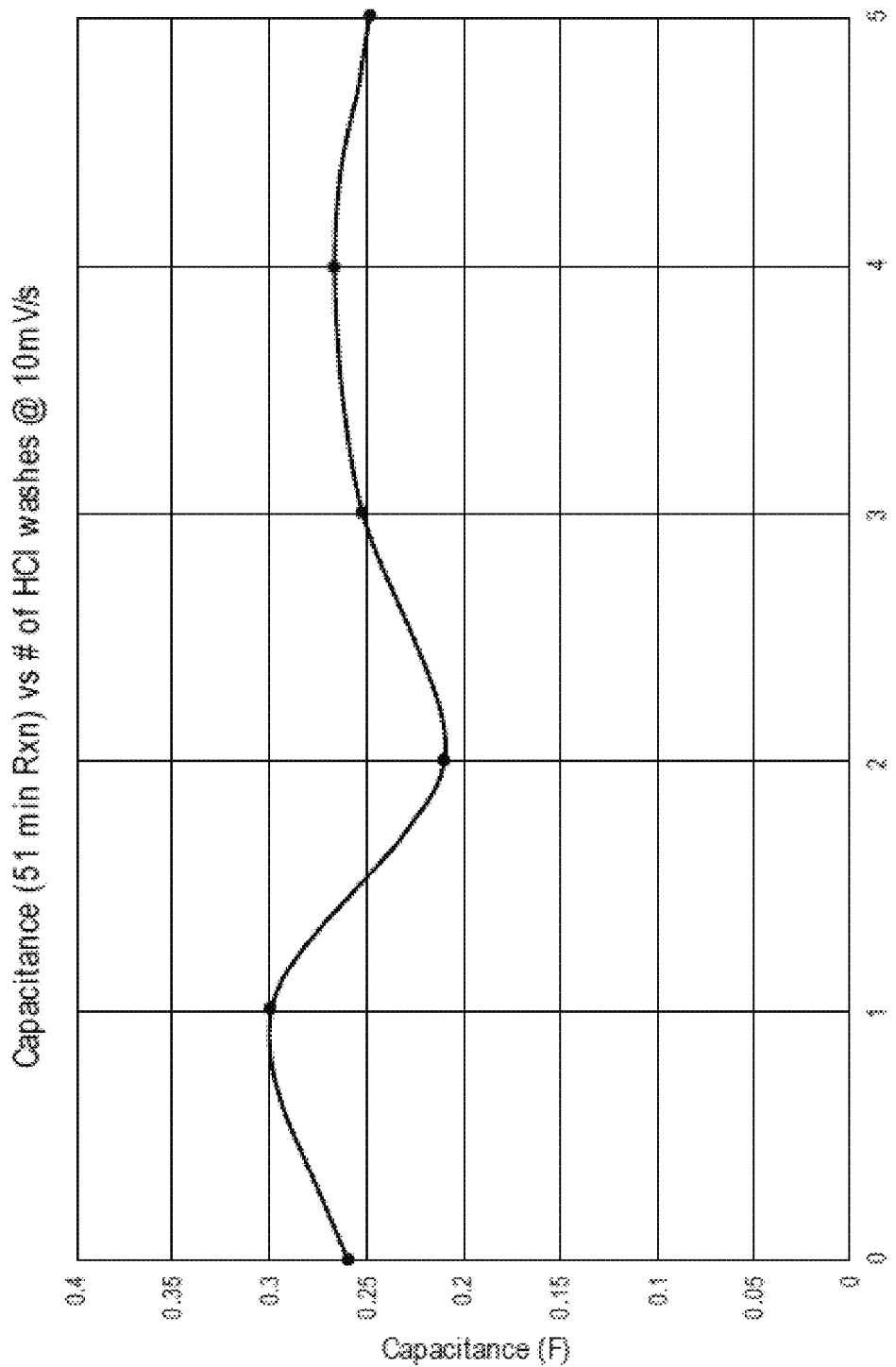
FIG. 12 shows capacitance as a function of number of hydrochloric acid (HCl) washes.

FIG. 12 shows capacitance as a function of number of hydrochloric acid (HCl) washes. In this example, comparing the effects of washing the product (e.g., of the method of FIG. 6) with between 0-5 HCl washes shows that HCl washes are unnecessary. Reaction conditions included: 6× mass ratio Ox:Gr, cooled by ice bath, 0-1 hour, variable HCl washes. Peak capacitance at 10 mV/s was 261 mF/cm$^2$ at 31 minutes. An 11% variation in capacitance between all numbers of washes with no visible trend was observed.

In certain embodiments, a method for synthesis (e.g., the method of FIG. 6) comprises providing graphite, and transforming the graphite to graphite oxide without the aid of hydrochloric acid at least about 1, 2, 3, 4, 5, 6, 7, 8, 9, or 10 times faster than with the aid of hydrochloric acid. In certain embodiments, a method for synthesis comprises providing graphite, and transforming the graphite to graphite oxide without the aid of hydrochloric acid at least about 2 times faster than with the aid of hydrochloric acid. In some embodiments, the method comprises transforming the graphite to graphite oxide without the aid of hydrochloric acid at least about 5 times faster than with the aid of hydrochloric acid. In some embodiments, the method comprises transforming the graphite to graphite oxide without the aid of hydrochloric acid at least about 8 times faster than with the aid of hydrochloric acid.

In certain embodiments, the method comprises synthesizing graphite oxide at least about 1, 2, 3, 4, 5, 6, 7, or 8 times faster than modified Hummers method. In certain embodiments, the method comprises synthesizing graphite oxide at least about 8 times faster than modified Hummers method. In certain embodiments, the graphite oxide is synthesized in less or equal to about 1 week. In certain embodiments, the method produces less waste per mass graphite oxide produced than modified Hummers method. In certain embodiments, the method produces repeatable results. In certain embodiments, the graphite oxide is synthesized without air drying.

In some embodiments, hydrochloric acid is not consumed in the synthesis of the graphite oxide herein. In certain embodiments, hydrochloric acid washes used for purification by modified Hummers method are eliminated, thereby leading to faster purification compared to the modified Hummers method. In certain embodiments, subjecting the graphite oxide to one or more hydrochloric acid washes has substantially no effect on capacitance. In certain embodiments, removal of hydrochloric acid from purification steps shows no loss of capacitance, significantly reduce cost of the graphite oxide, expedite purification procedure, or any combination thereof. In certain embodiments, the method comprises synthesizing graphite oxide at a cost per mass of graphite oxide of at least about 1, 2, 3, 4, 5, 6, 7, 8, 9, or 10 times less than modified Hummers method. In one example, the method comprises synthesizing graphite oxide at a cost per mass of graphite oxide of at least about 4 times less than modified Hummers method.

In certain embodiments, the method comprises a set of exact steps that lead to acceptable and reproducible synthesis product each time the synthesis is performed. In certain embodiments, the method allows human error and/or reliance on human judgement to be reduced by eliminating one or more synthesis steps associated therewith. In certain embodiments, the human error and/or reliance on human judgement is associated with controlling a rate of addition of water and/or ice over time.

In certain embodiments, the method comprises synthesizing graphite oxide at an average or maximum temperature of (i) less than about 45° C. or (ii) at least about 30° C. less than an average or maximum temperature used in modified Hummers method. In certain embodiments, the reduced average or maximum temperature reduces a risk of explosion, thereby increasing safety.

In certain embodiments, a batch of graphite oxide (e.g., 1 g of graphite oxide) is produced by: (a) adding 15 g graphite to 750 ml concentrated sulfuric acid at a first temperature of about 0° C., wherein the first temperature is maintained using an ice bath; (b) adding 90 g potassium permanganate (KMnO$_4$) while maintaining a second temperature of less than about 15° C.; (c) stirring the mixture in (b) for about 45 minutes; (d) quenching by adding the mixture in (c) to 2.6 kg ice and then adding 75 ml of 30% H$_2$O$_2$; and (e) purifying by 5 H$_2$O washes, followed by about 1 week of continuous-flow dialysis. In certain embodiments, the addition in (b) leads to an exothermic reaction.

In certain embodiments, the methods herein includes procedures of making oxidized forms of carbonaceous compositions, procedures of making materials derived from the oxidized forms of carbonaceous compositions, or both. For example, in certain embodiments, the methods herein includes procedure(s) of making both GO and graphene/reduced graphite oxide. In certain embodiments, GO is formed from graphite in a first reaction. In certain embodiments, the first reaction includes an oxidation (e.g. oxidation reaction). In certain embodiments, the GO is treated (e.g., filtered/purified, concentrated if end product, etc.). In certain embodiments, the GO is reduced (e.g., to graphene, ICCN, or any other materials derived through reduction of GO) in a second reaction. In certain embodiments, the second reaction includes a reduction. For example, in certain embodiments, the GO is reduced to form graphene and/or other reduced forms of GO, collectively referred to herein as reduced graphite oxide (rGO). In certain embodiments, rGO includes reduced forms graphite oxide and/or graphene oxide. In certain embodiments, any aspects of the disclosure described in relation to graphene equally apply to rGO at least in some configurations, and vice versa. In certain embodiments, the rGO (e.g., graphene) is treated.

In some embodiments, single-layer GO is manufactured. In certain embodiments, the manufacture or method (e.g., first reaction) uses about 32 liters (L) 98% sulfuric acid per kg graphite. In certain embodiments, about 4.8 kg potassium permanganate powder per kg graphite is used. In certain embodiments, the method includes include cooking time. In certain embodiments, the method does not include cooking time. In certain embodiments, the method includes given temperatures and process(es). In certain embodiments, the method includes, from the beginning of the reaction, about 1.5 hour of addition of potassium permanganate (reaction temperature less than about 15° C.), about 2 hours of reaction time (reaction temperature range of about 20-30° C.), about 1 hour of addition of about 32 kg ice (reaction temperature of about 50° C.) and about 1 hour reaction time (reaction temperature of about 50° C.). In certain embodiments, about 72 kg ice per kg graphite is used to quench reaction and/or for ice for reaction cooling. In certain embodiments, about 2 L 30% hydrogen peroxide per kg of graphite is used to quench reaction and/or for neutralizing. In certain embodiments, the graphite is a given type. In certain embodiments, the graphite comprises 325sh natural flake graphite. In certain embodiments, mixing speed (e.g., during one or more reaction processes) is about 100 rpm. In certain embodiments, the method includes timing the mixing of ingredients. In certain embodiments, sulfuric acid and graphite are premixed to minimize graphite dust and then added to the reactor rapidly. In certain embodiments, the addition of potassium permanganate results in an exothermic reaction. In certain embodiments, the potassium permanganate is added at a rate slow enough to keep the reaction temperature below about 15° C. (e.g., the potassium permanganate is added over approximately 1.5 hours). In certain embodiments, the potassium permanganate is added at a rate slow enough in combination with a cooling mechanism (e.g. cooling pipes and/or addition of ice) to keep the reaction temperature below about 15° C.

In some embodiments, multi-layer GO is manufactured. In certain embodiments, manufacture or method (e.g., first reaction) uses about 25 L 98% sulfuric acid per kg graphite. In certain embodiments, about 2 kg potassium permanganate per kg graphite oxide is used. In certain embodiments, the method includes cooking time. In certain embodiments, the method does not include cooking time. In certain embodiments, method includes given temperatures and process(es). In certain embodiments, method includes addition of potassium permanganate over 45 minutes (reaction temperature less than about 15° C.) and a 30 minute reaction time (reaction temperature of about 15° C.). In certain embodiments, about 125 kg ice per kg graphite is used to quench reaction and/or for ice for reaction cooling. In certain embodiments, about 1 L 30% hydrogen peroxide per kg of graphite is used to quench reaction and/or for neutralizing. In certain embodiments, graphite is a given type. In certain embodiments, graphite is highly exfoliated and milled, small flake, large surface area graphite, 9 micron flakes, or any combination thereof. In certain embodiments, mixing speed (e.g., during one or more reaction processes) is about 100 rpm. In certain embodiments, the method includes timing the mixing of ingredients. In certain embodiments, sulfuric acid and graphite are premixed to minimize graphite dust and then added to the reactor rapidly. In certain embodiments, addition of potassium permanganate results in an exothermic reaction. In certain embodiments, the potassium permanganate is added at a rate slow enough to keep the reaction temperature below about 15° C. (e.g., the potassium permanganate is added over approximately 1.5 hours).

In certain embodiments, a first filtration is performed after the first reaction. In certain embodiments, the first filtration includes post-oxidation purification. In certain embodiments, the purpose or goal of the first filtration (e.g., regardless it how it is done) is to remove impurities from the crude product and bring the pH up to at least about 5. In certain embodiments, the after oxidation (reaction 1), the crude product contains GO as well as one or more (e.g., several) impurities such as, for example, sulfuric acid, manganese oxides and manganese sulfate. In certain embodiments, after purification is complete, the GO is then concentrated to, for example, a solution of about 1% by weight. In certain embodiments, water and/or acid from first reaction is removed during filtration. In certain embodiments, after the first reaction, the acid concentration is about 30% (single-layer) or about 16% (multi-layer) sulfuric acid, corresponding to a pH of approximately 0. In certain embodiments, filtration is complete when the pH reaches about 5, corresponding to an acid concentration of about 0.00005%. In certain embodiments, a given amount or degree of concentration is needed for GO sales and/or straight graphene use (e.g., if used as feedstock for second reaction). In certain embodiments, the GO (e.g., most GO) is sold or used in dry powder form and/or an aqueous solution of about 2% (by weight). In some embodiments, the oxidized form of the carbonaceous composition is filtered via a first filtration at a rate of greater than or equal to about 100 grams (g) per year, 200 g per year, 500 g per year, 750 g per year, 1 kilogram (kg) per year, 10 kg per year, 25 kg per year, 50 kg per year, 75 kg per year, 0.1 tpy, 0.2 tpy, 0.3 tpy, 0.4 tpy, 0.5 tpy, 0.6 tpy, 0.7 tpy, 0.8 tpy, 0.9 tpy, 1 tpy, 2 tpy, 3 tpy, 4 tpy, 5 tpy, 10 tpy, 25 tpy, 50 tpy, 75 tpy, 100 tpy, 200 tpy, 500 tpy, 750 tpy, 1,000 tpy (1 ktpy), 2,000 tpy, 3,000 tpy, 4,000 tpy, 5,000 tpy, 6,000 tpy, 7,000 tpy, 8,000 tpy, 9,000 tpy, 10,000 tpy or more. In certain embodiments, the oxidized form of the carbonaceous composition is filtered using a first reaction filter as a batch process. In certain embodiments, as described in greater detail elsewhere herein, the methods, devices and systems herein are scalable. In some embodiments, the first reaction filter is used to filter the oxidized form of the carbonaceous composition at a rate of greater than or equal to about 1 g, 2 g, 4 g, 6 g, 8 g, 10 g, 25 g, 50 g, 75 g, 100 g, 250 g, 500 g, 750 g, 1 kg, 2 kg, 4 kg, 6 kg, 8 kg, 10 kg, 15 kg, 25 kg, 50 kg, 75 kg, 100 kg, 250 kg, 500 kg, 750 kg, 1 tonne (t), 2 t, 4 t, 6 t, 8 t, lot, 15 t, 25 t, 50 t, 75 t, 100 t, 250 t, 500 t, 750 t or 1,000 t per batch.

In certain embodiments, a second reaction includes reduction of GO to form graphene (reduced graphite oxide). For example, in certain embodiments, after the first purification, the sulfuric acid concentration of the product is about 0.00005% with a pH of about 5. In certain embodiments, the concentration of GO in the solution is about 1% by mass (1 kg GO in 100 L of aqueous solution). In certain embodiments, the manufacture or method (e.g., second reaction) uses about 20 L of 30% hydrogen peroxide per kg of GO (in 100 liters of solution) and about 4.95 kg of sodium ascorbate (sodium salt of ascorbic acid) per kg GO (in 100 liters of solution). In certain embodiments, the method includes cooking time. In certain embodiments, the method does not include cooking time. In certain embodiments, the method includes given temperatures and process(es). In certain embodiments, the method includes heating the reaction to about 90° C. and adding hydrogen peroxide over the course of an hour. In certain embodiments, the reaction continues to heat at about 90° C. for about 3 more hours. In certain embodiments, sodium ascorbate is added over the course of about 30 minutes. In certain embodiments, the reaction continues to heat at about 90° C. for approximately an additional 1.5 hours. In certain embodiments, the total time at 90° C. is about 6 hours. In certain embodiments, the mixing speed (e.g., during one or more reaction processes) is about 200 rpm. In some embodiments, the apparatus form the reduced form of the carbonaceous composition at a rate of greater than or equal to about 100 grams (g) per year, 200 g per year, 500 g per year, 750 g per year, 1 kilogram (kg) per year, 10 kg per year, 25 kg per year, 50 kg per year, 75 kg per year, 0.1 tpy, 0.2 tpy, 0.3 tpy, 0.4 tpy, 0.5 tpy, 0.6 tpy, 0.7 tpy, 0.8 tpy, 0.9 tpy, 1 tpy, 2 tpy, 3 tpy, 4 tpy, 5 tpy, 10 tpy, 25 tpy, 50 tpy, 75 tpy, 100 tpy, 200 tpy, 500 tpy, 750 tpy, 1,000 tpy (1 ktpy), 2,000 tpy, 3,000 tpy, 4,000 tpy, 5,000 tpy, 6,000 tpy, 7,000 tpy, 8,000 tpy, 9,000 tpy, 10,000 tpy or more. In certain embodiments, the second reaction system is used for batch manufacturing, synthesis or processing (i.e., run as a batch process). In certain embodiments, as described in greater detail elsewhere herein, the methods, devices and systems herein are scalable. In some embodiments, the second reaction system forms the oxidized form of the carbonaceous composition at a rate of greater than or equal to about 1 g, 2 g, 4 g, 6 g, 8 g, 10 g, 25 g, 50 g, 75 g, 100 g, 250 g, 500 g, 750 g, 1 kg, 2 kg, 4 kg, 6 kg, 8 kg, 10 kg, 15 kg, 25 kg, 50 kg, 75 kg, 100 kg, 250 kg, 500 kg, 750 kg, 1 tonne (t), 2 t, 4 t, 6 t, 8 t, 10 t, 15 t, 25 t, 50 t, 75 t, 100 t, 250 t, 500 t, 750 t or 1,000 t per batch.

In certain embodiments, a second filtration is performed after the second reaction. In certain embodiments, after the second reaction, there are several impurities such as, for example, sodium ascorbate, plus small amounts of sulfuric acid, manganese oxides and manganese salts. In certain embodiments, the purpose or goal of the first filtration (e.g., regardless it how it is done) is to remove the impurities (e.g., those salts) from the solution. In certain embodiments, the water, acid and/or salts is left over from second reaction. For example, in certain embodiments, there are about 4.95 kg of sodium ascorbate per kg of GO left over in solution from the second reaction, plus the remaining small amounts of sulfuric acid, manganese oxides and manganese salts from the initial oxidation (e.g., first reaction). In certain embodiments, the conductivity of the solution after reduction is greater than about 50, 60, 70, 80, 90, 100, 110, 120, 130, 140, 150, 160, 170, 180, 190, 200, 250, 300, 350, 400, 450, or 500 mS/cm. In certain embodiments, the conductivity of the solution after reduction is greater than about 200 mS/cm. In certain embodiments, the rGO solution is washed with de-ionized (DI) water (e.g., with copious amounts of DI water) until the conductivity of the rGO solution reaches about 50 µS/cm or less. In certain embodiments, the rGO solution is washed using a second reaction filter or second reaction filtration process. In certain embodiments, a given amount or degree of concentration is needed for straight rGO (e.g., graphene) use. For example, in certain embodiments, a concentration of about 2% by weight or greater is needed. In some embodiments, the reduced form of the carbonaceous composition is filtered using a second reaction filter at a rate of greater than or equal to about 100 grams (g) per year, 200 g per year, 500 g per year, 750 g per year, 1 kilogram (kg) per year, 10 kg per year, 25 kg per year, 50 kg per year, 75 kg per year, 0.1 tpy, 0.2 tpy, 0.3 tpy, 0.4 tpy, 0.5 tpy, 0.6 tpy, 0.7 tpy, 0.8 tpy, 0.9 tpy, 1 tpy, 2 tpy, 3 tpy, 4 tpy, 5 tpy, 10 tpy, 25 tpy, 50 tpy, 75 tpy, 100 tpy, 200 tpy, 500 tpy, 750 tpy, 1,000 tpy (1 ktpy), 2,000 tpy, 3,000 tpy, 4,000 tpy, 5,000 tpy, 6,000 tpy, 7,000 tpy, 8,000 tpy, 9,000 tpy, 10,000 tpy or more. In certain embodiments, the second reaction filter is used for batch filtration and/or purification (i.e., run as a batch process). In certain embodiments, as described in greater detail elsewhere herein, the methods, devices and systems herein are scalable. In some embodiments, the second reaction filter is used to filter the reduced form of the carbonaceous composition at a rate of greater than or equal to about 1 g, 2 g, 4 g, 6 g, 8 g, 10 g, 25 g, 50 g, 75 g, 100 g, 250 g, 500 g, 750 g, 1 kg, 2 kg, 4 kg, 6 kg, 8 kg, 10 kg, 15 kg, 25 kg, 50 kg, 75 kg, 100 kg, 250 kg, 500 kg, 750 kg, 1 tonne (t), 2 t, 4 t, 6 t, 8 t, lot, 15 t, 25 t, 50 t, 75 t, 100 t, 250 t, 500 t, 750 t or 1,000 t per batch.

In some embodiments, the second reaction is performed separately from the first reaction. For example, in certain embodiments, the second reaction, in some cases followed by the second filtration, is performed using any graphite oxide feedstock with suitable specifications.

In certain embodiments, one or more of the first reaction, first filtration, second reaction and second filtration (or oxidation, purification, reduction and final purification) is performed using the devices and systems herein. In certain embodiments, the devices and systems herein are suitably configured for any given processing step or procedure (e.g., temperature, reaction cooling, rate of addition of reagents, etc., is adjusted). For example, in certain embodiments, the mixing bowl and the tank contents (e.g., mass and/or type of substance(s)) and/or size are adjusted to perform the second reaction (e.g., instead of the first reaction). In certain embodiments, the first reaction is performed in a first system. In certain embodiments, the first filtration is performed in the first system or separately from the first system. In certain embodiments, the second reaction is performed in a second system. In certain embodiments, the second filtration is performed in the second system or separately from the second system. In some embodiments, the first and second systems are coupled (e.g., first system feeds into the second system). In certain embodiments, a plurality of devices and systems herein are coupled (e.g., in a tank house). In some embodiments, the first system is the same as the second system (e.g., the system is configured to be used for the first reaction first, cleaned or emptied, and then used for the second reaction). In certain embodiments, the first and second filtrations are performed in separate systems or in a single filter system. In certain embodiments, the first reaction, first filtration, second reaction, and second filtration are performed sequentially in a single overall process. In certain embodiments, the first reaction products are filtered in a first filtration without proceeding to the second reaction and/or second filtration. In certain embodiments, any combination of the first reaction, first filtration, second reaction, and second filtration processes are automated or semi-automated. Automation enables continuous production of GO/rGO to maximize the production rate while keeping labor costs down.

Figure 41A:
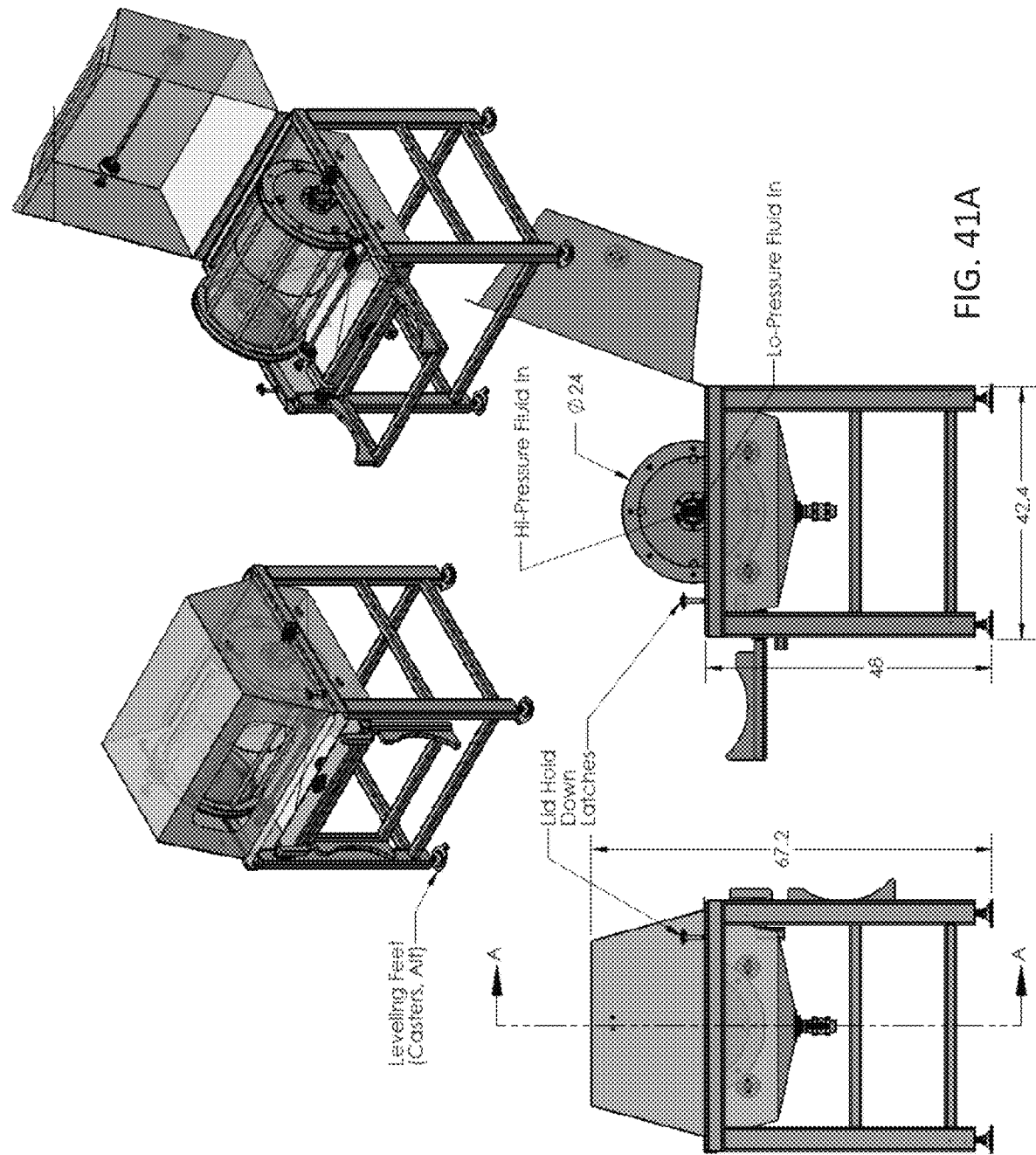
FIGS. 41A-41B show an exemplary embodiment of an rGO/graphene second reaction filter.
Figure 41B:
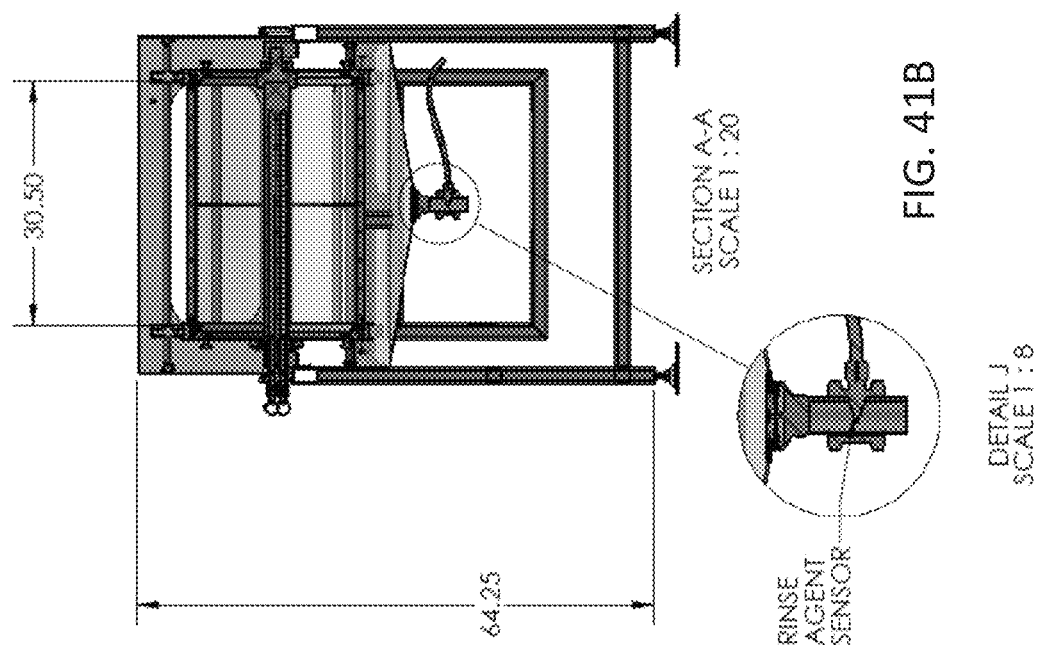
Figure 42A:
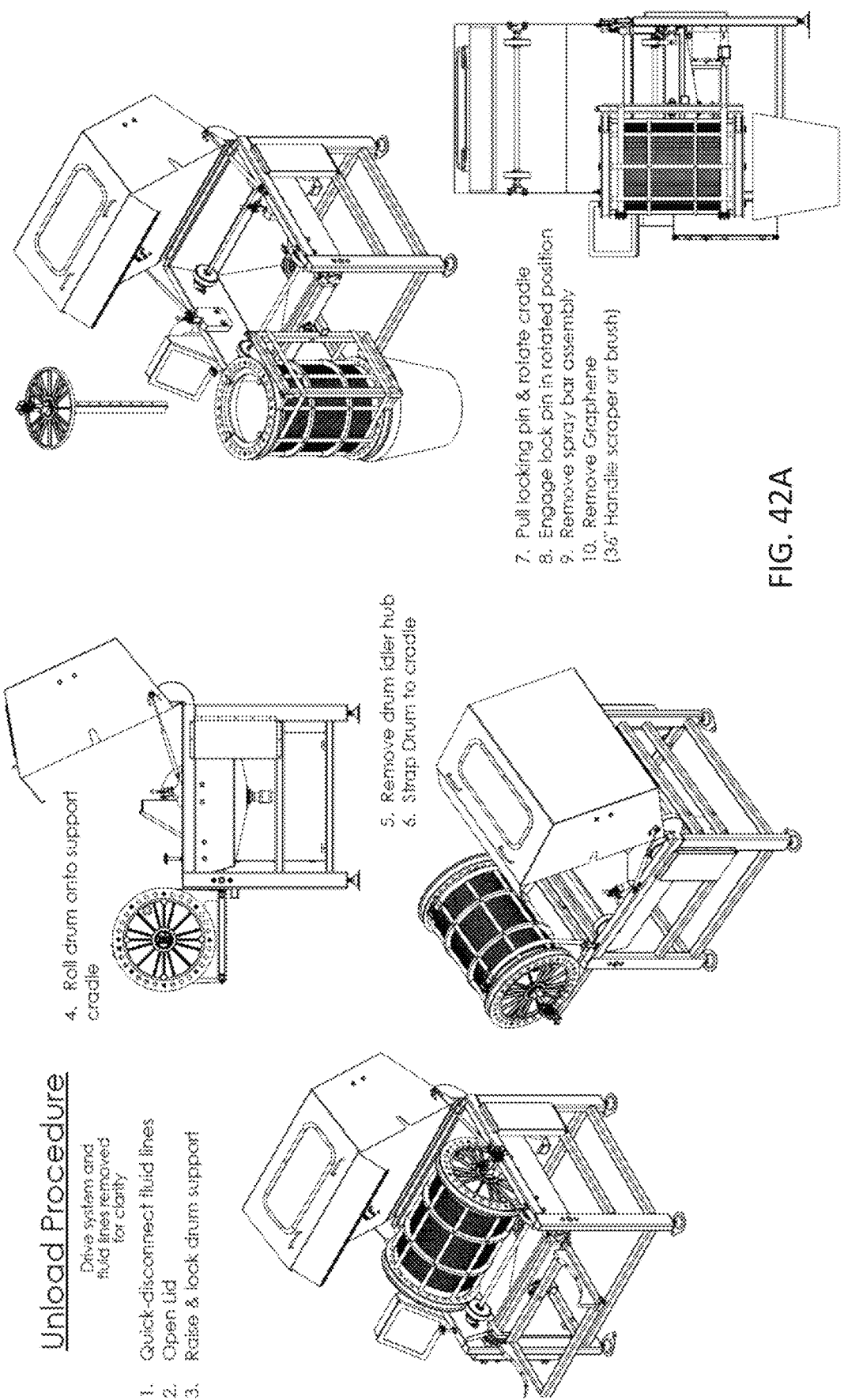
FIGS. 42A-42C shows unloading procedures using the rGO/graphene second reaction filter in FIGS. 41A-41B and 43A-43F.
Figure 42B:
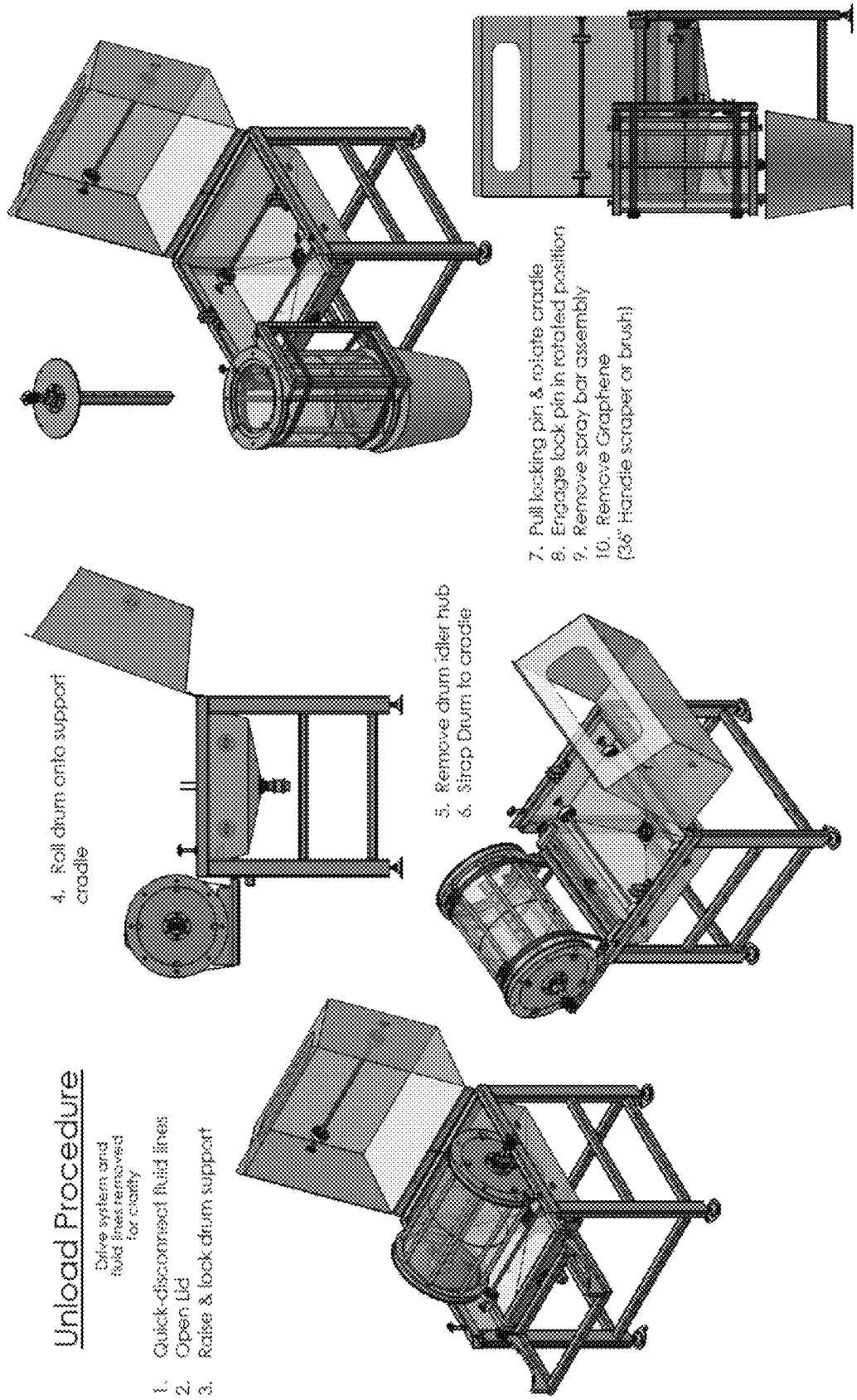
Figure 42C:
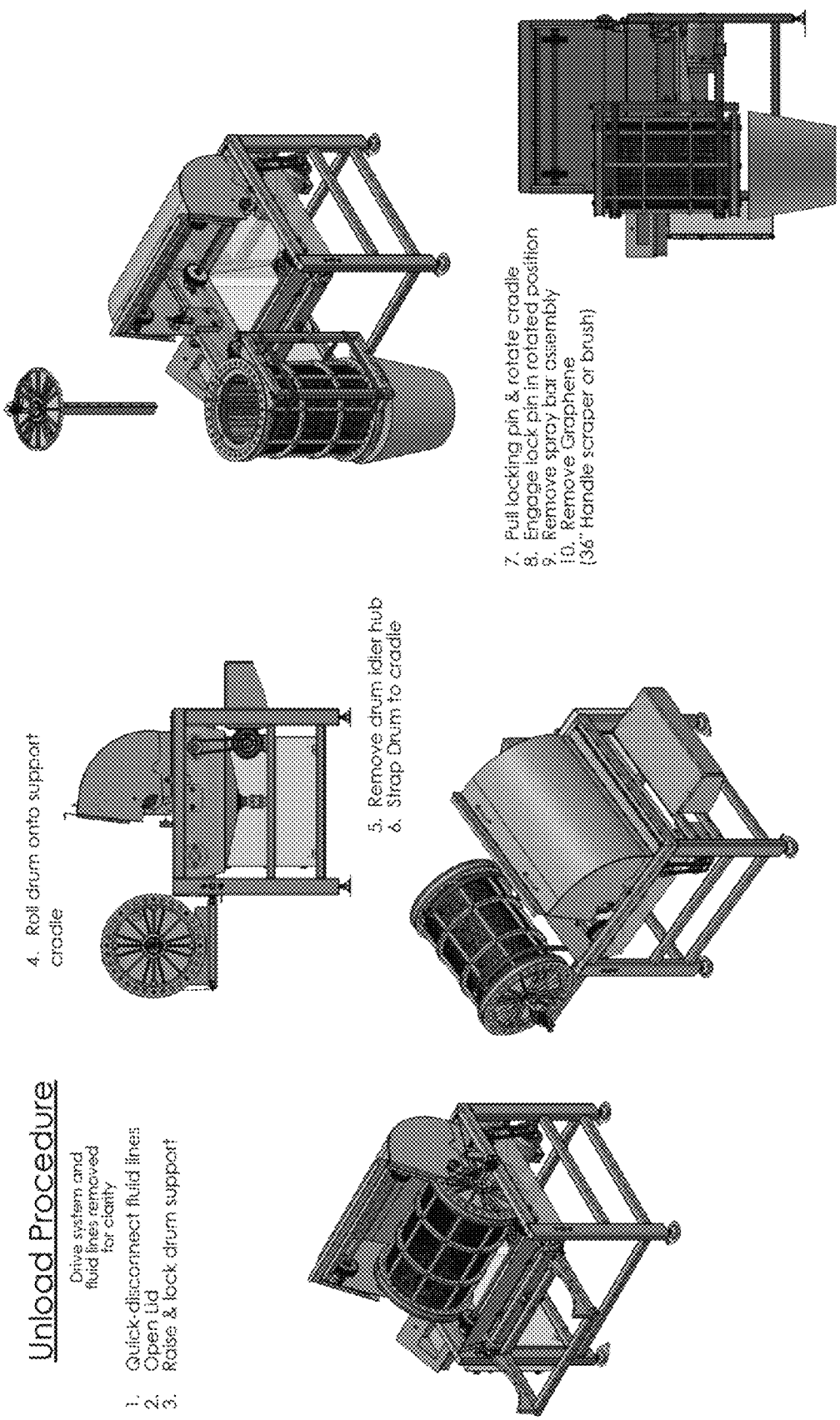
Figure 43B:
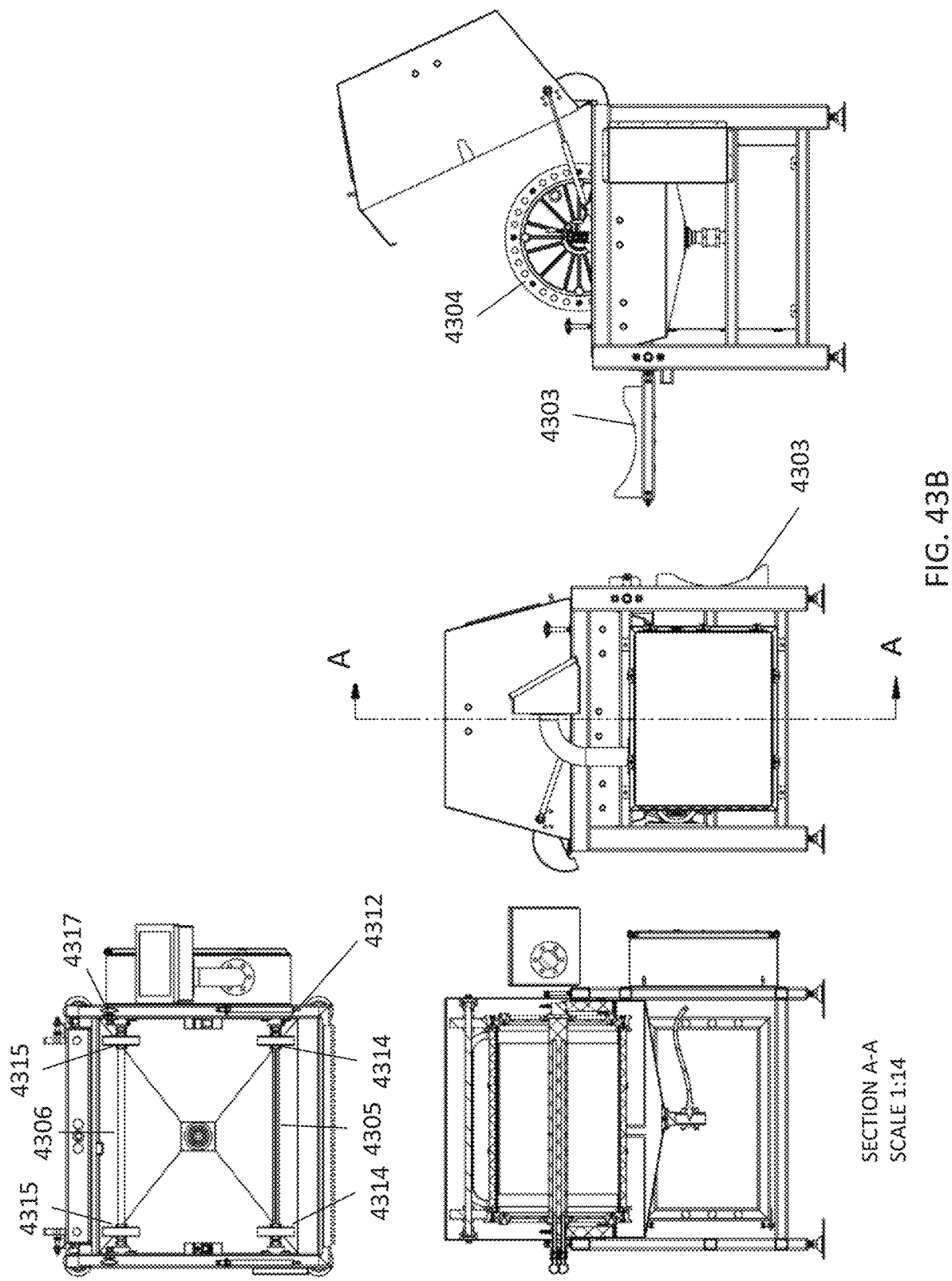
Figure 43C:
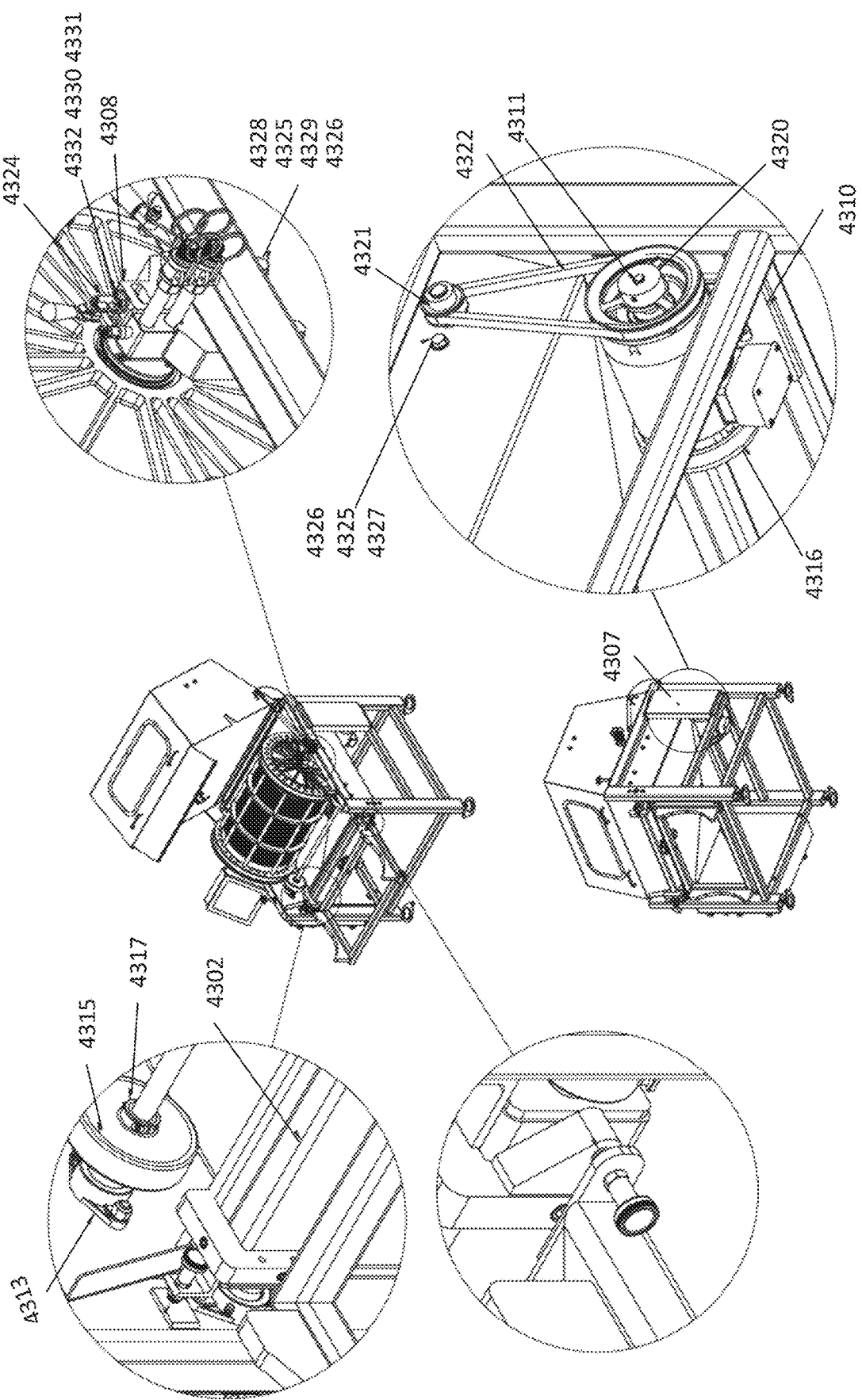
Figure 43E:
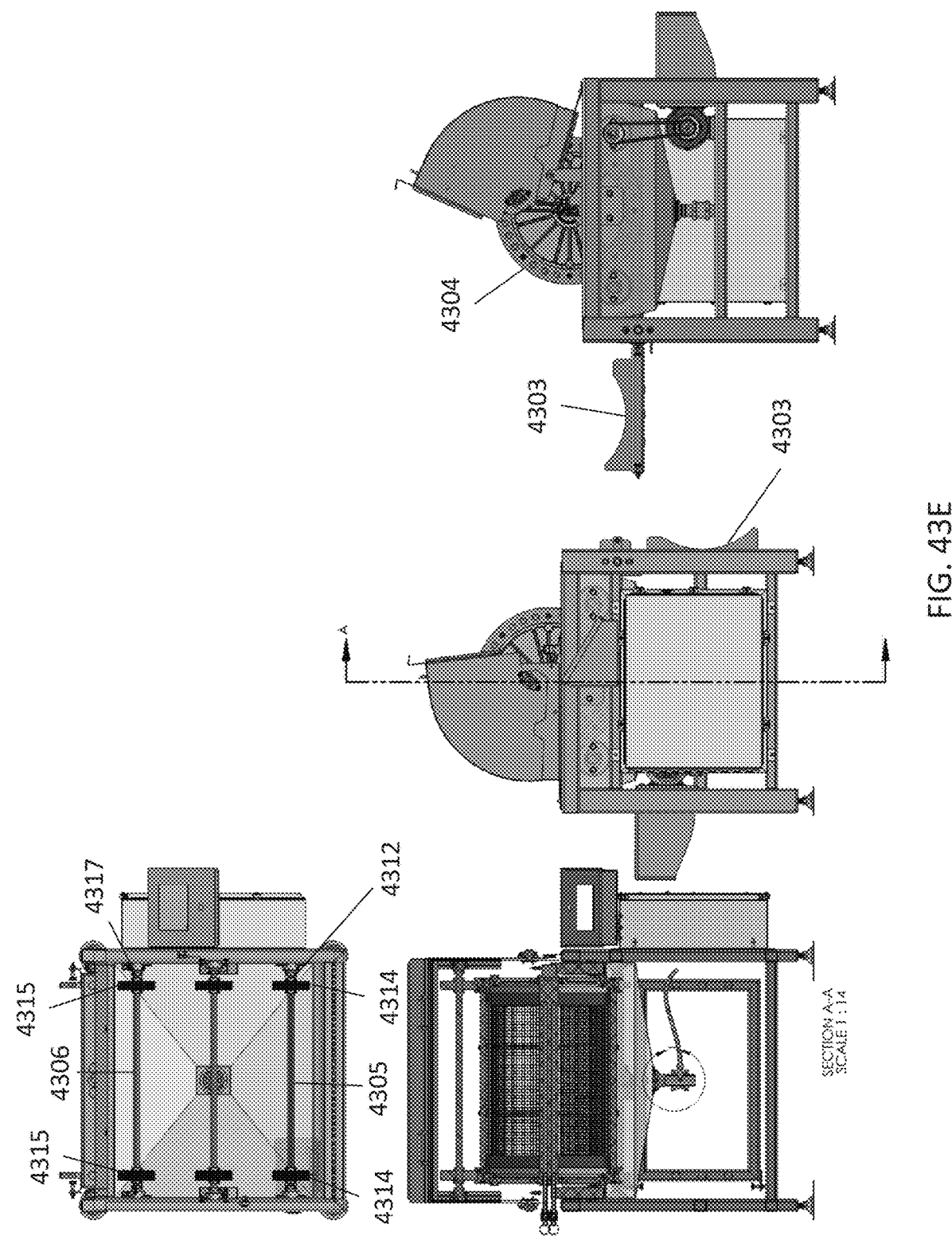
Figure 43F:
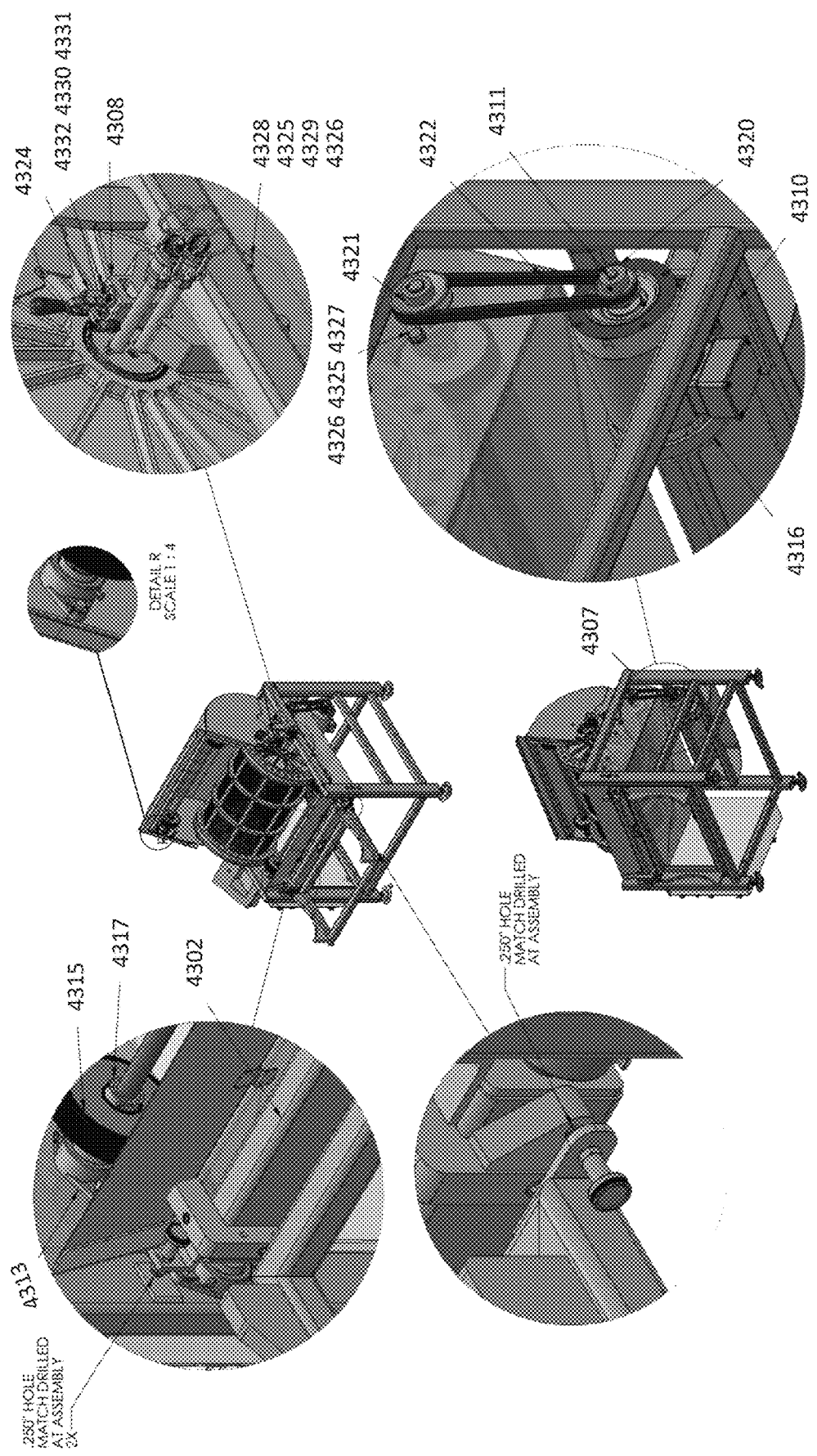

FIGS. 41A-41B provides an exemplary embodiment of a filtration system. In certain embodiments, the filtration system comprises a second reaction filter (e.g., used to implement the second filtration following the second reaction). In certain embodiments, the second reaction filter is an rGO/graphene second reaction filter. FIGS. 42A-42C provides examples of operation of the systems in FIGS. 41A-41B and FIGS. 43A-43F. In some embodiments, the rGO/graphene second reaction filter in FIGS. 43A-43F comprises or is at least in part formed from HDPE sheet 304 stainless steel. Further examples and detailed embodiments of filtration systems (e.g., of a second reaction filter) and methods are provided in FIGS. 13A-13C, FIGS. 14A-14B, FIGS. 15A-15B, FIGS. 16A-16B, FIG. 17, FIGS. 18A-18B, FIGS. 19A-19B, FIG. 20, FIGS. 21A-21C, FIGS. 22A-22D, FIGS. 23A-23E, FIG. 24, FIGS. 25A-25C, FIGS. 26A-26B, FIGS. 27A-27B, FIGS. 28A-28B, FIGS. 29A-29B, FIGS. 30A-30B, FIGS. 31-35, FIGS. 36A-36B, FIGS. 37A-37B, and FIGS. 38-40. In certain embodiments, the second reaction filter comprises one or more of the following: a frame assembly 4301, a cradle pivot assembly 4302, a drum cradle assembly 4303, a drum assembly 4304, a drive shaft 4305, an idler shaft 4306, a drive shroud 4307, a drum shaft support 4308, a drum shaft support idler side 4309, a motor mount plate 4310, a machine key stock 4311, a clamp collar 4312, a flange bearing 4313, a drive wheel 4314, an idler wheel 4315, a baldor motor 4316, a clamp collar 4317, an enclosure 4318, a control enclosure 4319, a drive shaft pulley 4320, a drive shaft pulley 4321, a drive belt 4322, a hold down clamp 4323, a sealing washer 4324, a nut 4325, hex bolts (4326, 4327), flat washers (4328, 4329), a nut 4330, a socket head cap screw 4331, and a hex bolt 4332. In certain embodiments, the units for various spatial sizes or dimensions are in inches or centimeters. In certain embodiments, the units for angles are degrees. In some embodiments, unless otherwise specified, dimensions are in inches. In some embodiments, unless otherwise specified, tolerances are X=±0.1, .XX=±0.01 and .XXX=±0.005 (decimals) and ±1° (angles). Scaling may or may not be as indicated.

In certain embodiments, a filtration system (e.g., a second reaction filter) comprises one or more subsystems or portions. In some embodiments, a filtration system (e.g., a second reaction filter such as, for example, an rGO/graphene second reaction filter) comprises a top assembly, a frame assembly, a lid assembly, a cradle pivot assembly, a drum cradle assembly, a drum assembly, a spray bar assembly, a drum end cap assembly, or any combination thereof. In certain embodiments, each such subsystem or portion in turn comprises one or more components. In certain embodiments, a filtration system comprises any component(s) of such subsystems or portions. In certain embodiments, such component(s) are organized in the aforementioned subsystems or portions. In certain embodiments, any components of a given subsystem or portion are provided as part of a different subsystem or portion (e.g., the components of the aforementioned subsystems or portions are reorganized in different subsystems or portions), substituted or omitted. Examples of subsystems/portions, components and quantities of components are provided in TABLE 3. It is understood that the subsystems/portions, components, and quantities of components as well as the dimensions and/or sizes shown in TABLE 3 (and elsewhere in the disclosure herein) are scalable (e.g. to increase or decrease the rate and/or output for processing/filtering carbonaceous compositions). In certain embodiments, aspects of the disclosure described in relation to a second reaction filter equally apply to a first reaction filter or other filter(s) herein at least in some configurations. In view of the present disclosure, a person of skill in the art will appreciate that certain materials useful for construction and fabrication for the devices and systems described herein can be obtained from commercial sources.

TABLE 3

| EXAMPLE QTY | PART NUMBER | DESCRIPTION |
|---|---|---|
| GSRF-1000 TOP ASSEMBLY (e.g., see FIGS. 43A-43F) | | |
| 1 | GSRF-0100 | FRAME ASSEMBLY 4301 (e.g., see FIGS. 13A-13C) |
| 1 | GSRF-0104 | CRADLE PIVOT ASSEMBLY 4302 (e.g., see FIGS. 14A-14B) |
| 1 | GSRF-0106 | DRUM CRADLE ASSEMBLY 4303 (e.g., see FIGS. 15A-15B) |
| 1 | GSRF-0108 | DRUM ASSEMBLY 4304 (e.g., see FIGS. 16A-16B) |
| 1 | GSRF-0011-1 | DRIVE SHAFT 4305 (e.g., see FIG. 17, bottom) |
| 2 | GSRF-0011-2 | IDLER SHAFT 4306 (e.g., see FIG. 17, top) |
| 1 | GSRF-0012 | DRIVE SHROUD 4307 (e.g., see FIGS. 18A-18B) |
| 1 | GSRF-0013-1 | Drum Shaft Support 4308 (e.g., see FIGS. 19A-19B) |
| 1 | GSRF-0013-2 | Drum Shaft Support, Idler Side 4309 (e.g., see FIGS. 19A-19B) |
| 1 | GSRF-0014 | Motor Mount Plate 4310 (e.g., see FIG. 20) |
| 6 | 3329K150 | Clamp Collar, 2 piece 1 shaft, keyed 4312 |
| 2 | 5126A680 | HOLD DOWN CLAMP 4323 |
| 8 | 5968K750 | Flange Bearing 4313 |
| 1 | 6204K136 | DRIVE SHAFT PULLEY 4321 |
| 1 | 6204K363 | MOTOR DRIVE PULLEY 4320 |
| 13 | 6436K380 | Clamp Collar, 2 piece 1 shaft, no key 4317 |
| 8 | 90107A011 | FLAT WASHER #10 4329 |
| 12 | 90107A033 | FLAT WASHER ½" 4328 |
| 8 | 90715A115 | NUT, #10-32 4330 |
| 24 | 90715A165 | NUT, ½-13 4325 |
| 8 | 92185A992 | SOCKET HEAD CAP SCREW, #10-32 × 1.0" 4331 |
| 4 | 92186A720 | HEX BOLT, ½-13 × 2.0" 4327 |
| 16 | 93190A715 | HEX BOLT ½-13 × 1.375" 4326 |
| 4 | 93190A716 | HEX BOLT ½-13 × 1.50" 4332 |

TABLE 3-continued

| EXAMPLE QTY | PART NUMBER | DESCRIPTION |
|---|---|---|
| 16 | 94709A518 | SEALING WASHER 4324 |
| 1 | CM3546 | Baldor motor 4316 |
| 2 | D92624A255 | Machine Key Stock ¼ × ¼ × 2.25 4311 |
| 1 | SSN4243008 | ELECTRONICS ENCLOSURE 4318 |
| 1 | WC12C12 | CONTROL ENCLOSURE 4319 |
| 4 | SUNRAY | 6.0"DIA × 1.5" IDLER WHEEL 4315 |
| 2 | SUNRAY | 6.0"DIA × 1.5" DRIVE WHEEL 4314 |
| 1 | | DRIVE BELT 4322 |
| GSRF-01001 FRAME ASSEMBLY | | |
| 1 | GSRF-0101 | FRAME WELDMENT 1301 (e.g., see FIGS. 21A-21C) |
| 1 | GSRF-0102 | LID WELDMENT 1303 (e.g., see FIGS. 22A-22D) |
| 1 | GSRF-0103 | DRAINPAN WELDMENT 1302 (e.g., see FIGS. 23A-23E) |
| 2 | 1344A230 | SPRING LOADED T-HANDLE LATCH 1306 |
| 1 | 1582A397 | PIANO HINGE, SS, .120" THICK, 3" WIDE × 36" LONG 1304 |
| 4 | 2534T610 | Leveling Foot, anchored 1309 |
| 1 | 2672K13 | STAINLESS STEEL DRAIN 1305 |
| 2 | 6626K570 | GAS SPRING 1308 |
| 2 | 6626K950 | GAS SPRING MOUNT CLEVIS 1307 |
| GSRF-0102 LID ASSEMBLY | | |
| 1 | GSRF-0102 | LID WELDMENT (e.g., see FIGS. 22A-22D) |
| 2 | GSRF-0015 | LID STOP 2210 (e.g., see FIG. 24) |
| 2 | 6626K960 | GAS SPRING MOUNT BRACKET 2211 |
| 2 | 1726A920 | HANDLE 2206 |
| 1 | 3275T15 | Window Trim Gasket 2205 |
| 8 | 90715A135 | NUT SS ⁵⁄₁₆-18 2214 |
| 12 | 93190A583 | HEX BOLT ⁵⁄₁₆-18 × 1.0" 2213 |
| 12 | 90107A030 | FLAT WASHER ⁵⁄₁₆ SS 2212 |
| 4 | 92185A194 | SOCKET HEAD CAP SCREW, #8-32 × .50" 2208 |
| 4 | 90107A010 | FLAT WASHER, #8 2207 |
| GSRF-0104 CRADLE PIVOT ASSEMBLY | | |
| 1 | GSRF-0105 | CRADLE PIVOT WELDMENT 1401 (e.g., see FIGS. 25A-25C) |
| 2 | GSRF-0010-2 | Drum Roll Guide 1403 (e.g., see FIGS. 26A) |
| 1 | GSRF-0011 | DRUM CATCH 1402 (e.g., see FIG. 17) |
| 1 | 5968K750 | Flange Bearing 1404 |
| 2 | 8480A300 | Spring Pin 1405 |
| 4 | 90107A030 | FLAT WASHER ⁵⁄₁₆ 1410 |
| 2 | 90107A033 | FLAT WASHER ½" 1411 |
| 4 | 90715A135 | NUT SS ⁵⁄₁₆-18 1412 |
| 2 | 90715A165 | NUT, ½-13 1413 |
| 2 | 91500A585 | FLAT HEAD SCREW ⁵⁄₁₆-18 × 1.25" 1408 |
| 2 | 92185A589 | SOCKET HEAD CAP SCREW ⁵⁄₁₆-18 × 1.75" 1406 |
| 2 | 92185A601 | SOCKET HEAD CAP SCREW ⁵⁄₁₆-18 × 1.50" 1407 |
| 2 | 93190A715 | HEX BOLT ½-13 × 1.375" 1409 |
| 2 | 9563K510 | HOLE PLUG 1½" 1415 |
| 4 | 9563K850 | HOLE PLUG 1⅛" 1414 |
| 2 | 9565K31 | TUBING END CAP, 2.0" SQUARE 1416 |

TABLE 3-continued

Figure 45C:
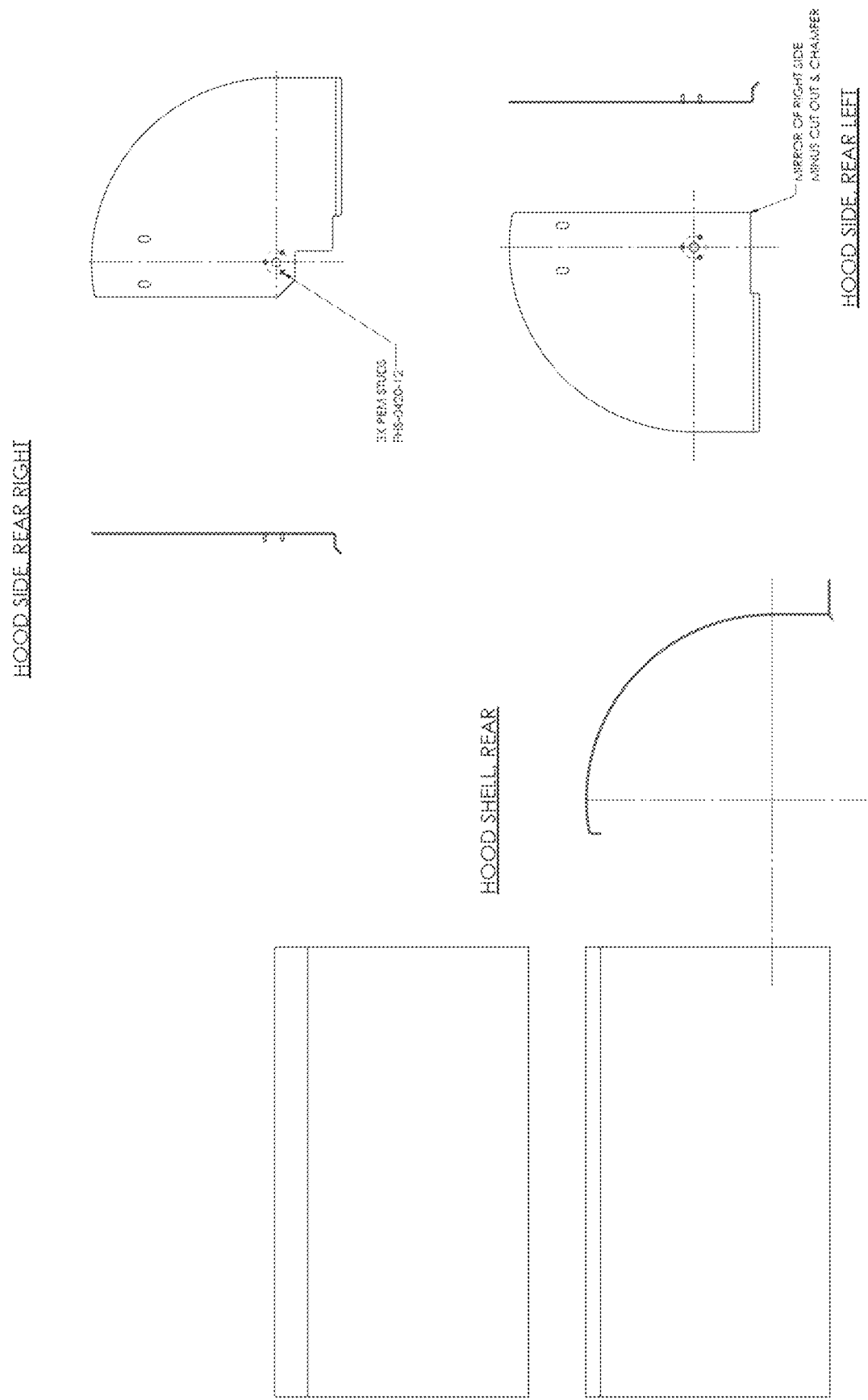
Figure 45D:
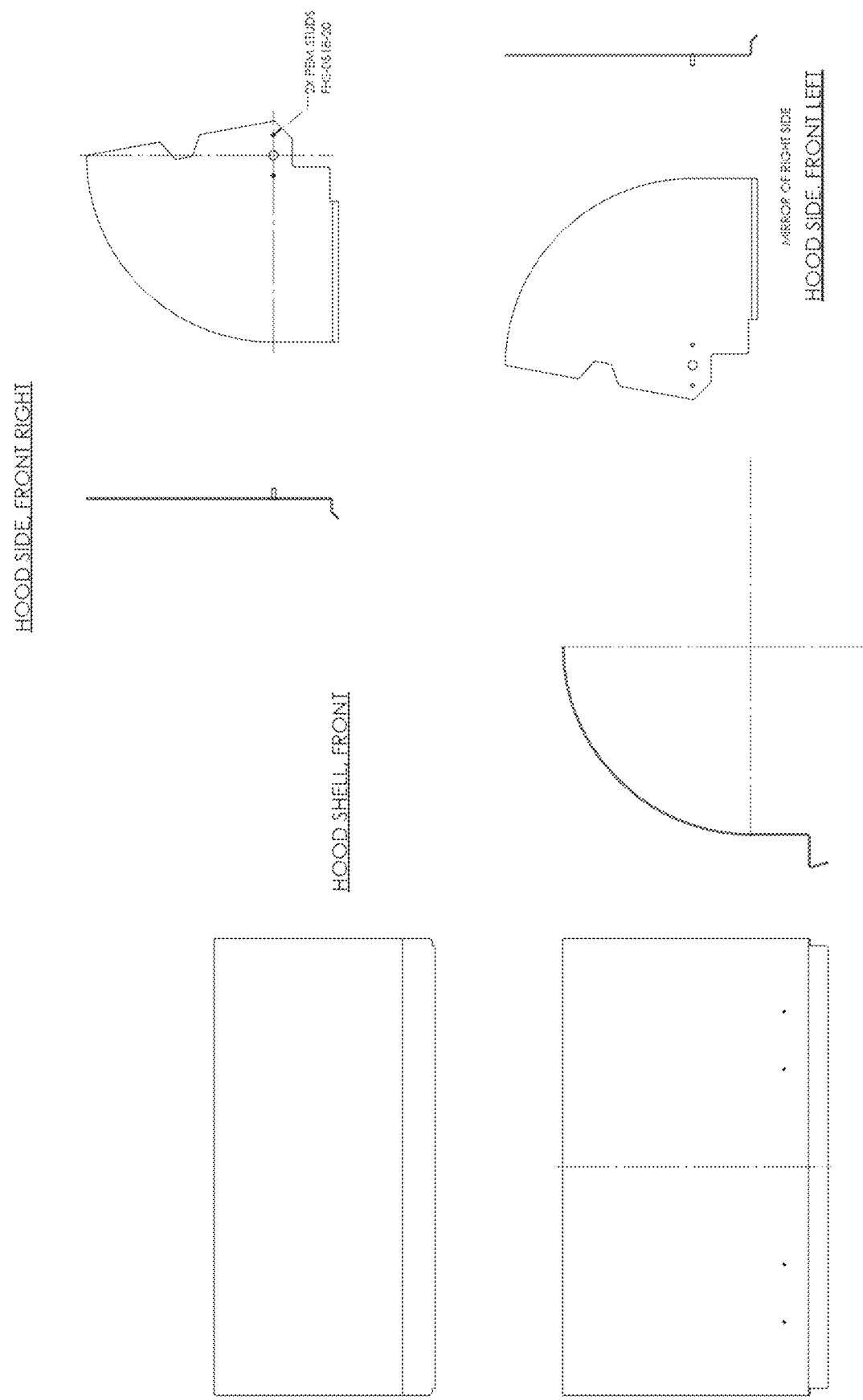

| EXAMPLE QTY | PART NUMBER | DESCRIPTION |
|---|---|---|
| | GSRF-0106 DRUM CRADLE ASSEMBLY | |
| 1 | GSRF-0107 | DRUM CRADLE WELDMENT 1501 (e.g., see FIGS. 27A-27B) |
| 2 | GSRF-0010 | DRUM BRACE 1502 (e.g., see FIGS. 26A-26B) |
| 2 | 8480A200 | Locking Spring Pin 1503 |
| 6 | 90107A030 | FLAT WASHER 5/16 SS 1504 |
| 6 | 90715A135 | NUT SS 5/16-18 1505 |
| 6 | 92196A318 | SOCKET HEAD CAP SCREW SS 5/16-18 × 1.375 1506 |
| 6 | 9563K850 | HOLE PLUG 1 1/8" 1507 |
| | GSRF-0108 DRUM ASSEMBLY | |
| 1 | GSRF-0109 | SPRAY BAR ASSEMBLY 1606 (e.g., see FIGS. 28A-28B) |
| 1 | GSRF-0110 | DRUM END CAP ASSEMBLY 1607 (e.g., see FIGS. 29A-29B) |
| 2 | GSRF-0001 | DRUM FRAME 1601 (e.g., see FIGS. 30A-30B) |
| 8 | GSRF-0002 | DRUM STIFFENER 1602 (e.g., see FIG. 31) |
| 2 | GSRF-0003 | DRUM STIFFENER RING 1603 (e.g., see FIG. 32) |
| 1 | GSRF-0004 | DRUM MESH 1604 (e.g., see FIG. 33) |
| 1 | GSRF-0009 | DRUM MICRON FILTER 1605 (e.g., see FIG. 34) |
| A/R | 7541A77 | EPOXY 1612 (not shown) |
| 8 | 90598A031 | 3/8-16 threaded insert 1609 |
| 16 | 90778A401 | SET SCREW, 1/4-20 × 1/4" LONG 1611 |
| 8 | 91830A719 | Thumb Screw 3/8-16 × 1.0" Long 1610 |
| 16 | 92185A630 | Socket Head Cap Screw, 3/8-16 × 1 3/4" Long 1608 |
| A/R | PAINTERS TAPE | BLUE MASKING, 2.0" WIDE 1613 |
| | GSRF-0109 SPRAY BAR ASSEMBLY | |
| 1 | GSRF-0005 | SPRAY BAR 2801 (e.g., see FIG. 35) |
| 1 | GSRF-0006 | DRUM BEARING PLATE 2802 (e.g., see FIGS. 36A-36B) |
| 1 | GSRF-0007-1 | SPRAY BAR BEARING HUB, FLUID SIDE 2803 (e.g., see FIGS. 37A-37B) |
| 1 | GSRF-0008-1 | DRUM SHAFT MOUNT 2804 (e.g., see FIG. 38) |
| 9 | 3404K37 | SPRAY TIP, 3/8" NPT, 50 DEGREE FAN 2809 |
| 2 | 4830K158 | Nipple 1/2" NPT 6.0" Long 2808 |
| 2 | 53015K108 | QUICK DISCONNECT FITTING, 1/2" NPT 2815 |
| 2 | 53015K508 | Quick Disconnect Fitting, 1/2" NPT 2814 |
| A/R | 7541A77 | EPOXY 2812 (not shown) |
| 3 | 91500A540 | FLAT HEAD SCREW 1/4-20 × .75" 2813 |
| 1 | 91580A332 | Internal retaining Ring 2807 |
| 1 | 91590A220 | External Snap Ring 2806 |
| 2 | 92185A542 | Socket Head Cap screw 1/4-20 1.0" Long 2805 |
| 1 | 9563K850 | HOLE PLUG 1 1/8" 2811 |
| 1 | W 61818-2Z | Deep Groove Ball Bearing, Sealed 2810 |
| | GSRF-0110 DRUM END CAP ASSEMBLY | |
| 1 | GSRF-0006 | DRUM BEARING PLATE 2901 (e.g., see FIGS. 36A-36B) |
| 1 | GSRF-0007-2 | SPRAY BAR BEARING HUB 2902 (e.g., see FIG. 39) |
| 1 | GSRF-0008-2 | DRUM SHAFT MOUNT 2903 (e.g., see FIG. 40) |
| A/R | 7541A77 | EPOXY 2909 (not shown) |
| 3 | 91500A540 | FLAT HEAD SCREW 1/4-20 × .75" 2906 |
| 1 | 91580A332 | Internal retaining Ring 2905 |
| 1 | 91590A220 | External Snap Ring 2904 |
| 1 | 9563K850 | HOLE PLUG 1 1/8" 2907 |
| 1 | W 61818-2Z | Deep Groove Ball Bearing, Sealed 2908 |
| | GSRF-0111 COVER ASSEMBLY | |
| 1 | GSRF-0112-1 | LID WELDMENT REAR 4501 (e.g., see FIGS. 45A-45D) |
| 1 | GSRF-0112-2 | LID WELDMENT FRONT 4502 (e.g., see FIGS. 45A-45D) |
| 2 | GSRF-0020 | HOOD PIVOT PLATE 4503 (e.g., see FIG. 45E) |
| 2 | GSRF-0021 | HOOD PIVOT SHAFT 4502 (e.g., see FIG. 45E) |
| 2 | 1726A920 | HANDLE 4505 |
| 2 | 6494K420 | 2 BOLT FLANGE BEARING, Ø.75 4506 |
| 4 | 90715A135 | NUT, 5/16-24 4507 |
| 4 | 90107A030 | FLAT WASHER, 5/16 4508 |
| 6 | 90107A029 | FLAT WASHER, 1/4 4509 |
| 6 | 90715A125 | NUT, 1/4-20 4510 |
| 2 | 93085A539 | FLAT HEAD SCREW, 5/16-24 4511 |
| 1 | GSRF-0113 | SPLASH GUARD |
| | ADDITIONAL PARTS | |
| 1 | 4464K563 | NPT PLUG 3/8-16 |
| 1 | 002X002WT0630W48T | Drum mesh |
| 1 | 7398K550 | Drive shaft |
| 1 | 8364T360 | Idler shaft |
| 1 | 92624A255 | Drive Key |

In certain embodiments, the filtration system (e.g., second reaction filtration system) shown in FIGS. 41A-41B includes one or more elements of a drum assembly (e.g., drum assembly GSRF-0108 in TABLE 3), optionally including one or more elements shown in FIGS. 16A-16B, FIGS. 28A-28B, FIGS. 29A-29B, FIGS. 30A-30B and/or FIGS. 31-34 (e.g., see TABLE 3). In certain embodiments, the filtration system shown in FIGS. 41A-41B includes one or more elements of a frame assembly (e.g., frame assembly GSRF-0100 in TABLE 3), optionally including one or more elements shown in FIGS. 13A-13C, FIGS. 21A-21C, FIGS. 22A-22D and/or FIGS. 23A-23E (e.g., see TABLE 3). In certain embodiments, the filtration system includes one or more elements of a cradle pivot assembly (e.g., see FIGS. 14A-14B), a drum cradle assembly (e.g., see FIGS. 15A-15B), a drive shaft (e.g., see FIG. 17, bottom), an idler shaft (e.g., see FIG. 17, top), a drive shroud (e.g., see FIGS. 18A-18B), a drum shaft support (e.g., see FIGS. 19A-19B), a motor mount plate (e.g., see FIG. 20) and/or other suitable elements.

Figure 21A:
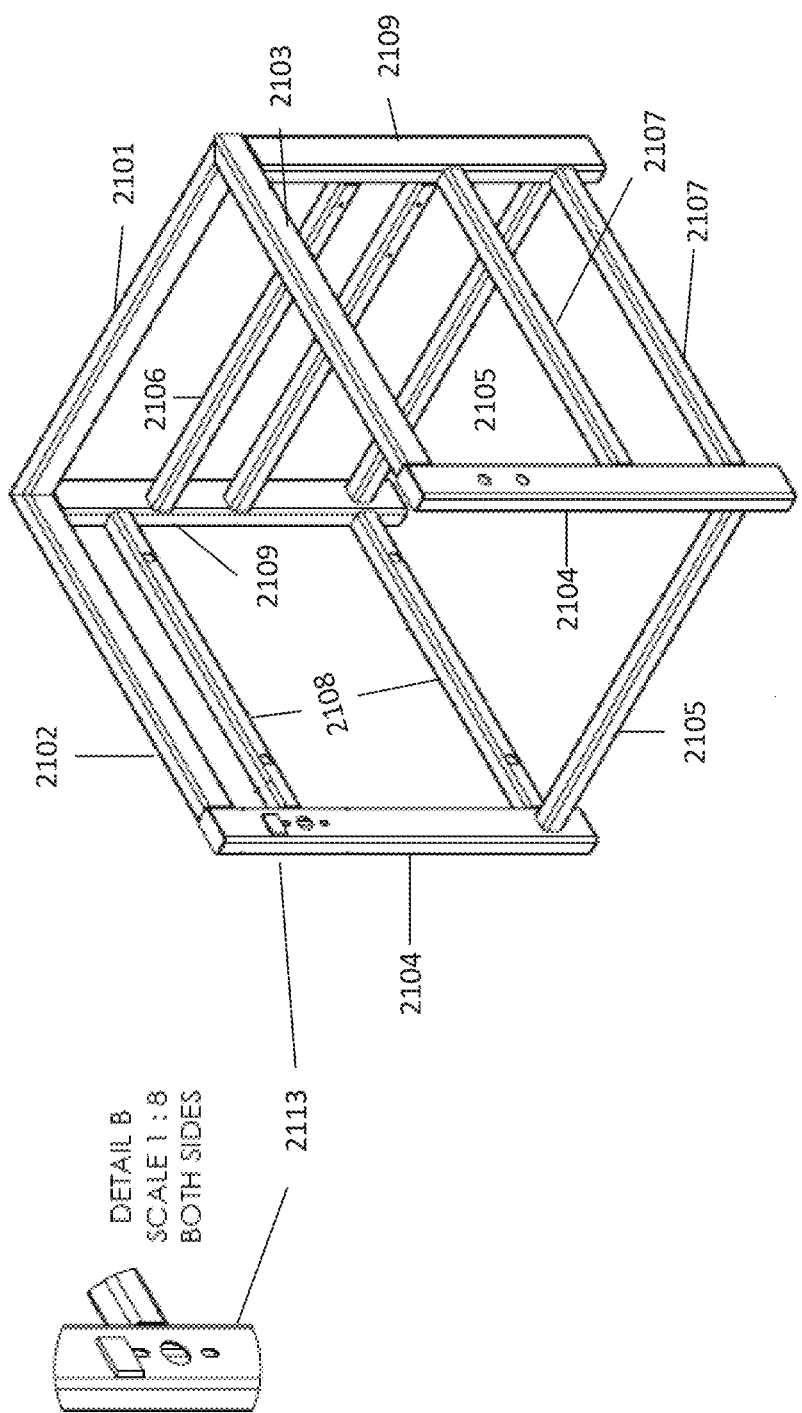
FIGS. 21A-21C show an exemplary embodiment of a frame weldment (e.g., GSRF-0101)
Figure 21B:
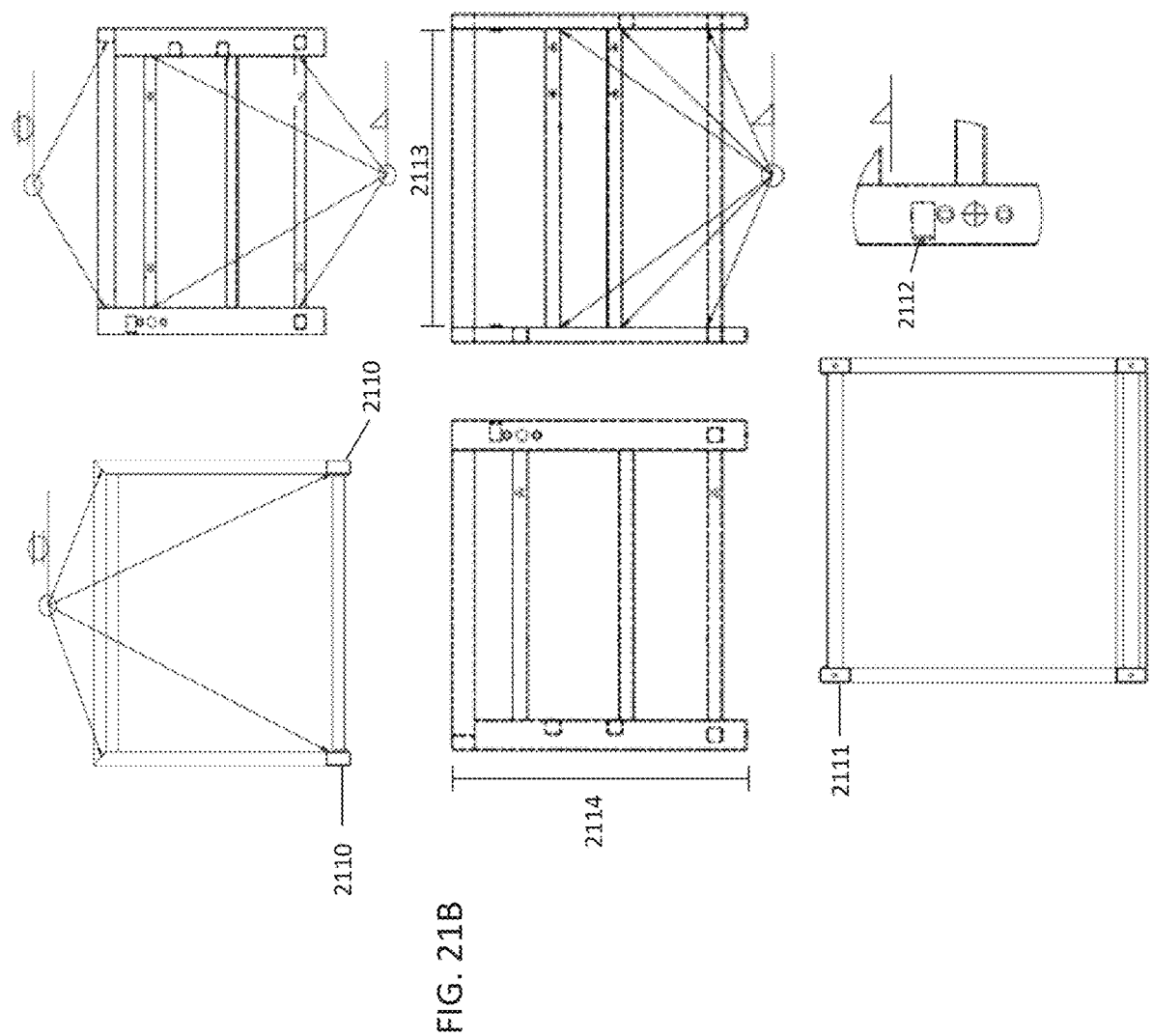
Figure 21C:
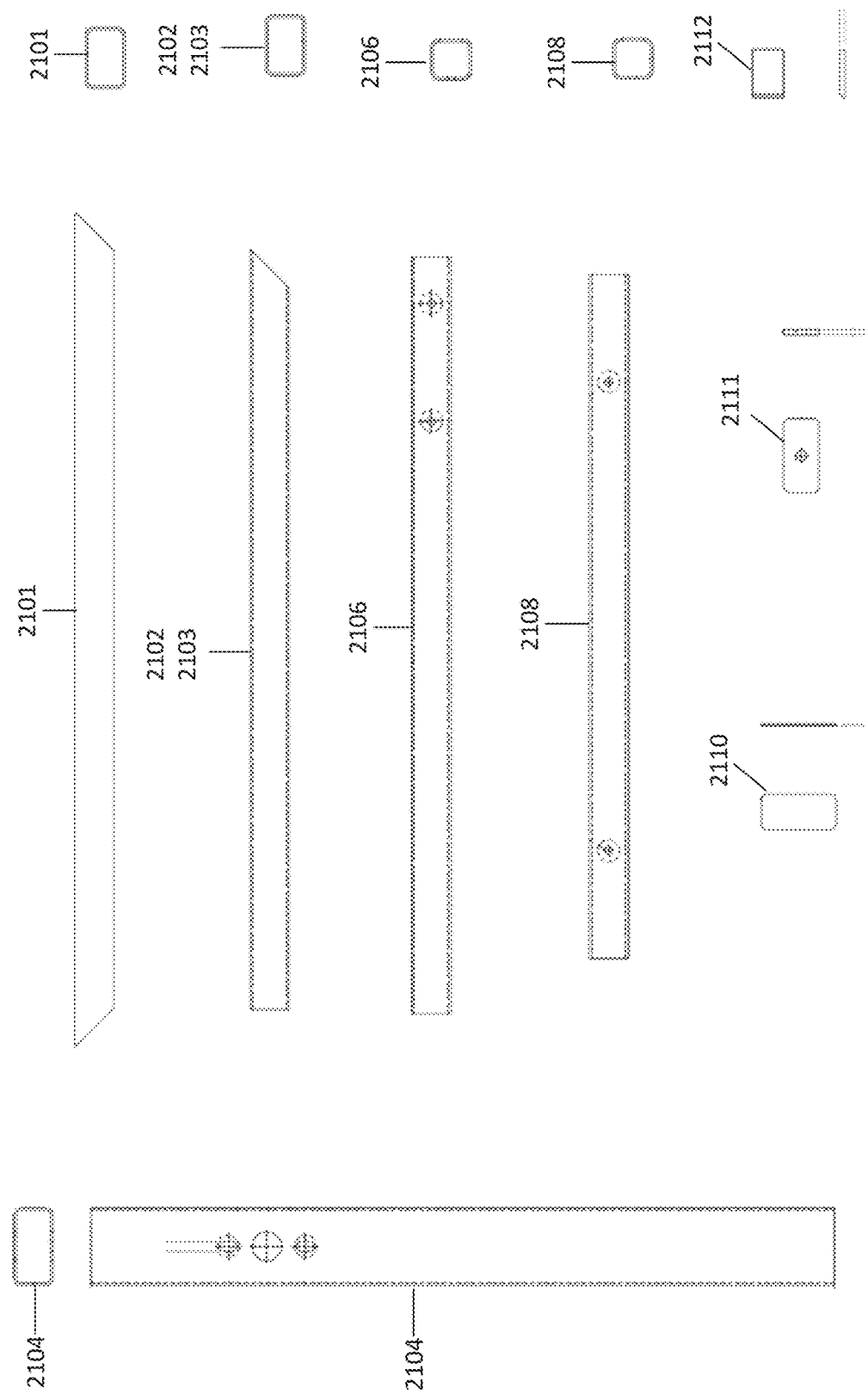

In certain embodiments, a frame assembly is part of a top assembly (e.g., see exemplary embodiments shown in FIGS. 41A-41B, FIGS. 43A-43F and/or FIGS. 41-43) of an rGO/graphene second reaction filter. In certain embodiments, as shown in FIGS. 13A-13C or in FIGS. 43A-43F (e.g., see 4301), the frame assembly includes one or more structural elements selected from, for example: a frame weldment 1301 (e.g., as shown in FIGS. 21A-21C), a drainpan weldment 1302 (e.g., as shown in FIGS. 23A-23E), a lid weldment 1303 (e.g., as shown in FIGS. 22A-22D), a piano hinge 1304, a drain 1305, a spring loaded T-handle latch 1306, a gas spring mount clevis 1307, a gas spring 1308, and a leveling and/or anchored foot 1309. FIG. 13A shows a perspective view of an exemplary embodiment of the frame assembly. FIG. 13B shows a side view of the frame assembly when the lid is closed 1311 and a side view when the lid is opened 1312. In some embodiments, the frame assembly is configured to have a center of gravity 1310 when the lid is opened. In certain embodiments, the piano hinge is made of stainless steel. In certain embodiments, the piano hinge has dimension(s) of, for example, about 0.120 inches in thickness, about 3 inches in width, and about 36 inches in length. FIG. 13C shows a bottom view 1313 of the drainpan weldment, a front view 1314 of the frame assembly with the lid closed, and a side view 1315 of the frame assembly with the lid closed. FIG. 13C also shows a side view 1316 of the lid assembly flush with the drain pan and a side view 1317 of the piano hinge. In certain embodiments, the drain is made of stainless steel. In certain embodiments, the frame weldment mechanically supports the drainpan weldment and the lid weldment. In further embodiments, the frame weldment supports elements and/or sub-assemblies that are directly or indirectly attached to the drainpan or the lid. In certain embodiments, such elements and/or sub-assemblies includes the drum assembly 4303. In certain embodiments, the drainpan and the lid weldment are mechanically coupled to each other and enable opening and closing the lid manually, automatically, or a combination thereof. In certain embodiments, the lid closed on top of the drainpan weldment is water-sealable. In certain embodiments, the center of gravity of the lid assembly is as shown in the right panel of FIG. 13B. In certain embodiments, the drain is located at the bottom of the drainpan. In certain embodiments, the drain is used for draining waste(s) produced in the rGO/graphene second reaction filter (e.g., in the top assembly).

Figure 14A:
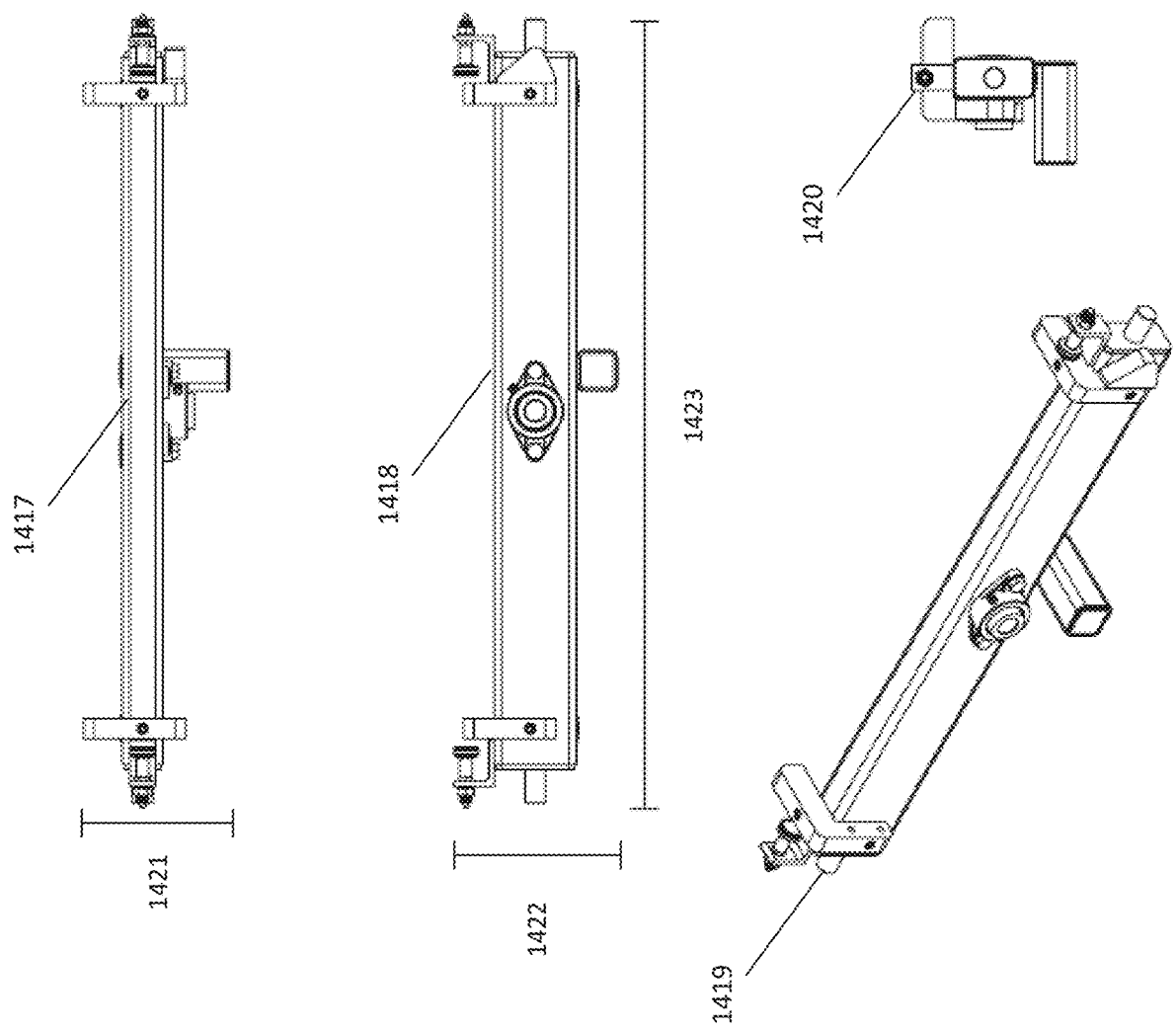
FIGS. 14A-14B show an exemplary embodiment of an cradle pivot assembly (e.g., GSRF-0104)
Figure 14B:
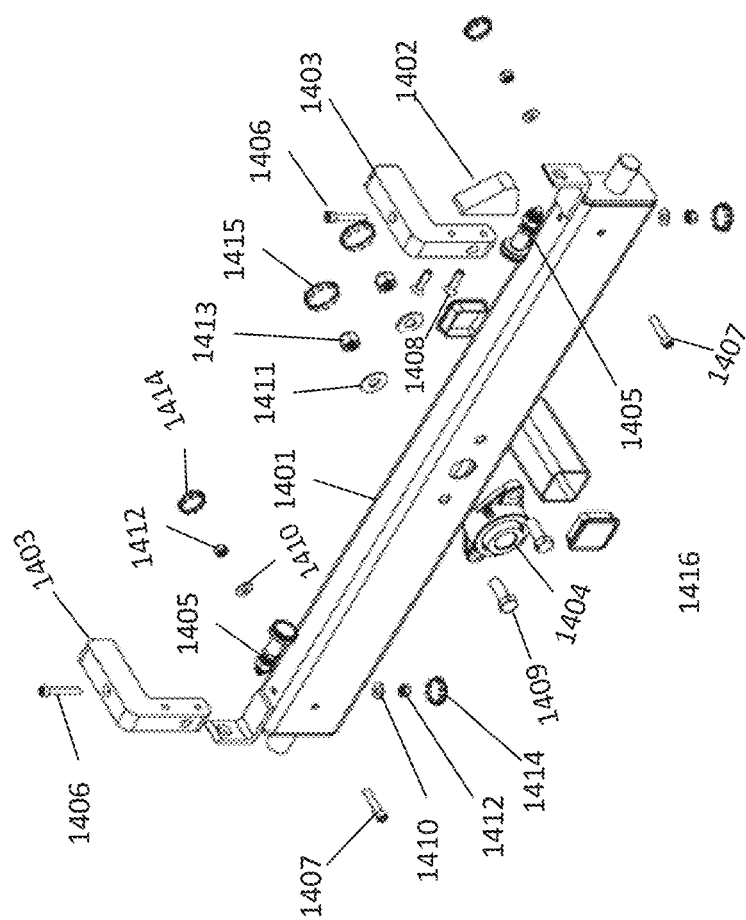
Figure 17:
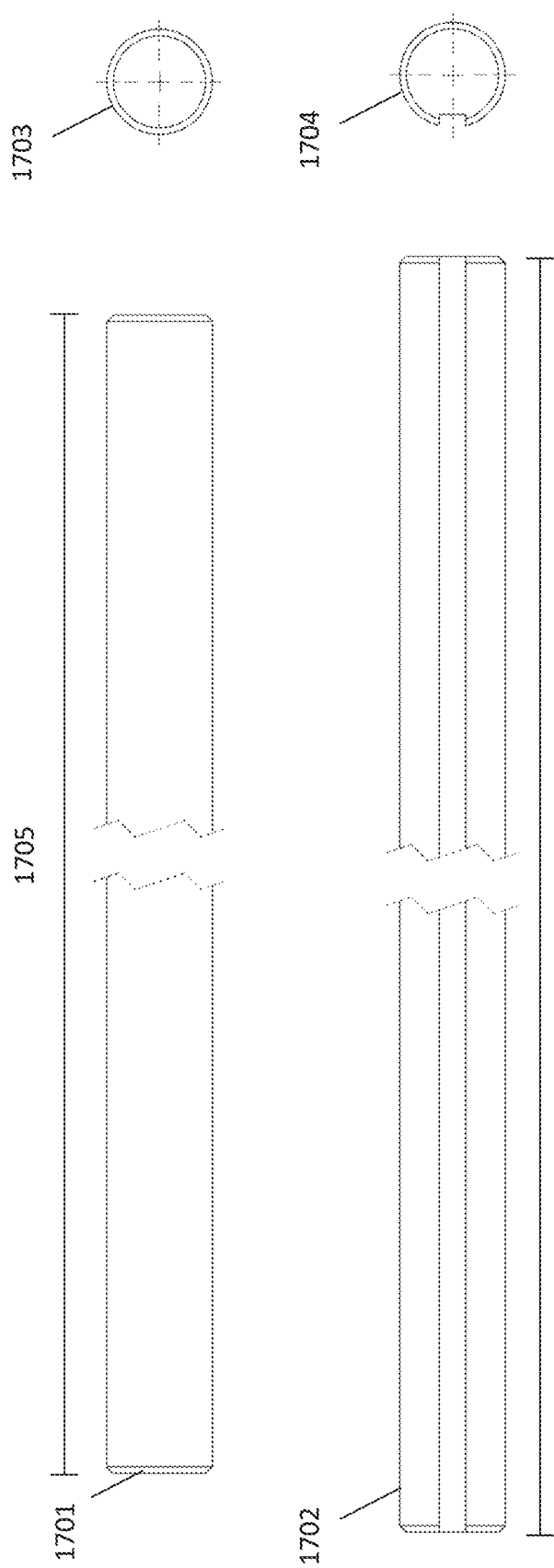
FIG. 17 shows an exemplary embodiment of an idler shaft and a drive shaft (e.g., GSRF-0011)
Figure 26B:
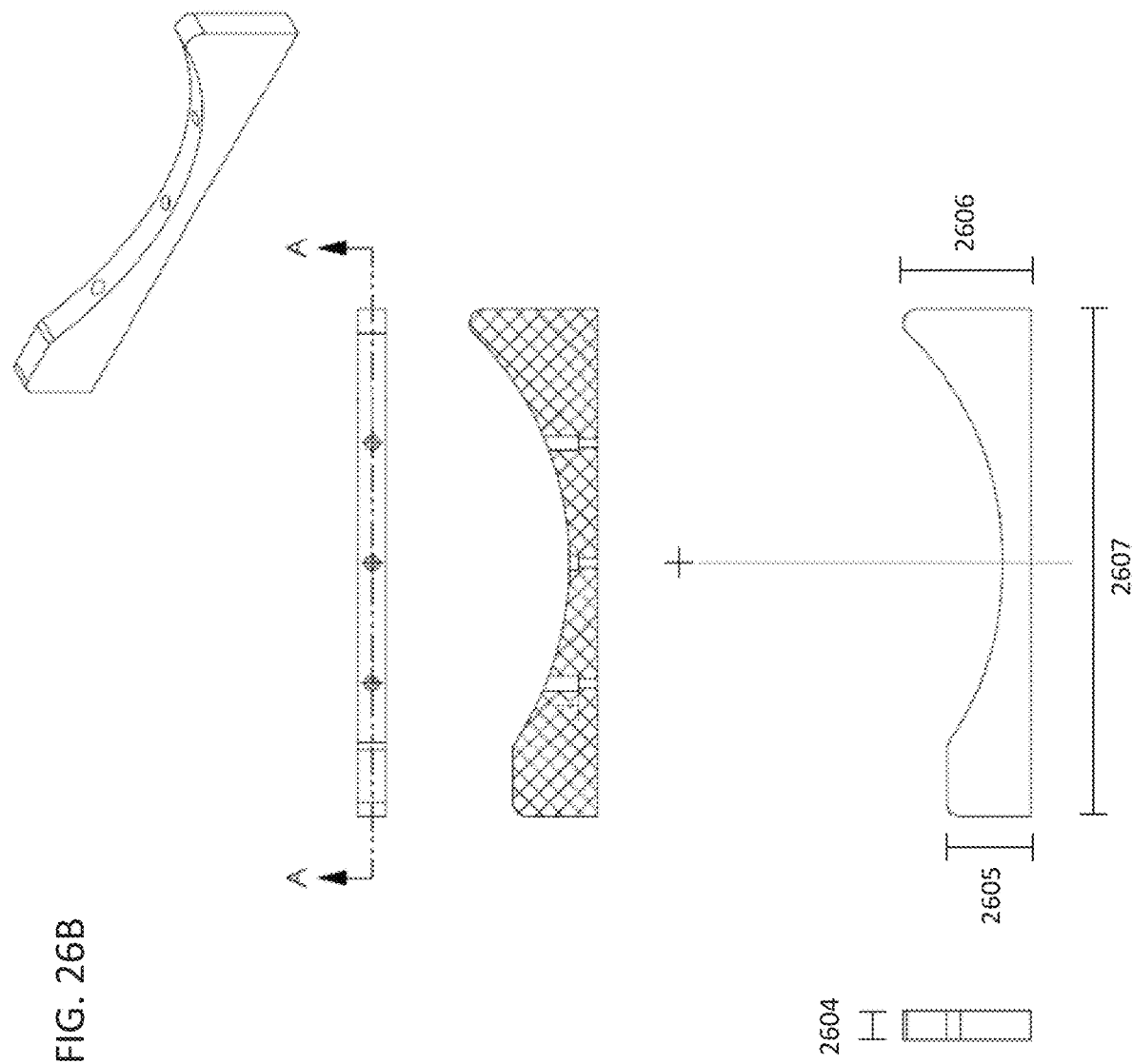

In certain embodiments, a cradle pivot assembly is part of a top assembly of an rGO/graphene second reaction filter. FIG. 14A shows a top view 1417, a front view 1418, a side view 1420, and a perspective view 1419 of an exemplary embodiment of a cradle pivot assembly. In certain embodiments, the cradle pivot assembly has a width 1423 of 38.25 about inches, a height 1422 of about 8.00 inches, and/or a depth 1421 of about 7.13 inches. In certain embodiments, the cradle pivot assembly, as shown in FIGS. 14A-14B or as 4302 in FIGS. 43A-43E, includes one or more structural elements selected from, for example: a cradle pivot weldment 1401, a drum catch 1402 (e.g., as shown in FIG. 17), a drum roll guide 1403 (e.g., as shown in FIGS. 26A-26B), a flange bearing 1404, a spring pin 5, a socket head cap screws 1406 and 1407, a flat head screw 1408, a hex bolt 1409, flat washers 1410 and 1411, nuts 1412 and 1413, hole plugs 1414 and 1415, and a tubing end cap 1416. In certain embodiments, the screw 1406 is $5/16$-$18 \times 1.75$ inches. In certain embodiments, the screw 1407 is $5/16$-$18 \times 1.50$ inches. In certain embodiments, the screw 1408 is $5/16$-$18 \times 1.25$ inches. In certain embodiments, the bolt 1409 is $1/2$-$13 \times 1.375$ inches. In certain embodiments, the flat washer 1410 is $5/16$ inches. In certain embodiments, the flat washer 1411 is $1/2$ inches. In certain embodiments, the nut 1412 is made of stainless steel, and has a size of $5/16$-$18$. In certain embodiments, the nut 1413 is made of stainless steel, and has a size of $1/2$-$13$. In certain embodiments, the hole plug is 1 and $1/8$ inches or 1 and $1/2$ inches. In certain embodiments, the end cap is 2.0 inches in its width, length, or diagonal. In certain embodiments, the end cap has a substantially square shape or any other suitable shapes.

Figure 15A:
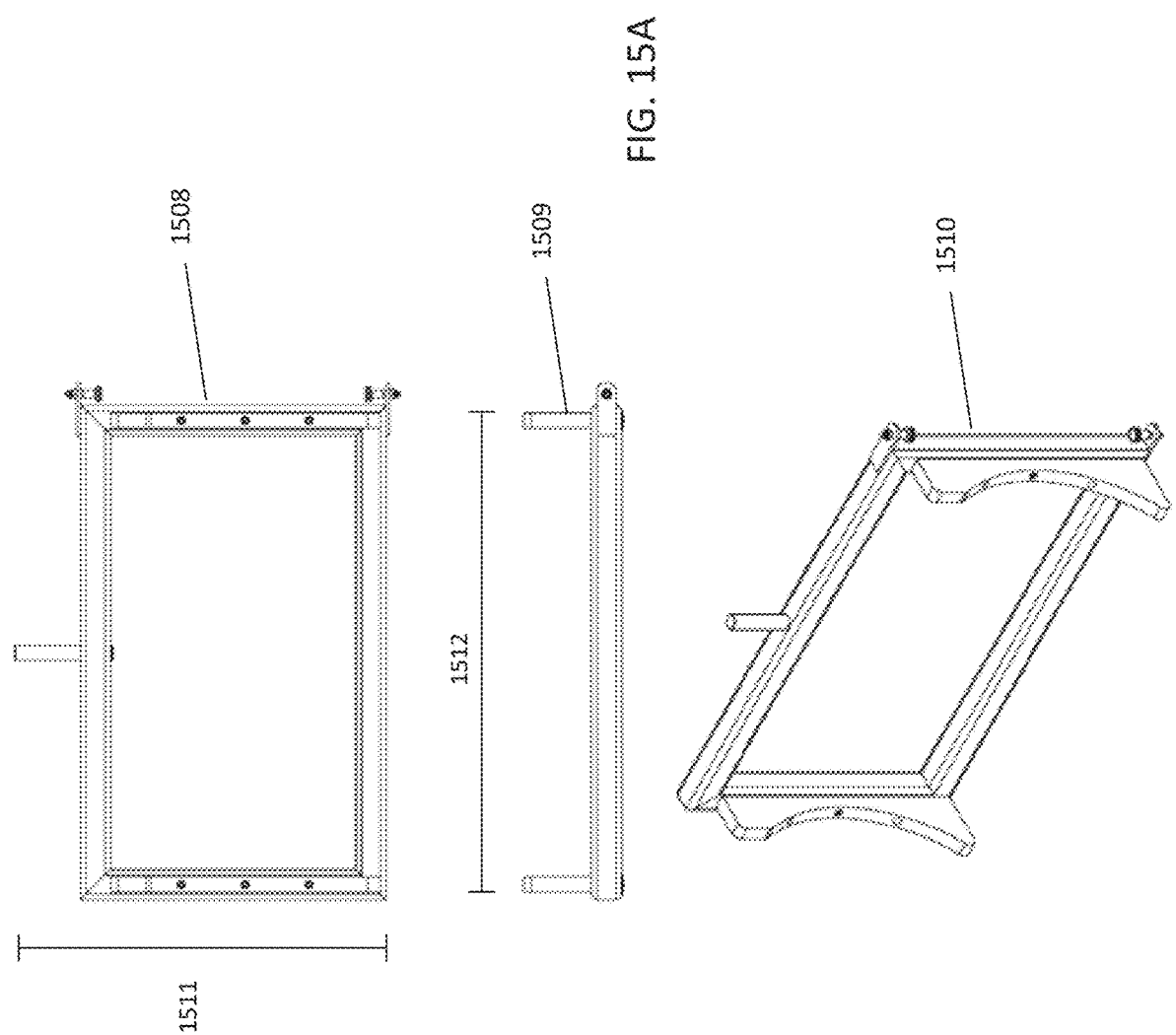
FIGS. 15A-15B show an exemplary embodiment of a drum cradle assembly (e.g., GSRF-0106)
Figure 15B:
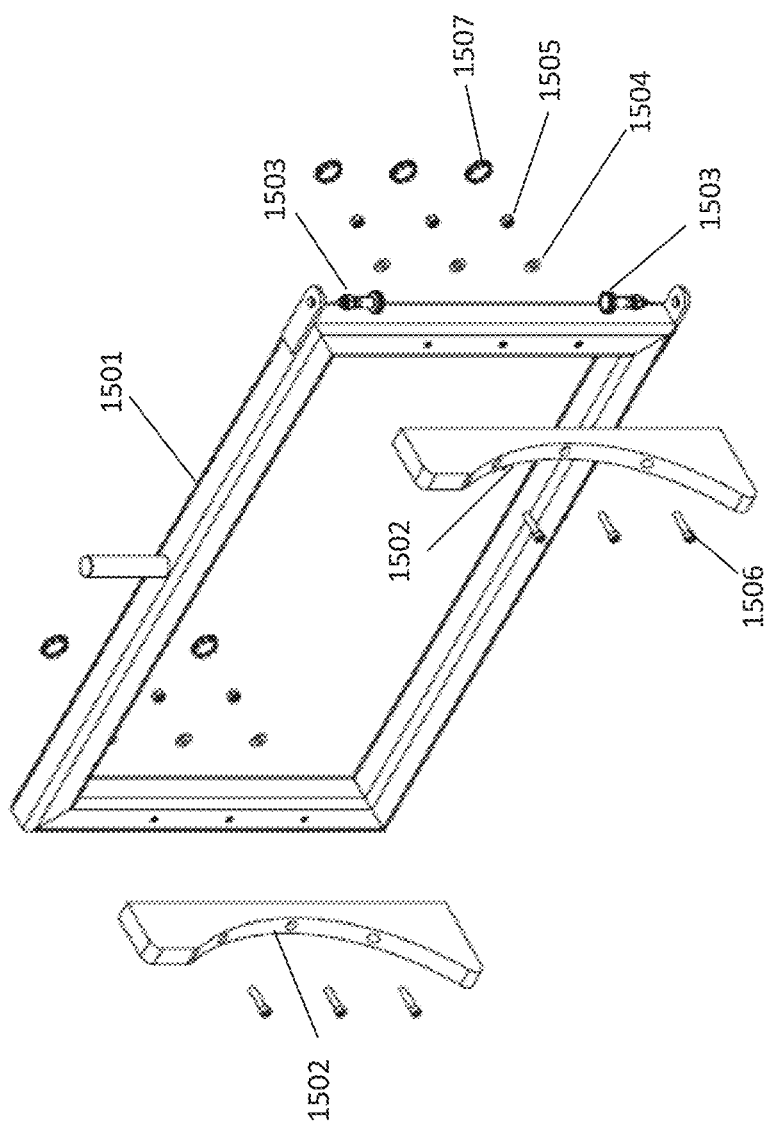

In certain embodiments, the cradle pivot assembly is used to enable pivoting of a drum cradle assembly that is mechanically coupled thereon, as shown, for example, in FIGS. 15A-15B or as 4303 in FIGS. 43A-43F. In certain embodiments, the drum cradle assembly pivots from its initial position (e.g., as shown in the middle panel in FIG. 43C) to a rolling position (e.g., as shown in the right panel of FIG. 43C). In certain embodiments, the cradle pivot assembly enables rotating of the drum cradle assembly from the rolling position (e.g., as shown in the right panel of FIG. 43C) to an unloading position (e.g., as shown in right panels of FIG. 43E). In certain embodiments, the cradle pivot assembly is attached to the drum cradle assembly, wherein the cradle pivot assembly is locked to the frame assembly by a locking pin 1405. In certain embodiments, removal of the locking pin 1405 enables the drum cradle assembly to pivot about a shaft relative to the frame assembly, thus enabling rotation of the drum assembly strapped to the drum cradle assembly (see, e.g., FIG. 43E). In certain embodiments, one or more of such positions of the drum cradle assembly is used in the process of unloading rGO/graphene from the top assembly of the rGO/graphene second reaction filter.

In certain embodiments, a drum cradle assembly is part of a top assembly of an rGO/graphene second reaction filter. In certain embodiments, the drum cradle assembly is as shown in FIGS. 15A-15B or as 4303 in FIGS. 43A-43F. FIG. 15A shows an exemplary embodiment of a drum cradle assembly depicted in a top-down view 1508, a front view 1509, and a perspective view 1510. In certain embodiments, the drum cradle assembly has a length 1511 of about 24.75 inches and a width 1512 between drum braces of about 32.00 inches. In certain embodiments, the drum cradle assembly includes one or more structural elements selected from, for example: a drum cradle weldment 1501, a drum brace 1502 (e.g., as shown in FIGS. 26A-26B), a locking spring pin 1503, a flat washer 1504, a nut 1505, a socket head cap screw 1506, and a hole plug 1507. In certain embodiments, the flat washer 1504 is $5/16$ inches and made of stainless steel. In certain embodiments, the nut 1505 is made of stainless steel, and has a size of $5/16$-$18$. In certain embodiments, the hole plug 1507 is 1 and $1/8$ inches. In certain embodiments, the socket head cap screw 1506 is $5/16$-$18 \times 1.375$ inches. In certain embodiments, the screw 1506 is made of stainless steel.

Figure 28A:
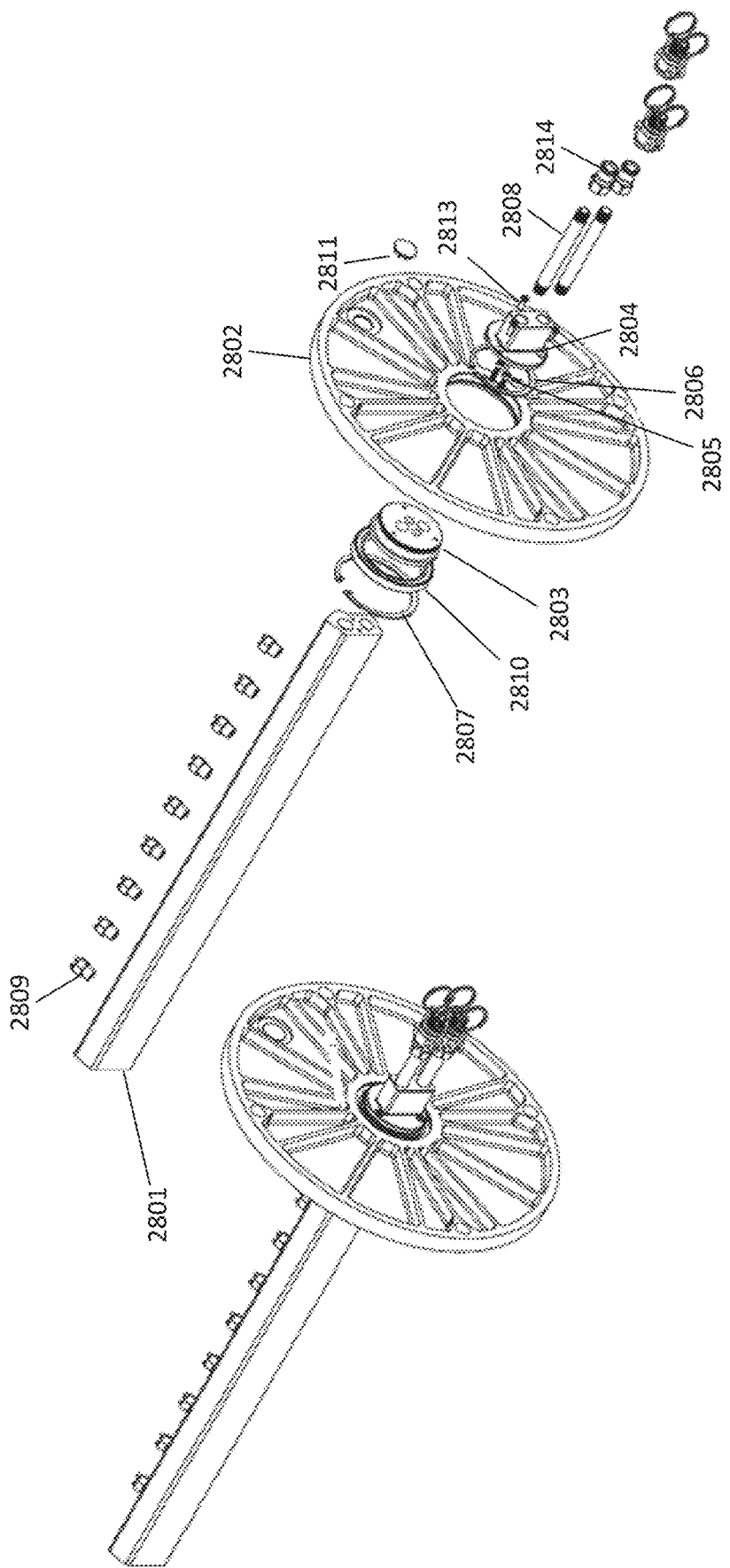
FIGS. 28A-28B show an exemplary embodiment of a spray bar assembly (e.g., GSRF-0109)
Figure 28B:
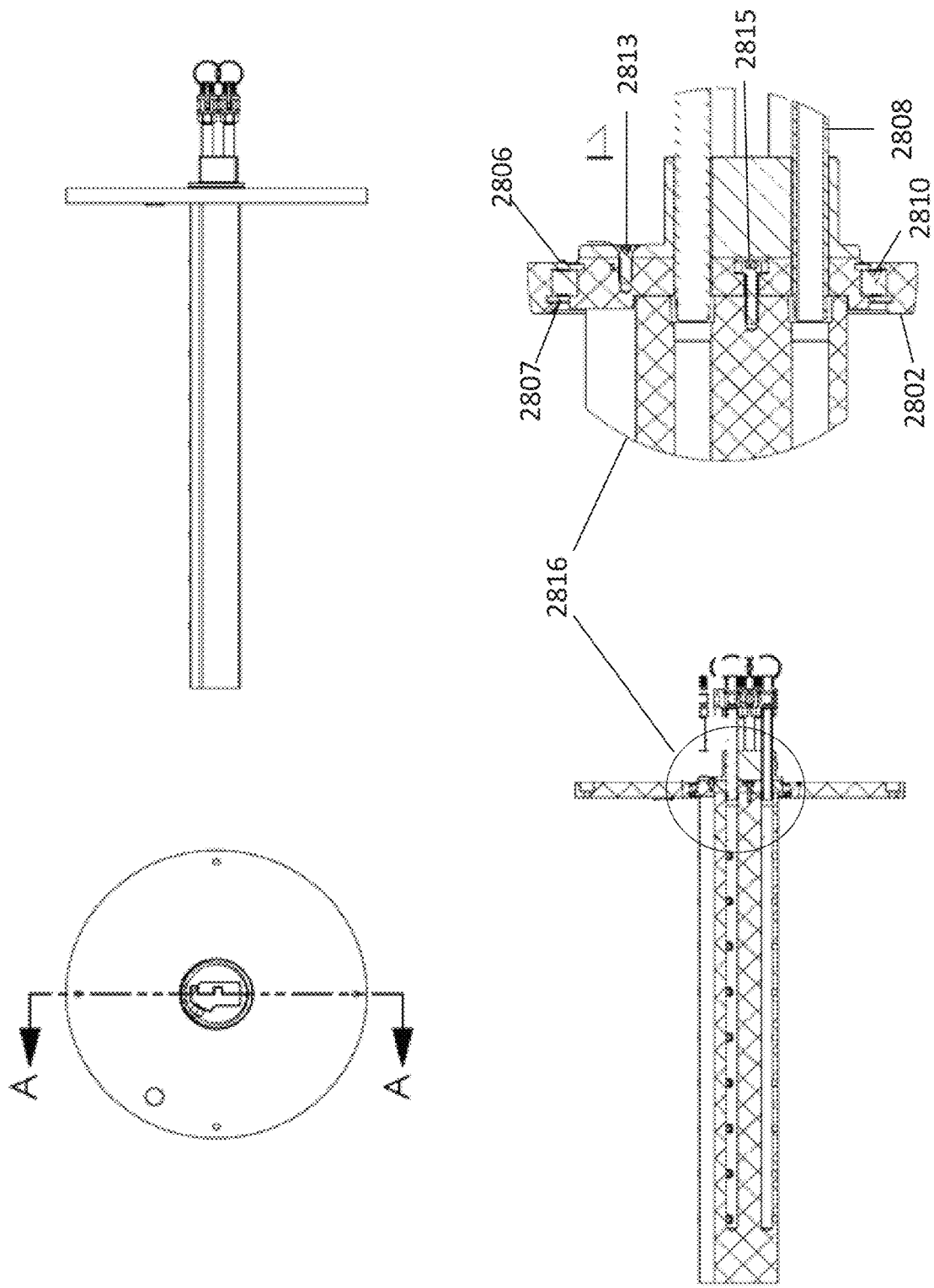

In certain embodiments, the drum cradle assembly has one or more different secured positions to facilitate functioning and/or unloading of the drum assembly. In certain embodiments, the drum cradle assembly is configured to pivot from its initial position (e.g., as shown in the middle panel of FIG. 43C) to a pivoted rolling position (e.g., as shown in the left panel of FIG. 43E) so that the drum assembly can be unlocked and rolled onto the drum cradle assembly. In certain embodiments, after the drum assembly is secured to the cradle assembly, the drum cradle assembly is further rotated to an unloading position (e.g., as shown in right panels in FIG. 43E) to enable removal of the spray bar assembly (e.g., as shown in FIG. 28A-28B and/or as 1606 in FIGS. 16A-16B) and rGO/graphene from the drum assembly. In certain embodiments, the drum assembly is fastened to the cradle assembly via any suitable fastening elements (e.g., straps, latches, hooks and the like).

Figure 16B:
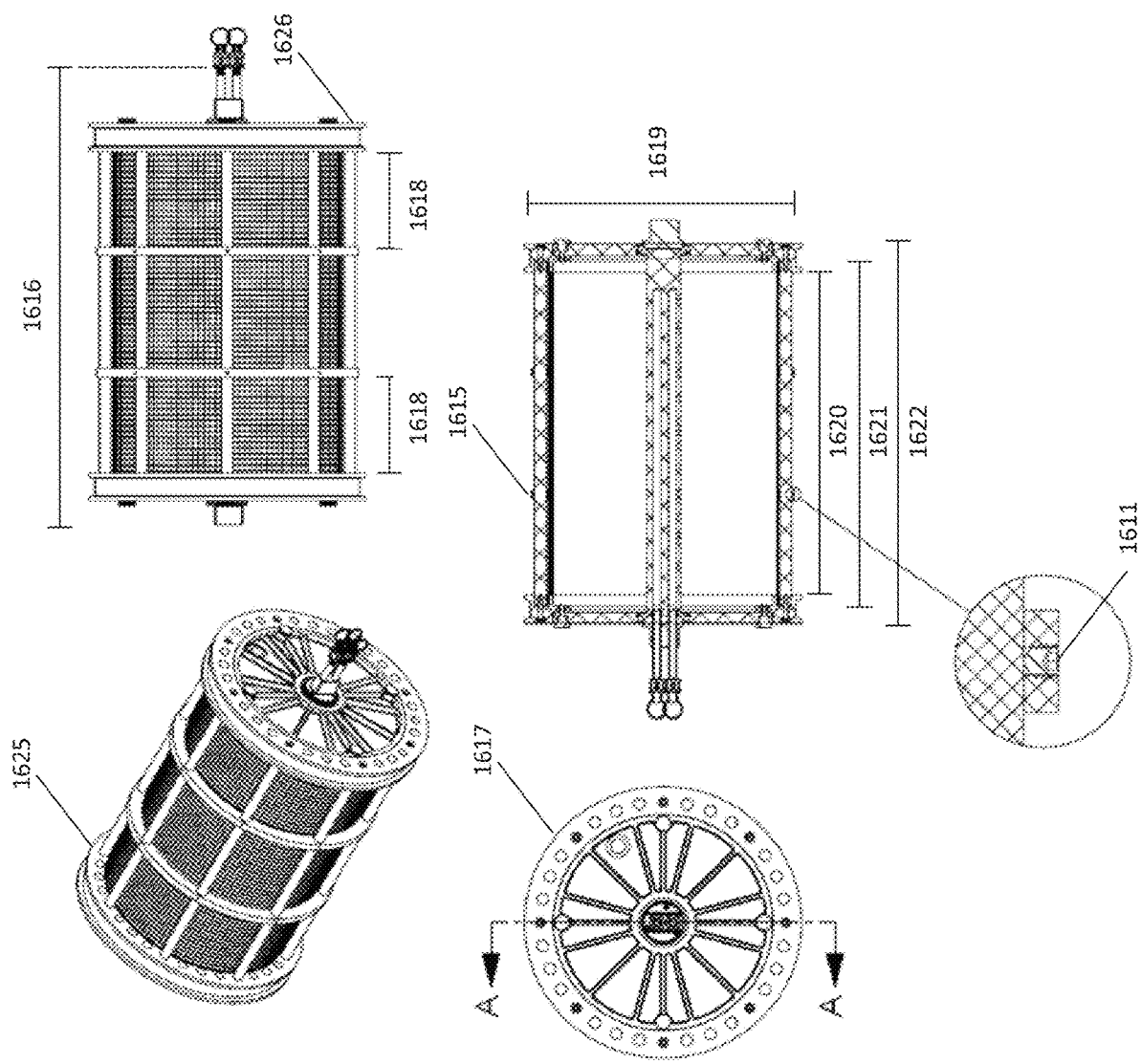
Figure 30B:
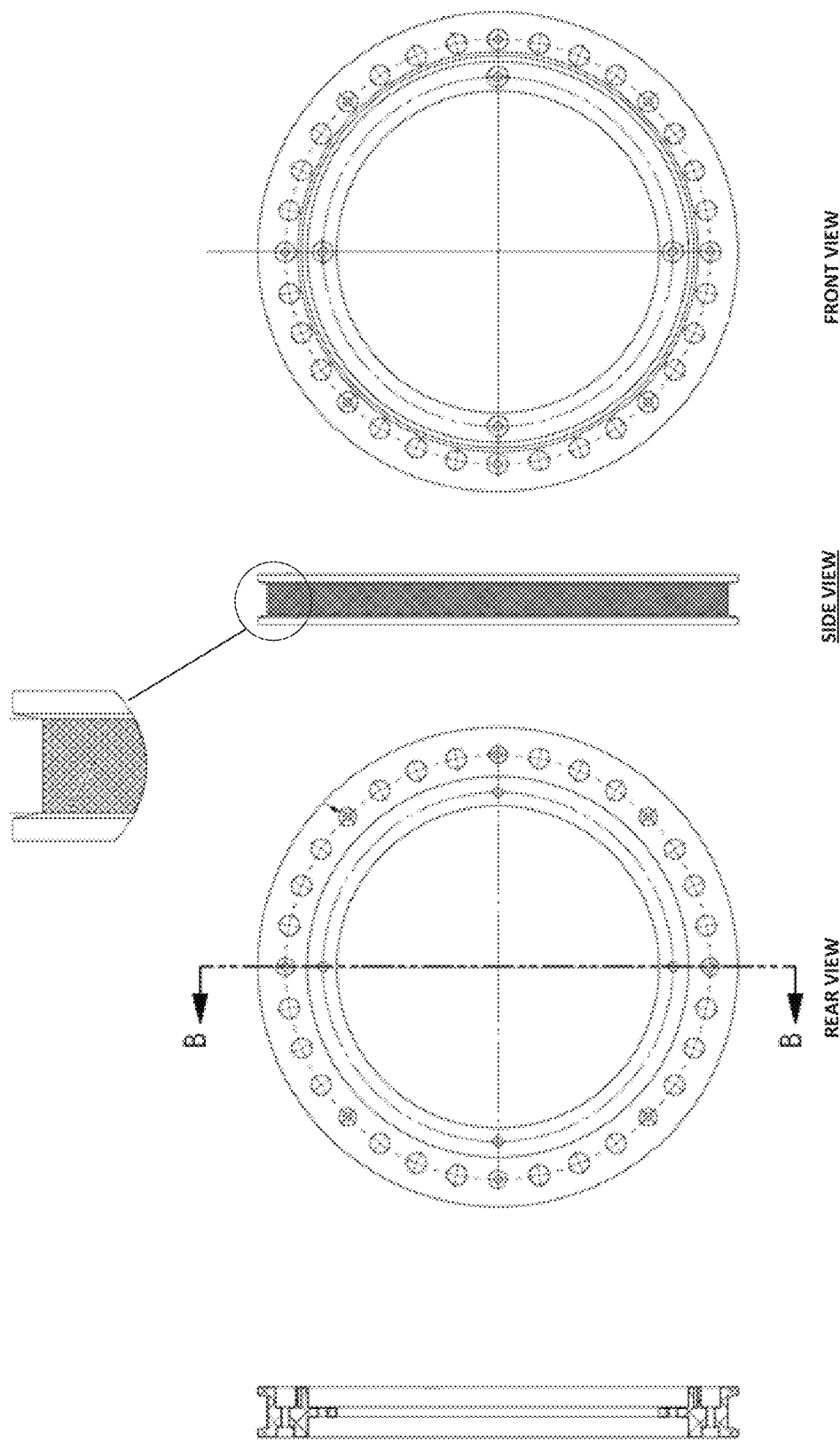
Figure 31:
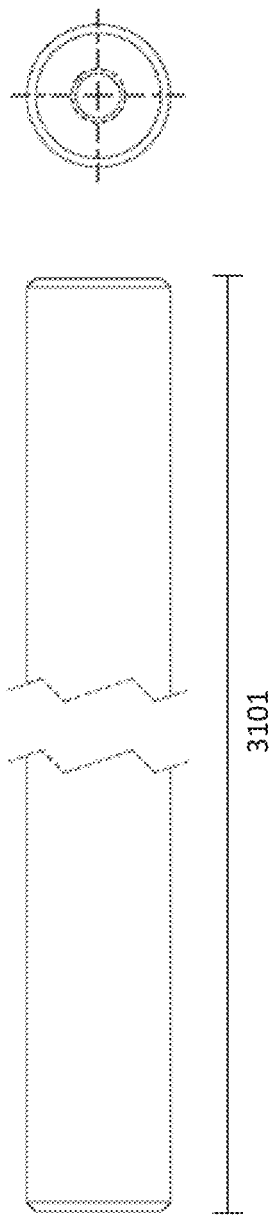
FIG. 31 shows an exemplary embodiment of a drum stiffener (e.g., GSRF-0002)
Figure 34:
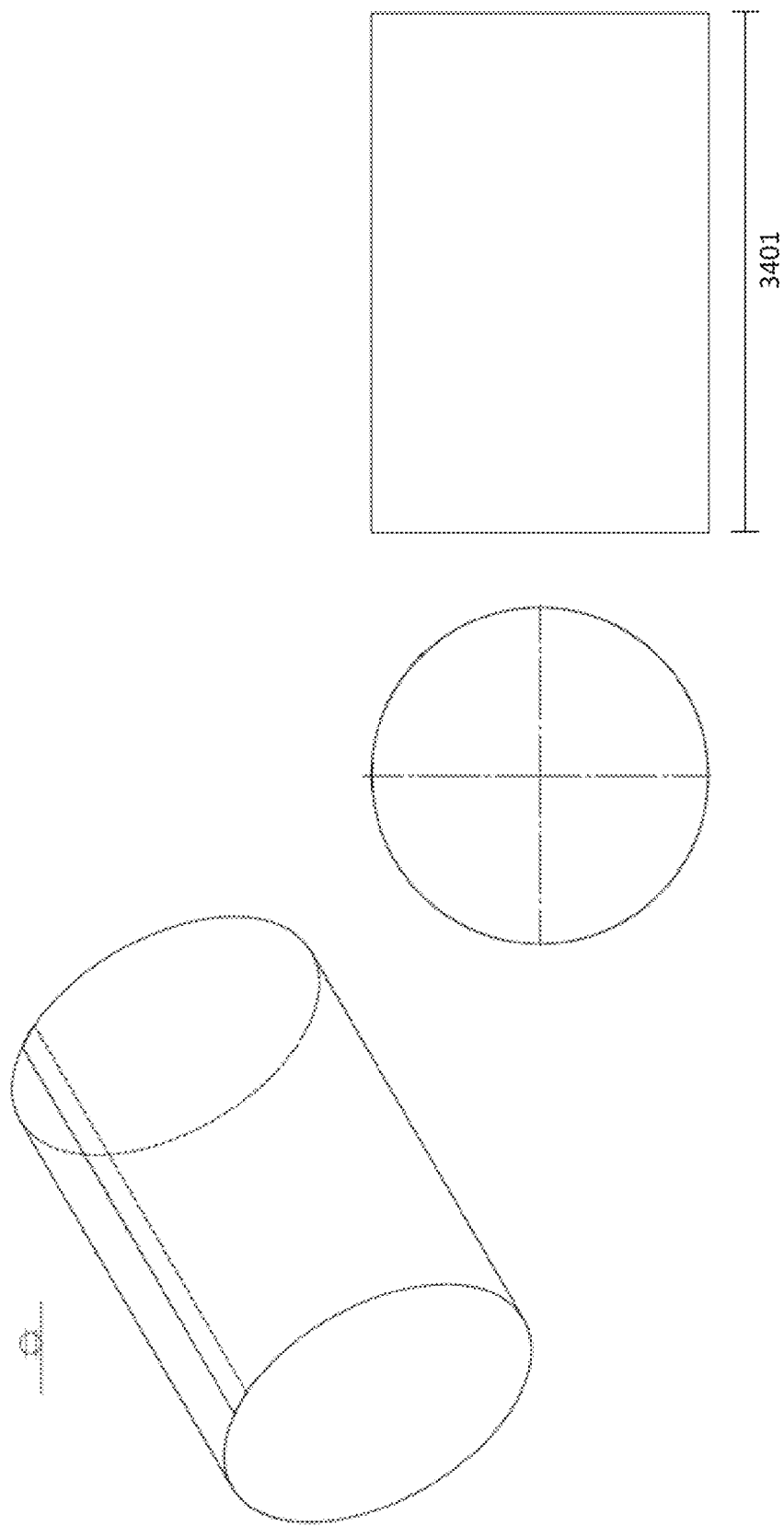
FIG. 34 shows an exemplary embodiment of a drum micron filter (e.g., GSRF-0009)

In certain embodiments, a drum assembly is part of a top assembly of an rGO/graphene second reaction filter for facilitating filtration and collection of rGO/graphene obtained from the rGO/graphene second reaction. In certain embodiments, the drum assembly is as shown in FIGS. 16A-16B or as 4301 in FIGS. 43A-43F. In certain embodiments, the drum assembly includes one or more structural elements selected from, for example: a drum frame 1601 (e.g., as shown in FIGS. 30A-30B), a drum stiffener 1602 (e.g., as shown in FIG. 31), a drum stiffener ring 1603 (e.g., as shown in FIG. 32), a drum mesh 1604 (e.g., as shown in FIG. 33), a drum micron filter 1605 (e.g., as shown in FIG. 34), a spray bar assembly 1606 (e.g., as shown in FIGS. 28A-28B), a drum end cap assembly 1607 (e.g., as shown in FIGS. 29A-29B), a socket head cap screw 1608, a threaded insert 1609, a thumb screw 1610, a set screw 1611, epoxy 1612 (not shown), and mask or masking (e.g., blue masking) 1613. In certain embodiments, epoxy is applied to rod ends and/or threads of a drum stiffener 1602. In certain embodiments, the epoxy is applied prior to installation of a socket head cap screw 1608, and/or a set crew 1611. In certain embodiments, epoxy is applied to fill mesh and/or micron material groove(s) prior to final assembly. In certain embodiments, prior to assembly of the drum assembly, one or more elements (e.g., a subset or a number of elements) of the assembly are dry fit. In certain embodiments, such elements include a drum frame 1601, mesh material 1604, micron material 1605 and/or opposing seams. In certain embodiments, the seams of the mesh material overlap at a given location of the drum frame. In certain embodiments, the seams of the micron material overlap at a given location of the drum frame. In certain embodiments, the locations of overlapping seams are different for the mesh 1623 and the micron material 1624 (e.g., see FIG. 16A, bottom right). In certain embodiments, the mask 1613 is used at inside and outside surfaces (e.g., that is flush with drum frames 1601). In certain embodiments, one or more of the socket head cap screw 1608, threaded insert 1609, thumb screw 1610, and set screw 1611 comprise or are made of any suitable material, for example, stainless steel. In certain embodiments, one or more of the drum frame 1601, drum stiffener 1602, and drum stiffener ring 1603 comprise or are made of any suitable material, for example, HDPE. FIG. 16B shows a perspective view 1625, a front view 1626, a side view 1617, and a cross-section side view 1615 of an exemplary embodiment of a drum assembly. In certain embodiments, the drum assembly has dimensions including one or more of the following: a drum frame outer diameter 1617 of about 24.00 inches, a drum frame inner diameter 1619 of about 23.00 inches, a first length 1620 of about 28.50 inches, a second length 1621 of about 31.00 inches, a third length 1622 of about 33.50 inches, a fourth length 1616 of about 40.42 inches, and a distance 1618 between a drum stiffener ring and a drum frame of about 8.50 inches. In certain embodiments, the components of the drum assembly are configured to minimize its weight. As an example, in certain embodiments, the distance between drum stiffener rings and/or between a drum stiffener ring and a drum frame is at least 8, 10, 12, 14, 16, 18, 20, 22, 24, 26, 28, 30, 35, 40, 45, 50, or more inches, wherein a longer distance allows fewer drum stiffener rings to be used (thereby reducing weight), wherein a shorter distance results in more drum stiffener rings (thereby promoting durability). In one exemplary embodiment, a distance between a drum stiffener ring and a drum frame of about 8.50 inches provides durability while reducing weight by not requiring more stiffener rings to be used. As another example, in certain embodiments, the distance between drum stiffeners is at least 8, 10, 12, 14, 16, 18, 20, 22, 24, 26, 28, 30, 35, 40, 45, 50, or more inches. In certain embodiments, the components of the drum assembly comprise materials selected to minimize weight while maintaining durability. For example, in some embodiments, the drum stiffener rings and/or drum comprise a lightweight and durable material (e.g. HDPE). In a preferred embodiment, the drum mesh and/or the drum micron filter is used to facilitating filtration and collection of rGO/graphene obtained from the rGO/graphene second reaction. In certain embodiments, the drum mesh provides structural support for the drum micron filter. Providing structural support for the drum micron filter is important for preventing the micron filter from sagging or ripping due to the force caused by the weight of the carbonaceous material and wash liquid in combination with the centrifugal force of the rotating drum and the high pressure spray of the wash liquid from the spray bar assembly). In some embodiments, the drum mesh is a stainless steel mesh. In certain embodiments, the pore shape of the drum mesh includes a square, a circle, an oval, a rectangle, a diamond or other geometrical shape (e.g., when the mesh is flat and unrolled). In some embodiments, the pore shape of the drum mesh is a square. In certain embodiments, the pore size of the drum mesh describes a diameter of the pores. In some embodiments, the drum mesh comprises pores having a pore size less than or equal to 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches. In some embodiments, the drum mesh comprises pores having a pore size equal to or greater than 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches. In some embodiments, the drum mesh comprises pores having a pore size of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches. In some embodiments, the drum mesh comprises a pore size of about 0.1 inches to about 1 inch. In some embodiments, the drum mesh comprises a pore size of at least about 0.1 inches. In some embodiments, the drum mesh comprises a pore size of at most about 1 inch. In some embodiments, the drum mesh comprises a pore size of about 0.1 inches to about 0.2 inches, about 0.1 inches to about 0.3 inches, about 0.1 inches to about 0.4 inches, about 0.1 inches to about 0.5 inches, about 0.1 inches to about 0.6 inches, about 0.1 inches to about 0.7 inches, about 0.1 inches to about 0.8 inches, about 0.1 inches to about 0.9 inches, about 0.1 inches to about 1 inch, about 0.2 inches to about 0.3 inches, about 0.2 inches to about 0.4 inches, about 0.2 inches to about 0.5 inches, about 0.2 inches to about 0.6 inches, about 0.2 inches to about 0.7 inches, about 0.2 inches to about 0.8 inches, about 0.2 inches to about 0.9 inches, about 0.2 inches to about 1 inch, about 0.3 inches to about 0.4 inches, about 0.3 inches to about 0.5 inches, about 0.3 inches to about 0.6 inches, about 0.3 inches to about 0.7 inches, about 0.3 inches to about 0.8 inches, about 0.3 inches to about 0.9 inches, about 0.3 inches to about 1 inch, about 0.4 inches to about 0.5 inches, about 0.4 inches to about 0.6 inches, about 0.4 inches to about 0.7 inches, about 0.4 inches to about 0.8 inches, about 0.4 inches to about 0.9 inches, about 0.4 inches to about 1 inch, about 0.5 inches to about 0.6 inches, about 0.5 inches to about 0.7 inches, about 0.5 inches to about 0.8 inches, about 0.5 inches to about 0.9 inches, about 0.5 inches to about 1 inch, about 0.6 inches to about 0.7 inches, about 0.6 inches to about 0.8 inches, about 0.6 inches to about 0.9 inches, about 0.6 inches to about 1 inch, about 0.7 inches to about 0.8 inches, about 0.7 inches to about 0.9 inches, about 0.7 inches to about 1 inch, about 0.8 inches to about 0.9 inches, about 0.8 inches to about 1 inch, or about 0.9 inches to about 1 inch. In some embodiments, the drum mesh itself is further supported by drum rings and/or drum stiffeners to prevent sagging or deformation. In certain embodiments, the drum micron filter is positioned just within the internal surface of the drum mesh inside the drum assembly. In certain embodiments, the drum micron filter is flush with the drum mesh. In certain embodiments, the drum micron filter comprises one or more layers. In some embodiments, the drum micron filter comprises about 1 layer to about 10 layers. In some embodiments, the drum micron filter comprises at least about 1 layer (e.g. of a micron filter sheet). In some embodiments, the drum micron filter comprises at most about 10 layers. In some embodiments, the drum micron filter comprises about 1 layer to about 2 layers, about 1 layer to about 3 layers, about 1 layer to about 4 layers, about 1 layer to about 5 layers, about 1 layer to about 6 layers, about 1 layer to about 7 layers, about 1 layer to about 8 layers, about 1 layer to about 9 layers, about 1 layer to about 10 layers, about 2 layers to about 3 layers, about 2 layers to about 4 layers, about 2 layers to about 5 layers, about 2 layers to about 6 layers, about 2 layers to about 7 layers, about 2 layers to about 8 layers, about 2 layers to about 9 layers, about 2 layers to about 10 layers, about 3 layers to about 4 layers, about 3 layers to about 5 layers, about 3 layers to about 6 layers, about 3 layers to about 7 layers, about 3 layers to about 8 layers, about 3 layers to about 9 layers, about 3 layers to about 10 layers, about 4 layers to about 5 layers, about 4 layers to about 6 layers, about 4 layers to about 7 layers, about 4 layers to about 8 layers, about 4 layers to about 9 layers, about 4 layers to about 10 layers, about 5 layers to about 6 layers, about 5 layers to about 7 layers, about 5 layers to about 8 layers, about 5 layers to about 9 layers, about 5 layers to about 10 layers, about 6 layers to about 7 layers, about 6 layers to about 8 layers, about 6 layers to about 9 layers, about 6 layers to about 10 layers, about 7 layers to about 8 layers, about 7 layers to about 9 layers, about 7 layers to about 10 layers, about 8 layers to about 9 layers, about 8 layers to about 10 layers, or about 9 layers to about 10 layers. In certain embodiments, the drum micron filter comprises a pore size suitable for retaining rGO/graphene while allowing undesirable reaction products or impurities to pass. In certain embodiments, a carbonaceous composition (e.g. GO and/or rGO) dispensed within the interior of the drum assembly is trapped by the drum mesh and/or drum micron filter. In certain embodiments, the pore size of a drum micron filter describes a diameter of the pores. In certain embodiments, the drum micron filter comprises a pore size suitable for retaining at least about 10%, 20%, 30%, 40%, 50%, 60%, 70%, 80%, 90%, 95%, 96%, 97%, 98%, or 99% of rGO/graphene. In certain embodiments, the drum micron filter comprises a pore size of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 5.0, or 10.0 microns. In certain embodiments, the drum micron filter comprises a pore size of greater than or equal to about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 5.0, or 10.0 microns. In certain embodiments, the drum micron filter has a pore size of less than or equal to (e.g. no more than) about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 5.0, or 10.0 microns. In some embodiments, the drum micron filter comprises a pore size of about 0.1 microns to about 3 microns. In some embodiments, the drum micron filter comprises a pore size of at least about 0.1 microns. In some embodiments, the drum micron filter comprises a pore size of at most about 3 microns. In some embodiments, the drum micron filter comprises a pore size of about 0.1 microns to about 0.5 microns, about 0.1 microns to about 0.8 microns, about 0.1 microns to about 0.9 microns, about 0.1 microns to about 1 micron, about 0.1 microns to about 1.1 microns, about 0.1 microns to about 1.2 microns, about 0.1 microns to about 1.5 microns, about 0.1 microns to about 2 microns, about 0.1 microns to about 2.5 microns, about 0.1 microns to about 3 microns, about 0.5 microns to about 0.8 microns, about 0.5 microns to about 0.9 microns, about 0.5 microns to about 1 micron, about 0.5 microns to about 1.1 microns, about 0.5 microns to about 1.2 microns, about 0.5 microns to about 1.5 microns, about 0.5 microns to about 2 microns, about 0.5 microns to about 2.5 microns, about 0.5 microns to about 3 microns, about 0.8 microns to about 0.9 microns, about 0.8 microns to about 1 micron, about 0.8 microns to about 1.1 microns, about 0.8 microns to about 1.2 microns, about 0.8 microns to about 1.5 microns, about 0.8 microns to about 2 microns, about 0.8 microns to about 2.5 microns, about 0.8 microns to about 3 microns, about 0.9 microns to about 1 micron, about 0.9 microns to about 1.1 microns, about 0.9 microns to about 1.2 microns, about 0.9 microns to about 1.5 microns, about 0.9 microns to about 2 microns, about 0.9 microns to about 2.5 microns, about 0.9 microns to about 3 microns, about 1 micron to about 1.1 microns, about 1 micron to about 1.2 microns, about 1 micron to about 1.5 microns, about 1 micron to about 2 microns, about 1 micron to about 2.5 microns, about 1 micron to about 3 microns, about 1.1 microns to about 1.2 microns, about 1.1 microns to about 1.5 microns, about 1.1 microns to about 2 microns, about 1.1 microns to about 2.5 microns, about 1.1 microns to about 3 microns, about 1.2 microns to about 1.5 microns, about 1.2 microns to about 2 microns, about 1.2 microns to about 2.5 microns, about 1.2 microns to about 3 microns, about 1.5 microns to about 2 microns, about 1.5 microns to about 2.5 microns, about 1.5 microns to about 3 microns, about 2 microns to about 2.5 microns, about 2 microns to about 3 microns, or about 2.5 microns to about 3 microns. In certain embodiments, the drum micron filter has a pore size of about 1, 2, 3, 5, or 10 microns. In one exemplary embodiment, the drum micron filter has a pore size of about 1 micron. In certain embodiments, the drum micron filter with a pore size of about 1 micron retains at least about 80%, 85%, 90%, 95%, 96%, 97%, 98%, or 99% of rGO/graphene dispensed within the interior of the drum assembly. One benefit of using the micron filter is the ability to effectively filter rGO/graphene with high retention of the rGO/graphene while separating and/or removing a filtrate comprising leftover reactants, reaction byproducts, impurities, and other undesirable compounds. For example, the use of the drum micron filter that traps rGO/graphene in combination with a spray bar assembly that washes the trapped rGO/graphene with high pressure deionized water (or other liquid suitable for cleaning/purifying rGO/graphene) enables the efficient filtration and/or purification of rGO/graphene for use in downstream applications (e.g. for use in building batteries or capacitors). In certain embodiments, the drum assembly has an initial position (e.g., as shown in bottom left panel of FIG. 43). In certain embodiments, the drum assembly has a rolling position when it is positioned on a pivoted drum cradle assembly (e.g., as shown in middle panels of FIG. 43). In certain embodiments, the drum assembly has an unloading position when it is fastened on a rotated drum cradle assembly (e.g., as shown in right panels of FIG. 43). In certain embodiments, one or more of such positions of the drum assembly are used in the process of unloading rGO/graphene from the top assembly of the rGO/graphene second reaction filter. In certain embodiments, at one or more of such positions (e.g., at the initial position), the drum assembly is rotated via the drum shaft when actuated by a motor. In certain embodiments, the drum assembly has a rotational speed of about 600 rpm (revolutions per minute). In certain embodiments, the drum assembly has a rotational speed from about 0 to about 50, about 0 to about 100, about 0 to about 150, about 0 to about 200, about 0 to about 250, about 0 to about 300, about 0 to about 350, about 0 to about 400, about 0 to about 450, about 0 to about 500, about 50 to about 100, about 50 to about 150, about 50 to about 200, about 50 to about 250, about 50 to about 300, about 50 to about 350, about 50 to about 400, about 50 to about 450, about 50 to about 500, about 100 to about 150, about 100 to about 200, about 100 to about 250, about 100 to about 300, about 100 to about 350, about 100 to about 400, about 100 to about 450, about 100 to about 500, about 150 to about 200, about 150 to about 250, about 150 to about 300, about 150 to about 350, about 150 to about 400, about 150 to about 450, about 150 to about 500, about 200 to about 250, about 200 to about 300, about 200 to about 350, about 200 to about 400, about 200 to about 450, about 200 to about 500, about 250 to about 300, about 250 to about 350, about 250 to about 400, about 250 to about 450, about 250 to about 500, about 300 to about 350, about 300 to about 400, about 300 to about 450, about 300 to about 500, about 350 to about 400, about 350 to about 450, about 350 to about 500, about 400 to about 450, about 400 to about 500, or about 450 to about 500, about 500 to about 600, about 500 to about 700, about 500 to about 800, about 500 to about 900, about 500 to about 1,000, about 600 to about 700, about 600 to about 800, about 600 to about 900, about 600 to about 1,000, about 700 to about 800, about 700 to about 900, about 700 to about 1,000, about 800 to about 900, about 800 to about 1,000, or about 900 to about 1,000 rpm (revolutions per minute).

In certain embodiments, a drive shaft 4305 and an idler shaft 4306 (e.g., as shown in FIG. 17 and FIGS. 43A-43F) form part of a top assembly of an rGO/graphene second reaction filter for mechanically supporting elements and/or sub-assemblies of the top assembly. FIG. 17 shows an exemplary embodiment of a drive shaft 1702 and an idler shaft 1701 with front views (1702 and 1701 respectively) and side views (1704 and 1703 respectively). In certain embodiments, a drive shaft 1702 has a length 1706 of about 40.69 inches. In certain embodiments, an idler shaft 1701 has a length 1705 of about 38.06 inches. In certain embodiments, the drive shaft is actuated by a drive motor 4316. In certain embodiments, the drive motor 4316 is engaged with a pulley system. In certain embodiments, the pulley system comprises drive shaft pulleys 4320 and 4321. In certain embodiments, the drive shaft pulleys 4320 and 4321 are mechanically linked via a drive belt 4322. In certain embodiments, the drive motor causes the drive shaft pulley 4320 to rotate or turn the drive belt 4322, which in turn rotates or turns the drive shaft pulley 4321. In certain embodiments, the drive shaft pulley 4321 is engaged with the drive shaft 4305. In certain embodiments, a drive shaft 4305 is configured to actuate the rotation of a drum assembly. In certain embodiments, a drive shaft 4305 is engaged with one or more drive wheels 4314. In certain embodiments, a drive shaft is engaged with two drive wheels. In certain embodiments, the centers of the two drive wheels are about 31.00 inches apart. In certain embodiments, one or more drive wheels 4314 are engaged with a drum assembly. In certain embodiments, one or more drive wheels are engaged with the one or more drum frame 1601 of a drum assembly. In certain embodiments, a drum bearing plate 2801 is attached to a drum frame 1601. In certain embodiments, a drive wheel is engaged with a drum frame 1601 of a drum assembly. In certain embodiments, a drive wheel 4314 is engaged with a drum frame 1601 of a drum assembly to transmit rotation from the drive shaft 4305 to the drum assembly. In certain embodiments, one or more drive wheels transmit rotation of the drive shaft to the drum assembly (see FIGS. 43C-43D). In certain embodiments, the drive shaft 4305 and drive wheels 4314 are engaged with one side of the drum assembly. In certain embodiments, the idler shaft 4306 and idler wheels 4315 are engaged with an opposite side of the drum assembly. In certain embodiments, the idler shaft 4306 does not actuate the drum assembly. In certain embodiments, the idler shaft 4306 provides passive support to the drum assembly as it rotates. In certain embodiments, the idler shaft 4306 also provides support to the drum assembly when the assembly is rolled onto the support cradle during an unloading procedure (see, e.g., FIG. 43E). In some exemplary embodiments, as shown in FIGS. 43A-43F, the drive motor 4316 actuates the drive shaft pulley 4320, which is coupled to a drive belt 4322 that transmits the rotation to another drive shaft pulley 4321 that is engaged with the drive shaft 4305. As the drive shaft 4305 rotates, so do the two drive wheels 4314 that are attached to the drive shaft 4305. Since the drive wheels 4314 are engaged with the drum bearing plate 2802 of the drum assembly, the rotation of the drive wheels 4314 causes the drum bearing plate 2802, and consequently, the drum assembly to rotate or turn about its axis (e.g., the drum shaft). As the drum assembly rotates, the idler wheels 4315 attached to the idler shaft 4306 engaged with the drum assembly on the opposite side of the drive shaft 4305 rotate with the drum assembly to provide support. Exemplary embodiments of the drive shaft and the idler shaft are as shown in FIG. 17, or as 4305 and/or 4306 in FIGS. 43A-43F. In certain embodiments, the drive shaft and/or the idler shaft comprise or are made of any suitable material, for example, stainless steel. In certain embodiments, the diameter of a longitudinal cross-section of the drive shaft and/or the idler shaft is about 1 inch. In certain embodiments, the longitudinal length of an idler shaft is about 38.06 inches. In certain embodiments, a longitudinal length of a drive shaft is about 40.69 inches. In certain embodiments, the material of the drive shaft includes, for example, stainless steel. In certain embodiments, the drive shaft and/or the idler shaft is keyed, cut to length and/or have chamfer ends.

Figure 18A:
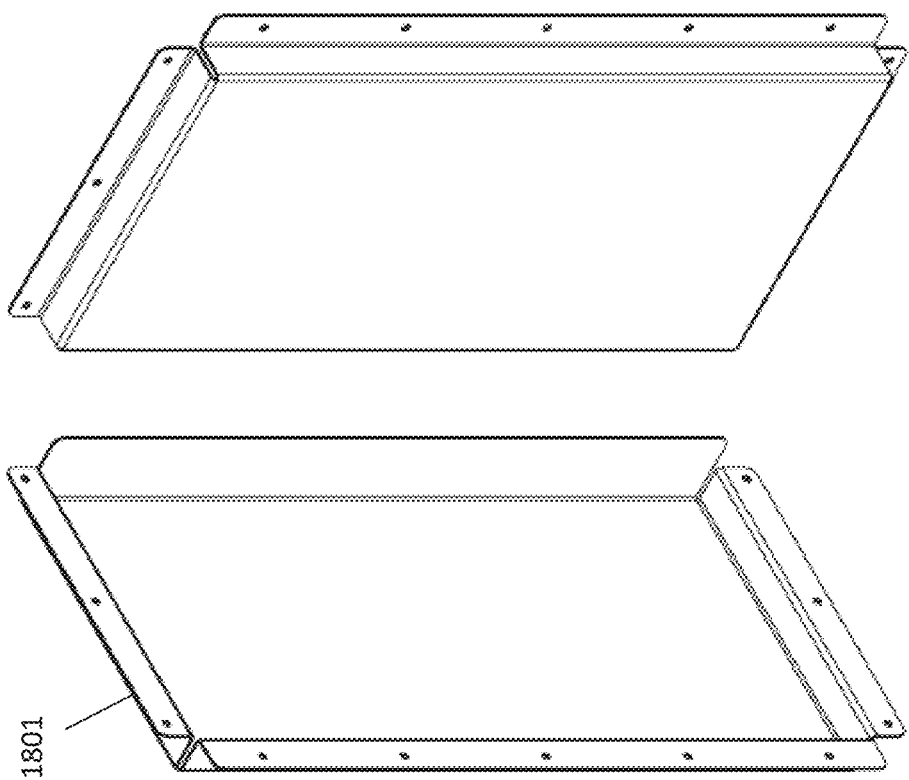
FIGS. 18A-18B show an exemplary embodiment of a drive shroud (e.g., GSRF-0012)
Figure 18B:
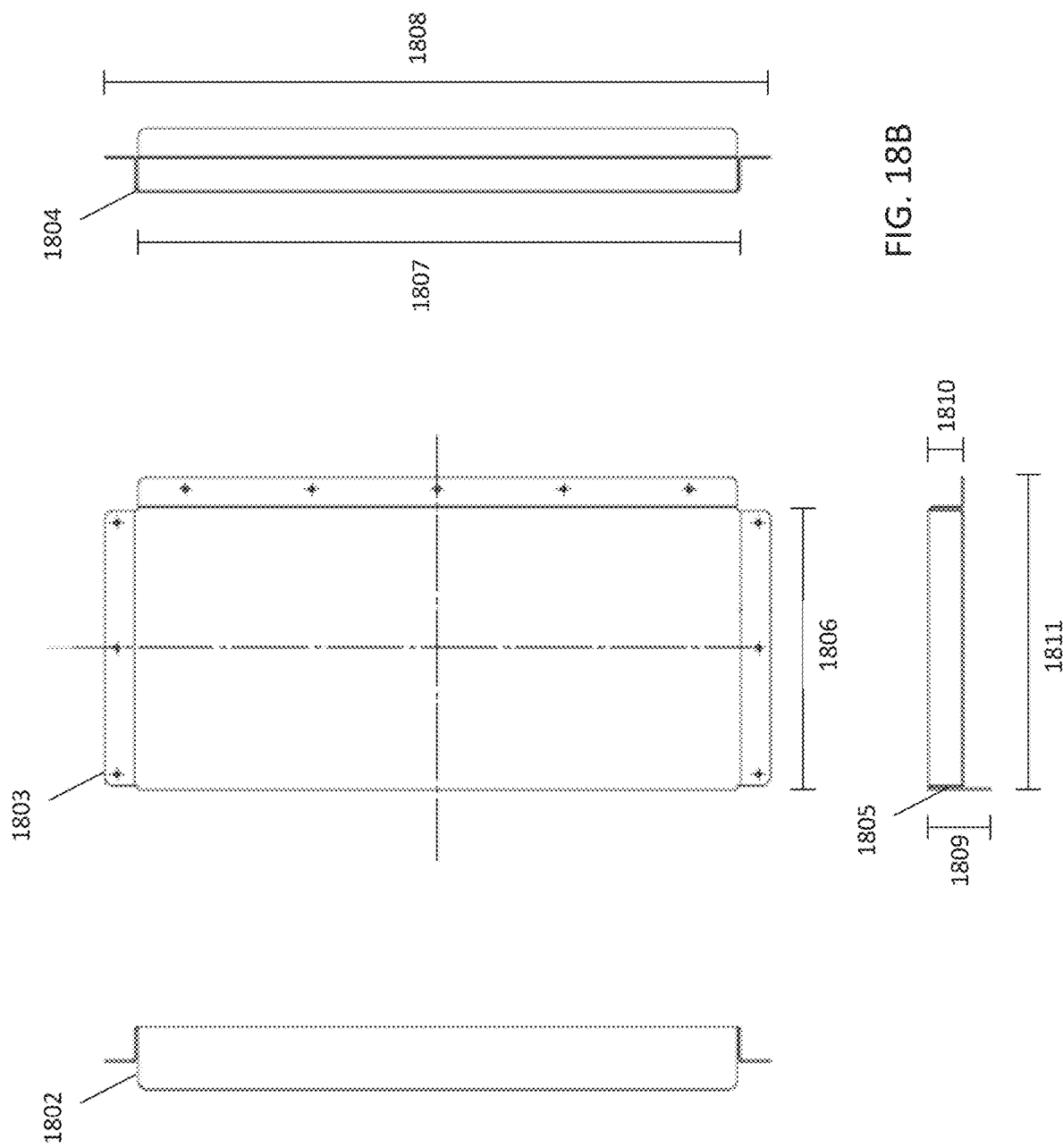

In certain embodiments, a drive shroud is as shown in FIGS. 18A-18B or as 4307 in FIGS. 43A-43F. In certain embodiments, drive shroud is included in a top assembly of an rGO/graphene second reaction filter for shrouding elements including the motor that actuates the drum assembly. FIG. 18A shows a perspective view 1801 of an embodiment of a drive shroud from two angles. FIG. 18B shows a left side view 1802, a right side view 1804, a front view 1805, and a top-down view 1803 of the drive shroud. In certain embodiments, a drive shroud has dimensions including one or more of the following: a width 1806 of about 8.75 inches, a width 1811 of about 9.94 inches, a length 1807 of about 19.00 inches, a length 1808 of about 21.13 inches, a height 1810 of about 1.13 inches, and a height 1809 of about 2.00 inches. In certain embodiments, drive shroud comprises or is made of a material that includes, for example, stainless steel sheet. In certain embodiments, thickness of the sheet is about 0.063 inches. In certain embodiments, drive shroud has welded corner seams and is ground smooth.

Figure 19A:
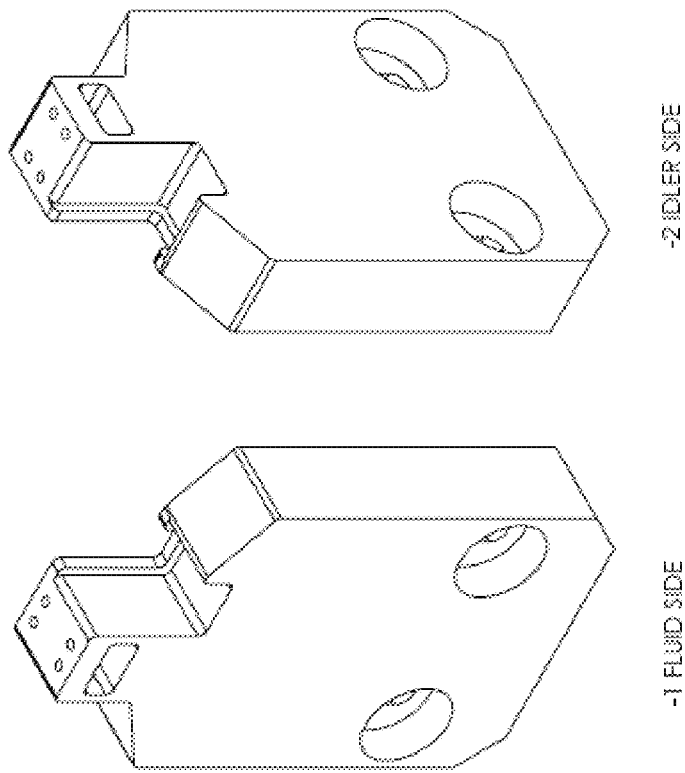
FIGS. 19A-19B show an exemplary embodiment of a drum shaft support (e.g., GSRF-0013)
Figure 19B:
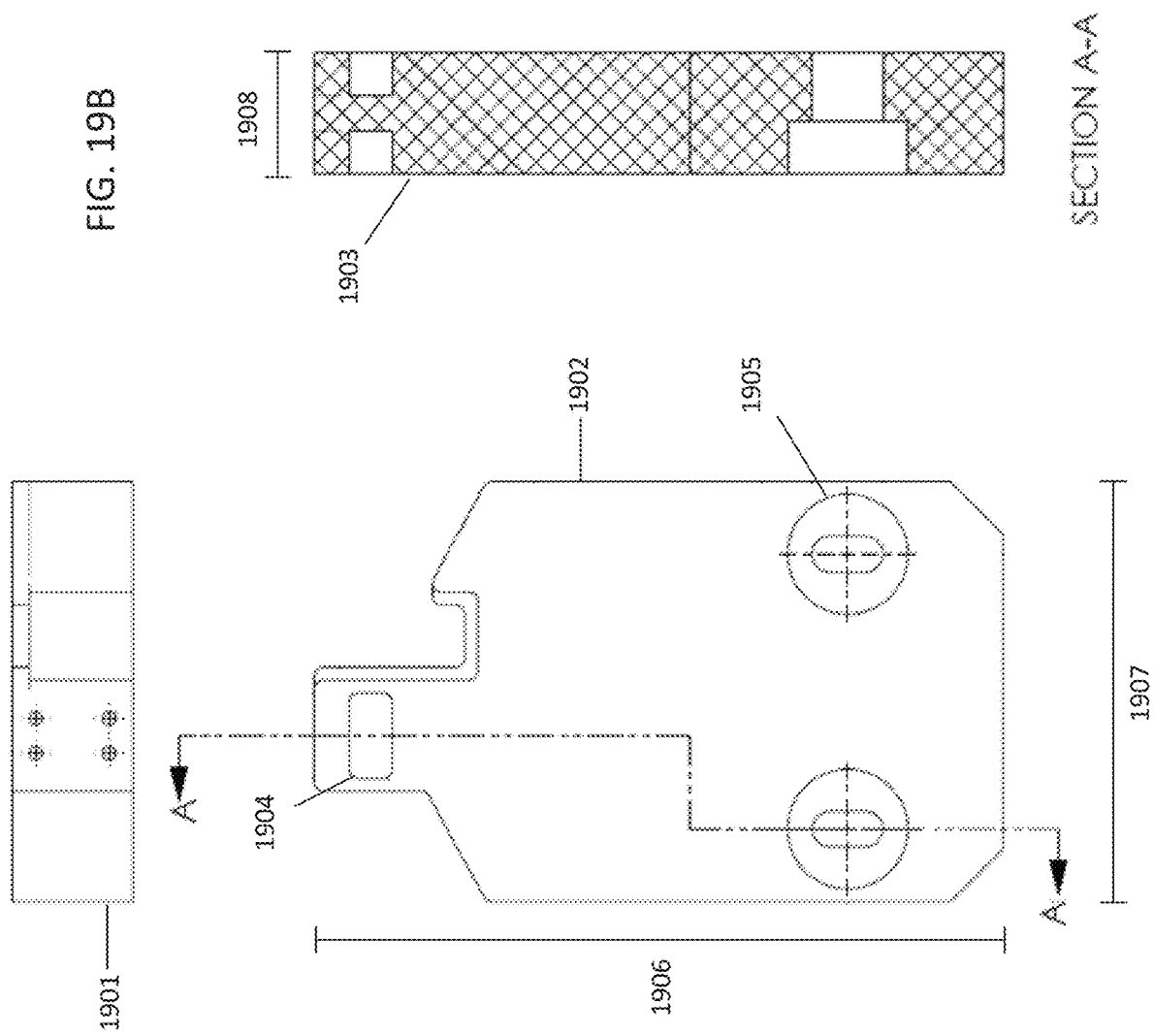

An exemplary embodiment of a drum shaft support is shown in FIGS. 19A-19B, or as 4308 and 4309 in FIG. 43D. In certain embodiments, the drum shaft support is included in a top assembly of an rGO/graphene second reaction filter. In certain embodiments, the drum shaft support is a part of a drum assembly and provides support to the drum assembly (e.g. drum). In certain embodiments, the drum shaft support provides support to a drum shaft mount (2804 in FIG. 28A). In certain embodiments, the drum shaft does not actuate the drum or drum assembly that rotates thereon. In certain embodiments, a drum assembly is actively rotated by a drive shaft (directly or indirectly) that is actuated by a drive motor. In certain embodiments, the drum shaft provides support for a drum assembly that passively rotates. In certain embodiments, the drum shaft actuates the drum assembly that rotates thereon. As shown in FIG. 19A, in certain embodiments, the drum shaft support has a fluid facing side (facing toward the inside of the drain pan and/or the interior of the drum) and an idler facing side (facing toward outside of the drainpan and/or the exterior of the drum). In certain embodiments, the drum shaft support is used to support the drum shaft. In certain embodiments, the drum shaft support is configured to allow the drum shaft to be lifted up off the drum shaft support (e.g. so the drum assembly can be rolled onto the drum cradle assembly). In certain embodiments, drive shroud comprises or is made of a material that includes high density polyethelene (e.g., about 1.75 inches in thickness). FIG. 19B shows a top-down view 1901, a front view 1902, and a cross-section side view 1903 of an embodiment of a drum shaft support. In certain embodiments, a drum shaft support comprises one or more apertures 1905. In certain embodiments, the one or more apertures 1905 comprise a diameter of about 1.75 inches. In certain embodiments, a drum shaft support comprises an opening 1904. In certain embodiments, a drum shaft support has dimensions including one or more of the following: a height 1906 of about 10.00 inches, a width 1907 of about 6.11 inches, and a depth 1908 of about 1.75 inches.

Figure 20:
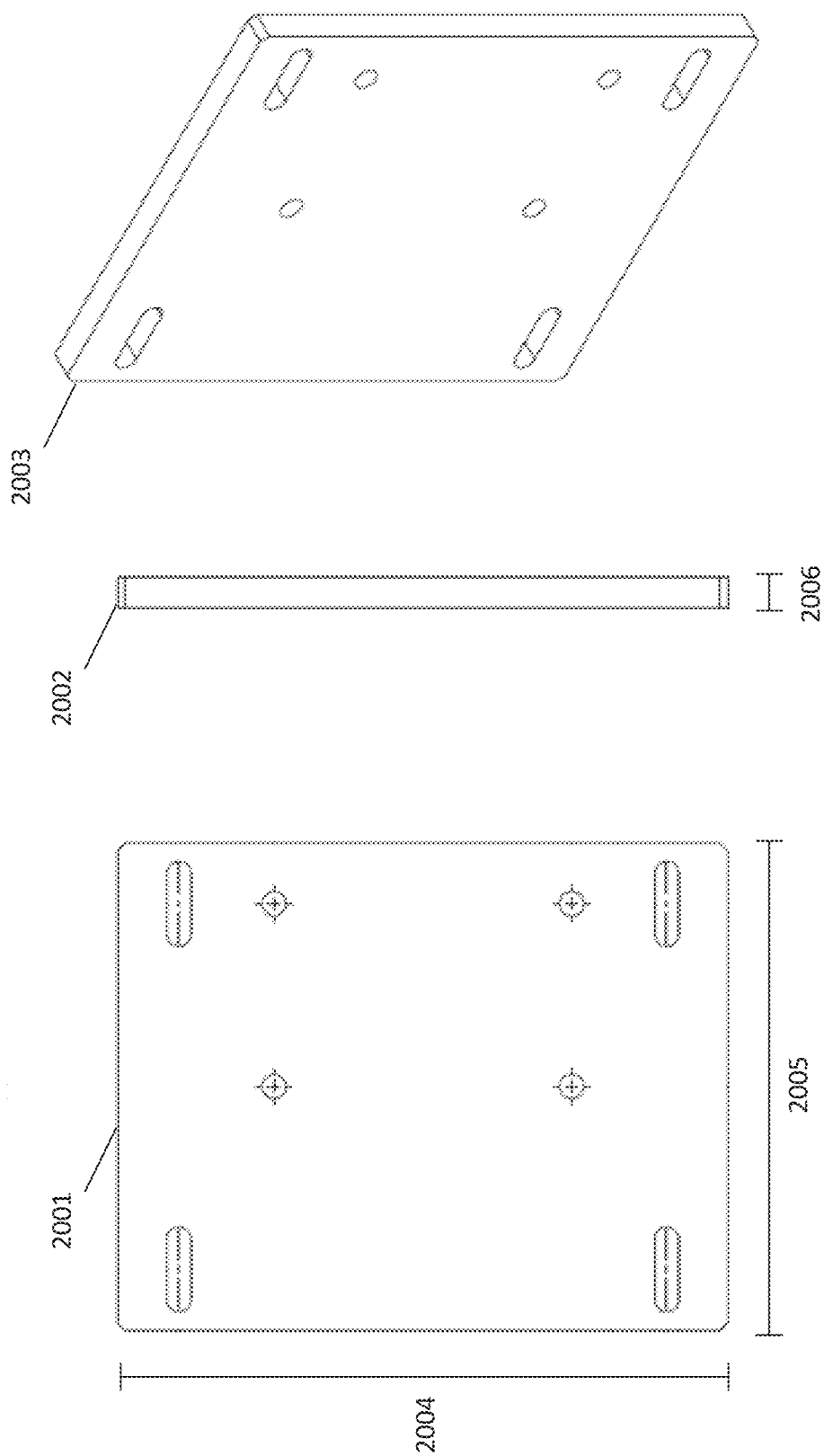
FIG. 20 shows an exemplary embodiment of a motor mount plate (e.g., GSRF-0014)

In certain embodiments, a motor mount plate is as shown in FIG. 20 or as 4310 in FIGS. 43A-43F. In certain embodiments, motor mount plate is included in a top assembly of an rGO/graphene second reaction filter for enabling mounting of motor(s) that actuate the drum assembly and/or other elements of the top assembly. FIG. 20 shows an embodiment of a motor mount plate with a front view 2001, a side view 2002, and a perspective view 2003. In certain embodiments, a motor mount plate has dimensions including one or more of the following: a width 2005 of about 8.00 inches, a height 2004 of about 10.00 inches, and a thickness 2006 of about 0.50 inches. In certain embodiments, motor mount plate comprises or be made of a material that includes stainless steel sheet (e.g., about 0.5 inches in thickness).

In certain embodiments, a frame weldment 1301 is as shown in FIGS. 21A-21C. In certain embodiments, frame weldment includes stainless steel plates 2110, 2111 and 2112, and stainless steel tubes 2101, 2102, 2103, 2104, 2105, 2106, 2107, 2108 and 2109. In certain embodiments, a stainless steel tube has dimensions including one or more of the following: a length of about 35.00 inches, about 38.75 inches, about 39.00 inches, or about 42.75 inches, a width of about 3.00 inches, about 2.00 inches, or about 2.38 inches, and a height of about 2.00 inches or about 0.50 inches. In certain embodiments, a frame weldment has dimensions including one or more of the following: a width 2113 of about 38.75 inches and a height 2114 of about 38.38 inches. In certain embodiments, other suitable elements and/or materials of different sizes and/or dimensions are used.

Figure 22A:
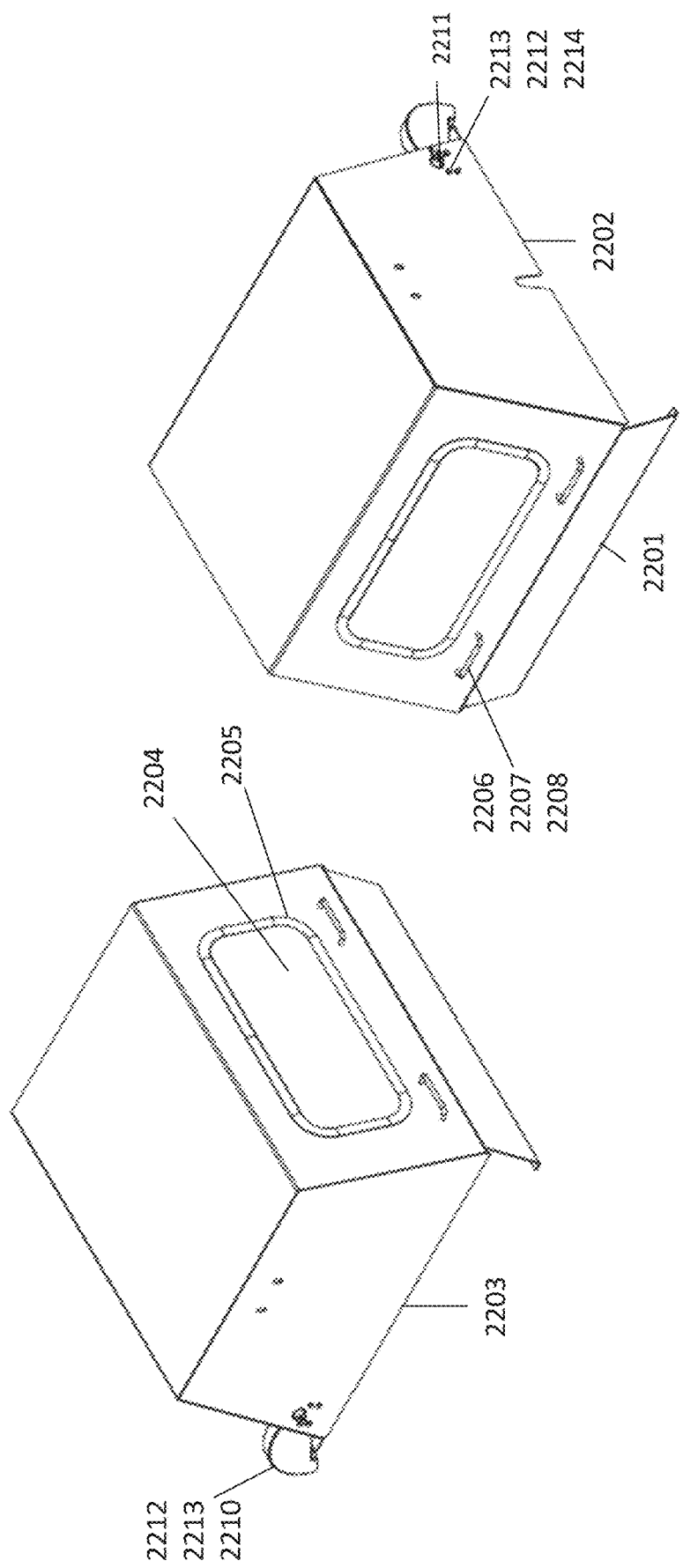
Figure 22C:
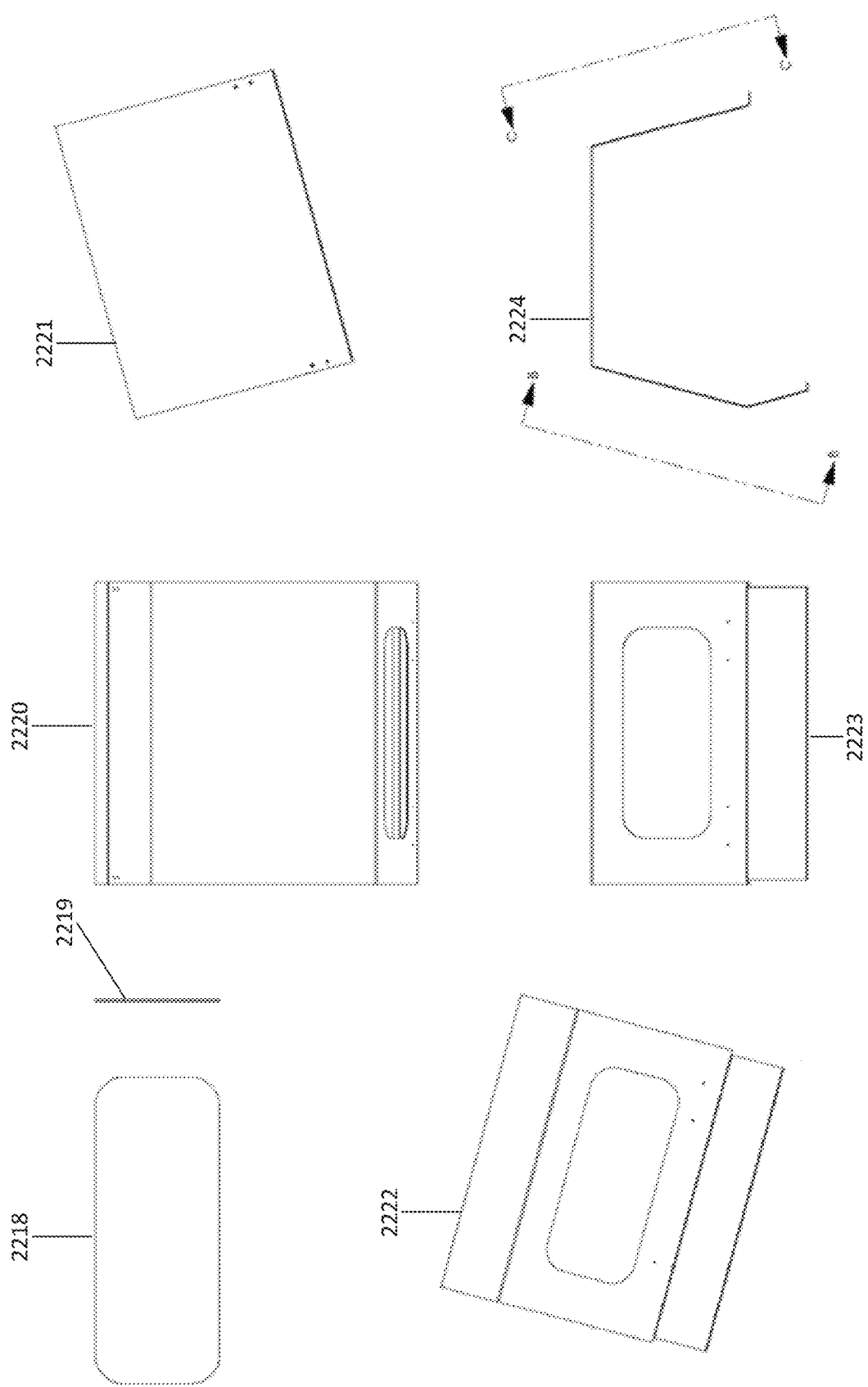
Figure 22D:
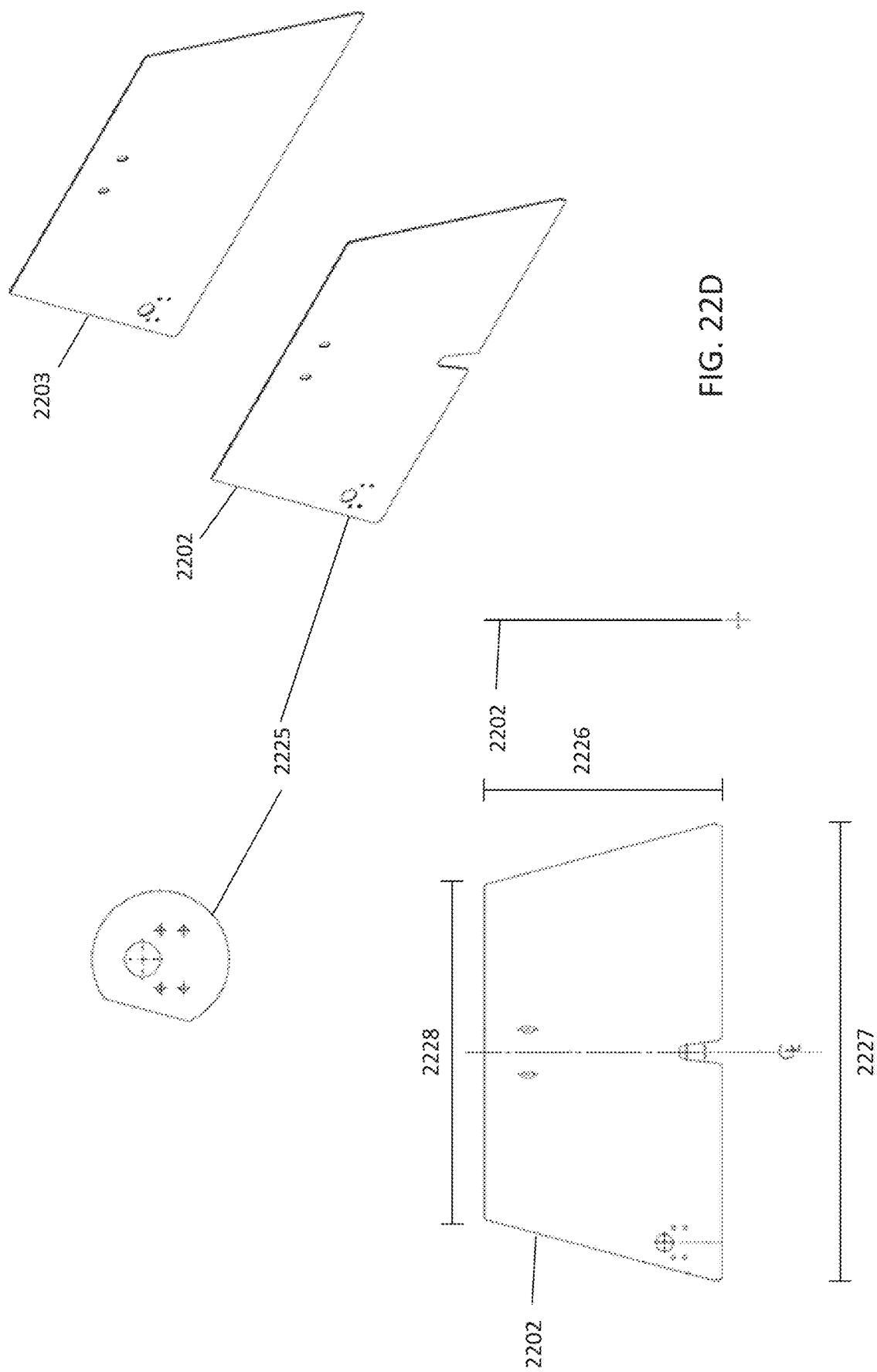
Figure 24:
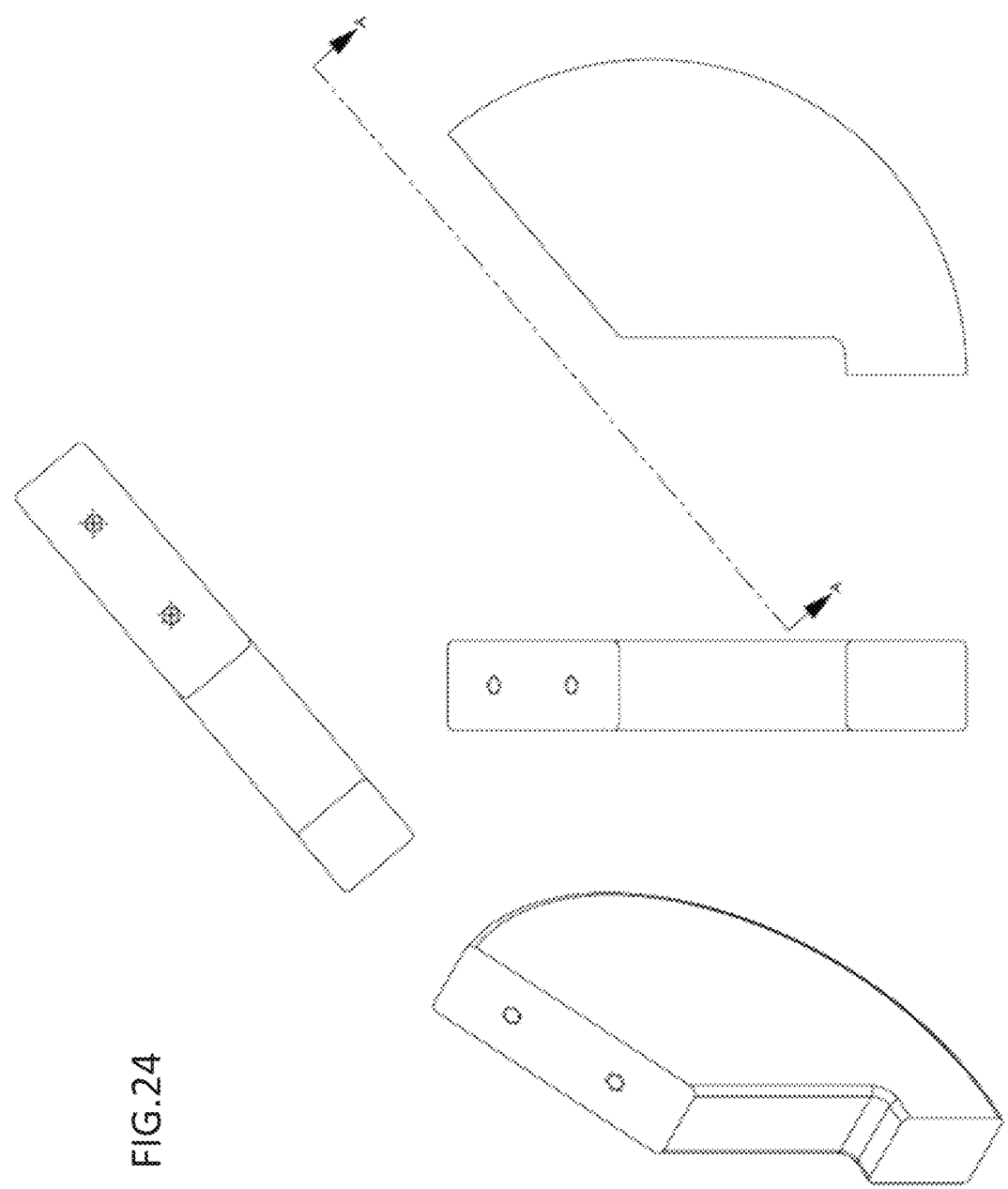
FIG. 24 shows an exemplary embodiment of a lid stop (e.g., GSRF-0015)

In certain embodiments, a lid weldment 1303 is as shown in FIGS. 22A-22D. In certain embodiments, lid weldment includes a top cover 2201. In certain embodiments, top cover comprises or is made of one or more materials, such as, for example, stainless steel sheet. In certain embodiments, the lid weldment comprises a fluid side panel 2202 and an idler side panel 2203. In certain embodiments, the fluid side panel 2202 and the idler side panel 2203 comprise or are made of, for example, stainless steel sheet. In certain embodiments, stainless steel sheet is about 0.125 inches in thickness. In certain embodiments, lid includes a window 2204 and a window trim gasket 2205 at the front side of the lid. In certain embodiments, on the same side, the lid includes a handle 2206, a flat washer 2207 and a socket head cap screw 2208. In certain embodiments, lid weldment includes a lid stop 2210 for positioning the lid in an open or in a closed position. Examples of shapes, sizes and/or dimensions of the lid stop are shown in FIG. 24. In certain embodiments, lid stop comprises or is made of one or more materials, such as, for example, high density polyethylene (HDPE). In certain embodiments, window comprises or is made of materials including, for example, plexiglass. In certain embodiments, thickness of the plexiglass is about 3/16 inches. In certain embodiments, lid weldment includes a gas spring mount bracket 2211, a hex bolt 2213, a nut 2214 or suitable elements of similar functions. In certain embodiments, the flat washer, the screw, the bolt and the nut comprise or are made of one or more materials, such as, for example, stainless steel. In certain embodiments, a lid weldment has dimensions including one or more of the following: a length 2215 of about 44.4 inches, a width 2216 of about 38.1 inches, and a height 2217 of about 27.5 inches. FIG. 22C shows a front view 2218 and a side view 2219 of a window 2204, and multiple views (2220, 2221, 2222, 2223, 2224, 2225) of the lid weldment. In certain embodiments, the fluid side panel has dimensions including one or more of the following: a first width 2228 of about 28.5 inches, a second width 2227 of about 39.0 inches, a height 2226 of about 20.2 inches, and a thickness of about 0.125 inches. Examples of shapes, sizes and/or dimensions of the lid weldment and its elements are shown in FIGS. 22B-22D.

Figure 23A:
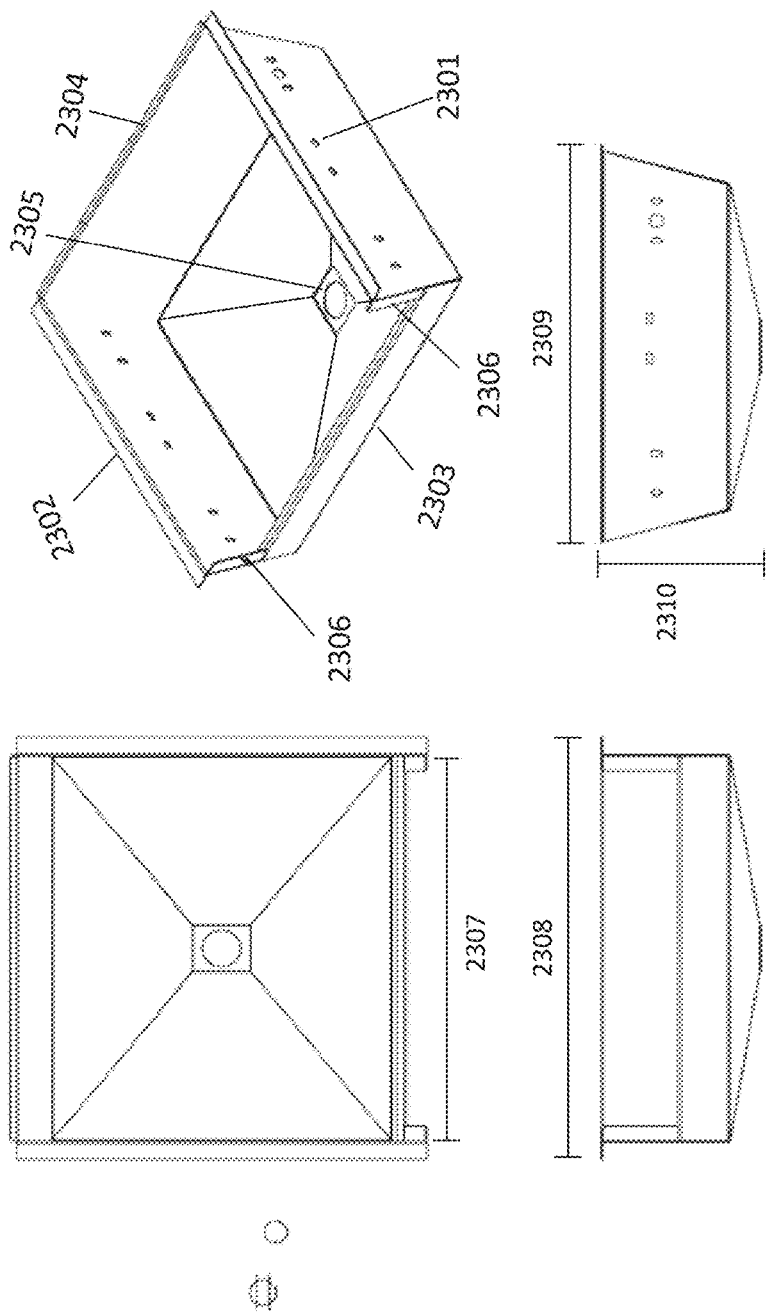
Figure 23B:
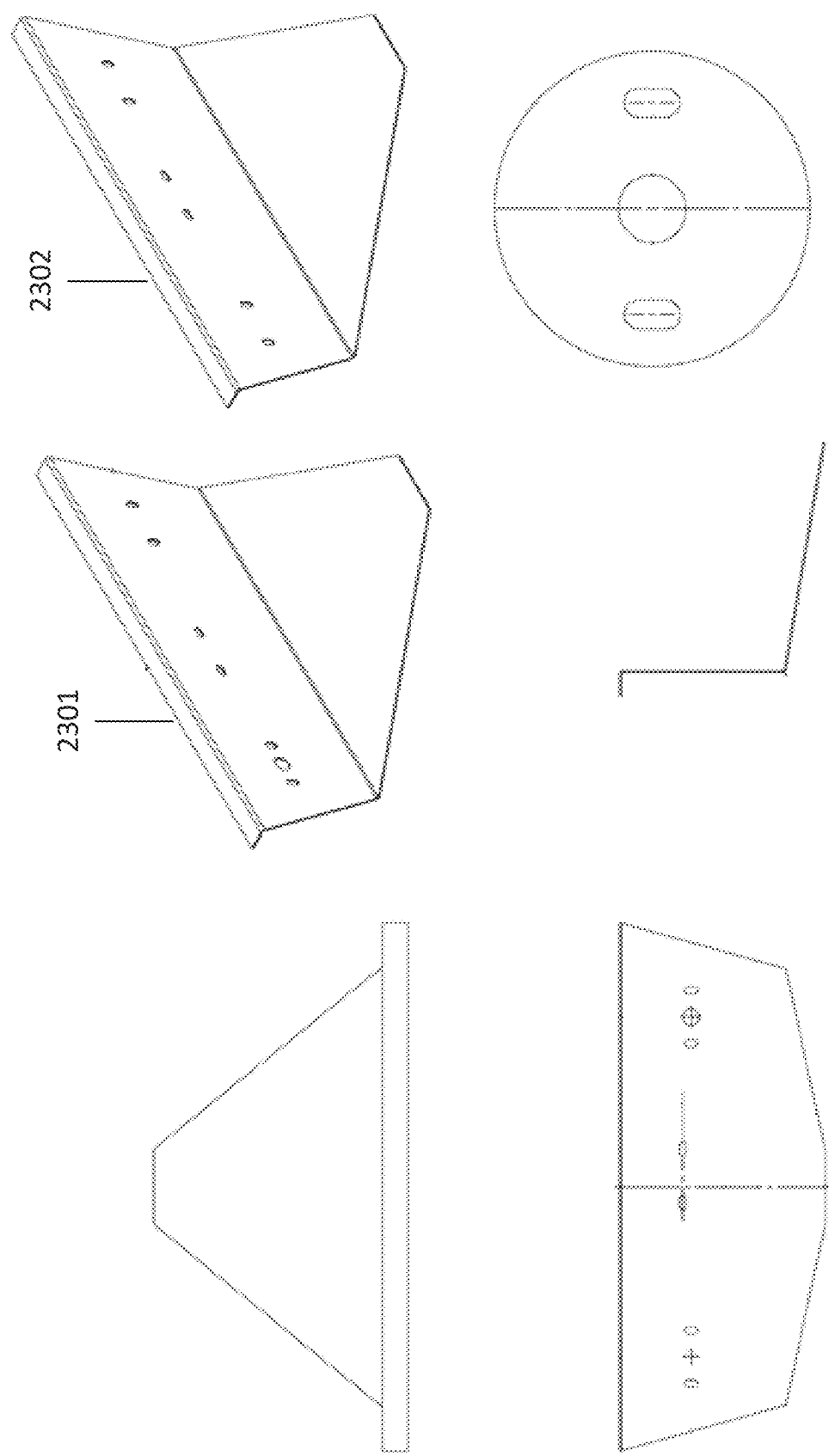

In certain embodiments, drainpan weldment 1302 is as shown in FIGS. 23A-23E. In certain embodiments, drainpan weldment includes a front panel 2303, a rear panel 2304, a drain plate 2305, a front panel gusset 2306, a side panel facing/connecting the drive shaft 2301, and a side panel facing/connecting the idler shaft 2302. FIG. 23B shows side panels 2301 and 2302. FIG. 23C shows a front panel 2303. FIG. 23D shows a rear panel 2304. FIG. 23E shows a drain plate 2305 and a front panel gusset 2306. In certain embodiments, a drain plate 2305 has dimensions including one or more of the following: an aperture diameter of about 3.63 inches, a width of about 4.56 inches, a length of about 5.44 inches, and a thickness of about 0.125 inches. In certain embodiments, a front panel gusset 2306 has dimensions including one or more of the following: a length of about 7.38 inches, a width of about 1.50 inches, and a thickness of about 0.125 inches. In certain embodiments, one or more elements of the drainpan weldment comprise or are made of materials including, for example, stainless steel sheet. In certain embodiments, stainless steel sheet has a thickness of about 0.125 inches. In certain embodiments, drainpan weldment is water-tight at all seams. In certain embodiments, one or more (e.g., all) joints and/or mating surfaces are seam welded, and are ground smooth. In certain embodiments, a drainpan weldment has dimensions including one or more of the following: a width 2307 of about 38.38 inches, a width 2308 of about 42.1 inches, a length 2309 of about 39.6 inches, and a height 2310 of about 15.3 inches. Examples of shapes, sizes and/or dimensions of the drainpan weldment and its elements are shown in FIGS. 23A-23E.

Figure 25A:
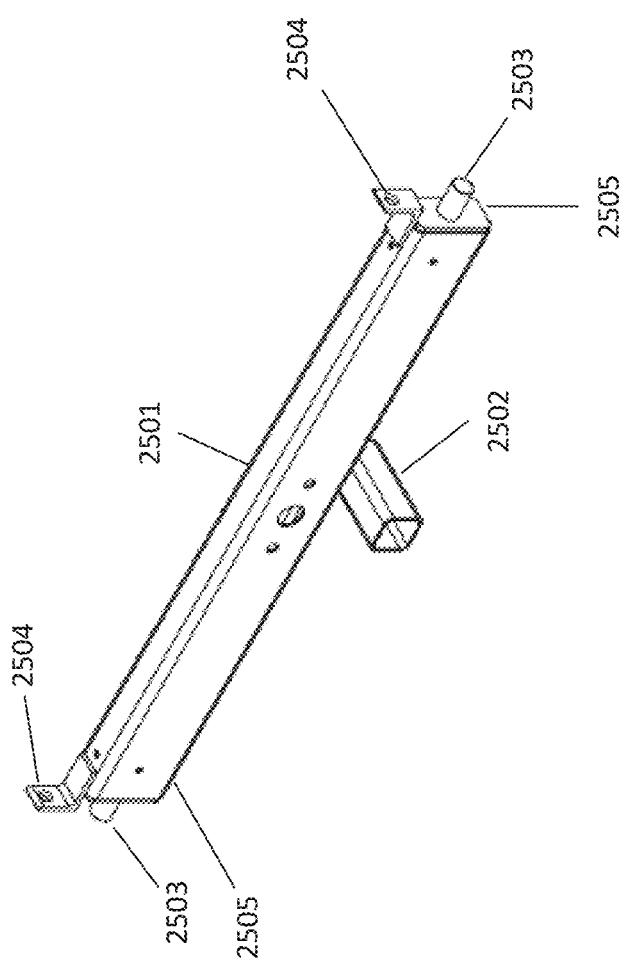
Figure 25C:
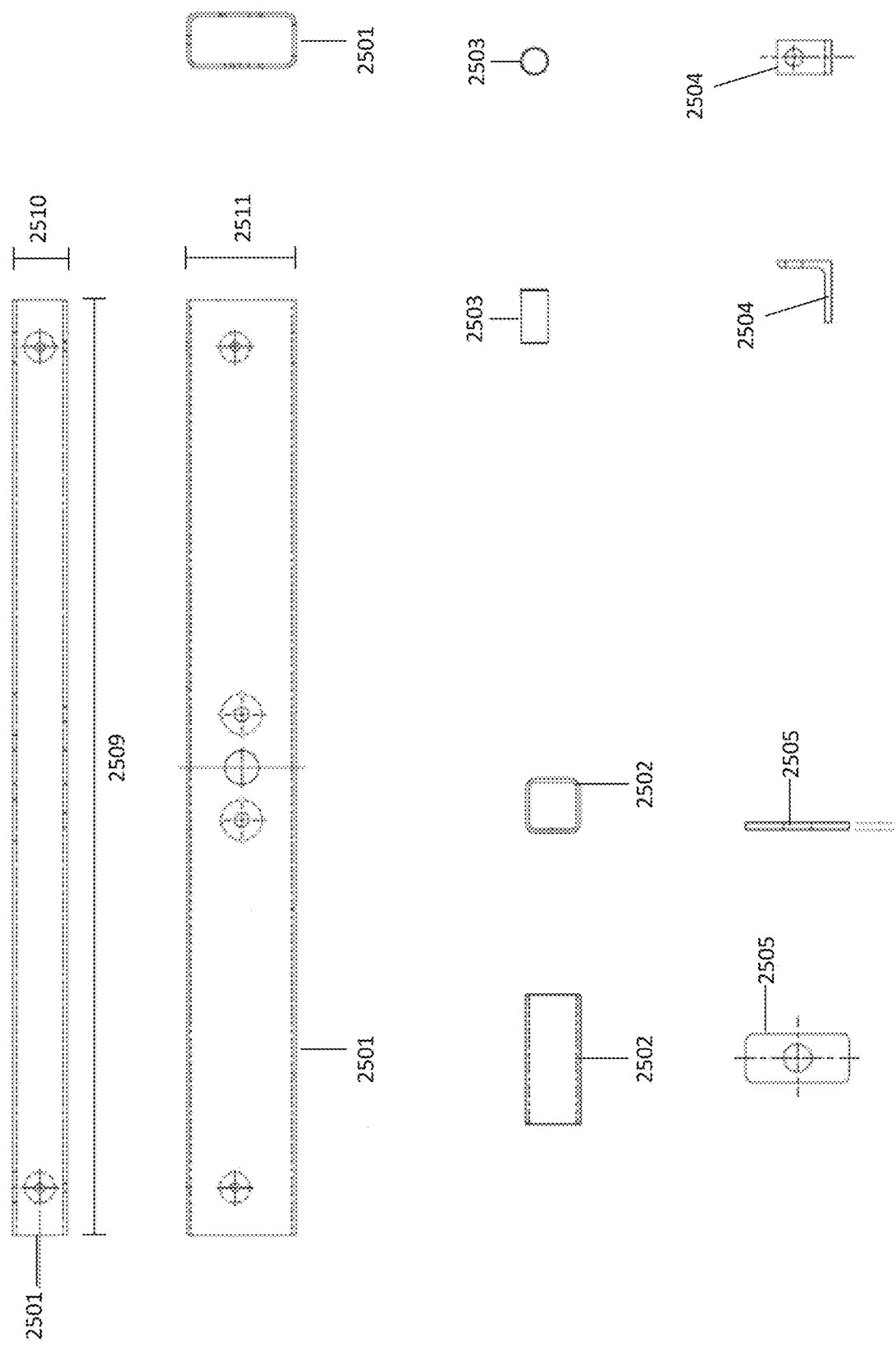

In certain embodiments, a cradle pivot weldment 1401 is as shown in FIGS. 25A-25C. In certain embodiments, the cradle pivot weldment includes one or more tube structures 2501 and 2502. In an example, one or more of such tube structures have a tube size of about 2.00 inches×4.00 inches×0.13 inches, or about 2.00 inches×2.00 inches×0.13 inches. In certain embodiments, the cradle pivot weldment includes a pivot shaft 2503. In certain embodiments, the pivot shaft has a rod shape with a diameter of about 1 inch. In certain embodiments, the cradle pivot weldment includes a pivot lock 2504 for receiving a locking pin (e.g. for locking the cradle pivot assembly in place to prevent rotation) and a pivot plate 2505. In certain embodiments, one or more of such elements comprise or are made of one or more materials, such as, for example, stainless steel. In certain embodiments, the pivot plate has a thickness of about 0.25 inches. In certain embodiments, the pivot lock has a size of about 2.00 inches×3.00 inches×0.25 inches. In certain embodiments, the pivot plate includes or is made of a material such as, for example, stainless steel. In certain embodiments, the pivot plate and the pivot shaft are cut to length and have chamfered ends. In certain embodiments, one or more joints are welded and ground smooth. In certain embodiments, the shaft uses drop material of an idler shaft (e.g., as shown in FIG. 17). In certain embodiments, a cradle pivot weldment has dimensions including one or more of the following: a width 2506 of about 38.25 inches, a width 2507 of about 36.63 inches, and a depth 2508 of about 5.13 inches. In certain embodiments, the cradle pivot weldment comprises a tube 2501 having dimensions including one or more of the following: a width 2509 of about 34.50 inches, a depth 2510 of about 2.00 inches, and a height 2511 of about 4.00 inches. In certain embodiments, the tube 2502 has dimensions including one or more of the following: a length of about 4.75 inches, a width of about 2.00 inches, and a height of about 2.00 inches. In certain embodiments, the pivot shaft 2503 has dimensions including one or more of the following: a length of about 2.00 inches and a diameter of about 1.00 inches. In certain embodiments, the pivot lock 2504 has dimensions including one or more of the following: an aperture with a diameter of about 0.656 inches, a width of 1.25 inches, a height of about 2.00 inches, and a depth of about 2.25 inches. In certain embodiments, the pivot plate 2505 has dimensions including one or more of the following: an aperture having a diameter of about 1.031 inches, a width of about 1.81 inches, a height of about 3.81 inches, and a thickness of about 0.25 inches. Examples of shapes, sizes and/or dimensions of the cradle pivot weldment and its elements are shown in FIGS. 25B-25C.

In certain embodiments, the drum roll guide 1403 is as shown in FIG. 26A. In certain embodiments, the drum roll guide is included in a cradle pivot assembly. In certain embodiments, the drum roll guide comprises one or more apertures. In certain embodiments, the drum roll guide has dimensions including one or more of the following: a width 2601 of about 5.00 inches, a height 2602 of about 4.50 inches, and a depth 2603 of about 1.00 inches.

In certain embodiments, the cradle pivot assembly includes a drum brace. In certain embodiments, the drum brace is as shown in FIG. 26B. In certain embodiments, the drum brace comprises or is made of one or more materials, such as, for example, HDPE. In certain embodiments, the drum brace has dimensions including one or more of the following: a width 2607 of 18.00 inches, a height 2605 of about 3.00 inches, a height 2606 of about 4.53 inches, and a thickness 2604 of about 1.00 inches.

Figure 27A:
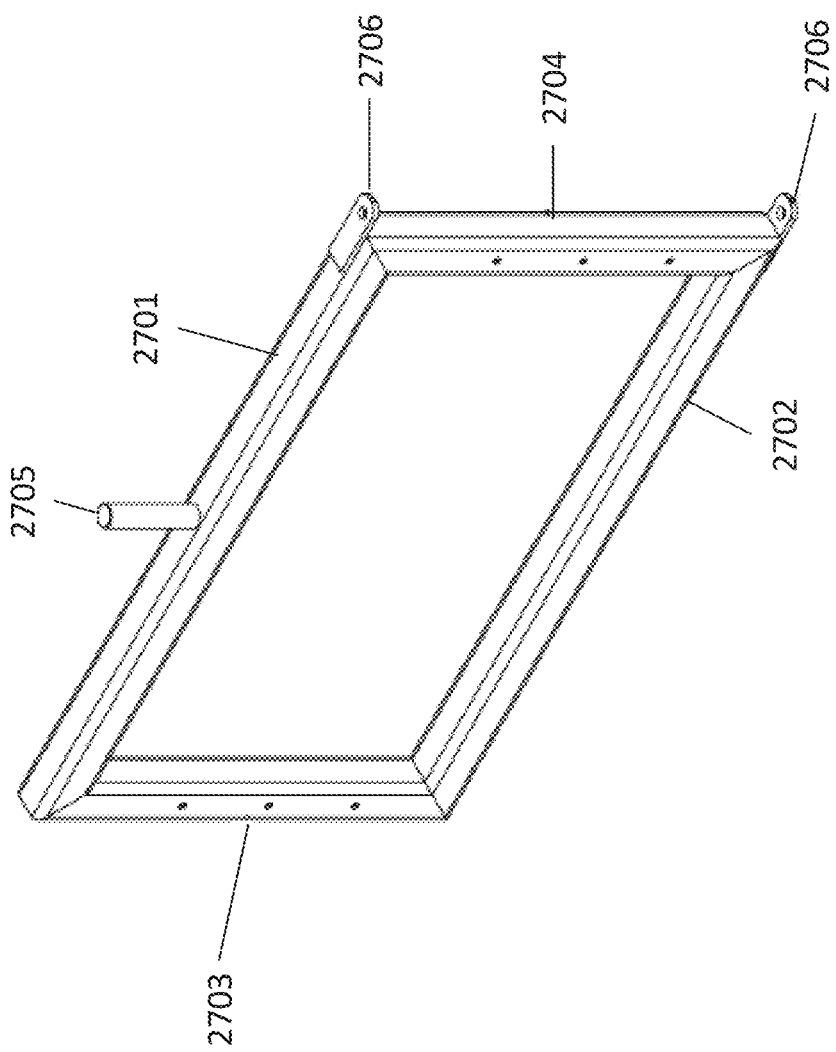

In certain embodiments, the drum cradle weldment 1501 is as shown in FIGS. 27A-27B. In certain embodiments, the drum cradle weldment has dimensions including one or more of the following: a width 2708 of about 33.00 inches, a length 2707 of about 20.38 inches, and a thickness 2709 of about 2.00 inches. In certain embodiments, the drum cradle weldment includes one or more tube structures 2701, 2702, 2703 and 2704. In an example, one or more of such tube structures have a tube size of about 2.00 inches×2.00 inches×0.13 inches. In certain embodiments, the drum cradle weldment includes a shaft 2705. In certain embodiments, the shaft has a rod shape with a diameter of about 1 inch and a length of about 6.5 inches. In certain embodiments, the drum cradle weldment includes a catch plate 2706. In certain embodiments, a locking spring pin (shown in FIG. 15B) goes through the catch plate into the drum catch (shown on FIG. 14B) to hold the drum cradle assembly in place and prevent it from pivoting about the cradle pivot. This keeps the drum cradle assembly stable to receive the drum assembly during unloading (see, e.g., FIG. 43E). In certain embodiments, once the drum assembly (e.g. drum) has been rolled onto the drum cradle assembly, the drum idler hub is removed, and the drum is strapped to the cradle. Next, the locking pin is pulled to enable the drum cradle assembly to rotate along with the strapped on drum. The rotated drum is now in a position for the batch of filtered carbonaceous composition (e.g., rGO) to be transferred into a vessel or container. In certain embodiments, one or more elements of the drum cradle weldment comprise or are made of one or more materials, such as, for example, stainless steel. In certain embodiments, the pivot plate has a size of about 1.25 inches×3.25 inches×0.25 inches. In certain embodiments, the pivot lock has a size of about 2.00 inches×3.00 inches×0.25 inches. In certain embodiments, the shaft includes or is made of a material such as, for example, stainless steel. In certain embodiments, the pivot plate and the pivot shaft are cut to length and have chamfered ends. In certain embodiments, one or more joints are welded and ground smooth. In certain embodiments, the shaft uses drop material of an idler shaft (e.g., as shown in FIG. 17). Examples of shapes, sizes and/or dimensions of the drainpan weldment and its elements are shown in FIG. 27B.

Figure 35:
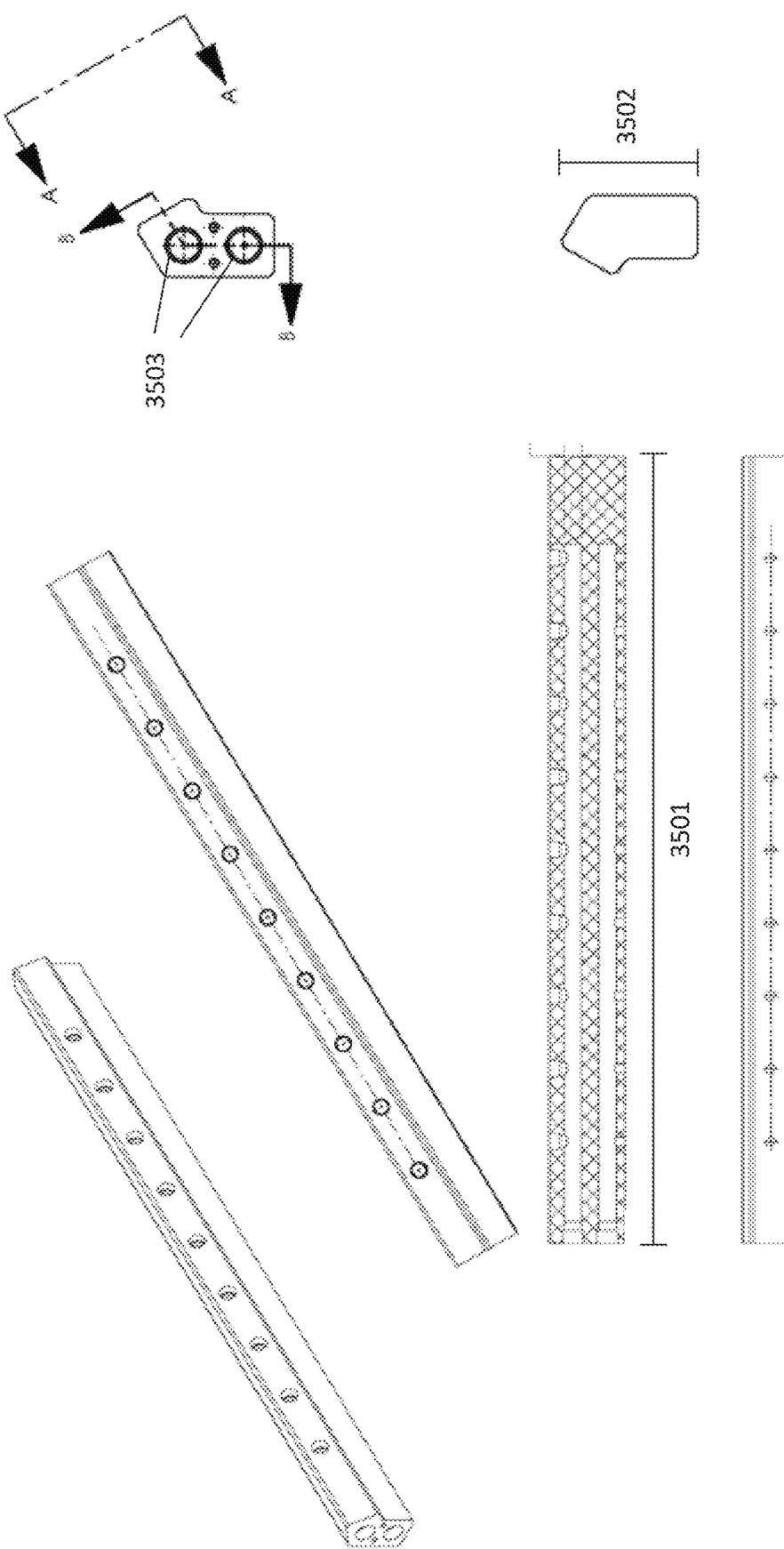
FIG. 35 shows an exemplary embodiment of a spray bar (e.g., GSRF-0005)
Figure 36A:
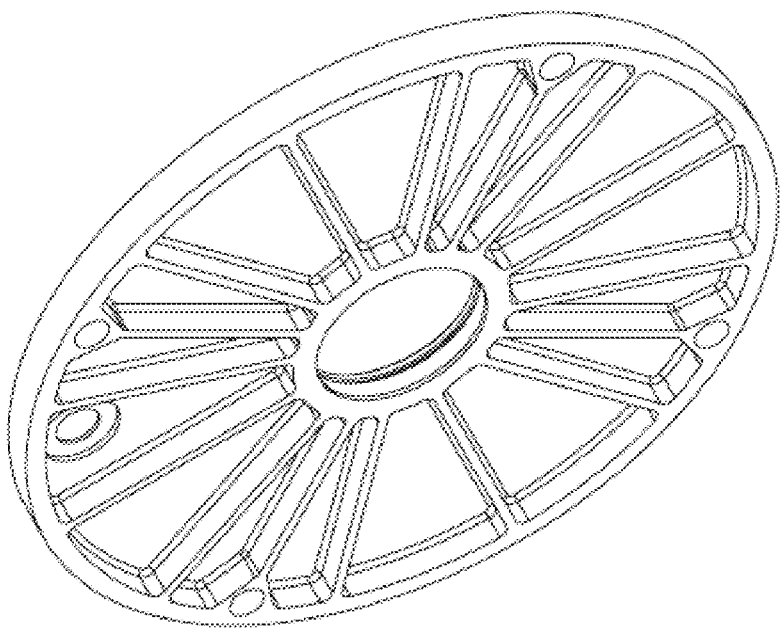
Figure 38:
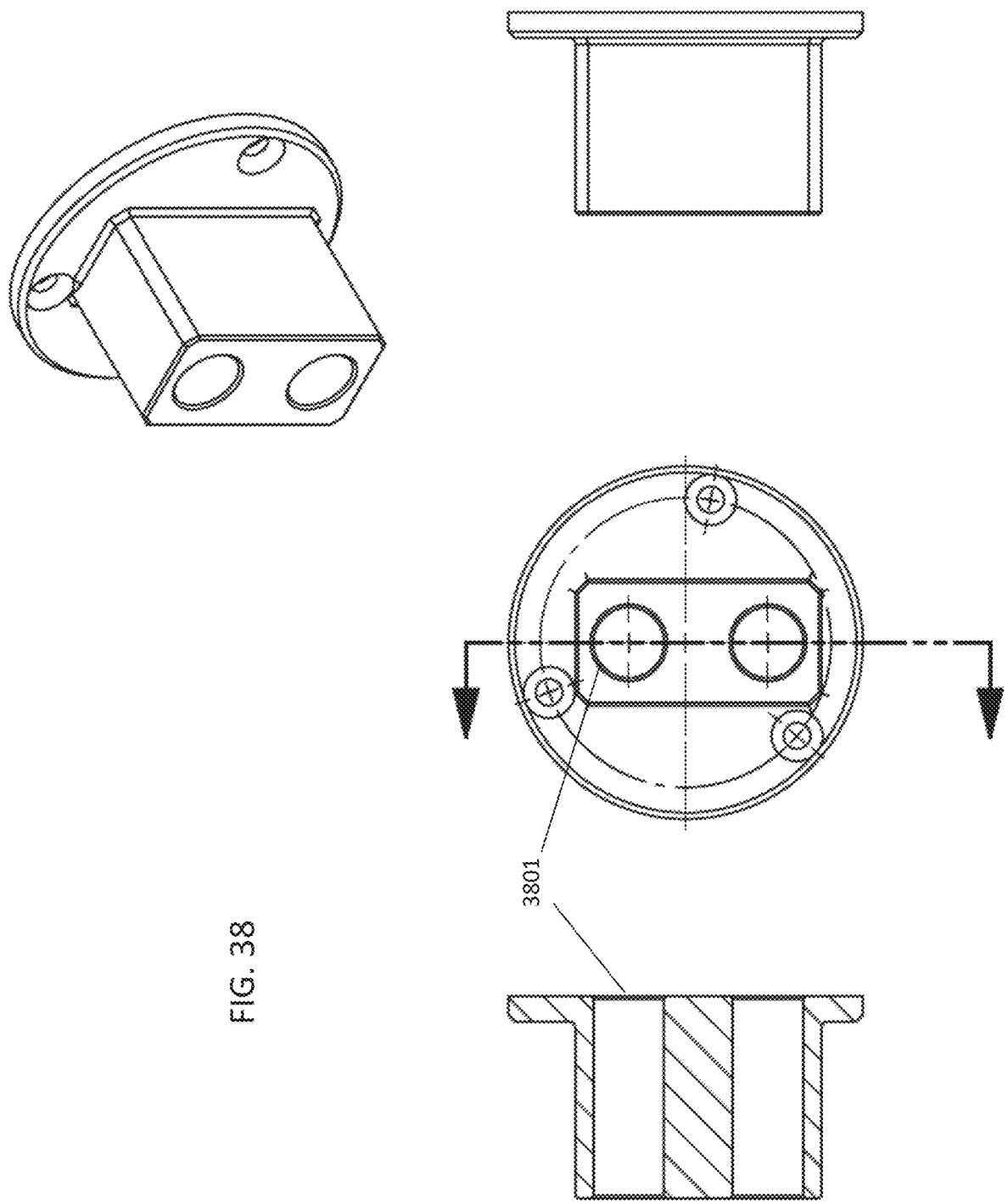
FIG. 38 shows an exemplary embodiment of a drum shaft mount on a fluid side (e.g., GSRF-0008)

In certain embodiments, the drum assembly (e.g., drum assembly shown in FIGS. 16A-16B) includes a spray bar assembly. In certain embodiments, the spray bar assembly is as shown in FIGS. 28A-28B. In certain embodiments, the spray bar assembly is used, for example, for dispensing a carbonaceous composition such as reaction products from the second reaction (e.g., rGO). In certain embodiments, the spray bar assembly dispenses a carbonaceous composition into the interior space of the drum assembly. In certain embodiments, the spray bar assembly dispenses a carbonaceous composition into the interior space of the drum assembly while the drum assembly is rotating. In certain embodiments, the spray bar assembly dispenses a carbonaceous composition into the interior space of the drum assembly while the drum assembly is not rotating. In certain embodiments, the spray bar assembly dispenses the carbonaceous composition at a low pressure. In certain embodiments, a low pressure is equal to or less than about 5, 10, 15, 20, 25, 30, 35, 40, 45, 50, 55, 60, 65, 70, 75, 80, 85, 90, 95, 100, 110, 120, 130, 140, 150, 160, 170, 180, 190, or 200 PSI. In certain embodiments, a low pressure is equal to or greater than about 5, 10, 15, 20, 25, 30, 35, 40, 45, 50, 55, 60, 65, 70, 75, 80, 85, 90, 95, 100, 110, 120, 130, 140, 150, 160, 170, 180, 190, or 200 PSI. In certain embodiments, the spray bar assembly is fluidly coupled (e.g. via a conduit and aperture of a drum shaft mount) to a second reaction tank or vessel. In certain embodiments, the spray bar assembly is fluidly coupled to a tank or vessel holding the product of the second reaction (e.g., rGO). In certain embodiments, the spray bar assembly actively pumps a carbonaceous composition from the tank or vessel into the drum assembly. In certain embodiments, operation of the spray bar assembly is automated or semi-automated. In certain embodiments, the spray bar assembly includes a spray bar 2801 (e.g., as shown in FIG. 35), a drum bearing plate 2802 (e.g., as shown in FIGS. 36A-36B), a spray bar bearing hub 2803 (e.g., as shown in FIGS. 37A-37B), and a drum shaft mount 2804 (e.g., as shown in FIG. 38). In certain embodiments, the spray bar assembly includes one or more elements selected from, for example: a socket head cap screw 2805, an external snap ring 2806, an internal retaining ring 2807, a nipple 2808, a spray tip 2809, a ball bearing 2810, a hole plug 2811, epoxy 2812 (not shown), a flat head screw 2813, and quick disconnect fittings 2814 and 2815. A close-up view 2816 of the spray bar assembly is also shown in FIG. 28B. In certain embodiments, one or more elements of the spray bar assembly comprise or are made of one or more materials, such as, for example, stainless steel, nickel plated steel and/or HDPE. In certain embodiments, the nipple is ½ inch national pipe thread taper (NPT) in diameter and about 6.0 inches in length. In certain embodiments, the spray tip is ⅜ inches NPT with 50 degree fan. In certain embodiments, a spray tip is configured to dispense a material (e.g., a wash liquid or a carbonaceous composition) at a spray angle of at least 10, 20, 30, 40, 50, 60, 70, 80, 90, 100, 110, 120, 130, 140, 150, 160, or 170 degrees. In certain embodiments, epoxy is applied to threads prior to installation (e.g., of a socket head cap screw 2805, a flat head screw 2813 and/or any other element(s)). In certain embodiments, the spray bar assembly is used, for example, for spraying a liquid (e.g. water, a liquid solution, a cleaning solution, a rinsing solution, etc.) into the interior of the drum assembly. In certain embodiments, the spray bar assembly is used for washing or rinsing a carbonaceous composition held within the drum assembly. In certain embodiments, the spray bar assembly sprays a liquid at a high pressure. In certain embodiments, the high pressure is equal to or less than about 10, 15, 20, 25, 30, 35, 40, 45, 50, 55, 60, 65, 70, 75, 80, 85, 90, 95, 100, 110, 120, 130, 140, 150, 160, 170, 180, 190, 200, 250, 300, 350, 400, 450, or 500 PSI. In certain embodiments, the high pressure is equal to or more than about 10, 15, 20, 25, 30, 35, 40, 45, 50, 55, 60, 65, 70, 75, 80, 85, 90, 95, 100, 110, 120, 130, 140, 150, 160, 170, 180, 190, 200, 250, 300, 350, 400, 450, or 500 PSI. In certain embodiments, the drum assembly comprises a drum mesh and/or micron filter having a pore size that is small enough to prevent passage of the carbonaceous composition (e.g., rGO), thereby retaining the carbonaceous composition within the interior of the drum assembly after it is dispensed by the spray bar while allowing a filtrate comprising waste products, unreacted reaction components, impurities, and other undesirable compounds to drain through the drum assembly (e.g., drain into a drain pan positioned underneath the drum assembly). In certain embodiments, the carbonaceous composition retained within the drum assembly is washed at high pressure by a liquid sprayed from the spray bar assembly. In certain embodiments, the spray bar assembly is removable from the drum assembly for unloading. Advantages of a removable spray bar assembly include, for example, ease of cleaning, unclogging, or replacement. Another advantage is that a high throughput process designed to maximize production of purified product (e.g. GO or rGO of sufficient purity and properties for use in a battery and/or capacitor) is enhanced by the use of a removable spray bar assembly that enables removal, repair, and/or replacement of the spray bar to minimize down time in case of spray bar assembly malfunction. In certain embodiments, the purified product has a purity (w/w) of at least 50%, 60%, 70%, 80%, 90%, 95%, 96%, 97%, 98%, 99%, or 99.9% after drying.

Figure 39:
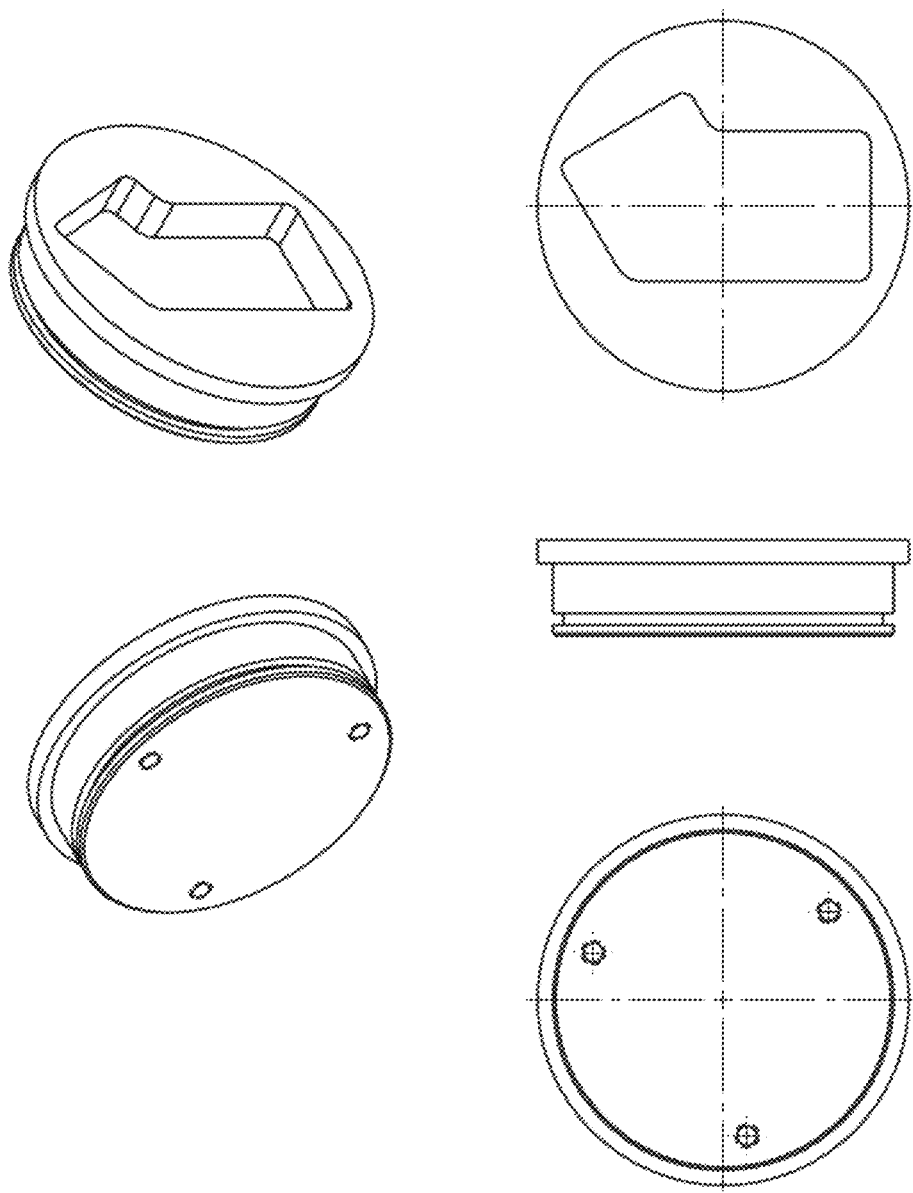
FIG. 39 shows an exemplary embodiment of a spray bar bearing hub on an idler side (e.g., GSRF-0007)

In certain embodiments, the drum assembly (e.g., drum assembly shown in FIGS. 16A-16B) includes a drum end cap assembly. In certain embodiments, the drum end cap assembly is as shown in FIGS. 29A-28B. In certain embodiments, the drum end cap assembly includes a drum bearing plate 2901 (e.g., as shown in FIG. 36), a spray bar bearing hub 2902 (e.g., as shown in FIG. 39) and/or a drum shaft mount 2903 (e.g., as shown in FIG. 40). In certain embodiments, the drum bearing plate, the spray bar bearing hub, the drum shaft mount comprises or are made of one or more materials, such as, for example, HDPE. In certain embodiments, the drum end cap assembly includes one or more elements selected from, for example: an external snap ring 2904, an internal retaining ring 2905, a nipple 2808, a hole plug 2907, epoxy 2909, a flat head screw 2906 and a deep groove ball bearing 2908. In certain embodiments, one or more elements of the drum end cap assembly comprises or are made of one or more materials, such as, for example, stainless steel and/or nickel plated steel. In certain embodiments, the ball bearing is sealed. In certain embodiments, epoxy is applied to threads prior to installation of the flat head screw 2906 and/or any other element(s).

Examples of shapes, sizes and/or dimensions of the drum frame 1601 are shown in FIGS. 30A-30B. In certain embodiments, the drum frame provides structural support for the drum assembly. In certain embodiments, the drum frame is configured to engage with one or more drive wheels. In certain embodiments, the drum frame receives rotational force from the one or more drive wheels (e.g., originating from a drive shaft that is rotated via a drive motor), causing the drum frame to rotate about its axis. In certain embodiments, the drum frame is configured to engage with one or more idler wheels. In certain embodiments, the drum frame comprises a groove on its outside surface for receiving one or more drive wheels. The groove provides a benefit of keeping the drum frame aligned with the one or more drive wheels. In certain embodiments, the drive wheel is configured to maximize friction. In certain embodiments, the drive wheel is configured to produce sufficient friction with the drum frame for the efficient transfer of rotational energy (e.g., minimize slippage as the drive wheels turn). In certain embodiments, the idler wheel is configured to minimize friction with the drum frame. In certain embodiments, the drum frame comprises or is made of one or more materials, such as, for example, HDPE. In certain embodiments, the drum frame has a thickness of about 2.50 inches.

Examples of shapes, sizes and/or dimensions of the drum stiffener 1602 are shown in FIG. 31. In certain embodiments, the drum stiffener comprises or is made of one or more materials, such as, for example, HDPE. In certain embodiments, the drum stiffener has a substantially rod-like shape (e.g., has a rod shape) with a diameter of about 1 inch. In certain embodiments, the drum stiffener has a thickness of about 0.75 inches. In certain embodiments, the drum stiffener has a length 3101 of about 30.50 inches. In certain embodiments, the drum stiffener provides structural support for the drum assembly. In certain embodiments, the drum stiffener provides a structural backing for the drum mesh and/or drum micron filter. In certain embodiments, the drum stiffener provides structural support for the drum mesh and/or drum micron filter to prevent warping, ripping, or other forms of deformation due to high velocity and/or high pressure materials dispensed inside the drum assembly (e.g., high pressure deionized water sprayed from a spray bar to wash a carbonaceous composition inside the drum assembly). In certain embodiments, one or more drum stiffeners are configured to provide structural support in combination with one or more drum stiffener rings.

Examples of shapes, sizes and/or dimensions of the drum stiffener ring 1603 are shown in FIG. 32. In certain embodiments, the drum stiffener ring has a diameter of about 22.75 inches and a thickness of about 0.75 inches. In certain embodiments, the drum stiffener ring comprises or is made of one or more materials, such as, for example, HDPE. In certain embodiments, the drum stiffener ring provides structural support for the drum assembly. In certain embodiments, the drum stiffener ring provides a structural backing for the drum mesh and/or drum micron filter. In certain embodiments, the drum stiffener ring provides structural support for the drum mesh and/or drum micron filter to prevent warping, ripping, or other forms of deformation due to high velocity and/or high pressure materials dispensed inside the drum assembly (e.g., high pressure deionized water sprayed from a spray bar to wash a carbonaceous composition inside the drum assembly). In certain embodiments, one or more drum stiffener rings are configured to provide structural support in combination with one or more drum stiffeners.

An example of the drum mesh 1604 is shown in FIG. 33. In certain embodiments, the drum mesh comprises or is made of, for example, a welded stainless steel mesh. In certain embodiments, the mesh is cut to a given size before rolling (e.g., before rolling into a cylindrical shape). In certain embodiments, the mesh is, for example, a ½ inch mesh T316 welded 0.063 inch wire by 4.0 inch wide roll (e.g., part #002X002WT0630W48T from TWP INC.). In certain embodiments, the size of the mesh before rolling is, for example, about a width 3301 of about 30.50 inches by a length of about 65.00 inches. In certain embodiments, the rolled mesh has a diameter of about 19.88 inches and a length of about 30.50 inches. In certain embodiments, the mesh has wrapped and crimped ends (e.g., see FIG. 33, bottom right). In certain embodiments, the mesh has wrapped and crimped ends for fastening the rolled shape and connecting the ends of the flat mesh into a cylindrical shape. In certain embodiments, the ends are wrapped and crimp along the length (orthogonal to the circular cross-section) of the rolled mesh. In certain embodiments, the drum mesh comprises one or more pore shapes and/or sizes. In certain embodiments, the drum mesh has any suitable pore shape and/or pore size. In certain embodiments, the pore size is variable or consistent throughout the mesh. In certain embodiments, the pore shape has a geometrical shape. In certain embodiments, the pore shape is variable or consistent throughout the mesh. In certain embodiments, the pore shape includes a square, a circle, an oval, a rectangle, a diamond or other geometrical shape (e.g., when the mesh is flat and unrolled).

In certain embodiments, a drum micron filter (e.g., as shown in FIG. 34) comprises or is made of, for example, stainless steel weave. In certain embodiments, the cut size of the steel weave before rolling into the cylindrical shape is a length 3401 of about 30.50 inches by about 65.00 inches. In certain embodiments, the filter has about a 2.0 inch overlap at a seam along the length (orthogonal to the circular cross-section) of the rolled mesh. In certain embodiments, the rolled filter has a diameter of about 19.81 inches and a length of about 30.50 inches. In certain embodiments, the thickness of the micron filter is, for example, about 0.30 inches. In certain embodiments, the micron filter comprises one or more pore shapes and/or sizes. In certain embodiments, the pore shape(s) and/or size(s) of the micron filter are any suitable shape(s) and/or size(s). In certain embodiments, the pore size is variable or consistent throughout the mesh. In certain embodiments, the pore size includes a width, length, diameter and/or diagonal from about 1 microns to about 3 microns. In certain embodiments, the pore shape is any geometrical shape. In certain embodiments, the pore shape is variable or consistent throughout the mesh. In certain embodiments, the pore shape includes, for example, a square, a circle, an oval, a rectangle, a diamond, or other geometrical shape (e.g., when the mesh is flat and unrolled).

Examples of shapes, sizes and/or dimensions of the spray bar 2801 are shown in FIG. 35. In certain embodiments, the spray bar comprises or is made of one or more materials including, for example, HDPE. In certain embodiments, the spray bar comprises one or more openings 2809 (e.g., a spray tip) for dispensing a material (e.g., a liquid, a wash liquid, a carbonaceous composition). In certain embodiments, the spray bar comprises at least 1, 2, 3, 4, 5, 6, 7, 8, 9, 10, 11, 12, 13, 14, 15, 16, 17, 18, 19, or 20 openings for dispensing a material. In certain embodiments, the spray bar comprises one or more internal channels 3503 for transporting a liquid and/or a carbonaceous composition. In certain embodiments, the spray bar has dimensions including one or more of the following: a length 3501 of about 32.38 inches and a height 3502 of about 3.12 inches.

Examples of shapes, sizes and/or dimensions of the drum bearing plate 2802 are shown in FIGS. 36A-36B. In certain embodiments, the drum bearing plate comprises or is made of one or more materials including, for example, HDPE. In certain embodiments, the drum bearing plate has dimensions including one or more of the following: a diameter of about 19.00 inches, a thickness 3602 of about 1 inch, and an internal diameter 3601 of about 4.319 inches.

Examples of shapes, sizes and/or dimensions of the spray bar bearing hub 2803 are shown in FIGS. 37A-37B. In certain embodiments, the spray bar bearing hub comprises or is made of one or more materials including, for example, HDPE. In certain embodiments, the spray bar bearing hub has dimensions including one or more of the following: a diameter 3701 of about 3.86 inches, a diameter 3702 of about 3.543 inches, a diameter 3704 of about 3.316 inches, a width 3705 of about 1.563 inches, and a thickness 3703 of about 1.00 inch. In certain embodiments, the spray bar bearing hub has one or more openings 3706.

Examples of shapes, sizes and/or dimensions of the drum shaft mount 2804 are shown in FIG. 38. In certain embodiments, the drum shaft mount sits on a drum shaft support. In certain embodiments, the drum shaft mount comprises an aperture 3801 for receiving a conduit, tube, or input (2808 in FIG. 28A) at an idler side of the drum shaft mount (facing away from the drain pan and/or interior of drum). In certain embodiments, a conduit, tube, or input is a nipple. In certain embodiments, the conduit is configured to receive a flow of material (e.g., a liquid) that travels through the aperture of the drum shaft mount to a spray bar assembly (e.g., into a spray bar 2801 of a spray bar assembly). In certain embodiments, the conduit receives a low pressure flow (e.g., of a carbonaceous composition such as, for example, rGO) into the drum assembly. In certain embodiments, the conduit receives a high pressure flow (e.g., of deionized water or some other wash liquid) into the drum assembly. In some embodiments, the drum shaft mount comprises two apertures, each aperture receiving a conduit receiving a flow of material. In certain embodiments, the two apertures receive a high pressure conduit and a low pressure conduit. In certain embodiments, a conduit is configured to couple with a source of material (e.g., a tank holding a wash liquid or a tank holding a carbonaceous composition). In certain embodiments, the material is transferred from a source to the spray bar assembly or spray bar using a pump, by gravity, or any other methods. In certain embodiments, the drum shaft mount is engaged with one or more spray bars 2801. In certain embodiments, a conduit 2808 is configured to couple with a quick disconnect fitting 2814. An advantage of a conduit configured to couple with a quick disconnect fitting is it allows the conduit to be sealed off when no source of material is coupled to the conduit. For example, a reaction filter that is not in operation does not need to be coupled to a source of material. As another example, in certain embodiments, when a batch of a carbonaceous composition has already been introduced into the drum assembly and is undergoing a wash cycle, a conduit configured to receive a carbonaceous composition does not need to be coupled to a source of the carbonaceous composition. In certain embodiments, a single conduit is configured to receive both a carbonaceous composition and a wash liquid (e.g., deionized water). For example, in one embodiment, a single conduit receives a material from a source of a carbonaceous composition that is dispensed inside the drum assembly via a spray bar of a spray bar assembly, and then the conduit is coupled to a source of deionized water that is dispensed inside the drum during the subsequent cleaning cycle(s). In certain embodiments, the drum shaft mount is engaged with a spray bar 2801 via an external snap ring 2806, a spray bar bearing hub 2803, a ball bearing 2810 (e.g., deep groove ball bearing), and an internal retaining ring 2807 (e.g., as shown in FIG. 28A). In certain embodiments, the drum shaft mount comprises or is made of one or more materials including, for example, HDPE. In certain embodiments, the drum shaft mount is about 2 inches in thickness.

Examples of shapes, sizes and/or dimensions of the spray bar bearing hub 2902 are shown in FIG. 39. In certain embodiments, the spray bar bearing hub comprises or is made of one or more materials including, for example, HDPE. In certain embodiments, the spray bar bearing hub is about 1 inch in thickness. FIG. 39 shows the idler side of the hub. In certain embodiments, the fluid side of the hub is a mirrored shape and/or size of the idler side.

Examples of shapes, sizes and/or dimensions of the drum shaft mount 2903 are shown in FIG. 40. In certain embodiments, the drum shaft mount 2903 does not comprise one or more apertures for receiving a conduit and/or a source of material (e.g., wash liquid and/or carbonaceous composition). In certain embodiments, the drum shaft mount 2903 is located on the opposite side of the drum assembly as the other drum shaft mount 2804 (which does comprise one or more apertures). In certain embodiments, the drum shaft mount comprises or is made of one or more materials including, for example, HDPE. In certain embodiments, the drum shaft mount is about 2 inches in thickness. FIG. 39 shows the idler side of the mount. In certain embodiments, the fluid side of the mount is a mirrored shape and/or size of the idler side. The details of structural elements and their inter-relations in the rGO/graphene second reaction filter in some cases are described in FIGS. 43A-43F and/or TABLE 3. In some cases, the exemplary procedures of operating an rGO/graphene second reaction filter (shown in FIGS. 43A-43F) are shown in FIGS. 42A-42C. In certain embodiments, operation and unloading of the second reaction filter is automated or semi-automated.

In some embodiments, an rGO/graphene second reaction filter (alternatively herein as the top assembly) (e.g., as shown in FIGS. 43A-43F) includes an enclosure 4318 and/or a control enclosure 4319. In certain embodiments, the enclosure 4318 and/or control enclosure 4319 houses or encloses a control unit therein. In certain embodiments, the control unit and/or its enclosure are physically attached to one or more elements of the top assembly. Alternatively, in other embodiments, the control unit and/or its enclosure are remotely located from the top assembly. In certain embodiments, the control unit is electrically or electronically connected to one or more elements of the top assembly to control operation (e.g., mechanical operation). In certain embodiments, the control unit controls, for example, the filtering steps and/or reactions, and/or unloading of the top assembly. In certain embodiments, the unloading of the top assembly is automated. In certain embodiments, the control unit and the top assembly are in communication and/or connected via a wired or a wireless connection. In certain embodiments, the control unit includes a user interface that allows a user to enter input at the interface. In certain embodiments, the control unit includes a digital processing device comprising a processor to control the top assembly. In certain embodiments, the control unit includes one or more software modules embedded and executable by the digital processing device (e.g., for controlling one or more elements of the top assembly). In certain embodiments, the control unit includes an electronic interface to receive data from non-transitory computer readable media, the Internet, a cloud, a mobile application and the like. In certain embodiments, the control unit includes a digital display. In certain embodiments, the digital display displays information related to the functioning of the second reaction filter and/or to the control of the second reaction filter. In certain embodiments, the control unit includes an on/off switch for turning the second reaction filter on and/or off. In certain embodiments, the control unit includes pre-programmed protocols for controlling one or more elements of the second reaction filter. In certain embodiments, the control unit operates the second reaction filter to carry out a cleaning protocol (e.g., user defined protocol or a predefined protocol). In certain embodiments, the cleaning protocol comprises a number of wash cycles. In certain embodiments, the cleaning protocol comprises at least 1, 2, 3, 4, 5, 6, 7, 8, 9, 10, 11, 12, 13, 14, 15, 16, 17, 18, 19, or 20 wash cycles. In certain embodiments, a wash cycle begins with the dispensing of a wash liquid into the drum assembly and ends when at least 10%, 20%, 30%, 40%, 50%, 60%, 70%, 80%, 90%, 95%, or 99% of the wash liquid has been drained from the interior of the drum assembly. In certain embodiments, a wash cycle comprises a spin cycle (e.g. spin dry cycle), wherein the drum assembly rotates without dispensing a wash liquid in order to drain the wash liquid from the interior of the drum assembly using centrifugal force. In certain embodiments, each wash cycle is configured according to certain properties, such as, for example, amount of the wash liquid (e.g., deionized water) used, length of each wash cycle, number of wash cycles, rotation speed of the drum, the pressure at which the wash liquid is dispensed, and the direction at which the spray bar assembly dispenses the wash liquid (e.g., twelve o'clock, three o'clock, six o'clock, nine o'clock, etc). In certain embodiments, such elements include, but are not limited to, a motor, a driver, a drum shaft, an idler shaft, a drive shaft, an idler wheel, a drive wheel, a spray bar assembly, a cradle pivot assembly, a drum cradle assembly, a lid, a frame assembly, a drive belt, or any combination thereof.

In some embodiments, an rGO/graphene second reaction filter (e.g., as shown in FIGS. 43A-43F) includes a cover assembly as shown in FIGS. 45A-E. In certain embodiments, the cover assembly includes one or more structural elements listed in TABLE 3 such as, for example, handles 4505, 2 bolt flange bearings 4506, nuts (4507, 4510), flat washers (4508, 4509), and flat screws 4511. In certain embodiments, the cover assembly comprises a front lid weldment 4502 and a rear lid weldment 4501 (e.g., as shown in FIGS. 45A-45E). In certain embodiments, the cover assembly comprises a hood pivot shaft 4504 and a hood pivot plate 4503 that help enable the front lid weldment to rotate about the rear lid weldment. In certain embodiments, the hood pivot shaft 4504 has a length of about 1.75 inches. In certain embodiments, the hood pivot plate 4503 has a diameter of about 2.75 inches and a thickness of about 0.125 inches.

Figure 46:
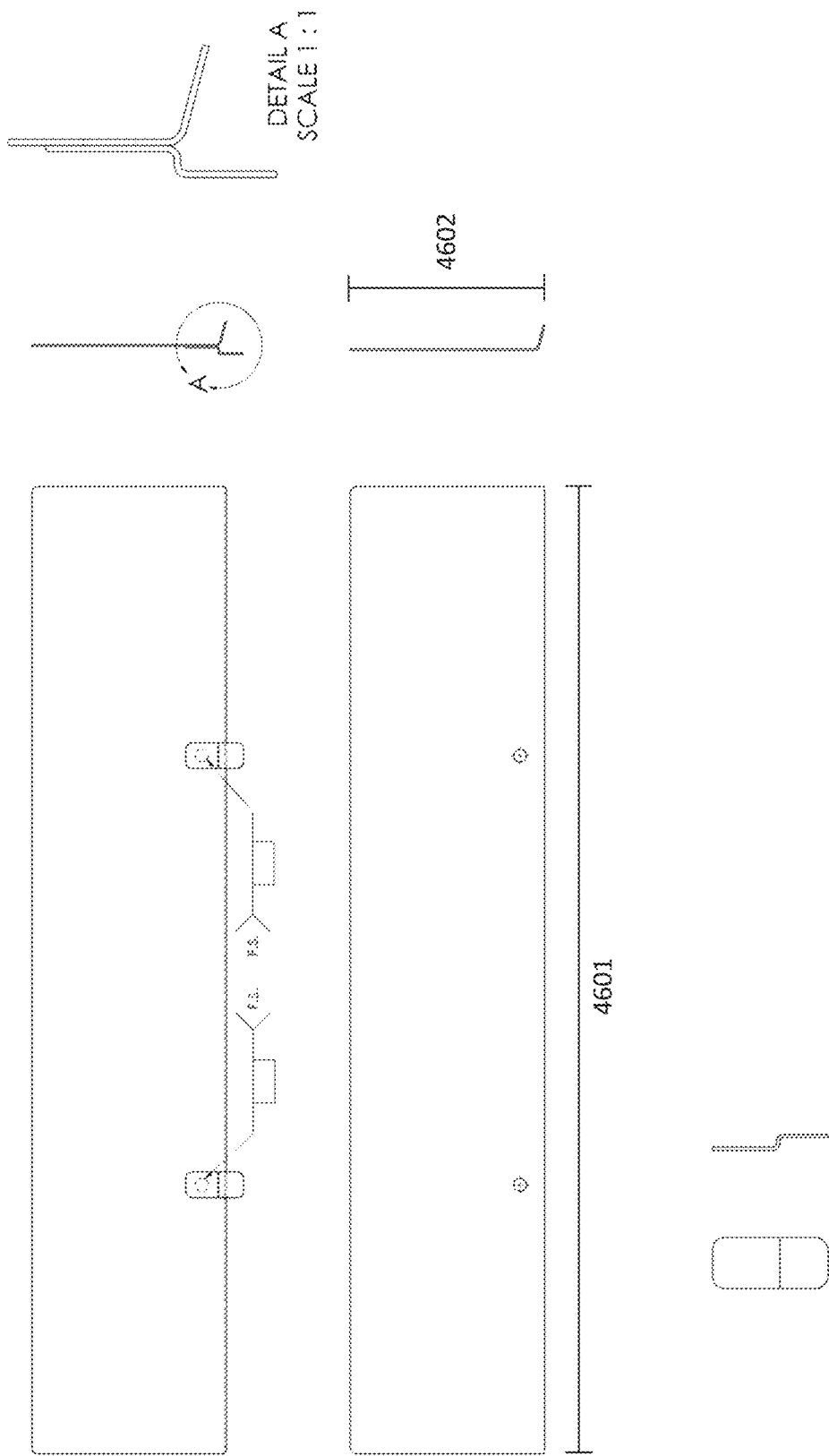
FIG. 46 shows an exemplary embodiment of a splash guard (e.g. GSRF-0113)

In some embodiments, an rGO/graphene second reaction filter comprises a splash guard as shown in FIG. 46. In certain embodiments, the splash guard has dimensions including one or more of the following: a width 4601 of about 37.75 inches and a height 4602 of about 7.30 inches.

In some embodiments, a scalable reactor 4400 is used for making GO and/or rGO as shown in FIG. 44. In certain embodiments, the reactor is a first reaction reactor (e.g., used to implement the first reaction). In certain embodiments, the reactor is automated or semi-automated (e.g., for making GO and/or rGO). In certain embodiments, the reactor and its components are scaled from micro-scale size(s) up to massive scale size(s) for making GO and/or rGO (e.g., as described elsewhere herein). In certain embodiments, the scalable reactor includes two or more (e.g., a plurality of) units (e.g., comprising reaction pots or reaction vessels) 4401. In certain embodiments, the reactor includes from 1 to 18 vessels. In certain embodiments, the reactor comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 units. In certain embodiments, the reactor comprises at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 units. In certain embodiments, the reactor is configured to produce GO and/or rGO at a capacity, speed or throughput of, for example, at least about 16 times greater than conventional reactor(s). In certain embodiments, each unit 4401 comprises a mixer 4403 comprising an agitator and a mixer bowl (e.g., with a size/volume from about 20 quart to about 320 quart). In certain embodiments, the reactor includes a tank 4402 (e.g., with a size/volume from about 100 gallons to about 3000 gallons) that is connected (e.g., couple and/or in fluid communication with) each of the units 4401. In certain embodiments, the reactor comprises one or more ventilation ports (e.g. ventilation in and ventilation out). In certain embodiments, the reactor comprises a mixer or mixer system, wherein the mixer system comprises a motor and an agitator. In certain embodiments, the agitator and/or mixer is configured to be raised and/or lowered from the reactor. In certain embodiments, the reactor comprises a port at a bottom end of the reactor that is in fluid communication with the tank 4402. In certain embodiments, the port directly empties into the tank. In certain embodiments, the port is coupled to a conduit that transports the contents of the reactor into the tank. In certain embodiments, the conduit comprises or is made of stainless steel. In certain embodiments, the reactor and/or its components are self-cleaning (e.g., such that cleaning is automatically performed with minimal manual intervention and/or without the need for manual intervention).

Figure 47:
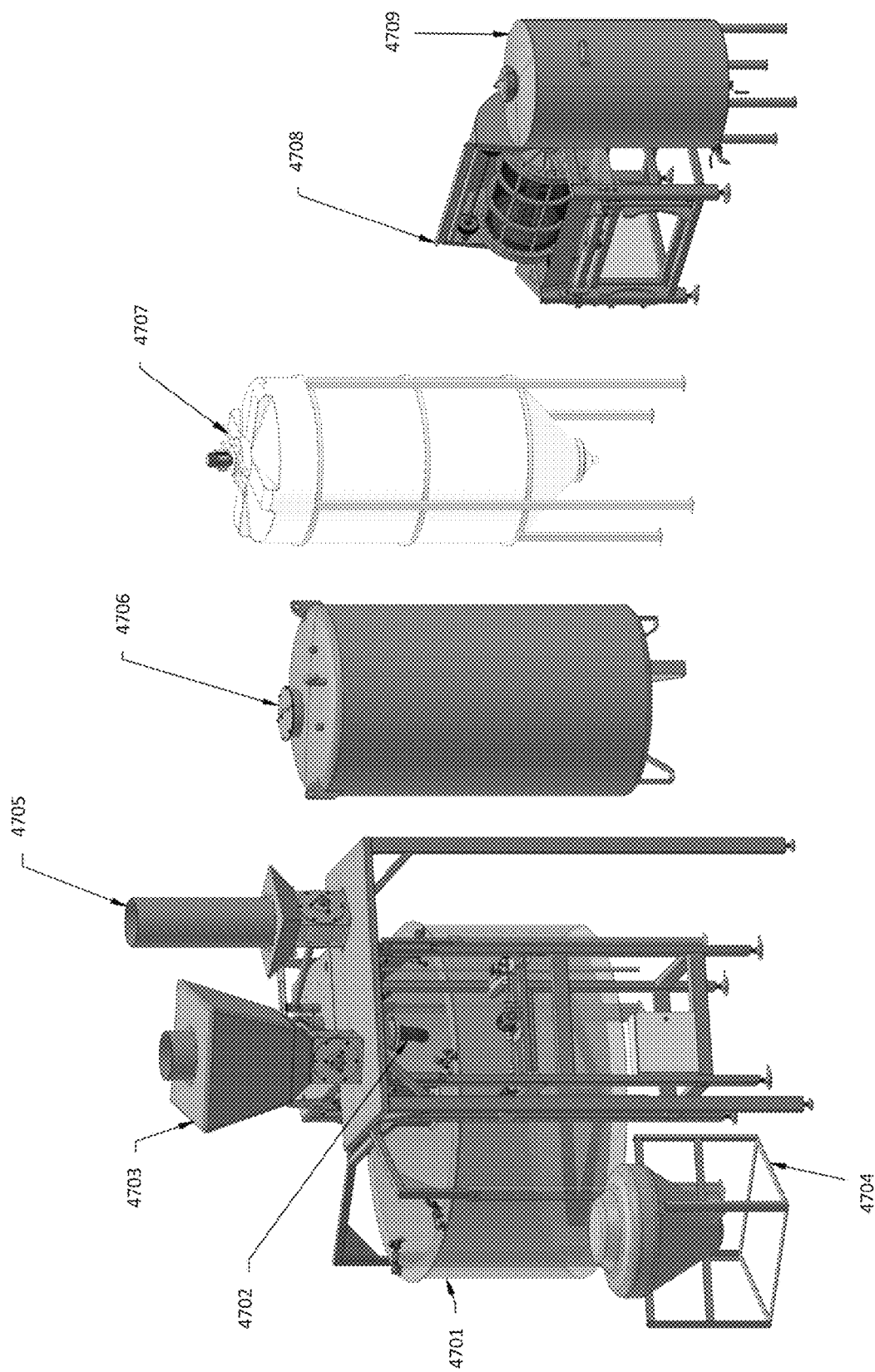
FIG. 47 shows an exemplary embodiment of a first reaction system, a de-ionized water holding tank, an acid holding tank, a second reaction system, and a second reaction filter.

In some embodiments, a system is used for processing a carbonaceous composition as shown in FIG. 47. In certain embodiments, the system comprises a first reaction system or apparatus for carrying out a first reaction to make an oxidized form of a carbonaceous composition, a first reaction filter for filtering an oxidized form of a carbonaceous composition, a second reaction system or apparatus for carrying out a second reaction to make a reduced form of a carbonaceous composition, a second reaction filter for filtering a reduced form of a carbonaceous composition, or any combination thereof. In certain embodiments, the system comprises a first reaction system or apparatus. In certain embodiments, a first reaction system or apparatus comprises a reaction vessel for holding a carbonaceous composition. In certain embodiments, the reaction vessel comprises one or more sensors for measuring the conditions inside the tank. In certain embodiments, the reaction vessel comprises a thermometer or temperature sensor. In certain embodiments, the thermometer or temperature sensor allows a determination of the reaction temperature and/or temperature rate of change inside the reaction vessel. As another example, in certain embodiments, the reaction vessel comprises a pH sensor. As another example, in certain embodiments, the reaction vessel comprises a salt concentration sensor. In certain embodiments, the first reaction system or apparatus comprises a first reaction mixer assembly 4702. In certain embodiments, the first reaction mixer assembly 4702 agitates or mixes the carbonaceous composition before, during, and/or after the first reaction. In certain embodiments, the first reaction system or apparatus comprises a tank 4701. In certain embodiments, the carbonaceous composition inside the first reaction vessel is transferred to the tank 4701.

In certain embodiments, an auger feed (or any other source of a material fed into a reaction vessel and/or a tank) dispenses a material into an intake of a reaction vessel and/or tank. In further embodiments, the intake receives the material, which is then dispensed into the interior of the reaction vessel and/or tank. In some embodiments, a reaction system comprises one or more reaction vessels and/or a tank comprising one or more intakes for receiving materials (e.g. reactants, ingredients, quenching reagents, etc). In certain embodiments, the first reaction vessel is in fluid communication with the tank 4701. In certain embodiments, the first reaction system or apparatus comprises an ice auger feed 4703. In certain embodiments, the ice auger feed 4703 dispenses ice (e.g. via the intake) into the tank 4701 before, during, and/or after the first reaction. In certain embodiments, the ice auger feed 4703 dispenses ice into the tank to quench the first reaction. In certain embodiments, the ice auger feed 4703 dispenses ice into the tank to cool the reaction temperature down to a certain temperature or temperature range. In certain embodiments, the ice auger feed 4703 dispenses ice into the tank to cool the reaction temperature down to a temperature less than or equal to about 0° C., 1° C., 2° C., 3° C., 4° C., 6° C., 8° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C. In certain embodiments, the ice auger feed 4703 feeds ice into the tank to cool the reaction temperature down to about 0° C., 1° C., 2° C., 3° C., 4° C., 6° C., 8° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C. In certain embodiments, the ice auger feed 4703 dispenses ice into the tank to maintain the reaction temperature at a certain temperature or temperature range. In certain embodiments, the ice auger feed 4703 dispenses ice into the tank to maintain the reaction temperature at about 0° C., 1° C., 2° C., 3° C., 4° C., 6° C., 8° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or about 100° C. In certain embodiments, the ice auger feed 4703 dispenses ice into the tank to prevent, reduce, or neutralize a temperature increase caused by an exothermic reaction taking place within the tank. In certain embodiments, the ice auger feed 4703 is automated or semi-automated. In some embodiments, a material (e.g., ice, potassium permanganate, sodium ascorbate, hydrogen peroxide, or other reactants or materials) is dispensed using a feed other than an auger feed. As an example, a tube chain conveyor is used in lieu of an auger feed.

In certain embodiments, one or more apparatuses or systems for moving and/or dispensing materials into a tank, reactor, vessel, or unit are used such as, for example, a conveyor (e.g. flexible screw conveyor, solid core screw conveyor, an auger conveyor, belt conveyor, etc). In some embodiments, the apparatus or system for moving and/or dispensing materials into a tank comprises a conveyor for transporting said materials from a storage unit (e.g., a deionized water holding tank 4706, an acid holding tank 4707, an ice storage unit, a potassium permanganate storage unit, etc) to a first reaction vessel, a first reaction tank (e.g., for quenching a first reaction), a first reaction filter, a second reaction system, or a second reaction filter. In one example, ice is transported from a storage unit to an ice feed (e.g., ice auger feed 4703) of a tank of a first reaction system or apparatus. In some embodiments, a container comprises a carbonaceous composition 4704. In certain embodiments, the reaction vessel comprises an intake for receiving potassium permanganate. In certain embodiments, the reaction vessel comprises an intake for receiving sulfuric acid. In certain embodiments, the reaction vessel comprises an intake for receiving a carbonaceous composition (e.g., graphite feedstock). In certain embodiments, the container comprises a carbonaceous composition 4704 comprising pre-mixed graphite and sulfuric acid. In certain embodiments, graphite and sulfuric acid are pre-mixed prior to being introduced into the tank 4701. One advantage of pre-mixing the carbonaceous composition (e.g. graphite and sulfuric acid) is to reduce variations in reaction temperature and/or reaction rate. Unmixed or unevenly mixed components can result in variations in reaction temperature and/or reaction rate throughout the composition when the reaction initiates. For example, in certain embodiments, adding the catalyst potassium permanganate to a first reaction vessel comprising unmixed graphite and sulfuric acid results in high reaction temperatures and/or reaction rates in some locations with lower reaction activity in other locations. In certain embodiments, a carbonaceous composition comprising graphite and sulfuric acid is pre-mixed within the reaction vessel, or alternatively, in another container 4704. In certain embodiments, a catalyst such as, for example, potassium permanganate is added to the pre-mixed graphite and sulfuric acid to catalyze the reaction inside the reaction vessel. In certain embodiments, pre-mixing reduces variations in reaction temperature and/or reaction speed during the reaction (e.g., a first reaction) for a given batch. In certain embodiments, pre-mixing reduces variations in reaction temperature and/or reaction rate between separate batches. In some embodiments, another catalyst is substituted for potassium permanganate (e.g., potassium ferrate $K_2FeO_4$). In certain embodiments, another catalyst is substituted for potassium permanganate in any of the systems, apparatus, and methods described herein. In certain embodiments, apparatus comprises a catalyst auger feed (e.g., a potassium permanganate auger feed 4705). In certain embodiments, potassium permanganate auger feed 4705 feeds or dispenses potassium permanganate into the reaction vessel (e.g., if the first reaction takes place in the reaction vessel and is quenched in the tank) or into the tank 4701 (e.g., if first reaction and quenching both take place in the tank) before, during, and/or after the first reaction. In certain embodiments, the potassium permanganate auger feed 4705 allows variations in the amount of potassium permanganate being dispensed. In certain embodiments, potassium permanganate auger feed 4705 is automated or semi-automated. In certain embodiments, potassium permanganate auger feed 4705 is manually and/or automatically controlled by a central control unit. In certain embodiments, potassium permanganate auger feed 4705 is configured (e.g. manually or automated) to feed potassium permanganate into the reaction vessel or into the tank 4701 at a rate suitable for maintaining a certain reaction temperature (e.g., temperature inside the reaction vessel for a first reaction) or reaction rate. In certain embodiments, potassium permanganate auger feed 4705 is configured to feed potassium permanganate at a rate suitable for keeping the reaction temperature below a certain temperature. In certain embodiments, a potassium permanganate auger feed 4705 is configured to increase the rate at which potassium permanganate is dispensed when the reaction temperature is below a temperature threshold. In certain embodiments, a potassium permanganate auger feed 4705 is configured to decrease the rate at which potassium permanganate is dispensed when the reaction temperature is above a temperature threshold. In certain embodiments, temperature threshold is about 0° C., 1° C., 2° C., 3° C., 4° C., 6° C., 8° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. or 100° C. In certain embodiments, a potassium permanganate auger feed 4705 is configured to increase the rate at which potassium permanganate is dispensed into the tank 4701 when the reaction temperature is increasing below a threshold rate of change. In certain embodiments, the potassium permanganate auger feed 4705 is configured to decrease the rate at which potassium permanganate is dispensed into the tank 4701 when the reaction temperature is increasing above a threshold rate of change. In certain embodiments, the threshold temperature rate of change is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 6.5, 7.0, 7.5, 8.0, 8.5, 9.0, 9.5, 10.0, 11, 12, 13, 14, 15, 16, 17, 18, 19, or 20° C. per minute (° C./min).

In some embodiments, a system as shown in FIG. 47 comprises a first reaction filter (e.g., first reaction filter system or first reaction filtration system or apparatus) for filtering an oxidized form of a carbonaceous composition (e.g., graphene oxide). In certain embodiments, first reaction filter filters the products of a first reaction (e.g., oxidation reaction generating GO). In certain embodiments, first reaction filter comprises a filtering membrane.

In some embodiments, a system as shown in FIG. 47 comprises a second reaction system or apparatus for carrying out a second reaction to generate a reduced form of a carbonaceous composition (e.g. rGO). In certain embodiments, second reaction system or apparatus comprises a second reaction tank, a mixer or mixer system, a heating component, a hydrogen peroxide feed, a sodium ascorbate feed, or any combination thereof. In certain embodiments, the second reaction tank comprise a carbonaceous composition. In certain embodiments, the second reaction system or apparatus comprises a heated tank 4709 (e.g., heat is provided by the heating component). In certain embodiments, the mixer or mixer system agitates and/or mixes the contents of the tank (e.g., carbonaceous composition and any other reactants or reaction components) in the same manner as any other mixer or mixer system described elsewhere herein in the specification. In certain embodiments, the heating component heats the tank to increase the second reaction temperature. In certain embodiments, the heating component is configured to heat the tank to at least about 30° C., 35° C., 40° C., 45° C., 50° C., 55° C., 60° C., 65° C., 70° C., 75° C., 80° C., 85° C., 90° C., 95° C. or 100° C. In certain embodiments, the heating component is configured to heat the tank to maintain a temperature of about 30° C., 35° C., 40° C., 45° C., 50° C., 55° C., 60° C., 65° C., 70° C., 75° C., 80° C., 85° C., 90° C., 95° C. or 100° C. In certain embodiments, the hydrogen peroxide feed is configured to dispense hydrogen peroxide at a certain rate or amount. In certain embodiments, the sodium ascorbate feed is configured to dispense hydrogen peroxide at a certain rate or amount. In certain embodiments, the hydrogen peroxide feed and sodium ascorbate feed are configured to dispense about 20 L of 30% hydrogen peroxide per kg of GO (in 100 liters of solution) and about 4.95 kg of sodium ascorbate (sodium salt of ascorbic acid) per kg GO (in 100 liters of solution).

In some embodiments, a system as shown in FIG. 47 comprises a second reaction filter 4708 (e.g., a second reaction filter system or second reaction filtration system) for carrying out a filtration of a reduced form of a carbonaceous composition (e.g. rGO). In certain embodiments, the second reaction filter 4708 comprises a variety of components as described elsewhere herein. In some embodiments, the second reaction filter 4708 comprises one or more of a drum assembly and a spray bar assembly. In certain embodiments, the spray bar assembly comprises a spray bar comprising one or more openings (e.g., nozzles or spray tips) for dispensing one or more materials (e.g., a liquid, a solid, a suspension, a mixture, etc) within the drum assembly. In certain embodiments, the spray bar is substantially positioned within the interior of the drum assembly. In certain embodiments, the spray bar is positioned to dispense a material within the interior of the drum assembly. In certain embodiments, the spray bar assembly is configured to dispense a carbonaceous composition (e.g., rGO) within the drum assembly. In certain embodiments, the spray bar assembly is configured to dispense the carbonaceous composition at a low pressure. In certain embodiments, the spray bar assembly is configured to dispense a liquid (e.g., deionized water from a deionized water holding tank 4706) within the drum assembly for washing and/or purifying the carbonaceous composition. In certain embodiments, the spray bar assembly is configured to dispense the liquid by spraying it at high pressure (e.g., to rinse the carbonaceous composition). In certain embodiments, the high pressure is a pressure that is higher than the low pressure, wherein the carbonaceous composition is dispensed at a lower pressure compared to the liquid that is dispensed at a higher pressure. In certain embodiments, the spray bar assembly comprises one or more spray bars (e.g., FIG. 28A spray bar 2801). In certain embodiments, the spray bar assembly comprises at least two, three, four, five, six, seven, eight, nine, or ten spray bars. In certain embodiments, a spray bar comprises one or more openings (e.g., nozzle, spray tip 2809, etc) for dispensing one or more materials. In certain embodiments, a spray bar comprises a set of openings for dispensing a carbonaceous composition. In certain embodiments, a spray bar comprises a set of openings for dispensing a liquid. In certain embodiments, a spray bar comprises a first set of openings for dispensing a carbonaceous composition (e.g., at low pressure) and a second set of openings for dispensing a liquid (e.g., at high pressure). In certain embodiments, the interior of the drum assembly is substantially enclosed to prevent solid and/or liquid particles from exiting the interior of the drum assembly. For example, in certain embodiments, the interior of the drum assembly is substantially enclosed, wherein the assembly comprises a drum mesh and/or drum micron filter comprising a pore size suitable for retaining a reduced form of a carbonaceous composition within the drum assembly while allowing impurities, reaction byproducts, and/or waste to pass through. In some embodiments, a second reaction filter comprises a spray bar assembly configured to dispense a liquid from the exterior of the drum assembly. In some embodiments, the second reaction filter 4708 comprises a drum assembly that is partially or completely submerged in a liquid (e.g., deionized water) in the drainpan (FIG. 23A). In certain embodiments, the drum assembly is rotated to enhance rinsing of a carbonaceous composition inside the drum assembly. In certain embodiments, the drainpan comprises a drain. In certain embodiments, the drain is configured to open or close. In certain embodiments, the second reaction filter comprises one or more sensors (e.g., a temperature, pH, and/or salt concentration sensor). In certain embodiments, the one or more sensors is positioned inside the drainpan. In certain embodiments, the one or more sensors are positioned at the drain. In certain embodiments, the second reaction filter undergoes multiple washes or wash cycles for a carbonaceous composition (e.g., one batch of rGO). In certain embodiments, each wash uses a volume of liquid (e.g., deionized water). In certain embodiments, a wash or wash cycle uses at least 5, 10, 15, 20, 25, 30, 35, 40, 45, 50, 60, 70, 80, 90, or 100 gallons of a liquid. In certain embodiments, the drum assembly comprising a carbonaceous composition undergoes one or more rinse or wash cycles. In certain embodiments, a rinse or wash cycle comprises filling up the drainpan with a volume of liquid (e.g., drain is closed), rotating the drum assembly to rinse the carbonaceous composition, and opening the drain to drain out the liquid. In certain embodiments, a rinse or wash cycle comprises spraying a volume of liquid from a spray bar assembly to rinse or wash the carbonaceous composition, and allowing the liquid to drain. In certain embodiments, operation of one or more components of the second reaction filter is automated or semi-automated. For example, in certain embodiments, operation of the second reaction filter comprises a set of instructions or steps suitable for filtering and/or purifying a carbonaceous composition (e.g., rGO). In certain embodiments, operation of the second reaction filter comprises control of one or more components of a drum assembly (e.g., a motor that actuates the drum assembly, a drum shaft, a drive shaft, an idler shaft, etc), a spray bar assembly (e.g., low pressure input, high pressure input), and a drainpan drain (e.g., open or close).

In some embodiments, a central control unit controls a first reaction system or apparatus, a first reaction filter, a second reaction system or apparatus, and a second reaction filter. In certain embodiments, the central control unit provides control that is manual, automated, or semi-automated. In certain embodiments, the central control unit controls any combination of the systems, apparatuses, filters, or processes described herein. In certain embodiments, the central control unit controls the temperature of the first reaction. In certain embodiments, the central control unit controls a one or more components of a first reaction system or apparatus (e.g., for carrying out oxidation of a carbonaceous composition). As an example, in certain embodiments, the central control unit controls one or more of a mixer, an ice auger feed, and a catalyst auger feed (e.g., a potassium permanganate auger feed). In certain embodiments, the central control unit controls the timing, amount, and/or rate of addition of one or more reactants or ingredients into a system for carrying out a first reaction (e.g., first reaction system, apparatus, or assembly). In certain embodiments, the central control unit controls the timing, amount, and/or rate of addition of potassium permanganate and/or ice into a vessel, reaction chamber, or unit of the first reaction system. In certain embodiments, the central control unit controls a first reaction filter or first reaction filtration process. In certain embodiments, the central control unit controls a second reaction system or apparatus. In certain embodiments, the central control unit controls the timing, amount, and/or rate of addition of one or more reactants or ingredients into a system for carrying out a second reaction (e.g., second reaction system, apparatus, or assembly). In certain embodiments, the central control unit controls the timing, amount, and/or rate of addition of hydrogen peroxide and/or sodium ascorbate into a vessel, reaction chamber, or unit of the second reaction system. In certain embodiments, the central control unit controls one or more components of a second reaction filter or second reaction filtration process. In certain embodiments, the central control unit controls one or more of rotation of a drum assembly (e.g., on or off rotation, speed of rotation, rate of increase or decrease in rotation), a spray bar assembly (e.g., rate, quantity, and/or pressure of rGO dispensed; rate, quantity, and/or pressure of deionized water dispensed), and a drainpan drain (e.g., opening or closing the drain). In certain embodiments, the central control unit utilizes sensor data from one or more of a first reaction system or apparatus, a first reaction filter, a second reaction system or apparatus, and a second reaction filter. In certain embodiments, the central control unit coordinates the operation of one or more of a first reaction system or apparatus, a first reaction filter, a second reaction system or apparatus, and a second reaction filter. In certain embodiments, the central control unit controls the components, subsystems, and/or systems for processing a carbonaceous composition. In certain embodiments, the central control unit coordinates the operation of components, subsystems, and/or systems for processing a carbonaceous composition to optimize the production rate of graphene oxide and/or reduced graphene oxide (e.g., single layer or multi-layer GO or rGO).

In certain embodiments, a central control unit and/or its enclosure is physically attached to one or more components of the systems or apparatuses described herein. Alternatively, in other embodiments, the central control unit and/or its enclosure is remotely located from one or more components of the systems and assemblies described herein. For example, in certain embodiments, the central control unit is geographically separated from a space containing systems for processing carbonaceous compositions (e.g., first reaction system, first reaction filter, second reaction system, second reaction filter, etc). In certain embodiments, the central control unit is electrically or electronically connected to one or more components of a system for processing carbonaceous compositions to control operation (e.g., mechanical operation). In certain embodiments, the central control unit controls one or more systems for carrying out, for example, a first reaction, a first filtration, a second reaction, a second filtration, or any combination thereof. In certain embodiments, the central control unit and the system are in communication and/or connected via a wired or a wireless connection. In certain embodiments, the central control unit includes a user interface that allows a user to enter input at the interface. In certain embodiments, the central control unit includes a digital processing device comprising a processor to control the system or any of its components or subsystems. In certain embodiments, the central control unit includes one or more software modules embedded and executable by the digital processing device (e.g., for controlling one or more elements of the top assembly). In certain embodiments, the central control unit includes an electronic interface to receive data from non-transitory computer readable media, the Internet, a cloud, a mobile application and the like. In certain embodiments, the central control unit includes a digital display. In certain embodiments, the digital display displays information related to the control and/or functioning of the first reaction system, the first reaction filter, the second reaction system, the second reaction filter, or any combination thereof. In certain embodiments, the central control unit includes an on/off switch for turning the first reaction system, the first reaction filter, the second reaction system, the second reaction filter, or any combination thereof on and/or off. In certain embodiments, the central control unit includes pre-programmed protocols for controlling one or more elements of the first reaction system, the first reaction filter, the second reaction system, the second reaction filter, or any combination thereof. In certain embodiments, such elements include one or more of a motor, an agitator, a mixer or mixer system, an ice auger feed, a potassium permanganate auger feed, a sodium ascorbate feed, a hydrogen peroxide feed, a lid, a cover, a hood assembly, a driver, a drum shaft, an idler shaft, a drive shaft, an idler wheel, a drive wheel, a spray bar assembly, a cradle pivot assembly, a drum cradle assembly, a lid, a frame assembly, a drive belt, or any combination thereof.

In certain embodiments, a process for making graphite oxide (GO) and graphene (rGO) includes oxidation, filtration (e.g. purification), reduction and second filtration (e.g. final purification). In certain embodiments, the process of making graphite oxide (GO) includes oxidation and filtration. In certain embodiments, GO generated from a first reaction is processed to an appropriate pH for one or more downstream applications. In certain embodiments, the GO generated from a first reaction is processed to a pH between about 4.5 and 5.0, 5.0 and 5.5, 5.5 and 6.0, 6.0 and 6.5, or 6.5 and 7.0. In certain embodiments, the process of making graphite oxide (GO) and/or graphene (rGO) generates waste materials, such as, for example, sulfuric acid. In certain embodiments, the process for making GO/rGO includes an independent waste processing step, for example, such as adding lime (e.g. CaO) to reaction byproducts of reaction one. In certain embodiments, the waste processing step neutralizes sulfuric acid waste with lime to generate gypsum. In certain embodiments, the gypsum is processed, for example, by being filter pressed. In certain embodiments, the gypsum is then dried. In certain embodiments, a waste processing apparatus comprising a tank and a mixer is configured to generate gypsum by mixing lime with a waste liquid from reaction one, wherein the waste liquid comprises sulfuric acid. Processed gypsum is useful for downstream applications, such as, for example, as a fertilizer. The high calcium and sulfur content of gypsum and its high solubility makes it an ideal fertilizer. Gypsum also does not acidify the soil and may act to reduce aluminum toxicity in the soil. Therefore, in certain embodiments, a process of making GO and/or rGO comprises a waste processing step that converts sulfuric acid waste into gypsum.

In certain embodiments, during oxidation to single-layer GO, graphite (about 1 kg) is mixed with 98% sulfuric acid (about 32 L) and chilled to about −10° C. In certain embodiments, the GO reactor cooling coils is chilled to −2° C. In certain embodiments, the graphite/sulfuric acid mixture is then poured carefully into the reactor. In certain embodiments, potassium permanganate (about 4.8 kg) powder is added to the reactor slowly over the course of about 1.5 hours, carefully keeping the reaction temperature below about 15° C. In certain embodiments, after addition of potassium permanganate is complete, the reactor cooling coil temperature is raised to about 12° C., and the reaction heats up to about 30° C. over about 1.5 hours. In certain embodiments, the reactor cooling coils are then cooled to about −2° C., and the reaction temperature stays at about 30° C. for approximately an additional 30 minutes. In certain embodiments, crushed ice (about 32 kg) is then added over the course of about 1 hour. In certain embodiments, the reaction temperature climbs to about 50° C. over this time. After ice addition, in certain embodiments, the reaction is allowed to stir for about 1 hour. In certain embodiments, the reaction is finally quenched with crushed ice (about 72 kg). In certain embodiments, the ice melts during this quench, and then 30% hydrogen peroxide (about 2 L) is added to stop the reaction.

In certain embodiments, during oxidation to multi-layer GO, graphite (about 1 kg) is mixed with 98% sulfuric acid (about 32 L) and chilled to about −10° C. In certain embodiments, the GO reactor cooling coils are chilled to about −2° C. In certain embodiments, the graphite/sulfuric acid mixture are then poured carefully into the reactor. In certain embodiments, potassium permanganate (about 2 kg) powder is added to the reactor slowly over the course of about 45 minutes, carefully keeping the reaction temperature below about 15° C. In certain embodiments, the reaction is then allowed to stir for about 30 minutes at a reaction temperature of about 15° C. In certain embodiments, the reaction is finally quenched with crushed ice (about 125 kg). In certain embodiments, the ice melts during this quench, and then 30% hydrogen peroxide (about 1 L) is added to stop the reaction.

In certain embodiments, purification is performed using a tangential flow filtration process. In certain embodiments, the filter type is a modified polyether sulfone hollow filter membrane with about 0.02 micron pore size. In certain embodiments, the purification is complete when the pH of the product reaches about 5. In certain embodiments, the purified GO is then concentrated to a solution of about 1% by weight.

In certain embodiments, the reduction is performed by heating the purified 1% by weight GO (about 1 kg) solution to about 90° C. and adding 30% $H_2O_2$ (about 1 L) for about 1 hour. After about 1 hour, 30% $H_2O_2$ (about 1 L) is added to the reaction and heated at about 90° C. for approximately an additional 3 hours. Then, sodium ascorbate (about 4.95 kg) is added to the reaction over the course of about 30 minutes. In certain embodiments, the reaction continues to heat under stirring for approximately an additional 1.5 hours to form reduced graphite oxide (rGO).

In certain embodiments, the final purification includes purifying rGO via vacuum filtration through, for example, a 2 micron 316 stainless steel mesh filter (e.g., via a second reaction filter). In certain embodiments, water is flushed through the rGO to remove all salts. In certain embodiments, purification is complete when the rGO solution has a conductivity of about 50 μS/cm or less. In certain embodiments, the filtration is accomplished using the second reaction filter as described herein (e.g. as shown in FIGS. 41-43). As an example, in certain embodiments, the slurry of rGO second reaction products is pumped into the interior space of the drum assembly (e.g., drum) at low pressure by the spray bar (e.g., "Lo-Pressure Fluid In" in FIG. 41A) as the drum is rotating (e.g. 600 rpm). In certain embodiments, the centrifugal force from the rotation of the drum forces the slurry against the interior surface of the drum mesh and/or drum micron filter. Water and dissolved solutes are able to pass through the mesh/filter pores, while the rGO product is retained. In certain embodiments, a liquid (e.g. deionized water) is sprayed at high pressure (e.g., "Hi-Pressure Fluid In" in FIG. 41A) from openings in the spray bar (e.g. spray tip 2809) against the rGO product stuck on the interior surface of the mesh/filter. In certain embodiments, the high pressure liquid forces the rGO product off the surface of the mesh/filter and into the bottom of the drum. In certain embodiments, the drum is rotating during this washing process. In certain embodiments, the drum rotates continuously at the same speed, change speeds, stop and go, reverse rotation, or any combination thereof to facilitate washing and/or drying of the rGO. In certain embodiments, the bottom of the drum (e.g. bottom ½, bottom ⅓, bottom ¼, or bottom ⅕, etc.) is positioned within the drainpan weldment (e.g. below the top edge of the drainpan weldment). In some embodiments, a portion of the bottom of the drum is submerged under a liquid being used to wash the rGO second reaction product. This allows rGO that is forced off the surface of the mesh/filter to be further washed by submersion in a volume of liquid in the drainpan weldment. In certain embodiments, once the rGO product has been sufficiently washed, the liquid is drained from the drainpan, and the spray bar ceases ejecting high pressure liquid. In certain embodiments, the drum rotates at a high rpm to help dry the rGO product. In certain embodiments, a vacuum is applied to enhance the filtration and/or draining process at any point during this procedure. In some embodiments, the rGO product undergoes multiple rounds of washing. In certain embodiments, each wash or round of washing ends when at least a majority of the liquid in the drainpan is drained. In certain embodiments, the drum provides at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 washes for a batch of a carbonaceous composition (e.g., rGO).

In certain embodiments, the methods herein (e.g., the methods of making graphite oxide) are tunable in terms of control of oxidation characteristics and amount of exfoliation. In certain embodiments, the methods herein are safer than other methods because of procedural and engineered temperature controls. In certain embodiments, the methods herein are efficient in minimizing the use of reagents for carrying out the reactions and filtrations described herein. In certain embodiments, the methods herein are configured to be fully scalable.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the systems, devices, and methods described herein are employable in practicing the subject matter described herein. It is intended that the following claims define the scope of the invention and that methods and structures within the scope of these claims and their equivalents be covered thereby.

What is claimed is:

1. A reaction system for making reduced graphene oxide, comprising:
    a filter apparatus comprising a micron filter comprising pores having a pore size suitable to retain at least 95% w/w of a graphene oxide from a carbonaceous composition while allowing a filtrate comprising waste products, unreacted reaction components, or impurities to drain through the micron filter, wherein the filter apparatus is configured to purify the carbonaceous composition comprising the graphene oxide by vacuum filtration;
    a reaction vessel comprising
    a heating component for heating the reaction vessel; and
    a feed configured to dispense the graphene oxide into the reaction vessel, wherein the reaction vessel is configured to facilitate conversion of the graphene oxide into reduced graphene oxide.

2. The system of claim 1, further comprising a sensor disposed within the reaction vessel.

3. The system of claim 2, wherein the sensor measures temperature, pH, or salt concentration.

4. The system of claim 3, wherein the system comprises a control unit for regulating a reaction carried out by the system.

5. The system of claim 4, wherein the control unit is configured to control one or more of a timing, amount, or rate of addition of one or more ingredients into the reaction vessel.

6. The system of claim 4, wherein the control unit is configured with a pre-programmed protocol for controlling the reaction.

7. The system of claim 1, wherein the heating component is configured to heat the reaction vessel to a reaction temperature, and maintain the reaction temperature within the reaction vessel for an amount of time.

8. The system of claim 1, wherein the reaction vessel has a volume of at least about 20 gallons.

9. The system of claim 1, wherein the system forms the reduced graphene oxide at a rate of greater than about 1 kg per batch.

10. The system of claim 1, wherein the heating component is configured to heat the reaction vessel to at least 90 degrees Celsius.

11. The system of claim 1, wherein the filter apparatus further comprises a mesh providing structural support for the micron filter.

12. The system of claim 1, wherein the filter apparatus further comprises a spray bar assembly configured to dispense the carbonaceous composition comprising the graphene oxide onto the micron filter.

13. The system of claim 1, wherein the spray bar assembly is further configured to dispense a wash fluid.

* * * * *